US008808440B2

(12) United States Patent
Fujie et al.

(10) Patent No.: US 8,808,440 B2
(45) Date of Patent: Aug. 19, 2014

(54) INK COMPOSITION, INK FOR INKJET RECORDING AND INKJET RECORDING METHOD

(71) Applicant: FUJIFILM Corporation, Tokyo (JP)

(72) Inventors: Yoshihiko Fujie, Kanagawa (JP); Keiichi Tateishi, Kanagawa (JP); Toshiharu Tanaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/011,091

(22) Filed: Aug. 27, 2013

(65) Prior Publication Data

US 2013/0342620 A1    Dec. 26, 2013

Related U.S. Application Data

(63) Continuation of application No. PCT/JP2011/079384, filed on Dec. 19, 2011.

(30) Foreign Application Priority Data

Feb. 28, 2011 (JP) .................. 2011-043406
Jun. 27, 2011 (JP) .................. 2011-142326

(51) Int. Cl.
*C09D 11/02* (2014.01)

(52) U.S. Cl.
USPC ............... 106/31.5; 106/31.46; 106/31.48; 106/31.52

(58) Field of Classification Search
CPC ................. C09D 11/328; B41J 2/17
USPC ......... 106/31.5, 31.52, 31.48, 31.46; 347/100
See application file for complete search history.

(56) References Cited

U.S. PATENT DOCUMENTS

| | | | |
|---|---|---|---|
| 6,923,855 B2 * | 8/2005 | Harada et al. ............. | 106/31.5 |
| 7,163,576 B2 * | 1/2007 | Oshaughnessy et al. .. | 106/31.48 |
| 7,510,605 B2 * | 3/2009 | Harada et al. ............. | 106/31.48 |
| 7,553,358 B2 * | 6/2009 | Okamura et al. .......... | 106/31.48 |
| 8,101,011 B2 * | 1/2012 | Tateishi et al. ............ | 106/31.46 |
| 8,523,990 B2 * | 9/2013 | Tanaka et al. ............. | 106/31.5 |
| 2003/0035034 A1 | 2/2003 | Fukumoto et al. | |
| 2004/0129172 A1 | 7/2004 | Harada et al. | |
| 2008/0274283 A1 | 11/2008 | Tateishi et al. | |
| 2008/0274285 A1 | 11/2008 | Okamura et al. | |
| 2010/0118067 A1 | 5/2010 | Morita et al. | |
| 2010/0124639 A1 | 5/2010 | Wright | |
| 2010/0189966 A1 | 7/2010 | Cordwell | |
| 2011/0104458 A1 | 5/2011 | Tanaka et al. | |
| 2012/0088910 A1 | 4/2012 | Tateishi et al. | |
| 2012/0095194 A1 | 4/2012 | Tateishi et al. | |
| 2012/0095195 A1 | 4/2012 | Tateishi et al. | |
| 2013/0284064 A1 * | 10/2013 | Tateishi et al. ............. | 106/31.78 |

FOREIGN PATENT DOCUMENTS

| | | |
|---|---|---|
| JP | 2002-105366 A | 4/2002 |
| JP | 2004-83903 A | 3/2004 |
| JP | 2005-225979 A | 8/2005 |
| JP | 2005-264085 A | 9/2005 |
| JP | 2005-533147 A | 11/2005 |
| JP | 2006-57062 A | 3/2006 |
| JP | 2007-63520 A | 3/2007 |
| JP | 2007-224276 A | 9/2007 |
| JP | 2008-297541 A | 12/2008 |
| JP | 2009-263514 A | 11/2009 |
| JP | 4402917 B2 | 11/2009 |
| JP | 2010-24444 A | 2/2010 |
| JP | 2010-526166 A | 7/2010 |
| JP | 2010-184985 A | 8/2010 |
| JP | 2010-530916 A | 9/2010 |
| WO | 2004/007619 A1 | 1/2004 |
| WO | 2008/142989 A1 | 11/2008 |

OTHER PUBLICATIONS

International Search Report (PCT/ISA/210), dated Jan. 31, 2012, issued by the International Searching Authority in counterpart International Patent Application No. PCT/JP2011/079384.
Written Opinion (PCT/ISA/237), dated Jan. 31, 2012, issued by the International Searching Authority in counterpart International Patent Application No. PCT/JP2011/079384.
International Preliminary Report on Patentability issued Sep. 19, 2013, in International Application No. PCT/JP2011/079384, with attached translation of Written Opinion [PCT/ISA/237].

* cited by examiner

*Primary Examiner* — Helene Klemanski
(74) *Attorney, Agent, or Firm* — Sughrue Mion, PLLC

(57) ABSTRACT

An ink composition containing at least three coloring materials of a first coloring material, a second coloring material, and a third coloring material, in which the first coloring material is a compound represented by Formula (Y) as described, the second coloring material is at least one compound selected from Group A consisting of compounds having a specific structure, in which the mass ratio of the content (% by mass) of the second coloring material in the composition to the content (% by mass) of the first coloring material in the composition is 0.001 to 1.0, and the third coloring material is a compound different from the first coloring material as described.

12 Claims, No Drawings

INK COMPOSITION, INK FOR INKJET RECORDING AND INKJET RECORDING METHOD

CROSS REFERENCE TO RELATED APPLICATION

This is a continuation of International Application No. PCT/JP2011/079384 filed on Dec. 19, 2011, and claims priority from Japanese Patent application Nos. 2011-043406 and 2011-142326, filed on Feb. 28, 2011 and Jun. 27, 2011, respectively, the entire disclosures of which are incorporated herein by reference.

TECHNICAL FIELD

The present invention relates to an ink composition, an ink for inkjet recording, and an inkjet recording method.

BACKGROUND ART

An inkjet recording method is a recording method for forming an image by providing small ink droplets to a recording medium such as plain paper and a glossy medium, and has become rapidly widespread due to price reduction and improvement of recording speed. Further, in addition to that high-definition of an image obtained by the inkjet recording method is advanced, and along with rapid spread of digital cameras, the method has become widely common as an output method of images comparable to a silver halide photograph.

Examples of the problem of the ink jet recording method include deterioration in image fastness of the recorded material obtained. In general, the recorded matter obtained by the inkjet recording method has low image fastness as compared to a silver halide photograph. Specifically, when the recorded material is exposed to water, light, humidity, heat, environmental gases present in the air or the like for a long period of time, there is a problem in that a color material on the recorded material is likely to deteriorate, which causes a change in color tone or color fading of the image.

In forming a color image, an ink set in which ink compositions with a plurality of colors are combined with each other is used. In the ink set, when image fastness such as light resistance or ozone resistance of a specific ink composition are significantly lower than those of the other ink compositions, a color formed by the specific ink composition is faded or discolored more rapidly than the other colors, and thus the color tone balance of the entire color image deteriorates. Therefore, it is preferred that the image fastness of each ink composition constituting the ink set is excellent and a difference in image fastness between the respective ink compositions is small.

Among yellow, magenta and cyan inks widely used as ink for inkjet, magenta, in particular, light resistance of the image of yellow ink tends to be inferior to that of images of the other inks. As a colorant used in the yellow ink, various azo compounds are known (for example, Patent Documents 1 to 8).

With respect to such problems, various yellow inks color tones of which are good and which are aimed to improve fastness to light, moist heat and gas such as ozone have been proposed (see Patent Documents 9 to 11).

Further, Patent Document 12 discloses an ink composition containing at least two or more yellow dyes which satisfy a relationship of a specific wavelength.

Further, in the ink for inkjet, from the viewpoint of image quality improvement in the recorded material obtained, in addition to the aforementioned points, it has been required that the color tone of the ink itself and permeability into an image-receiving paper are improved, and suppression of bronze generation of printed matters is improved.

RELATED ART

Patent Document

Patent Document 1: Japanese Patent Application Laid-Open No. 2004-83903
Patent Document 2: Japanese Patent Application Laid-Open No. 2007-063520
Patent Document 3: Japanese Patent Application Laid-Open No. 2010-024444
Patent Document 4: Japanese Patent Application Laid-Open No. 2010-184985
Patent Document 5: International Publication No. WO 2008/142989
Patent Document 6: Japanese National Publication of International Patent Application No. 2005-533147
Patent Document 7: Japanese National Publication of International Patent Application No. 2010-526166
Patent Document 8: Japanese National Publication of International Patent Application No. 2010-530916
Patent Document 9: Japanese Patent No. 4402917
Patent Document 10: Japanese Patent Application Laid-Open No. 2008-297541
Patent Document 11: Japanese Patent Application Laid-Open No. 2009-263514
Patent Document 12: Japanese Patent Application Laid-Open No. 2005-264085

DISCLOSURE OF INVENTION

Problems to be Solved by the Invention

The yellow inks described in Patent Documents 9 to 12 have a certain level of effect in improving fastness such as light resistance and ozone resistance, but considering the diversification of use environment in recent years, there is a need for an ink composition having fastness at a higher level, excellent permeability into an image-receiving paper, and excellent suppressing bronze generation of printed matters obtained.

An object of the present invention is to provide an ink composition capable of forming an image having excellent light resistance and ozone resistance, which is excellent in color tone, permeability into an image-receiving paper, and suppression of bronze generation of printed matters, an ink for inkjet recording using the ink composition, and an inkjet recording method.

Means to Solving the Problem

The problems may be solved by the following means.

[1] An ink composition containing at least three coloring materials of a first coloring material, a second coloring material and a third coloring material, wherein the first coloring material is a compound represented by the following Formula (Y), the second coloring material is at least one compound selected from the following Group A, the mass ratio of the content (% by mass) of the second coloring material in the composition to the content (% by mass) of the first coloring material in the composition is 0.001 to 1.0, and the third coloring material is a compound which is different from the first coloring material and is represented by any one of the following Formulas (1) to (8).

Formula (Y):
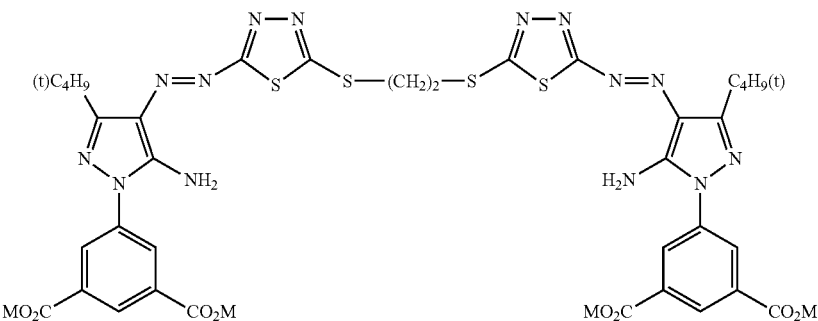
wherein in Formula (Y), M's each independently represent a hydrogen atom or a cation, and when M represents a cation, M represents $Li^+$ ion, $Na^+$ ion, $K^+$ ion or $NH_4^+$ ion:
Group A:
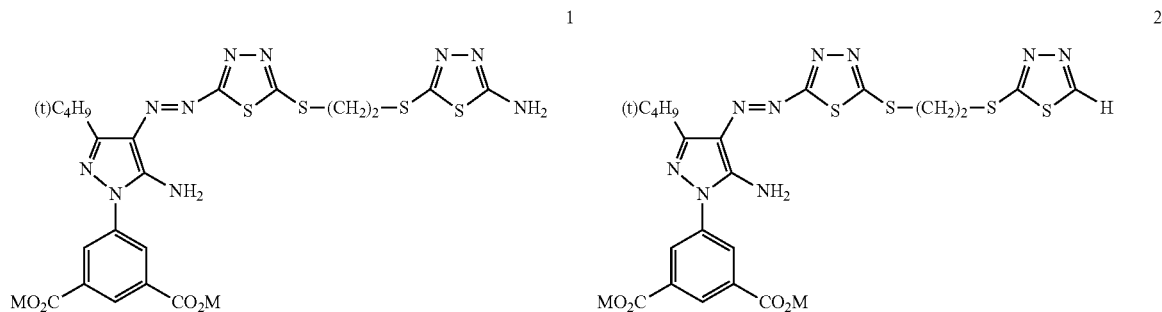
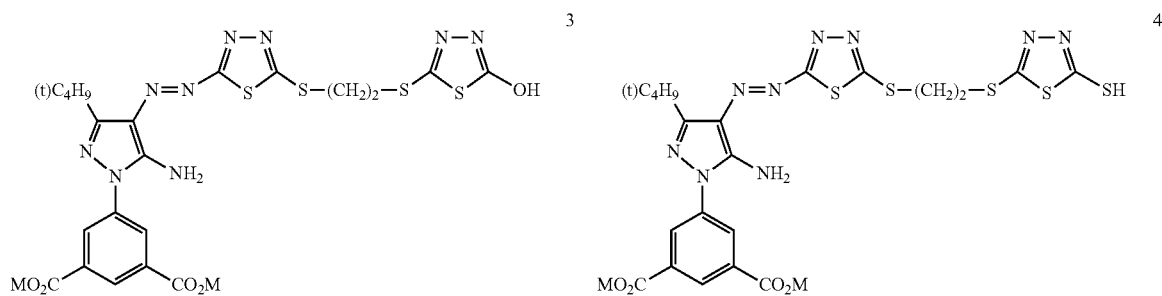
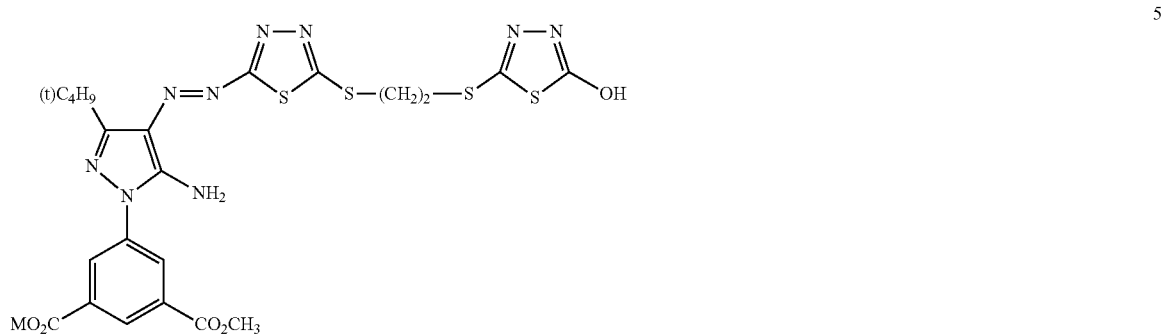

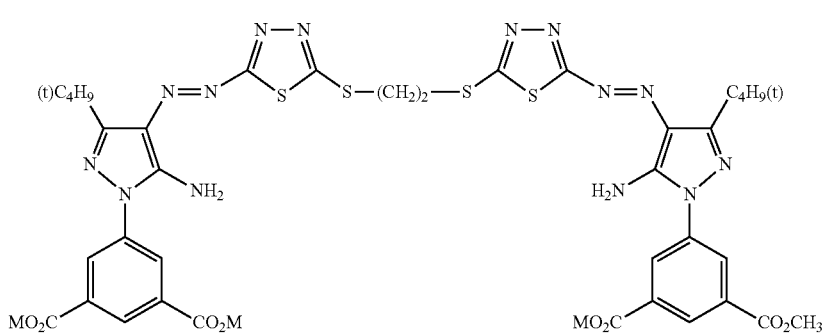

6

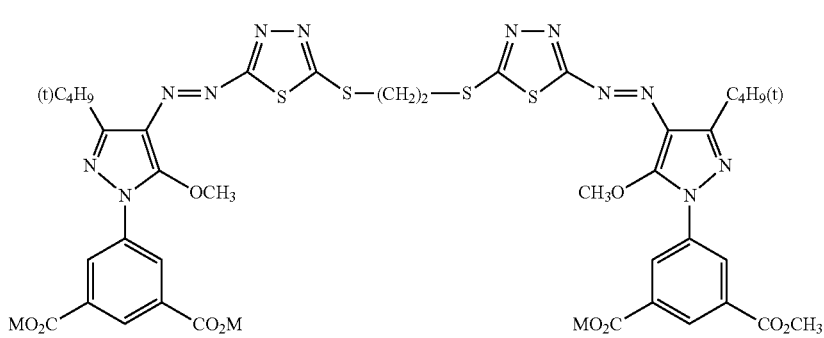

7

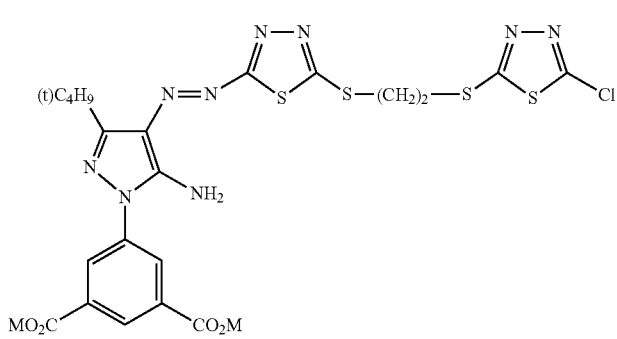

8 wherein, in Group A, M's each independently represent a hydrogen atom or a cation, and when M represents a cation, M represents Li$^+$ ion, Na$^+$ ion, K$^+$ ion, or NH$_4^+$ ion:

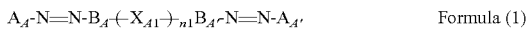
Formula (1)

wherein, in Formula (1), $A_A$ and $A_{A'}$ each independently represent an aryl group or a monovalent heterocyclic group, $B_A$ and $B_{A'}$ each independently represent an arylene group or a divalent heterocyclic group, $X_{A1}$ represents a divalent linking group, and n1 represents 0 or 1, provided that at least one of $A_A$, $B_A$, $A_{A'}$ and $B_{A'}$ is a heterocyclic group:

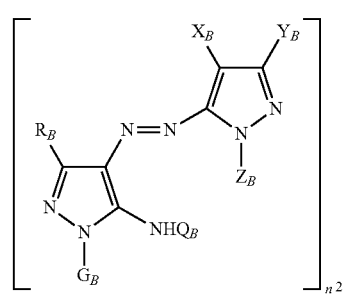
Formula (2)

wherein in Formula (2), $G_B$ represents a heterocyclic group, and $n^2$ represents an integer of 1 to 3, when $n^2$ is 1, $R_B$, $X_B$, $Y_B$, $Z_B$, $Q_B$ and $G_B$ represent a monovalent group, when $n^2$ is 2, $R_B$, $X_B$, $Y_B$, $Z_B$, $Q_B$ and $G_B$ represent a monovalent or divalent substituent, and at least one thereof represents a divalent substituent, and when $n^2$ is 3, $R_B$, $X_B$, $Y_B$, $Z_B$, $Q_B$ and $G_B$ represent a divalent or trivalent substituent, and at least two thereof represent a divalent substituent, or at least one thereof represents a trivalent substituent:

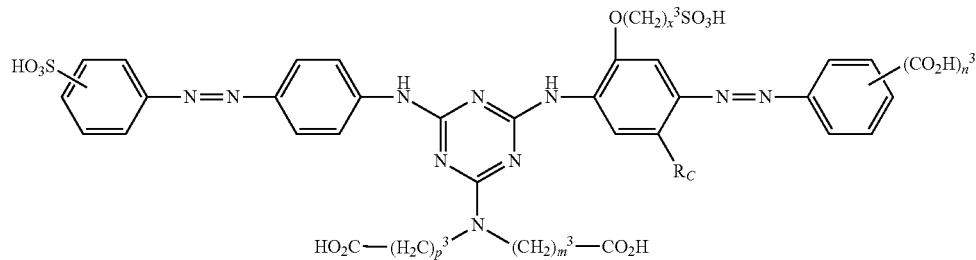

Formula (3)

wherein in Formula (3), $R_C$ represents an alkyl group having 1 to 4 carbon atoms, $n^3$ represents 1 or 2, $x^3$ represents an integer of 2 to 4, and $m^3$ and $p^3$ each independently represent an integer of 1 to 3:

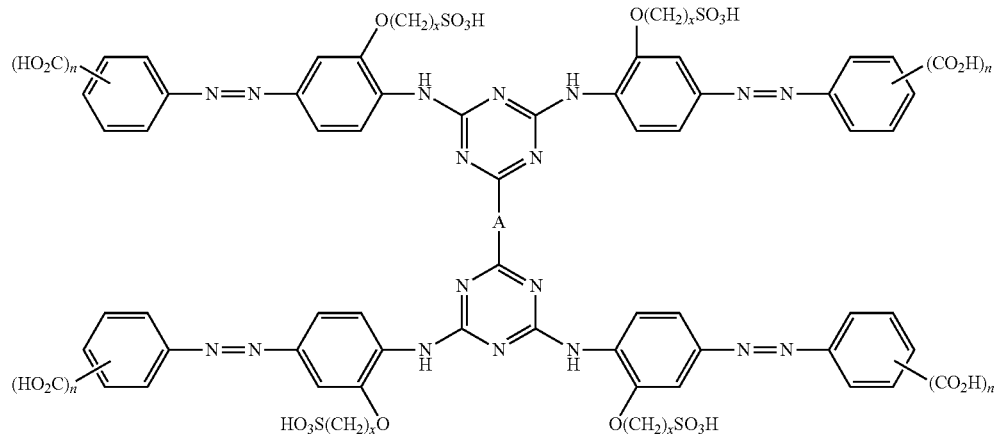

Formula (4)

wherein in Formula (4), n represents 1 or 2, x represents an integer of 2 to 4, and A represents a divalent bonding group represented by any one of the following Formulas (A-1) to (A-3):

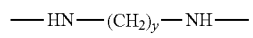

Formula (A-1)

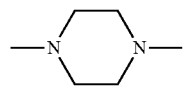

Formula (A-2)

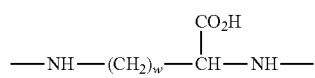

Formula (A-3)

wherein in Formulas (A-1) and (A-3), y represents an integer of 2 to 6, and w represents an integer of 1 to 4:

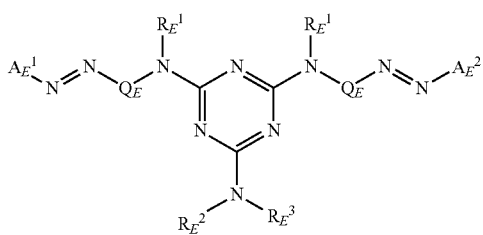

Formula (5)

wherein in Formula (5), $A_E^1$ and $A_E^2$ are each independently a phenyl group or a naphthyl group which may be substituted, each $Q_E$ is independently a phenylene group which may be substituted, each $R_E^1$ is independently H, or an alkyl group which may be substituted, $R_E^2$ is H, or an alkyl group which may be substituted, $R_E^3$ is an alkyl group having a sulfo group, provided that the compound of Formula (5) has at least one carboxylic acid group and the compound of Formula (5) is not a compound represented by Formula (B-1):

$R_G^b$ are each independently H, an alkyl group which may be substituted, an aryl group which may be substituted, or an aryl alkyl group which may be substituted, each of $W_G^1$, $W_G^2$, $W_G^3$ and $W_G^4$ is independently a —$CO_2H$, —$SO_3H$ or —$PO_3H_2$ group, or an alkyl group which is substituted with one or more groups selected from —$CO_2H$, —$SO_3H$ and

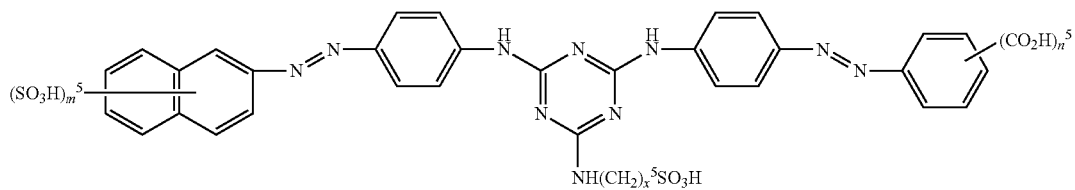

Formula (B-1)

wherein, $m^5$ is 1 or 2; $n^5$ is 1 or 2; and $x^5$ is 2 to 4:

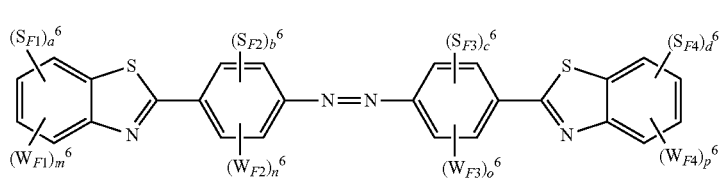

Formula (6)

wherein in Formula (6), each of $S_{F1}$, $S_{F2}$, $S_{F3}$ and $S_{F4}$ is independently a substituent other than a water-dispersible substituent, each of $W_{F1}$, $W_{F2}$, $W_{F3}$ and $W_{F4}$ is independently a water-dispersible substituent, $a^6$, $b^6$, $c^6$ and $d^6$ are each independently 0 to 4, and $m^6$, $n^6$, $o^6$ and $p^6$ are each independently 0 to 4, ($a^6$+$m^6$) has a value of 0 to 4,
($b^6$+$n^6$) has a value of 0 to 4,
($c^6$+$o^6$) has a value of 0 to 4,
($d^6$+$p^6$) has a value of 0 to 4, and
($n^6$+$o^6$) has a value of 1 to 8:

—$PO_3H_2$, each of $S_G^1$, $S_G^2$, $S_G^3$ and $S_G^4$ is independently a substituent other than a group defined as $W_G^1$, $W_G^2$, $W_G^3$ and $W_G^4$, $a^7$ and $d^7$ are each independently 1 to 5, $b^7$ and $c^7$ are each independently 0 to 4;

($a^7$+$b^7$) is a value of 1 to 5;
($c^7$+$d^7$) is a value of 1 to 5; $e^7$ and $h^7$ are each independently 1 to 7; $f^7$ and $g^7$ are each independently 0 to 6;
($e^7$+$f^7$) has a value of 1 to 7; and
($g^7$+$h^7$) has a value of 1 to 7.

[2] The ink composition according to [1], in which the compound selected from Group A is at least one kind selected from Compound 1, 2, 3 and 8.

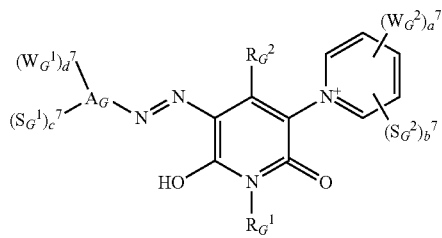

Formula (7)

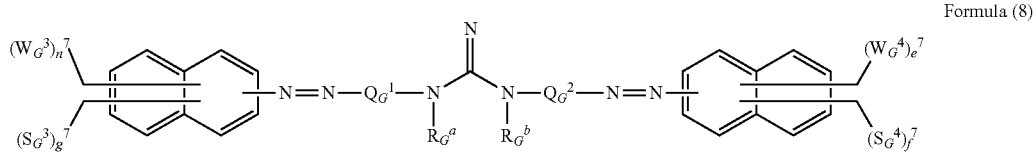

Formula (8)

wherein in Formulas (7) and (8), $A_G$ is an aryl group or a heteroaryl group, or a group containing an aryl group or a heteroaryl group, $Q_G^1$ and $Q_G^2$ are each independently a phenylene group which may be substituted, $R_G^1$, $R_G^2$, $R_G^a$ and

[3] The ink composition according to [1] or [2], in which the main component of M is $K^+$ ion in the compound represented by Formula (Y), and the main component of M is $K^+$ ion in the compound selected from Group A.

[4] The ink composition according to any one of [1] to [3], in which all M's are a K⁺ ion in both of the compound represented by Formula (Y) and the compound selected from Group A.

[5] The ink composition of any one of [1] to [4], in which the mass ratio of the content (% by mass) of the second coloring material in the ink composition to the content (% by mass) of the first coloring material in the ink composition is 0.001 to 0.2.

[6] The ink composition of any one of [1] to [5], in which the content of the second coloring material in the ink composition is 0.01% by mass to 1.1% by mass based on a total mass of the ink composition.

[7] The ink composition of any one of [1] to [6], in which the content of the first coloring material represented by Formula (Y) is 0.1% by mass to 10% by mass based on the total mass of the ink composition.

[8] The ink composition of any one of [1] to [7], in which the content of the third coloring material is 0.1% by mass to 10% by mass based on the total mass of the ink composition.

[9] The ink composition of any one of [1] to [8], in which the content (% by mass) of the first coloring material in the ink composition is 1.0 time to 5.0 times by mass ratio than the content (% by mass) of the third coloring material.

[10] The ink composition of any one of [1] to [8], in which the content (% by mass) of the first coloring material in the ink composition is 2.0 times to 4.0 times by mass ratio than the content (% by mass) of the third coloring material.

[11] An ink for inkjet recording containing the ink composition of any one of [1] to [10].

[12] An inkjet recording method using the ink for inkjet recording of [11].

[13] An inkjet recording method including: discharging ink droplets to an image-receiving material having an image-receiving layer containing white inorganic pigment particles on a support in accordance with a recording signal to record an image on the image-receiving material, in which the ink droplets are made of the ink for inkjet recording of [11].

Effects of the Invention

According to the present invention, it is possible to provide an ink composition capable of forming an image which is fast to light and ozone, which is excellent in color tone, permeability into an image-receiving paper and suppression of bronze generation of printed matters, an ink for inkjet recording using the ink composition, and an inkjet recording method.

EMBODIMENTS FOR CARRYING OUT THE INVENTION

First, a substituent constant σp value of Hammett used in the present specification will be basically described. The Hammett's rule is an empirical rule proposed by L. P. Hammett in 1935 in order to quantitatively discuss an influence of substituent groups exerted on reaction or equilibrium of a benzene derivative, and the validity of this rule is widely recognized today. The substituent constant obtained by the Hammett's rule includes a σp value and an am value, and these values are disclosed in many general textbooks, the details of which are described in, for example, J. A. Dean, Ed., "Lange's Handbook of Chemistry", 12th Edition, 1979 (McGraw-Hill) or "Realms of Chemistry" special issue, No. 122, pp. 96 to 103, 1979 (Nankodo Co., Ltd.). Meanwhile, each substituent in the present invention is limited or described by the substituent constant σp of Hammett, and it is not meant that the substituents are not limited only to a substituent group which may be found in the aforementioned textbooks and the value of which is already known in the literatures, but even if the value is not yet known in the literatures, the substituent will be definitely included in the present invention as long as the value falls within the range when measured on the basis of the Hammett's rule. Even when the compounds represented by Formulas of the present invention are not a benzene derivative, the σp value is used as a measure of showing the electron effect of the substituent regardless of the substitution position thereof. In the present invention, the σp value will be hereinafter used as such a meaning.

Further, in the present invention, when the compound is a salt, the salt is dissociated into and present as ions in ink, but will be expressed as "contains the salt" for convenience. In addition, in the following description, a compound represented by Formula (Y) and a compound represented by Formula (Y-1), which are a first coloring material, are each described briefly as the "compound of Formula (Y)" and the "compound of Formula (Y-1)" in some cases. Furthermore, at least one compound selected from Group A, which is a second coloring material, is described briefly as the "compound of Group A" in some cases.

Hereinafter, the present invention will be described in detail with reference to preferred embodiments.

(Ink Composition)

The ink composition of the present invention is an ink composition containing at least three coloring materials of a first coloring material, a second coloring material and a third coloring material, in which the first coloring material is a compound represented by the following Formula (Y) (hereinafter, the compound represented by Formula (Y) will be denoted as the "azo dye" in some cases), the second coloring material is at least one compound selected from the following Group A, in which the mass ratio of the content (% by mass) of the second coloring material in the composition to the content (% by mass) of the first coloring material in the composition is 0.001 to 1.0, and the third coloring material is a compound which is different from the first coloring material, and is represented by any one of Formulas (1) to (8).

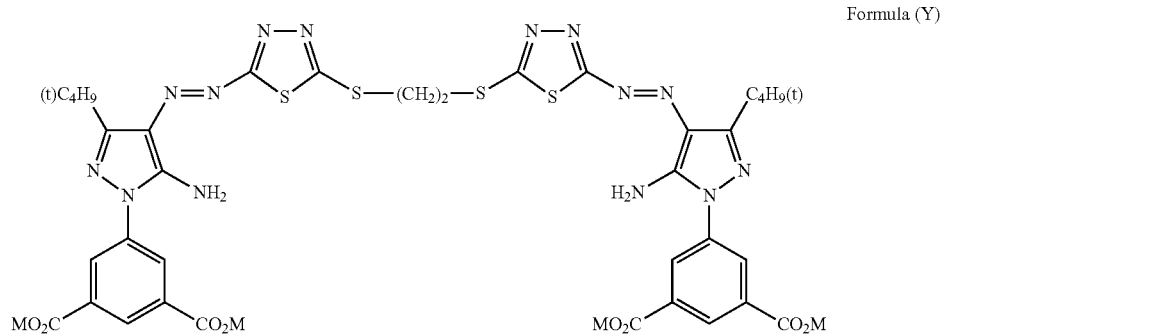
Formula (Y)
(In Formula (Y), M's each independently represent a hydrogen atom or a cation, and when M represents a cation, M represents Li⁺, Na⁺ ion, K⁺ ion, or NH₄⁺ ion.)
Group A:
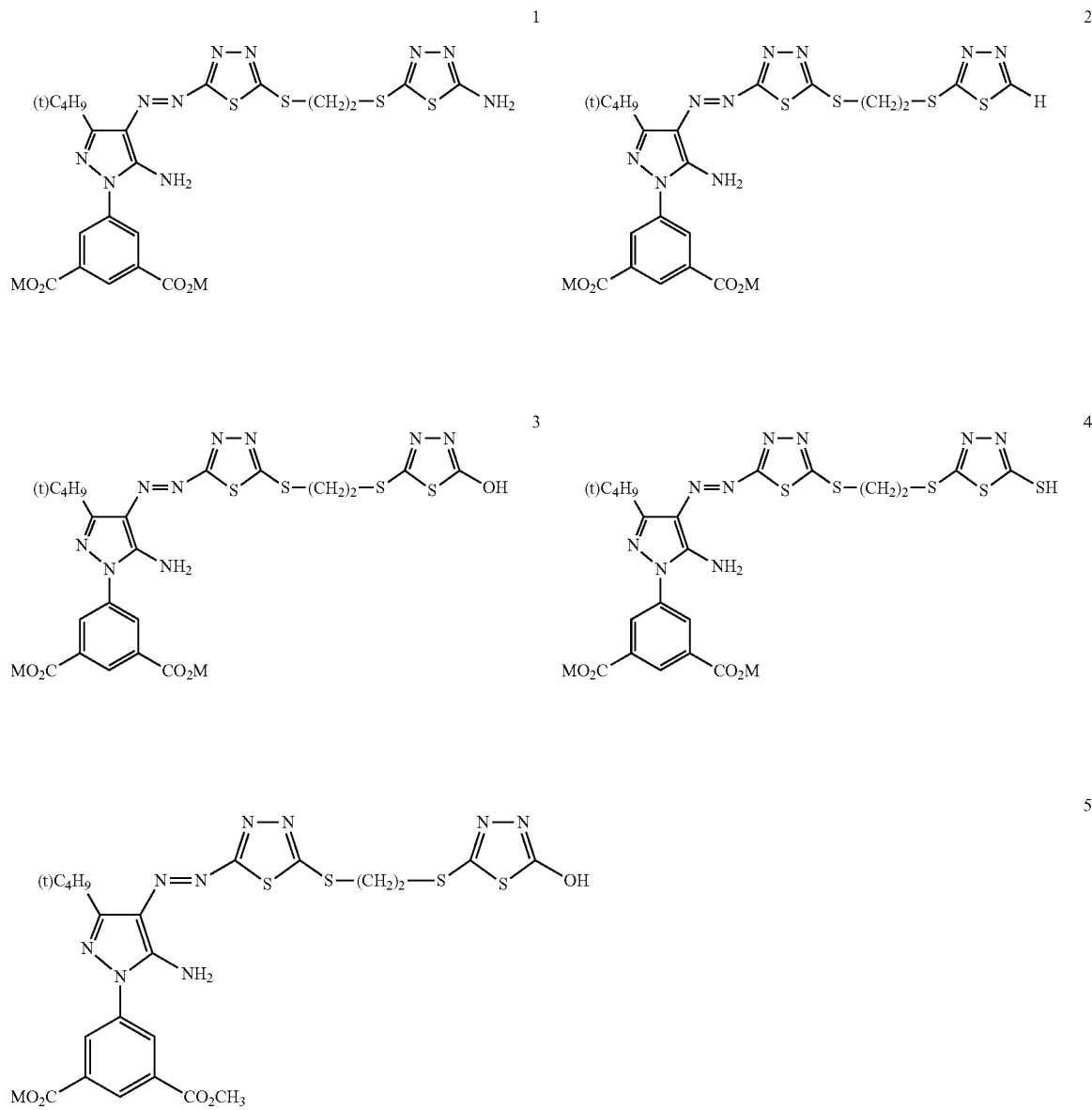

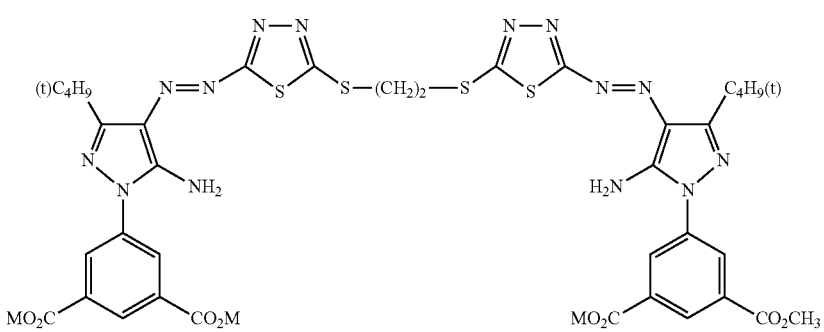

6

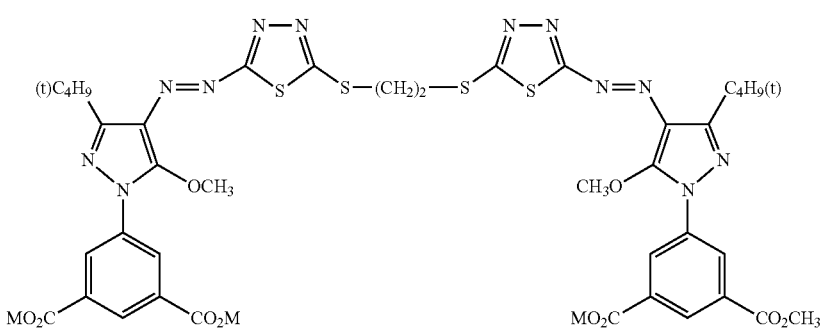

7

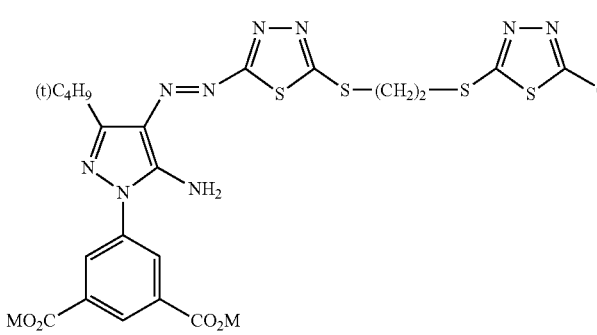

8

(In Group A, M's each independently represent a hydrogen atom or a cation, and when M represents a cation, M represents $Li^+$ ion, $Na^+$ ion, $K^+$ ion, or $NH_4^+$ ion.)

In the present invention, a compound represented by the following Formula (Y-1) is used particularly as the first coloring material, and as the second coloring material, Compound 1, 2, 3, 5, 6 or 8 in Group A is preferably used, Compound 1, 2, 3, 6 or 8 is more preferably used, and Compound 1, 2, 3 or 8 is still more preferably used.

By containing the compound represented by Formula (Y) as the first coloring material, a specific amount of at least one compound selected from the following Group A as the second coloring material, and at least one compound represented by any one of Formulas (1) to (8) as the third coloring material, the ink is provided as ink having excellent color tone, permeability into an image-receiving paper, and suppression of bronze generation of printed matters. The reason is not clear, but it is presumed that the compound represented by Formula (Y), the second coloring material, and the third coloring material are contained in the ink composition, and thus the compounds compensates for each other in solubility thereof without destroying the entire color tone or coloring balance so that excessive association or aggregation is suppressed to appropriately increase the permeability into an image-receiving paper, thereby making it difficult to cause a bronze phenomenon on the surface of the image-receiving paper.

The ink composition of the present invention is obtained by dissolving at least one or more compounds (dyes) represented by the following Formula (Y), the second coloring material (dye) and the third coloring material (dye) in, for example, an aqueous medium. That is, the dye represented by Formula (Y), the second dye and the third dye are typically aqueous dyes.

The content of the dye represented by Formula (Y) is preferably 0.1% by mass to 10% by mass, and more preferably 1.0% by mass to 6.0% by mass, based on the total amount of the ink composition. By using the dye, it is possible to suppress bleeding or color migration of the obtained image, and achieve quality with good color or color concentration. Further, the dye has excellent fastness to light, heat, air, water, chemicals, and the like compared to general azo dyes, thereby contributing to storage stability of ink and a recorded image.

The content of the third dye is preferably 0.1% by mass to 10% by mass, and more preferably 0.5% by mass to 4.0% by mass, based on the total amount of the ink composition. By using the third dye in combination with the dye represented by Formula (Y), it is possible to prepare an ink composition having excellent color tone, permeability into an image-receiving paper, and suppression of bronze generation of printed matters.

Meanwhile, the content (% by mass) of the first dye represented by Formula (Y) in the ink composition is preferably 0.1 time to 10.0 times, more preferably 1.0 time to 5.0 times, and still more preferably 2.0 times to 4.0 times the content (% by mass) of the third dye by mass ratio. By adopting this ratio, it is possible to obtain a better effect or suppressing the bronze generation.

Further, it is preferred that the ink composition of the present invention is used as an ink for inkjet recording. That is, the present invention also relates to an ink for inkjet recording containing the ink composition of the present invention. The contents of the first dye represented by Formula (Y) and the third dye in the ink for inkjet recording are the same as the contents thereof in the ink composition.

The ink for inkjet recording of the present invention may be prepared by diluting a stock solution of the ink for inkjet recording with water or the like. Further, the ink for inkjet recording of the present invention may similarly contain components as described below, which may be contained in the ink composition of the present invention.

[Coloring Material]
(First Coloring Material)

An aqueous azo dye used as the first coloring material in the ink composition of the present invention is represented by Formula (Y). Hereinafter, the azo dye (yellow) represented by Formula (Y) will be described.

component of the counter cation M means an ion that occupies 80% or more (preferably 90% or more) of the entire counter cation M.

The reason is because when the main component of the counter cation M of the ionic hydrophilic group of the compound represented by Formula (Y) is $K^+$ ion, the solubility in the ink solution is increased, and thus the formation and precipitation of salt are suppressed, thereby significantly improving storage stability of the ink solution.

The dye represented by Formula (Y) may be in a form of a mixed salt in which multiple kinds of M are present. In the case of a mixed salt, it is preferred that 50% to 100%, more preferably 80% to 100%, particularly 90% to 100% of M is a $K^+$ ion in terms of the mole fraction in M possessed by the dye represented by Formula (Y) contained in an ink. Other than a $K^+$ ion, M is preferably a $Na^+$ ion or a $NH_4^+$ ion, and more preferably $Na^+$ ion.

Further, it is most preferred that instead of the mixed salt, all the Ms of the dye contained in the ink and represented by Formula (Y) are $K^+$ ion. The reason is because in a distributed state where molecules are dissolved in an aqueous solution or an ink solution when all the Ms are $K^+$ ion, a cationic species is exchanged in a state where a carboxy group which is an ionic hydrophilic group, or a salt thereof ($-CO_2M$) is disso-

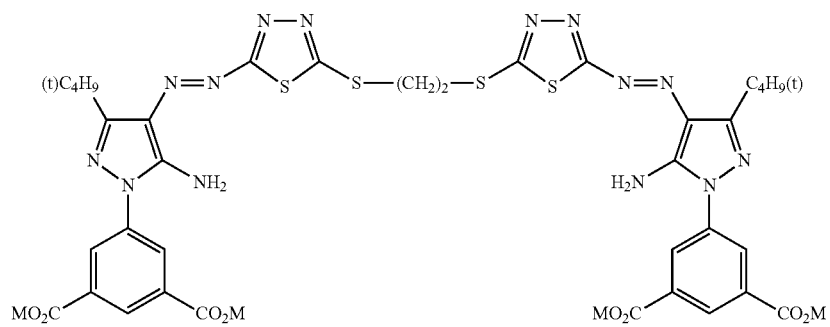

Formula (Y)

(In Formula (Y), M's each independently represent a hydrogen atom or a cation, and when M represents a cation, M represents $Li^+$ ion, $Na^+$ ion, $K^+$ ion, or $NH_4^+$ ion.)

M represents a hydrogen atom or a cation, and when M represents a cation, M represents $Li^+$ ion, $Na^+$ ion, $K^+$ ion, or $NH_4^+$ ion. M is preferably $Na^+$ ion, $K^+$ ion, or $NH_4^+$ ion, more preferably $Na^+$ ion and $K^+$ ion, and most preferably $K^+$ ion. In the dye represented by Formula (Y), it is preferred that the counter cation which is a main component of M is $K^+$ ion, and more preferred that the entire M is $K^+$ ion. Here, the main ciated into and ionized as $-CO_2^-$ and $M^+$, so as to form a state of a salt having solubility lower than that of the aqueous solution or ink solution, thereby obtaining an effect that it is easy to suppress a coloring agent from being precipitated in the state of salt.

Among the compounds of Formula (Y), it is preferred that particularly the compound of the following Formula (Y-1) is used.

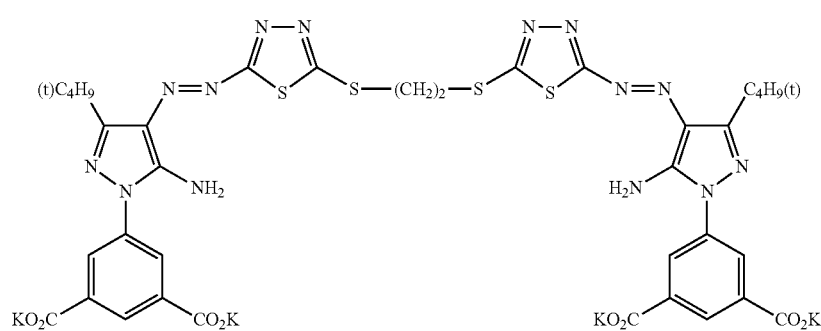

Formula (Y-1)

Dyes represented by Formula (Y) and Formula (Y-1) may be synthesized by a general synthesis method, and may be synthesized in the same manner as a method described in, for example, [0066] and [0067] of Japanese Patent Application Laid-Open No. 2004-083903.

The yellow dye used in the present invention has an excellent forced fading rate constant for ozone gas. For measurement of the forced fading rate constant for ozone gas, a colored region which has a color in the main spectral absorption region of the ink in an image obtained by printing only the ink on a reflective image-receiving medium and in which a reflection concentration measured through a status A filter is 0.90 to 1.10 is selected as an initial concentration point, and the initial concentration is defined as a starting concentration (=100%). The image is faded using an ozone fading tester, which maintains an ozone concentration of 5 mg/L at all times, to measure the time for which the concentration becomes 80% of the initial concentration, and a reciprocal of the time [hour-1] is obtained to be defined as the forced fading rate constant, based on the assumption that the relationship between fading concentration and time follows a rate equation of first-order reaction. Therefore, the fading rate constant obtained is a fading rate constant of a colored region that is printed by the ink, and in the present specification, the value is used as a fading rate constant of the ink.

As a test print patch, it is possible to use a patch obtained by printing a black square symbol of JIS code 2223, a stepwise color patch of the Macbeth chart, or an arbitrary stepwise density patch where a measured area may be obtained.

A reflection concentration of a reflection image (stepwise color patch) printed for measurement is a concentration obtained with measurement light passing through a status A filter by a densitometer satisfying the International Standard ISO5-4 (geometrical conditions for reflection concentration).

In a test chamber for measurement of a forced fading rate constant for ozone gas, an ozone generator (for example, a high-voltage discharge mode of applying an alternating current voltage to dry air) capable of constantly maintaining an internal ozone gas concentration at 5 mg/L is provided, and an aeration temperature is adjusted to 25° C.

Meanwhile, the forced fading rate constant is an index for showing the susceptibility to oxidation by oxidative atmosphere in the environment, such as photochemical smog, exhaust gas of automobiles, organic vapor from a painted surface of furniture, a carpet or the like, and gas generated from a frame in a bright room, and an index using ozone gas as a representative of the oxidative atmosphere.

(Second Coloring Material)
[Group A]

In addition to the compound of Formula (Y) or the compound of Formula (Y-1) described above, which is used as the first coloring material, the ink composition of the present invention needs to be constituted to contain a second coloring material having the characteristics that storage stability of the ink composition, coloring properties of the ink, and image fastness of the printed matters are excellent. In the present invention, as the second coloring material, at least one compound selected from the following Group A is used. Even among at least one compound selected from the following Group A, particularly Compound 1, 2, 3, 5, 6 or 8 in Group A is preferably used, Compound 1, 2, 3, 6 or 8 is more preferably used, and Compound 1, 2, 3 or 8 is still more preferably used.

In the present invention, as the second coloring material, at least one compound selected from Group A may be used either alone or in combination of a plurality thereof. In the present invention, as the second coloring material, compounds are preferably used in combination of 1, 2, 3, 5, 6 and 8, compounds are more preferably in combination of 1, 2, 3, 6 and 8, and compounds are still more preferably used in combination of 1, 2, 3 and 8.

Further, a synergistic effect is exhibited by using at least one compound selected from the following Group A in combination with the compounds of Formula (Y), and thus the following effects may be obtained. That is, by containing these coloring materials, it is possible to prepare a yellow ink composition having a high tinctorial strength, provide an image having further excellent light resistance, and prevent clogging of an ink supply path or sufficiently satisfy storage stability. Hereinafter, these Formulas will be described.

Group A:

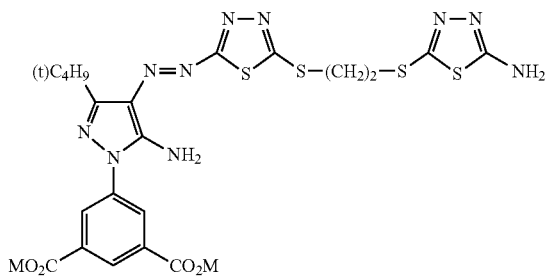

1

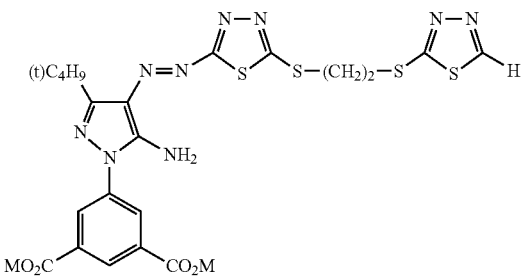

2

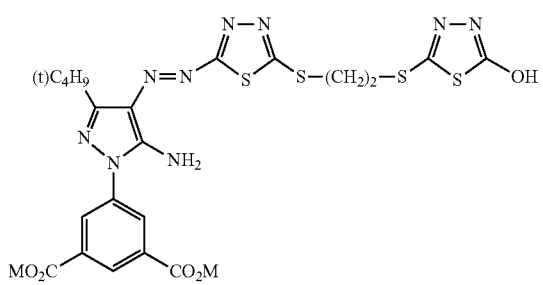

3

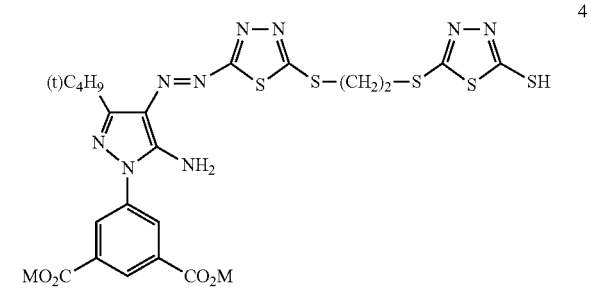

4

-continued

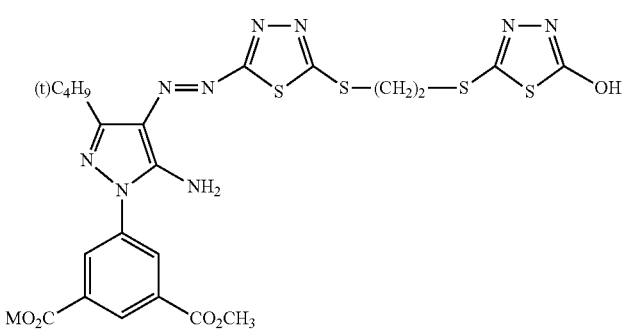

5

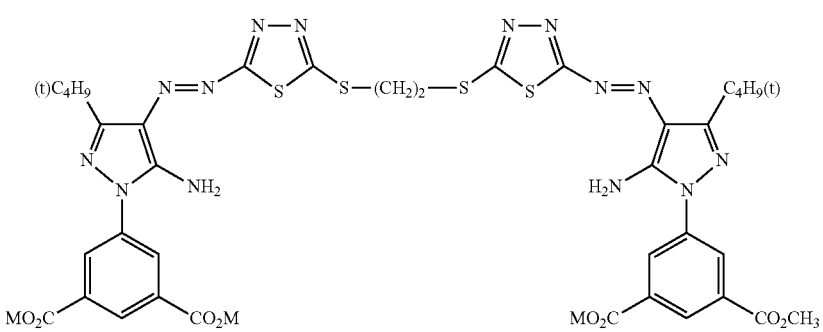

6

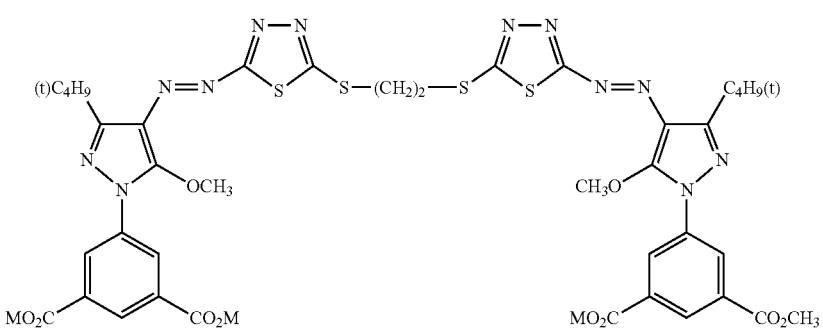

7

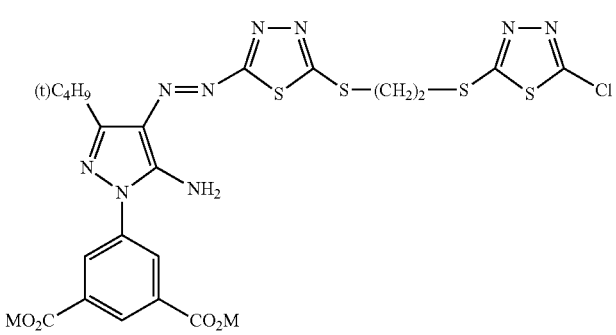

8

M in the at least one compound selected from Group A represents a hydrogen atom, $Li^+$ ion, $Na^+$ ion, $K^+$ ion or $NH_4^+$, represents preferably $Na^+$ ion, $K^+$ ion and $NH_4^+$ ion, more preferably $Na^+$ ion and $K^+$ ion, and still more preferably $K^+$ ion. In the at least one compound selected from Group A, the main component of the counter cation M is preferably $K^+$ ion, and all the Ms are more preferably $K^+$ ion.

The at least one compound selected from Group A may be in a form of a mixed salt in which multiple kinds of M are present. In the case of a mixed salt, it is preferred that 50% to 100%, more preferably 80% to 100%, still more preferably 90% to 100% of M is a $K^+$ ion in terms of the mole fraction in M possessed by the dye represented by Formula (Y) contained in an ink. Other than a $K^+$ ion, M is preferably a $Na^+$ ion or a $NH_4^+$ ion, and more preferably $Na^+$ ion.

Further, it is particularly preferred that M of all the compounds selected from Group A contained in the ink composition instead of the mixed salt is $K^+$. The reason is because in a distributed state where molecules are dissolved in an aqueous solution or an ink solution when all the Ms are $K^+$ ion, a cationic species is exchanged in a state where a carboxy group which is an ionic hydrophilic group, or a salt thereof (—$CO_2M$) is dissociated into and ionized as —$CO_2^-$ and $M^+$, so as to form a state of a salt having solubility lower than that of the aqueous solution or the ink solution, thereby obtaining an effect that it is easy to suppress a coloring agent from being precipitated in the state of salt.

The compound selected from Group A may be synthesized by a general synthesis method, and may be synthesized in the same manner as in Formula (Y) or Formula (Y-1) by varying and variously combining diazo components and coupling components described in, for example, the Japanese Patent Application Laid-Open No. 2004-083903.

In the present invention, it is preferred that in the compound represented by Formula (Y), the main component of the counter cation M is $K^+$ ion, and even in the compound selected from Group A, the main component of the counter cation M is $K^+$ ion. Here, the main component of the counter cation M means an ion that occupies 80% or more, and preferably 90% or more in the entire counter cation M.

The reason is because when the main component of the counter cation M of the ionic hydrophilic group of the compound represented by Formula (Y) and the compound selected from Group A is $K^+$ ion, the solubility in the ink composition is increased, and thus the formation and precipitation of the salt are suppressed, thereby significantly improving storage stability of the ink composition.

Further, it is more preferred that all the Ms in the compound represented by Formula (Y) and the compound selected from Group A are $K^+$ ion. The reason is because it is possible to significantly improve storage stability of the ink composition.

[Verification Method of Coloring Material]

For verification whether or not the coloring material used in the present invention is contained, it is possible to apply the following verification method including (1) to (3) using a liquid chromotography-mass spectrometry (LC-MS).

(1) a retention time of a peak, (2) a maximum absorption wavelength for the peak of (1), and (3) m/z (positive) and m/z (negative) of a mass spectrum for the peak of (1)

The analytical conditions of liquid chromotography-mass spectrometry are as follows. A liquid (ink) diluted about 1,000-fold with pure water was used as a sample for measurement. And, analysis was performed with liquid chromatography-mass spectrometry under the following conditions to measure a peak retention time and a peak having a measured Mass value.

<Measurement Conditions of Liquid Chromatograph Mass Spectrometry (LC-MS)>

Apparatus: Agilent 1100 (manufactured by Agilent Technologies, Inc.)

Column: YMC AM-312, inner diameter: 6.0 mm and length: 150 mm (manufactured by YMC Co., Ltd.)

Eluent: Liquid A: ultrapure water+0.1% acetic acid, 0.2% triethylamine

Liquid B: methanol+0.1% acetic acid, 0.2% triethylamine

Mobile phase and gradient conditions: (Table 1 (in Table 1, B. Conc. means the concentration of liquid B))

TABLE 1

| | Time(min) | | | | | |
|---|---|---|---|---|---|---|
| | 0 | 3 | 10 | 30 | 35 | 60 |
| B. Conc. | 50 | 50 | 70 | 70 | 90 | 90 |

Flow rate: 1.0 mL/min
Detection wavelength: 210 nm to 600 nm
Column temperature in an oven: 40° C.

Further, analysis conditions of mass spectrum are as follows. For the peak obtained, the mass spectrum is measured under the following conditions, and each of the posi and nega of m/z, which has been detected most strongly, is measured.

Device: Applied Biosystems™ QSTAR pulseri (manufactured by Life Technologies Corporation)
Ionization method: ESI (positive)
Capillary voltage: 3.5 kV
Desolvation gas: 300° C.
Ion source temperature: 120° C.
Detection method: TOF-MS
Detection range: 120 to 1,500

Under the aforementioned method and conditions, measurement was performed on Compound (Y-1) of the first coloring material and Compounds 1 to 8 of Group A of the second coloring material (M=$K^+$) as representative examples for each coloring material. As a result, the obtained retention time and measured Mass value {m/z (positive)} are shown in Table 2. For coloring compositions and inks, measurement was performed under the same method and conditions as above. If the values correspond to those shown in Table 2, it can be considered that the compounds correspond to those used in the present invention.

Further, M may be verified by, for example, measurement by ion chromatography.

Measurement conditions of ion chromatography:

Apparatus: Personal Ion Analyzer PIA-1000 (manufactured by Shimadzu Corp.)

Column: Semi-micro column Shim-pack IC-C2 (S) for cation analysis (inner diameter: 100 mm and length: 2 mm)

Mobile phase: 2.5 mM aqueous oxalic acid solution
Column temperature: 35° C.
Flow rate: 0.2 mL/min

TABLE 2

| Coloring material | Retention time (min) | Measured Mass value (m/z) | Calculated Mass value (m/z) |
|---|---|---|---|
| 1 | 14.2 | $(M+H)^+$: 607.1029 | $(M+H)^+$: C21H23N10O4S4 |
| 2 | 15.2 | $(M+H)^+$: 592.0846 | $(M+H)^+$: C21H23N9O4S4 |
| 3 | 16.9 | $(M+H)^+$: 608.0850 | $(M+H)^+$: C21H22N9O5S4 |
| 4 | 18.5 | N.D. | $(M+H)^+$: C19H21N7O4S3 |
| 5 | 21.8 | $(M+H)^+$: 633.0862 | $(M+H)^+$: C22H21N10O5S4 |
| Y-1 | 24.4 | $(M+H)^+$: 921.2026 | $(M+H)^+$: C36H37N14O8S4 |
| 7 | 36.7 | $(M+H)^+$: 965.2286 | $(M+H)^+$: C39H41N12O10S4 |
| 6 | 38.2 | $(M+H)^+$: 935.2134 | $(M+H)^+$: C37H39N14O8S4 |
| 8 | 24.8 | $(M+H)^+$: 626.0218 | $(M+H)^+$: C21H21ClN9O4S4 |

[Content of Coloring Material]

The ink composition of the present invention may be used as an ink material, and a concentrated aqueous solution containing a coloring agent at high concentration. It is preferred that the coloring agent concentration of the concentrated aqueous solution is 15% by mass or less and preferably 12% by mass or less in terms of temporal stability of the dye and ease of handling (viscosity), and it is preferred that the concentration is 8% by mass or more from the viewpoint of improving temporal stability of the dye or suppressing transport costs.

Further, the ink composition of the present invention may also be used as an inkjet ink. The coloring agent concentration of the inkjet ink is preferably 1% by mass to 12% by mass, more preferably 2% by mass to 8% by mass, and particularly preferably 3% by mass to 6% by mass in terms of the ink viscosity or the concentration of the printed matters.

It is preferred that the content of the second coloring material [at least one compound selected from Group A] in the ink composition is as follows. That is, the content (% by mass) of the second coloring material is preferably 0.001% by mass to 2.0% by mass, more preferably 0.005% by mass to 1.5% by mass, still more preferably 0.01% by mass to 1.1% by mass, and particularly preferably 0.05% by mass to 0.8% by mass, based on the total mass of the ink composition.

Meanwhile, it is more preferred that the content of the second coloring material in this case is as follows in relation to the other coloring materials. When any one of at least one compound selected from Group A is used alone, it is preferred that the content thereof is set to satisfy the aforementioned range, and when two or more selected from the compounds are used in combination, it is preferred that the total content thereof is set to satisfy the aforementioned range. By setting the content of the first coloring material and/or the second coloring material to the above-described range, the light resistance and color tone of the image may be satisfied, and the reliability of ink using the ink composition, such as storage stability or recording durability may be satisfied.

Compound 1 of Group A is contained in an amount preferably 0.001% by mass to 1.0% by mass, and more preferably 0.01% by mass to 1.0% by mass, based on the total mass of the ink composition.

Compound 2 of Group A is contained in an amount preferably 0.003% by mass to 3.0% by mass, and more preferably 0.1% by mass to 3.0% by mass, based on the total mass of the ink composition.

Compound 3 of Group A is contained in an amount preferably 0.001% by mass to 1.0% by mass, and more preferably 0.01% by mass to 1.0% by mass, based on the total mass of the ink composition.

Compound 4 of Group A is contained in an amount preferably 0.0% by mass to 0.5% by mass based on the total mass of the ink composition.

Compound 5 of Group A is contained in an amount preferably 0.0% by mass to 0.5% by mass based on the total mass of the ink composition.

Compound 6 of Group A is contained in an amount preferably 0.0% by mass to 0.5% by mass based on the total mass of the ink composition.

Compound 7 of Group A is contained in an amount preferably 0.0% by mass to 0.5% by mass based on the total mass of the ink composition.

Compound 8 of Group A is contained in an amount preferably 0.002% by mass to 2.0% by mass, and more preferably 0.05% by mass to 2.0% by mass, based on the total mass of the ink composition.

The content (% by mass) of the second coloring material based on the total mass of the ink composition needs to be (second coloring material/first coloring material)=0.001 to 1.0 by mass ratio with respect to the content (% by mass) of the first coloring material.

In the present invention, it is also preferred that the mass ratio of the content (% by mass) of the second coloring material to the content (% by mass) of the first coloring material is (second coloring material/first coloring material)=0.001 to 3.0. By setting the mass ratio of the content of the coloring material to be the above range, it is possible to form an image having light resistance at a higher level far more than the performance expected from the combination of the solubility and light resistance of the first coloring material with the solubility and light resistance of the second coloring material. Further, it is possible to obtain an image with a color tone which is more preferred. The mass ratio of the content (% by mass) of the second coloring material to the content (% by mass) of the first coloring material is more preferably (second coloring material/first coloring material)=0.001 to 0.2, still more preferably 0.01 to 0.2, and even still more preferably 0.02 to 0.12. By setting the mass ratio of the content of the coloring material to this range, it is possible to form an image having light resistance at a particularly high level even in the mass ratio of the aforementioned content. In addition, it is possible to obtain an image with particularly preferred color tone, and sufficiently satisfy the reliability as an ink.

When the mass ratio is 0.001 or more, storage stability of the ink solution is improved, and when the mass ratio is 1.0 or less, aqueous solution stability of the ink composition is excellent. By setting the mass ratio of the content of the coloring material to be the above range, it is possible to achieve an ink solution storage stability and image fastness of printed matters at a higher level far more than the performance expected from the combination of the solubility and image fastness of the first coloring material with the solubility and image fastness of the second coloring material. Further, an image with preferred color tone may be obtained, and thus reliability as an ink may also be satisfied.

By using the first color and material and the second coloring material at a specific mass ratio, the synergistic effect is exhibited, and thus the reason why imparting storage stability of the ink may be compatible with achieving the image fastness of printed matters at a level more than expected is guessed as follows by the present inventors. Since the first coloring material originally tends to have a low solubility in an aqueous medium, association or aggregation of the coloring material rapidly occurs immediately after an ink using an ink composition containing these compounds is imparted to a recording medium. Association or aggregation tends to improve fastness of the coloring material on the recording medium forming the image. However, meanwhile, excessive association or aggregation reduces solubility in an aqueous solution and an ink solution in some cases. With respect to this, by allowing the first coloring material to coexist with the second coloring material, the first coloring material forms an optimal association or aggregation state on a recording medium with respect to light resistance, and accordingly, it is considered that light resistance of the image has been improved.

Further, by using the first coloring material and the second coloring material at a specific mass ratio, the synergistic effect is exhibited, and thus the reason why the reliability of an ink using the ink composition has been achieved is guessed as follows by the present inventors. As described above, impurities considered to be eluted from a member constituting an ink cartridge or an ink supply path are incorporated into the ink and thus become responsible for lowering clogging of the ink supply path or ink supply characteristics and lowering storage stability of the ink in some cases. The present inventors have studied on the problem, and as a result, considered that the crystallization of the first coloring material may be suppressed without lowering tinctorial strength of the ink by allowing the first coloring material to coexist with the similar second coloring material in structure in the ink, and thus storage stability of the ink may be significantly improved. That is, with respect to reliability of the ink, which would be difficult to achieve when only the first coloring material is used as a coloring material, it is possible to obtain an effect far more than expected by using the second coloring material in combination, thereby achieving sufficient reliability.

Further, the sum (% by mass) of the contents of the first coloring material and the second coloring material in the ink composition is preferably 1.00% by mass to 12.00% by mass, and particularly preferably 3.00% by mass to 8.0% by mass, based on the total mass of the ink composition. When the sum of the contents is 1.00% by mass or more, light resistance and chromogenic properties are sufficiently obtained, and when the sum of the contents is 12.00% by mass or less, inkjet discharge characteristics are excellent without precipitation, and the like of the insoluble material in the ink.

Meanwhile, when the ink composition of the present invention is a yellow ink of the ink for inkjet recording, preferred color tone as the yellow ink means the following two cases. That is, it is meant that an image formed using only the yellow ink does not exhibit red tint or green tint. Further, in addition to this, when an image with a secondary color formed using the yellow ink, that is, an image with red or green is formed, it is meant that the image has a color tone without greatly damaging a color reproduction range of both red and green.

(Third Coloring Material)

The ink composition of the present invention contains a compound represented by any one of the following Formulas (1) to (8) as a third coloring material. These compounds may be used either alone or in combination of two or more thereof, but it is preferred that two or more are combined from the viewpoint of coloring balance.

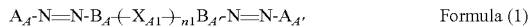
$$A_A-N=N-B_A(-X_{A1})_{n1}B_{A'}-N=N-A_{A'}$$ Formula (1)

(In Formula (1), $A_A$ and $A_{A'}$ each independently represent an aryl group or a monovalent heterocyclic group, $B_A$ and $B_{A'}$ each independently represent an arylene group or a divalent heterocyclic group, $X_{A1}$ represents a divalent linking group, and n1 represents 0 or 1. However, at least one of $A_A$, $B_A$, $A_{A'}$ and $B_{A'}$ is a heterocyclic group.)

It is preferred that the compound represented by Formula (1) is the following Formula (1-1) or Formula (1-2).

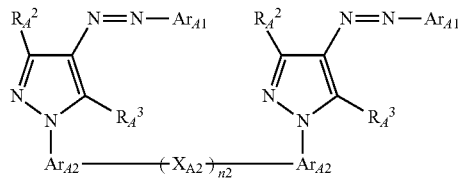

Formula (1-1)

(In the formula, $R_A^2$ represents a monovalent group, $R_A^3$ represents $-OR_A^6$ or $-NHR_A^7$, $R_A^6$ and $R_A^7$ represent a hydrogen atom or a monovalent group, $X_{A2}$ represents a divalent linking group, n2 is 0 or 1, $Ar_{A1}$ represents an aryl group or a heterocyclic group, and $Ar_{A2}$ represents an alkylene group, an arylene group or a divalent triazine ring group.)

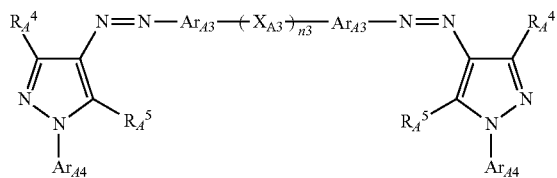

Formula (1-2)

(In the formula, $R_A^4$ represents a monovalent group, $R_A^5$ represents $-OR_A^6$ or $-NHR_A^7$, $R_A^6$ and $R_A^7$ represent a hydrogen atom or a monovalent group, $X_{A3}$ represents a divalent linking group, n3 is 0 or 1, $Ar_{A3}$ represents an arylene group or a divalent heterocyclic group, and $Ar_{A4}$ represents an alkyl group, an aryl group or a monovalent triazine ring group.)

Hereinafter, Formula (1) will be described in detail. An aryl group or an arylene group, which is represented by $A_A$, $A_{A'}$, $B_A$ and $B_{A'}$, includes a substituted or unsubstituted aryl group or arylene group. As the substituted or unsubstituted aryl group or arylene group, an aryl group or an arylene group having 6 to 30 carbon atoms is preferred. Examples of the substituent include a halogen atom, an alkyl group, a cycloalkyl group, an aralkyl group, an alkenyl group, an alkynyl group, an aryl group, a heterocyclic group, a cyano group, a hydroxyl group, a nitro group, a carboxyl group (which may be in the form of a salt), an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, a sulfo group (which may be in the form of a salt), an alkyl- or arylsulfinyl group, an alkyl- or arylsulfonyl group, an acyl group, an aryloxy carbonyl group, an alkoxycarbonyl group, a carbamoyl group, an imide group, a phosphino group, a phosphinyl group, a phosphinyloxy group, a phosphinylamino group, or a silyl group.

Formula (1) will be described in more detail. The halogen atom represents, for example, a chlorine atom, a bromine atom and an iodine atom, and the alkyl group includes a substituted or unsubstituted alkyl group. The substituted or unsubstituted alkyl group is preferably an alkyl group having 1 to 30 carbon atoms. Examples of the substituent include those which are the same as the substituents of the aryl group or the arylene group. Among them, a hydroxyl group, an alkoxy group, a cyano group, a halogen atom, a sulfo group (which may be in the form of a salt) and a carboxyl group (which may be in the form of a salt) are preferred. Examples of the alkyl group include methyl, ethyl, butyl, t-butyl, n-octyl, eicosyl, 2-chloroethyl, hydroxyethyl, cyanoethyl and 4-sulfobutyl.

The cycloalkyl group includes a substituted or unsubstituted cycloalkyl group. The substituted or unsubstituted cycloalkyl group is preferably a cycloalkyl group having 5 to 30 carbon atoms. Examples of the substituent include those which are the same as the substituents of the aryl group or the arylene group. Examples of the cycloalkyl group include cyclohexyl, cyclopentyl and 4-n-dodecyl cyclohexyl.

The aralkyl group includes a substituted or unsubstituted aralkyl group. The substituted or unsubstituted aralkyl group is preferably an aralkyl group having 7 to 30 carbon atoms. Examples of the substituent include those which are the same as the substituents of the aryl group or the arylene group. Examples of the aralkyl include benzyl and 2-phenethyl.

The alkenyl group represents a straight, branched, or cyclic substituted or unsubstituted alkenyl group. These include preferably a substituted or unsubstituted alkenyl group having 2 to 30 carbon atoms, for example, vinyl, allyl, prenyl, geranyl, oleyl, 2-cyclopenten-1-yl and 2-cyclohexen-1-yl.

The alkynyl group is preferably a substituted or unsubstituted alkynyl group having 2 to 30 carbon atoms, and examples thereof include ethynyl and propargyl.

The aryl group is a substituted or unsubstituted aryl group having 6 to 30 carbon atoms, and examples thereof include phenyl, p-tolyl, naphthyl, m-chlorophenyl and o-hexadecanoylaminophenyl.

The heterocyclic group is preferably a monovalent group in which one hydrogen atom has been removed from a 5-membered or 6-membered substituted or unsubstituted aromatic or non-aromatic heterocyclic compound, and more preferably a 5-membered or 6-membered aromatic heterocyclic group having 3 to 30 carbon atoms. Examples thereof include 2-furyl, 2-thienyl, 2-pyrimidinyl and 2-benzothiazolyl.

The alkoxy group includes a substituted or unsubstituted alkoxy group. The substituted or unsubstituted alkoxy group is preferably an alkoxy group having 1 to 30 carbon atoms. Examples of the substituent include those which are the same as the substituents of the aryl group or the arylene group. Examples of the alkoxy group include methoxy, ethoxy, isopropoxy, n-octyloxy, methoxyethoxy, hydroxyethoxy, 3-carboxypropoxy, and the like.

The aryloxy group is preferably a substituted or unsubstituted aryloxy group having 6 to 30 carbon atoms, and examples thereof include phenoxy, 2-methylphenoxy, 4-t-butyl phenoxy, 3-nitrophenoxy and 2-tetradecanoylaminophenoxy.

The silyloxy group is preferably a silyloxy group having 3 to 20 carbon atoms, and examples thereof include trimethylsilyloxy and t-butyldimethylsilyloxy.

The heterocyclic oxy group is preferably a substituted or unsubstituted heterocyclic oxy group having 2 to 30 carbon atoms, and examples thereof include 1-phenyltetrazol-5-oxy and 2-tetrahydropyranyloxy.

The acyloxy group is preferably a formyloxy group, a substituted or unsubstituted alkylcarbonyloxy group having 2 to 30 carbon atoms, and a substituted or unsubstituted arylcarbonyloxy group having 6 to 30 carbon atoms, and examples thereof include formyloxy, acetyloxy, pivaloyloxy, stearoyloxy, benzoyloxy and p-methoxyphenylcarbonyloxy.

The carbamoyloxy group is preferably a substituted or unsubstituted carbamoyloxy group having 1 to 30 carbon atoms, and examples thereof include N,N-dimethylcarbamoyloxy, N,N-diethylcarbamoyloxy, morpholinocarbonyloxy, N,N-di-n-octyl aminocarbonyloxy and N-n-octyl carbamoyloxy.

The alkoxycarbonyloxy group is preferably a substituted or unsubstituted alkoxycarbonyloxy group having 2 to 30 carbon atoms, and examples thereof include methoxycarbonyloxy, ethoxycarbonyloxy, t-butoxycarbonyloxy and n-octylcarbonyloxy.

The aryloxycarbonyloxy group is preferably a substituted or unsubstituted aryloxycarbonyloxy group having 7 to 30 carbon atoms, and examples thereof include phenoxycarbonyloxy, p-methoxyphenoxycarbonyloxy and p-(n-hexadecyloxy)phenoxycarbonyloxy.

The amino group is preferably a substituted or unsubstituted alkylamino group having 1 to 30 carbon atoms and a substituted or unsubstituted anilino group having 6 to 30 carbon atoms, and examples thereof include amino, methylamino, dimethylamino, anilino, N-methyl-anilino and diphenyl amino.

The acylamino group is preferably a formylamino group, a substituted or unsubstituted alkylcarbonylamino group having 1 to 30 carbon atoms, and a substituted or unsubstituted arylcarbonylamino group having 6 to 30 carbon atoms, and examples thereof include formylamino, acetylamino, pivaloylamino, lauroylamino, benzoylamino and 3,4,5-tri-n-octyloxyphenylcarbonylamino.

The aminocarbonylamino group is preferably a substituted or unsubstituted aminocarbonylamino group having 1 to 30 carbon atoms, and examples thereof include carbamoylamino, N,N-dimethylamino carbonyl amino, N,N-diethylamino carbonyl amino and morpholinocarbonylamino.

The alkoxycarbonylamino group is preferably a substituted or unsubstituted alkoxycarbonylamino group having 2 to 30 carbon atoms, and examples thereof include methoxycarbonylamino, ethoxycarbonylamino, t-butoxycarbonylamino, n-octadecyloxycarbonylamino and N-methyl-methoxycarbonylamino.

The aryloxycarbonylamino group is preferably a substituted or unsubstituted aryloxycarbonylamino group having 7 to 30 carbon atoms, and examples thereof include phenoxycarbonylamino, p-chlorophenoxycarbonylamino and m-(n-octyloxy)phenoxycarbonylamino.

The sulfamoylamino group is preferably a substituted or unsubstituted sulfamoylamino group having 0 to 30 carbon atoms, and examples thereof include sulfamoylamino, N,N-dimethylaminosulfonylamino and N-n-octylaminosulfonylamino.

The alkyl- or arylsulfonylamino group is preferably a substituted or unsubstituted alkylsulfonylamino group having 1 to 30 carbon atoms and a substituted or unsubstituted arylsulfonylamino group having 6 to 30 carbon atoms, and examples thereof include methylsulfonylamino, butylsulfonylamino, phenylsulfonylamino, 2,3,5-trichlorophenyl sulfonylamino and p-methylphenylsulfonylamino.

The alkylthio group is preferably a substituted or unsubstituted alkylthio group having 1 to 30 carbon atoms, and examples thereof include methylthio, ethylthio and n-hexadecylthio.

The arylthio group is preferably a substituted or unsubstituted arylthio group having 6 to 30 carbon atoms, and examples thereof include phenylthio, p-chlorophenylthio and m-methoxyphenylthio.

The heterocyclic thio group is preferably a substituted or unsubstituted heterocyclic thio group having 2 to 30 carbon atoms, and examples thereof include 2-benzothiazolylthio and 1-phenyletrazol-5-ylthio.

The sulfamoyl group is preferably a substituted or unsubstituted sulfamoyl group having 0 to 30 carbon atoms, and examples thereof include N-ethylsulfamoyl, N-(3-dodecyloxypropyl)sulfamoyl, N,N-dimethyl sulfamoyl, N-acetyl sulfamoyl, N-benzoyl sulfamoyl and N—(N'-phenylcarbamoyl)sulfamoyl).

The alkyl- or arylsulfinyl group is preferably a substituted or unsubstituted alkylsulfinyl group having 1 to 30 carbon atoms and a substituted or unsubstituted arylsulfinyl group having 6 to 30 carbon atoms, and examples thereof include methylsulfinyl, ethylsulfinyl, phenylsulfinyl and p-methyl phenylsulfinyl.

The alkyl- or arylsulfonyl group is preferably a substituted or unsubstituted alkylsulfonyl group having 1 to 30 carbon atoms and a substituted or unsubstituted arylsulfonyl group having 6 to 30 carbon atoms, and examples thereof include methylsulfonyl, ethylsulfonyl, phenylsulfonyl and p-methyl phenylsulfonyl.

The acyl group is preferably a formyl group, a substituted or unsubstituted alkylcarbonyl group having 2 to 30 carbon atoms, a substituted or unsubstituted arylcarbonyl group having 7 to 30 carbon atoms, and a substituted or unsubstituted heterocyclic carbonyl group having 4 to 30 carbon atoms, which is bounded with a carbonyl group through a carbon atom, and examples thereof include acetyl, pivaloyl, 2-chloroacetyl, stearoyl, benzoyl, p-(n-octyloxy)phenylcarbonyl, 2-pyridylcarbonyl and 2-furylcarbonyl.

The aryloxycarbonyl group is preferably a substituted or unsubstituted aryloxycarbonyl group having 7 to 30 carbon atoms, and examples thereof include phenoxycarbonyl, o-chlorophenoxycarbonyl, m-nitrophenoxycarbonyl and p-(t-butyl)phenoxycarbonyl.

The alkoxycarbonyl group is preferably a substituted or unsubstituted alkoxycarbonyl group having 2 to 30 carbon atoms, and examples thereof include methoxycarbonyl, ethoxycarbonyl, t-butoxycarbonyl and n-octadecyloxycarbonyl.

The carbamoyl group is preferably a substituted or unsubstituted carbamoyl group having 1 to 30 carbon atoms, and examples thereof include carbamoyl, N-methylcarbamoyl, N,N-dimethylcarbamoyl, N,N-di-n-octylcarbamoyl and N-(methylsulfonyl)carbamoyl.

The phosphino group is preferably a substituted or unsubstituted phosphino group having 2 to 30 carbon atoms, and examples thereof include dimethylphosphino, diphenylphosphino and methylphenoxyphosphino.

The phosphinyl group is preferably a substituted or unsubstituted phosphinyl group having 2 to 30 carbon atoms, and examples thereof include phosphinyl, dioctyloxyphosphinyl and diethoxyphosphinyl.

The phosphinyloxy group is preferably a substituted or unsubstituted phosphinyloxy group having 2 to 30 carbon atoms, and examples thereof include diphenoxyphosphinyloxy and dioctyloxyphosphinyloxy.

The phosphinyloxy group is preferably a substituted or unsubstituted phosphinylamino group having 2 to 30 carbon atoms, and examples thereof include dimethoxyphosphinylamino and dimethylaminophosphinylamino.

The silyl group is preferably a substituted or unsubstituted silyl group having 3 to 30 carbon atoms, and examples thereof include trimethylsilyl, t-butyldimethylsilyl and phenyldimethylsilyl.

Among the aforementioned substituents of the aryl group or arylene group, those having a hydrogen atom may remove the substituents and be substituted with the aforementioned groups. Examples of such substituents include an alkylcarbonylaminosulfonyl group, an arylcarbonylaminosulfonyl group, an alkylsulfonylaminocarbonyl group and an arylsulfonylaminocarbonyl group. Specific examples thereof include a methylsulfonylaminocarbonyl group, a p-methylphenylsulfonylaminocarbonyl group, an acetylaminosulfonyl group and a benzoylaminosulfonyl group.

The monovalent or divalent heterocyclic group represented by $A_4$, $A_{4'}$, $B_4$ and $B_{4'}$ is preferably a 5-membered or 6-membered ring, and may also be condensed. Further, the heterocyclic group may be an aromatic heterocyclic ring or a non-aromatic heterocyclic ring. In the present invention, the heterocyclic group may be classified into types I and II. Examples of those known as acidic nuclei as type I include a 5-pyrazolone ring, a 5-aminopyrazole ring, an oxazolone ring, a barbituric acid ring, a pyridone ring, a rhodanine ring, a pyrazolidine dione ring, a pyrazolopyridone ring and a Meldrum's acid ring, and a 5-pyrazolone ring and a 5-aminopyrazole ring are preferred. Examples of those known as basic nuclei as type II include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline and the like. Among them, an aromatic heterocyclic group is preferred, and similarly to the above, preferred examples thereof include pyridine, pyrazine, pyrimidine, pyridazine, triazine, pyrazole, imidazole, benzimidazole, triazole, thiazole, benzothiazole, isothiazole, benzisothiazole and thiadiazole. Thiadiazole is the most preferred. These may have a substituent, and examples of the substituent are the same as the aforementioned substituents of the aryl group or the arylene group.

Among $A_4$, $A_{4'}$, $B_4$ and $B_{4'}$, it is preferred that $A_4$ and $A_{4'}$ are identical with each other, and $B_4$ and $B_{4'}$ are identical with each other, and it is more preferred that both of these pairs are a heterocyclic ring. When both of $A_4$ and $A_{4'}$, and $B_4$ and $B_{4'}$ are heterocyclic rings, it is preferred that one pair of $A_4$ and $A_{4'}$ or $B_4$ and $B_{4'}$ is a heterocyclic ring of type I, and the other pair thereof is a heterocyclic ring of type II. Further, it is most preferred that one pair thereof is a thiadiazole ring, and the other pair thereof is a 5-aminopyrazole ring.

A divalent linking group represented by $X_{41}$ of Formula (1) is preferably an alkylene group (for example, methylene, ethylene, propylene, butylene and pentylene), an alkenylene group (for example, ethenylene and propenylene), an alkynylene group (for example, ethynylene and propynylene), an arylene group (for example, phenylene and naphthylene), a divalent heterocyclic group (for example, a 6-chloro-1,3,5-triazin-2,4-diyl group, a pyrimidin-2,4-diyl group and a quinoxalin-2,3-diyl group), —O—, —CO—, —NR— (in which $R_A$ represents a hydrogen atom, an alkyl group or an aryl group), —S—, —SO$_2$—, —SO—, or a combination thereof.

The alkylene group, the alkenylene group, the alkynylene group, the arylene group, the divalent heterocyclic group, and the alkyl group or aryl group represented by $R_A$ may have a substituent. Examples of the substituent are the same as the substituent of the aryl group or arylene group described above. The alkyl group and aryl group represented by $R_A$ have the same meaning as those described above.

More preferably, it is more preferred that the divalent linking group is an alkylene group having 10 or less carbon atoms, an alkenylene group having 10 or less carbon atoms, an alkynylene group having 10 or less carbon atoms, an arylene group having 6 to 10 carbon atoms, a divalent heterocyclic group, —O—, —S—, or a combination thereof.

The total number of carbon atoms in the divalent linking group is preferably 0 to 50, more preferably 0 to 30, and most preferably 0 to 10.

More preferably, the divalent linking group is the bis-azo compound represented by Formula (1-1) or (1-2). The divalent linking group is particularly preferably a bis-azo compound of Formula (1-2).

Formulas (1-1) and (1-2) will be described in detail. A monovalent group represented by $R_A^2$, $R_A^4$, $R_A^6$, or $R_A^7$ has the same meaning as the above-described substituents of the aryl group or arylene group. A divalent linking group represented by $X_{42}$ or $X_{43}$ has the same meaning as the linking group represented by $X_{41}$ in Formula (1). An aryl group or arylene group represented by $Ar_{41}$, $Ar_{42}$, $Ar_{43}$, or $Ar_{44}$ has the same meaning as the above-described aryl group or arylene group (Formula (1)). A heterocyclic group represented by $Ar_{41}$ or $Ar_{43}$ has the same meaning as the above-described heterocyclic group of type II. An alkyl group or alkylene group represented by $Ar_{42}$ or $Ar_{44}$ has the same meaning as those described above (the substituents in Formula (1)). A triazine ring group represented by $Ar_{42}$ or $Ar_{44}$ may have a monovalent substituent (the monovalent substituent has the same meaning as those described above). In Formula (1-1), it is preferred that at least one of $Ar_{42}$ and $X_{42}$ has a sulfo group or a carboxyl group (including a salt thereof). In Formula (1-2), it is preferred that $Ar_{44}$ has a sulfo group or a carboxyl group (including a salt thereof).

More preferably, $R_A^3$ and $R_A^5$ are an amino group, and $Ar_{42}$ and $Ar_{43}$ are a heterocyclic group. Further, it is most preferred that $Ar_{41}$ in Formula (1-1) is a thiadiazole ring, and $Ar_{43}$ in Formula (1-2) is a thiadiazole ring.

Specific examples (Exemplified Colorants 1 to 75) of the compound represented by Formula (1), (1-1) or (1-3) will be described below, but the compound used in the present invention is not limited to the following examples. Meanwhile, in the specific examples, Et and Ph mean ethyl and phenyl, respectively.

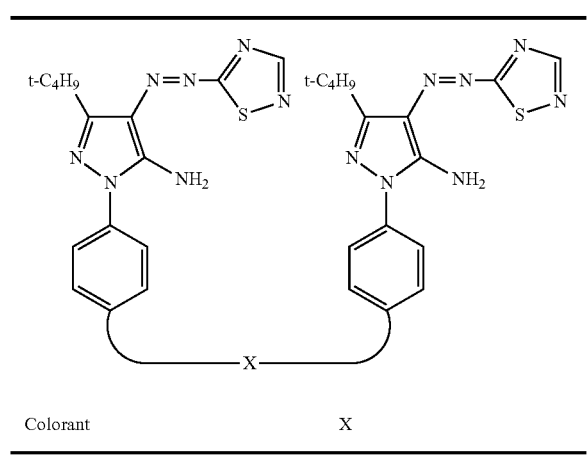

| Colorant | X |
|---|---|
| 1 | —CONH—[phenyl with NaO₃S, CH=CH]—[phenyl with SO₃Na]—NHCO— |
| 2 | —CONH—[phenyl with SO₃Na]—[phenyl with SO₃Na]—NHCO— |
| 3 | —CONH—[phenyl]—NHCO— |

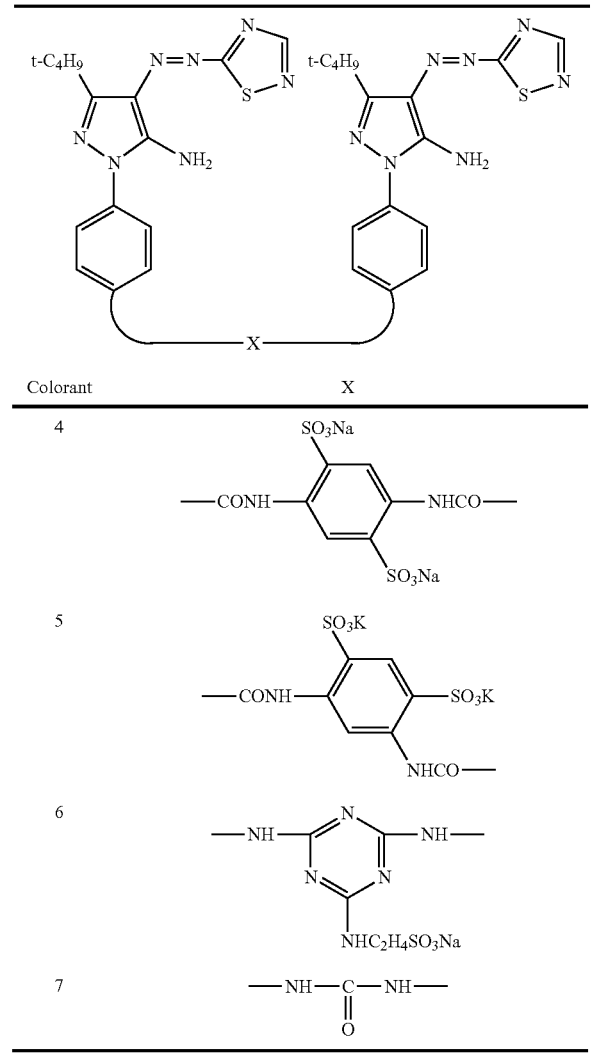

| Colorant | X |
|---|---|
| 4 | —CONH—[phenyl with SO₃Na, SO₃Na]—NHCO— |
| 5 | —CONH—[phenyl with SO₃K, SO₃K]—NHCO— |
| 6 | —NH—[triazine with NHC₂H₄SO₃Na]—NH— |
| 7 | —NH—C(=O)—NH— |

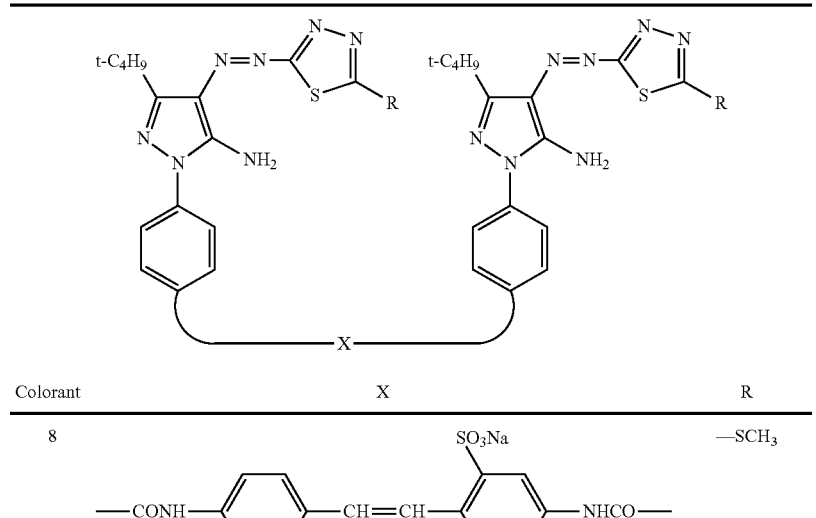

| Colorant | X | R |
|---|---|---|
| 8 | —CONH—[phenyl with SO₃Na]—CH=CH—[phenyl with SO₃Na]—NHCO— | —SCH₃ |

-continued
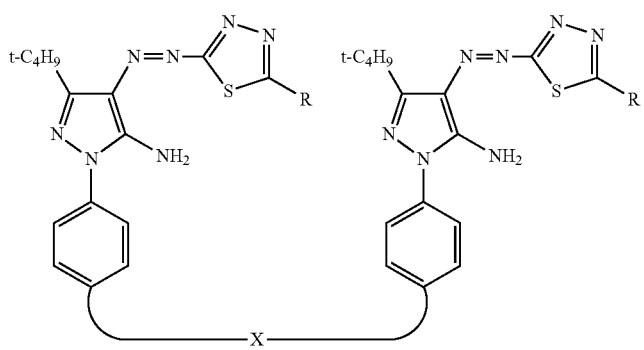
| Colorant | X | R |
|---|---|---|
| 9 | 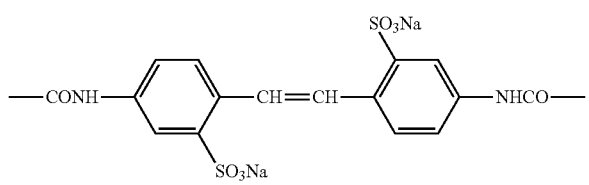 | —SCH₂COONa |
| 10 | 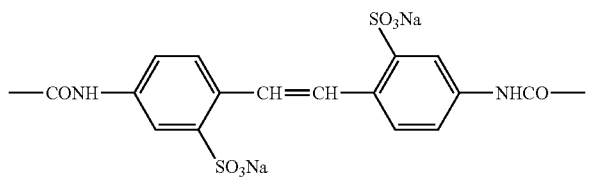 | —SC₈H₁₇-n |
| 11 | 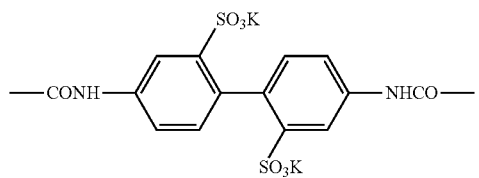 | —SCH₃ |
| 12 | 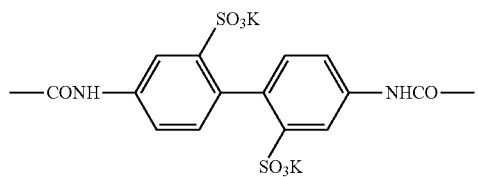 | —SCH₂COOK |
| 13 | 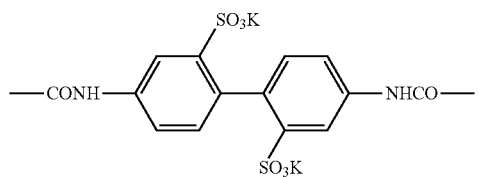 | —SC₆H₁₃-n |

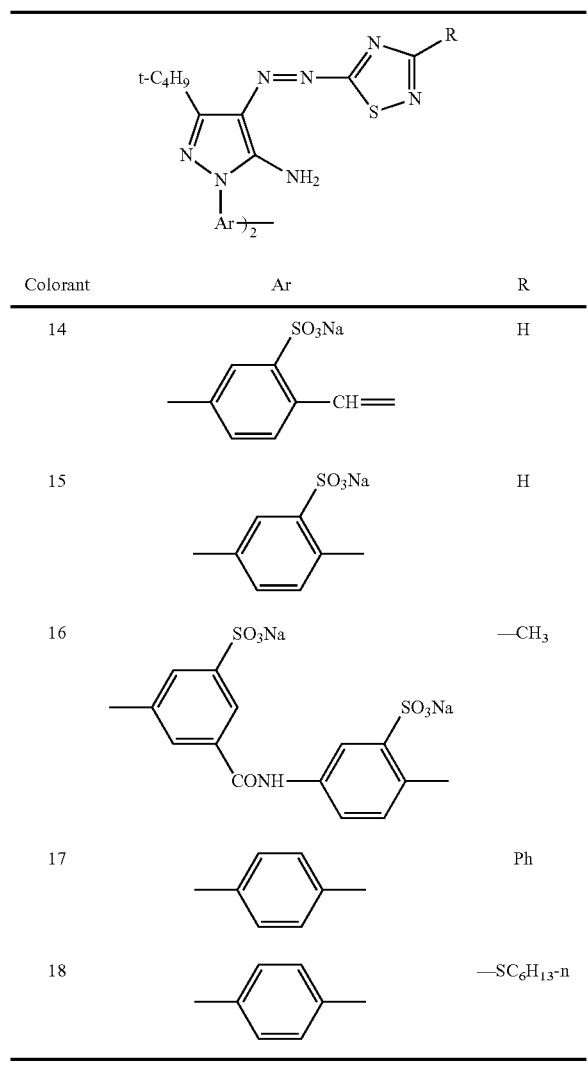
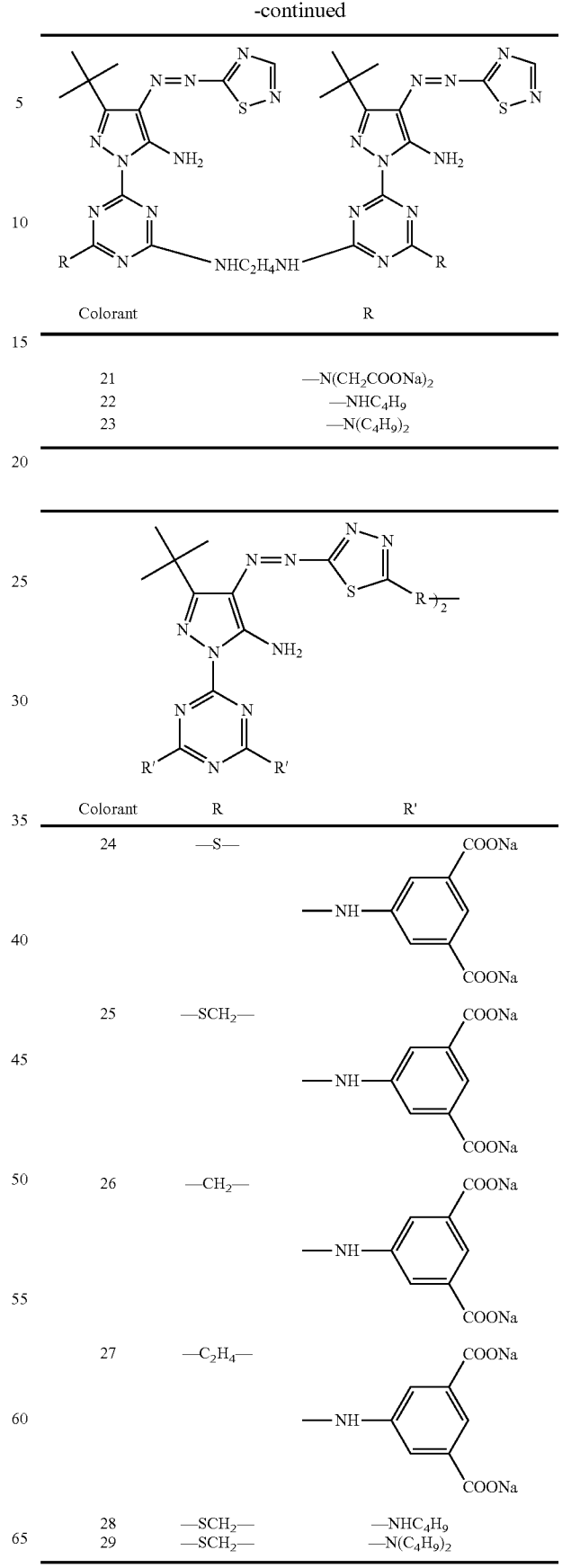

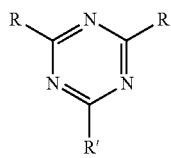
| Colorant | R | R' |
|---|---|---|
| 30 | 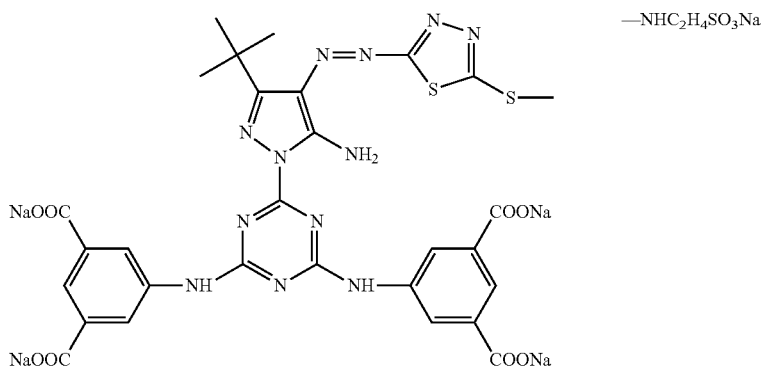 | —NHC$_2$H$_4$SO$_3$Na |
| 31 | 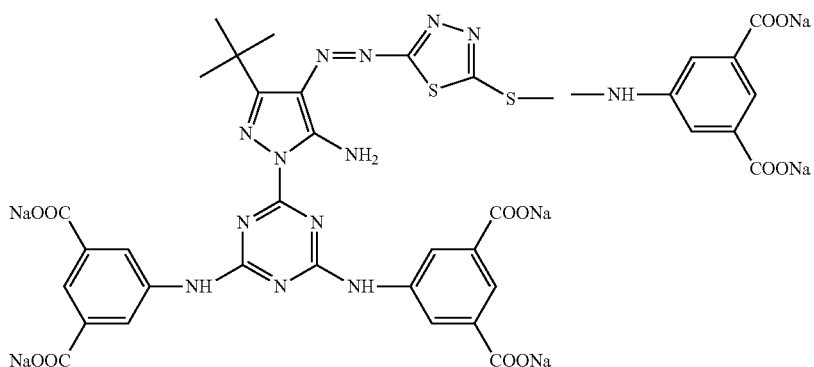 | |
| 32 | 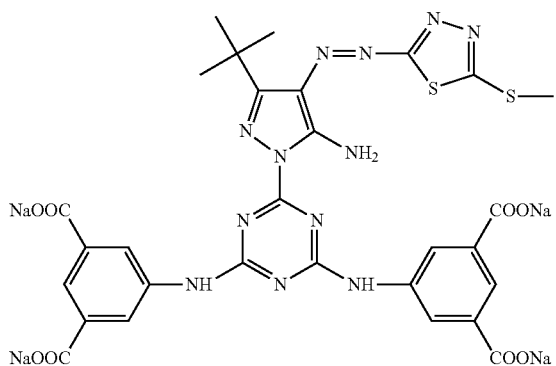 | Cl |

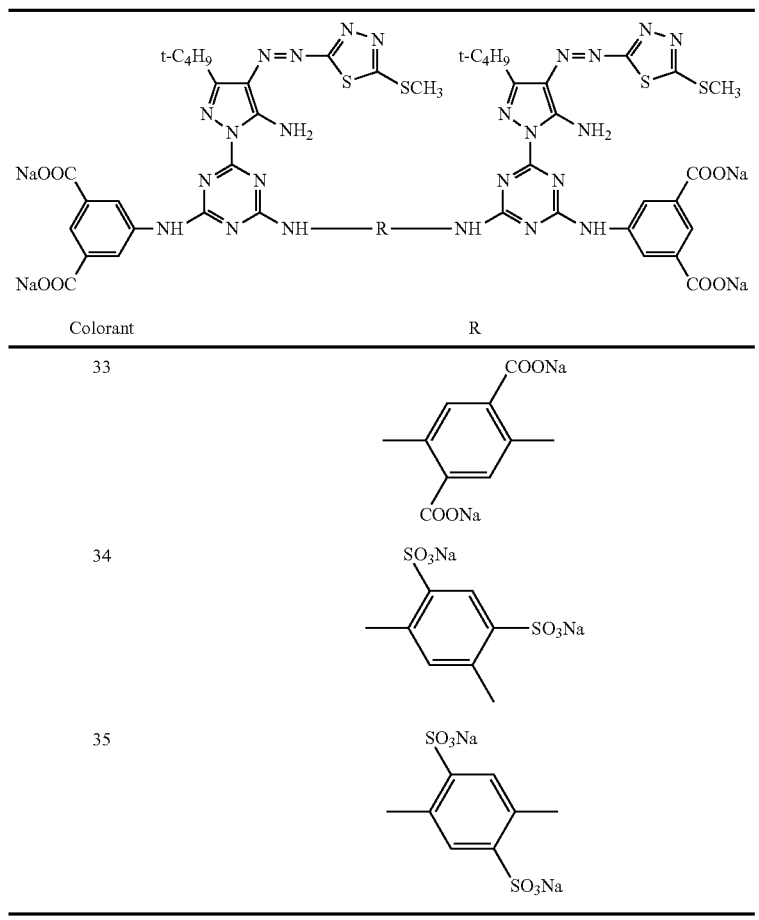
| Colorant | R |
|---|---|
| 33 | 2,5-dimethyl-1,4-(COONa)₂-benzene |
| 34 | 2,5-dimethyl-1,3-(SO₃Na)₂-benzene |
| 35 | 2,5-dimethyl-1,4-(SO₃Na)₂-benzene |
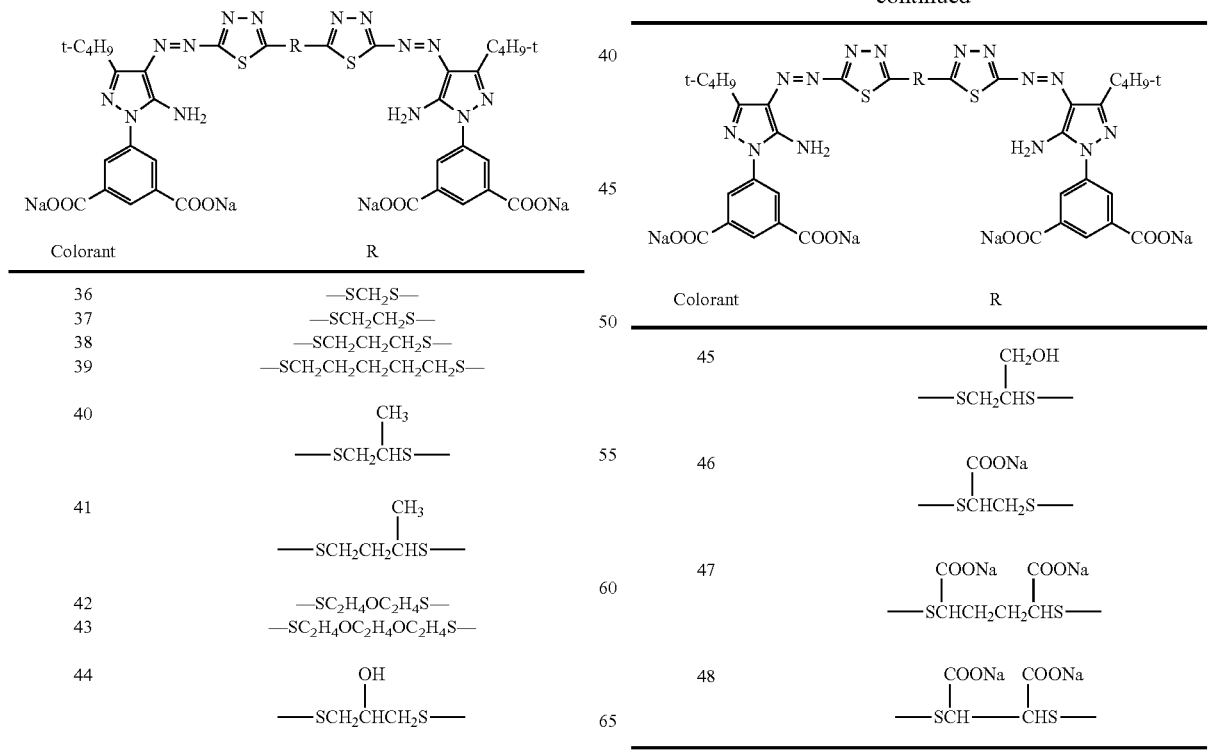
| Colorant | R |
|---|---|
| 36 | —SCH₂S— |
| 37 | —SCH₂CH₂S— |
| 38 | —SCH₂CH₂CH₂S— |
| 39 | —SCH₂CH₂CH₂CH₂CH₂S— |
| 40 | —SCH₂CH(CH₃)S— |
| 41 | —SCH₂CH₂CH(CH₃)S— |
| 42 | —SC₂H₄OC₂H₄S— |
| 43 | —SC₂H₄OC₂H₄OC₂H₄S— |
| 44 | —SCH₂CH(OH)CH₂S— |
| 45 | —SCH₂CH(CH₂OH)S— |
| 46 | —SCH(COONa)CH₂S— |
| 47 | —SCH(COONa)CH₂CH₂CH(COONa)S— |
| 48 | —SCH(COONa)—CH(COONa)S— |

| | |
|---|---|
| 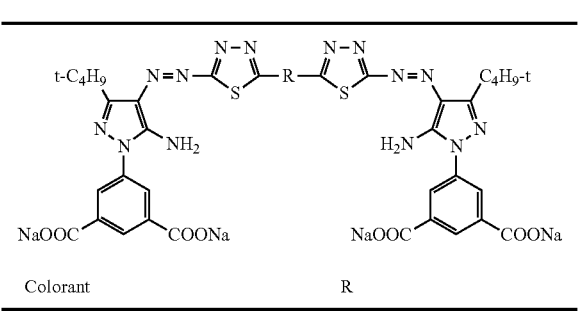 | 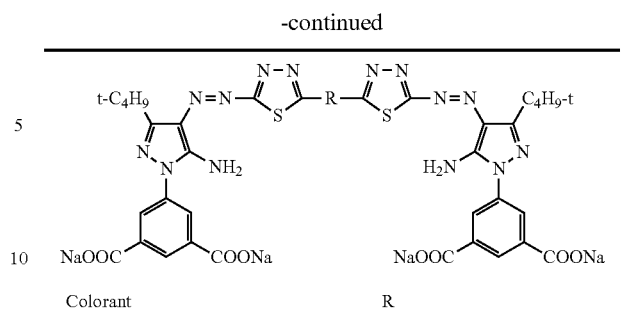 |
| Colorant — R | Colorant — R |
| 49 | 51 |
| 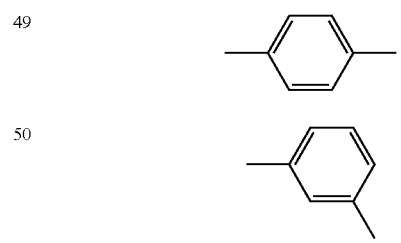 | 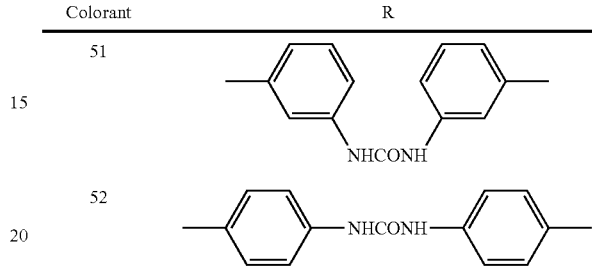 |
| 50 | 52 |
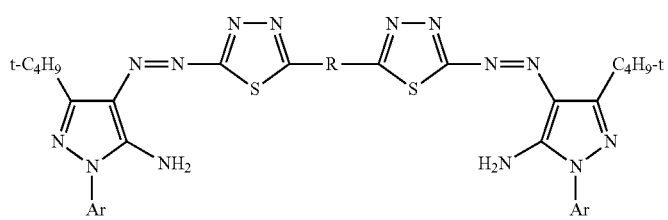
| Colorant | Ar | R |
|---|---|---|
| 53 | | —SC₃H₆S— |
| 54 | | —SC₃H₆S— |
| 55 | | —SC₃H₆S— |
| 56 | | —SC₃H₆S— |
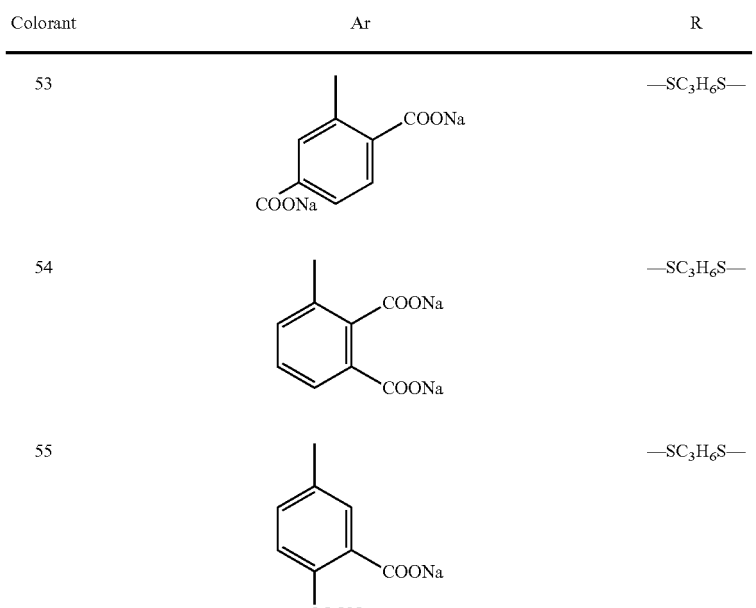
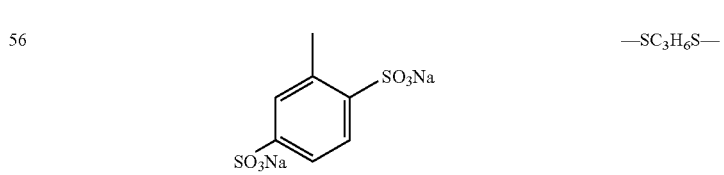

-continued
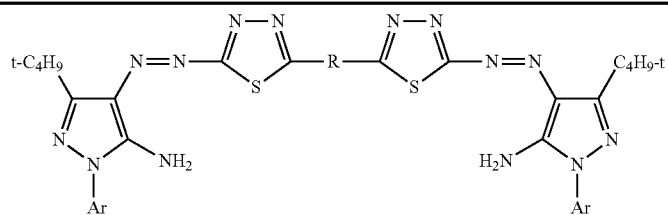
| Colorant | Ar | R |
|---|---|---|
| 57 | 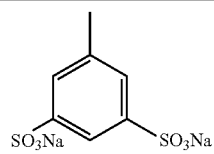 | —SC₃H₆S— |
| 58 | 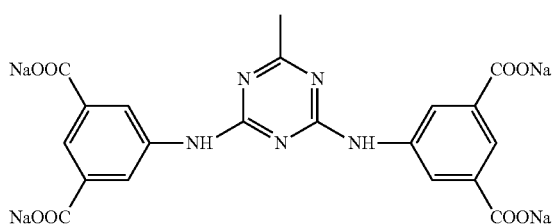 | —SC₃H₆S— |
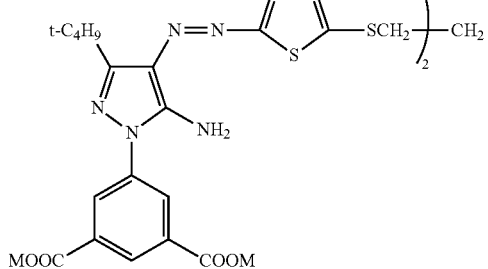
| Colorant | M |
|---|---|
| 59 | K |
| 60 | Li |
| 61 | NH₄ |
| 62 | HN(Et)₃ |
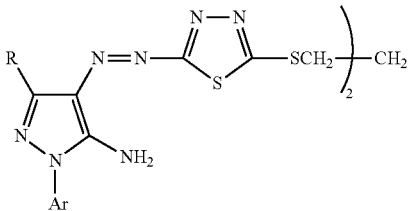
| Colorant | R | Ar |
|---|---|---|
| 63 | OEt | 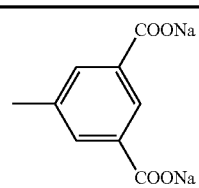 |
| 64 | Ph | 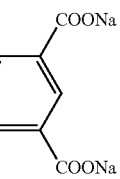 |
| 65 | t-C₄H₉ | C₃H₆SO₃Na |

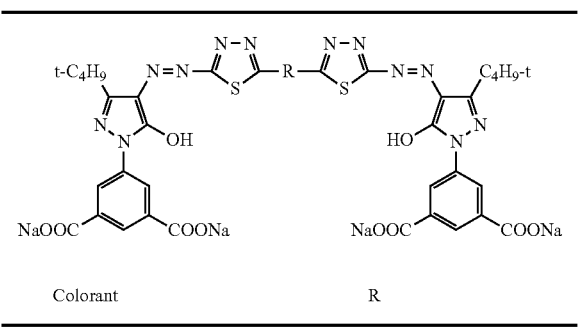

| Colorant | R |
|---|---|
| 66 | —SCH$_2$CH$_2$S— |
| 67 | —SCH$_2$CH$_2$CH$_2$S— |
| 68 | —SCH$_2$CH$_2$CH$_2$CH$_2$CH$_2$S— |
| 69 | (m-dimethylbenzene linker) |

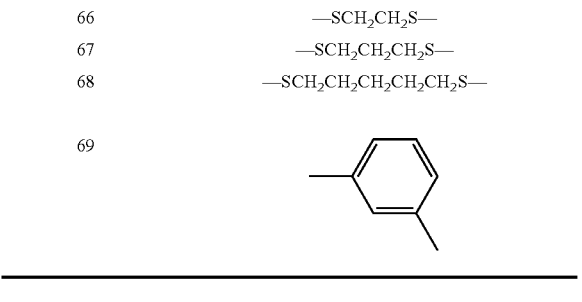

| Colorant | Ar |
|---|---|
| 70 | (—C$_6$H$_4$—NHCONH—C$_6$H$_4$—) |
| 71 | (—C$_6$H$_4$—SC$_3$H$_6$S—C$_6$H$_4$—) |
| 72 | (thiadiazole—SC$_3$H$_6$S—thiadiazole) |

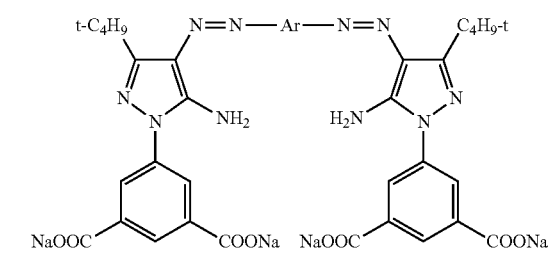

| Colorant | R |
|---|---|
| 73 | (NH-linked 3,5-di-COONa phenyl) |
| 74 | NHC$_2$H$_4$COONa |
| 75 | (NH-linked 2,5-di-SO$_3$Na phenyl) |

These colorants may be synthesized by the method described, for example, in Japanese Patent Application Laid-Open No. 2004-83903.

Further, appropriate examples of the compound represented by Formula (1) include the compound represented by Formula (1-3).

Formula (1-3)

[Structure of Formula (1-3) showing a triazine core with Y$_A$, two NH$_2$ groups, two pyrazole rings with A$_{A1}$ and A$_{A2}$ substituents, linked via N=N to Ar$_{A1}$ and Ar$_{A2}$]

In Formula (1-3), Ar$_{A1}$ and Ar$_{A2}$ each independently represent an aromatic hydrocarbon ring group, a non-aromatic hydrocarbon ring group, an aromatic heterocyclic group or a non-aromatic heterocyclic group, A$_{A1}$ and A$_{A2}$ each independently represent a hydrogen atom or a substituent, and the substituent may further have a substituent. Y$_A$ represents —OM$_A$ or —NR$_{A1}$R$_{A2}$, M$_A$ represents a hydrogen atom or a metal ion, and R$_{A1}$ and R$_{A2}$ each independently represents a hydrogen atom, an alkyl group, an alkenyl group, an alkynyl group, an aralkyl group, an aryl group or a heterocyclic group.

Hereinafter, Formula (1-3) will be described in more detail. Ar$_{A1}$ and Ar$_{A2}$ represent an aromatic hydrocarbon ring group, a non-aromatic hydrocarbon ring group, an aromatic heterocyclic group or a non-aromatic heterocyclic group, and may be a single ring or may be further condensed with another ring. Each ring may have a substituent, and examples of the substituent include the substituents (SUB) described below. Examples of the aromatic hydrocarbon ring group include an aryl group described in the substituents (SUB) described below. Examples of the non-aromatic hydrocarbon ring group include a cycloalkyl group, a bicycloalkyl group, and the like described in the substituents (SUB) described below. Examples of the non-aromatic heterocyclic group include a piperidyl group, a piperidino group, a morpholinyl group, a morpholino group, and the like.

$Ar_{A1}$ and $Ar_{A2}$ are preferably an aromatic heterocyclic group, and more preferably a 5- to 7-membered nitrogen-containing aromatic heterocyclic group and a 5- to 6-membered aromatic heterocyclic group is preferred. Hereinafter, preferred examples, more preferred examples, and still more preferred examples of $Ar_{A1}$ and $Ar_{A2}$ will be described, but the substitution position bonded to the azo group of $Ar_{A1}$ and $Ar_{A2}$, and the substituent which $Ar_{A1}$ and $Ar_{A2}$ may have and the substitution position thereof are not limited. Preferred examples of $Ar_{A1}$ and $Ar_{A2}$ include a phenyl group, an imidazolyl group, a benzoimidazolyl group, a pyrazolyl group, a benzopyrazolyl group, a triazolyl group, a thiazolyl group, a benzothiazolyl group, an isothiazolyl group, a benzoisothiazolyl group, an oxazolyl group, a benzoxazolyl group, a thiadiazolyl group, a pyrrolyl group, a benzopyrrolyl group, an indolyl group, an isoxazolyl group, a benzoisoxazolyl group, a thiophenyl group, a benzothiophenyl group, a furanyl group, a benzofuranyl group, a pyridinyl group, a quinolinyl group, an isoquinolinyl group, a pyridazinyl group, a pyrimidinyl group, a pyrazinyl group, a cinnolinyl group, a phthalazinyl group, a quinazolinyl group, a qunoxalinyl group or a triazinyl group.

More preferred examples of $Ar_{A1}$ and $Ar_{A2}$ include a pyridinyl group, a pyrimidinyl group, a pyridazinyl group, a pyrrolyl group, an imidazolyl group, a pyrazolyl group, a triazolyl group, an oxazolyl group, an isoxazolyl group, a thiazolyl group, an isothiazolyl group or a thiadiazolyl group, and still more preferred examples thereof include a pyrazolyl group, a thiazolyl group, an isothiazolyl group or a thiadiazolyl group. A pyrazolyl group or a thiadiazolyl group is particularly preferred.

These groups may further have a substituent.

Examples of a group substituted with $Ar_{A1}$ and $Ar_{A2}$ include a halogen atom, an alkyl group, an alkenyl group, an alkynyl group, an aralkyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, a sulfo group, an alkyl- or arylsulfinyl group, an alkyl- or arylsulfonyl group, an acyl group, an aryloxy carbonyl group, an alkoxycarbonyl group, a carbamoyl group, an aryl- or heterocyclic azo group, an imide group, a phosphino group, a phosphinyl group, a phosphinyloxy group, a phosphinylamino group, a silyl group and an ionic hydrophilic group. A halogen atom, an alkyl group, an aryl group, a heterocyclic group, a cyano group, an amino group, an acylamino group, and an alkyl- or arylsulfonyl group are more preferred, and an alkyl group, an aryl group, a cyano group, —$SO_2CH_3$ and $SO_2Ph$ are still more preferred.

$Ar_{A1}$ and $Ar_{A2}$ are preferably a pyrazolyl group, the substituent thereof is an alkyl group, an aryl group, a cyano group, —$SO_2CH_3$ and $SO_2Ph$, and the substituent of the pyrazolyl group is most preferably an aryl group or a cyano group. Further, $Ar_{A1}$ and $Ar_{A2}$ are preferably a thiadiazolyl group, the substituent thereof is a group selected from an alkyl group, a phenyl group, an alkoxy group, a thioalkoxy group, a phenoxy group, an alkylthio group, an arylthio group, an alkylamino group, and an arylamino group, and an alkyl group, a phenyl group, an alkylthio group, an arylthio group, an alkylamino group or an arylamino group is preferred, and an alkyl group or an aryl group is more preferred.

Here, the substituents (SUB) which may be substituted with $Ar_{A1}$ and $Ar_{A2}$ will be described in detail.

Examples of the halogen atom include a fluorine atom, a chlorine atom, a bromine atom and an iodine atom.

Examples of the alkyl group include a straight, branched, or cyclic substituted or unsubstituted alkyl group, and also include a cycloalkyl group, a bicycloalkyl group, a tricyclo structure having more ring structures, and the like. The alkyl group in the substituents described below (for example, the alkyl group of alkoxy groups and alkylthio groups) also represents an alkyl group of such a concept. Specifically, the alkyl group is an alkyl group having preferably 1 to 30 carbon atoms, more preferably 1 to 20 carbon atoms in a state where the substituents are excluded, and a substituted or unsubstituted alkyl group having 1 to 15 carbon atoms is preferred. Examples thereof include a methyl group, an ethyl group, an n-propyl group, an isopropyl group, a t-butyl group, an n-octyl group, an eicosyl group, a 2-chloroethyl group, a 2-cyanoethyl group, a 2-ethylhexyl group and the like. The cycloalkyl group is a substituted or unsubstituted cycloalkyl group preferably having 3 to 30 carbon atoms, more preferably 3 to 20 carbon atoms, and still more preferably 3 to 15 carbon atoms, in a state where the substituents are excluded. Preferred examples of the cycloalkyl group include a cyclohexyl group, a cyclopentyl group, a 4-n-dodecylcyclohexyl group and the like, and the bicylcoalkyl group is a substituted or unsubstituted bicycloalkyl group having preferably 5 to 30 carbon atoms, more preferably 5 to 20 carbon atoms, and still more preferably 5 to 15 carbon atoms, in a state where the substituents are excluded. That is, the bicycloalkyl group is a monovalent group in which one hydrogen atom is removed from bicycloalkanes having 5 to 30 carbon atoms, and examples thereof include a bicyclo[1,2,2]heptan-2-yl group, a bicyclo[2,2,2]octan-3-yl group, and the like. Examples of the substituents include a hydroxyl group, an alkoxy group, a cyano group, a halogen atom and an ionic hydrophilic group.

However, an aryl group is substituted, and thus the alkyl group (aralkyl group) is not included herein.

Examples of the alkenyl group include a straight, branched or cyclic substituted or unsubstituted alkenyl group, and include a cycloalkenyl group and a bicycloalkenyl group. Specifically, the alkenyl group is a substituted or unsubstituted alkenyl group having preferably 2 to 30 carbon atoms, more preferably 2 to 20 carbon atoms, and still more preferably 2 to 15, in a state where the substituents of an alkenyl group are excluded, examples thereof include a vinyl group, an allyl group, a prenyl group, a geranyl group, an oleyl group and the like, and the cycloalkenyl group is a substituted or unsubstituted cycloalkenyl group having preferably 3 to 30 carbon atoms, more preferably 3 to 20 carbon atoms, and still more preferably 3 to 15 carbon atoms, in a state where the substituents of a cycloalkenyl group are excluded. That is, the cycloalkenyl group is a monovalent group in which one hydrogen atom is removed from cycloalkenes having 3 to 30 carbon atoms, examples thereof include a 2-cyclopenten-1-yl group, a 2-cyclohexen-1-yl group, and the like, and the bicycloalkenyl group is a substituted or unsubstituted bicycloalkenyl group having preferably 5 to 30 carbon atoms, more preferably 5 to 20 carbon atoms, and still more preferably 5 to 15 carbon atoms, in a state where the substituents of the bicycloalkenyl group are excluded, That is, the bicycloalkenyl group is a monovalent group in which one hydrogen atom is removed from bicycloalkenes having one double bond, and examples thereof include a bicyclo[2,2,1]hept-2-en-1-yl group, a bicyclo[2,2,2]oct-2-en-4-yl group, and the like. Examples of the substituents include a hydroxyl group, an alkoxy group, a cyano group, a halogen atom and an ionic hydrophilic group.

The alkynyl group is a substituted or unsubstituted alkynyl group having preferably 2 to 30 carbon atoms, more preferably 2 to 20 carbon atoms, and most still more preferably 2 to 15 carbon atoms, in a state where the substituents are excluded, and examples thereof include an ethynyl group, a propargyl group, a trimethylsilylethynyl group and the like. Examples of the substituents include a hydroxyl group, an alkoxy group, a cyano group, a halogen atom and an ionic hydrophilic group.

Examples of the aralkyl group include an aralkyl group having a substituent and an unsubstituted aralkyl group. The aralkyl group is a substituted or unsubstituted aralkyl group having preferably 7 to 30 carbon atoms, more preferably 7 to 20 carbon atoms, and still more preferably 7 to 15 carbon atoms, when the substituents are excluded. Examples of the aralkyl group include a benzyl group and a 2-phenethyl group. Examples of the substituents include a hydroxyl group, an alkoxy group, a cyano group, a halogen atom and an ionic hydrophilic group.

The aryl group is a substituted or unsubstituted aryl group having preferably 6 to 30 carbon atoms, more preferably 6 to 20 carbon atoms, and still more preferably 6 to 15 carbon atoms, in a state where the substituents are excluded. Examples thereof include a phenyl group, a p-tolyl group, a naphthyl group, an m-chlorophenyl group, an o-hexadecanoylaminophenyl group and the like. Examples of the substituents include an alkyl group, an aryl group, a hydroxyl group, an alkoxy group, a cyano group, a halogen atom and an ionic hydrophilic group.

The heterocyclic group is preferably a monovalent group in which one hydrogen atom is removed from a 5- or 6-membered substituted or unsubstituted aromatic or non-aromatic heterocyclic compound, and is a 5- or 6-membered aromatic heterocyclic group having more preferably 2 to 30 carbon atoms, still more preferably 2 to 20 carbon atoms, and further preferably 2 to 15 carbon atoms, in a state where the substituents of the heterocyclic group are excluded. Examples thereof include a 2-furyl group, a 2-thienyl group, a 2-pyrimidinyl group, a 2-benzothiazolyl group and the like. Examples of the substituents include an alkyl group, an aryl group, a hydroxyl group, an alkoxy group, a cyano group, a halogen atom and an ionic hydrophilic group.

The alkoxy group represents a substituted or unsubstituted alkoxy group having preferably 1 to 30 carbon atoms, more preferably 1 to 20 carbon atoms, and still more preferably 1 to 15 carbon atoms, in a state where the substituents are excluded, and examples thereof include a methoxy group, an ethoxy group, an isopropoxy group, a t-butoxy group, an n-octyloxy group, a 2-methoxyethoxy group and the like. Examples of the substituents include an aryl group, a hydroxyl group, an alkoxy group, a cyano group, a halogen atom and an ionic hydrophilic group.

The aryloxy group represents a substituted or unsubstituted aryloxy group having preferably 6 to 30 carbon atoms, more preferably 6 to 20 carbon atoms, and still more preferably 6 to 15 carbon atoms, in a state where the substituents are excluded, and examples thereof include a phenoxy group, a 2-methylphenoxy group, a 4-t-butylphenoxy group, a 3-nitrophenoxy group, a 2-tetradecanoylaminophenoxy group and the like. Examples of the substituents include an alkyl group, an aryl group, a hydroxyl group, an alkoxy group, a cyano group, a halogen atom and an ionic hydrophilic group.

The silyloxy group represents a substituted or unsubstituted silyloxy group having preferably 0 to 20 carbon atoms and more preferably 0 to 15 carbon atoms, in a state where substituents are excluded, and examples thereof include a trimethylsilyloxy group, a diphenylmethylsilyloxy group and the like. Examples of the substituents include an alkyl group, an aryl group and a heterocyclic group.

The heterocyclic oxy group represents a substituted or unsubstituted heterocyclic oxy group having preferably 2 to 30 carbon atoms, more preferably 2 to 20 carbon atoms, and still more preferably 2 to 15 carbon atoms, in a state where the substituents are excluded, and examples thereof include a 1-phenyltetrazol-5-oxy group, a 2-tetrahydropyranyloxy group and the like. Examples of the substituents include an alkyl group, an aryl group, a hydroxyl group, an alkoxy group, a cyano group, a halogen atom and an ionic hydrophilic group.

The acyloxy group is preferably a formyloxy group, or a substituted or unsubstituted alkylcarbonyloxy group having 2 to 30 carbon atoms, in a state where the substituents are excluded, or a substituted or unsubstituted arylcarbonyloxy group having 6 to 30 carbon atoms, more preferably 6 to 20 carbon atoms, and still more preferably 6 to 15 carbon atoms, in a state where the substituents are excluded. Examples thereof include an acetyloxy group, a pivaloyloxy group, a stearoyloxy group, a benzoyloxy group, a p-methoxyphenylcarbonyloxy group and the like. Examples of the substituents include an alkyl group and an aryl group.

The carbamoyloxy group is a substituted or unsubstituted carbamoyloxy group having preferably 1 to 30 carbon atoms, more preferably 1 to 20 carbon atoms, and still more preferably 1 to 15 carbon atoms, in a state where the substituents are excluded, and examples thereof include an N,N-dimethylcarbamoyloxy group, an N,N-diethylcarbamoyloxy group, a morpholinocarbonyloxy group, an N,N-di-n-octylaminocarbonyloxy group, an N-n-octylcarbamoyloxy group and the like. Examples of the substituents include an alkyl group, an aryl group and a heterocyclic group.

The alkoxycarbonyloxy group is a substituted or unsubstituted alkoxycarbonyloxy group having preferably 2 to 30 carbon atoms, more preferably 2 to 20 carbon atoms, and still more preferably 2 to 15 carbon atoms, in a state where the substituents are excluded, and examples thereof include a methoxycarbonyloxy group, an ethoxycarbonyloxy group, a t-butoxycarbonyloxy group, an n-octylcarbonyloxy group and the like. Examples of the substituents include a hydroxyl group, an alkoxy group, a cyano group, a halogen atom and an ionic hydrophilic group.

The aryloxycarbonyloxy group is a substituted or unsubstituted aryloxycarbonyloxy group having preferably 7 to 30 carbon atoms, more preferably 7 to 20 carbon atoms, and still more preferably 7 to 15 carbon atoms, in a state where the substituents are excluded, and examples thereof include a phenoxycarbonyloxy group, a p-methoxyphenoxycarbonyloxy group, a p-n-hexadecyloxyphenoxycarbonyloxy group and the like. Examples of the substituents include an alkyl group, a hydroxyl group, an alkoxy group, a cyano group, a halogen atom and an ionic hydrophilic group.

The amino group includes an alkylamino group, an arylamino group and a heterocyclic amino group, and is a substituted or unsubstituted alkylamino group having preferably 1 to 30 carbon atoms, more preferably 1 to 20 carbon atoms, and still more preferably 1 to 15 carbon atoms, in a state where the substituents are excluded, or a substituted or unsubstituted aryl group having 6 to 30 carbon atoms, more preferably 6 to 20 carbon atoms, and still more preferably 6 to 15 carbon atoms, in a state where the substituents are excluded, and examples thereof include a methylamino group, a dimethylamino group, an anilino group, an N-methyl-anilino group, a diphenylamino group and the like. Examples of the substituents include an alkyl group, an aryl group, a heterocyclic group, a hydroxyl group, an alkoxy group, a cyano group, a halogen atom and an ionic hydrophilic group.

The acylamino group is preferably a formylamino group, a substituted or unsubstituted alkylcarbonylamino group having 1 to 30 carbon atoms, more preferably 1 to 20 carbon atoms, and still more preferably 1 to 15 carbon atoms, in a state where the substituents are excluded, or a substituted or unsubstituted arylcarbonylamino group having preferably 6 to 30 carbon atoms, more preferably 6 to 20 carbon atoms, and still more preferably 6 to 15 carbon atoms, in a state where the substituents are excluded, and examples thereof include an acetylamino group, a pivaloylamino group, a lauroylamino group, a benzoylamino group, a 3,4,5-tri-n-octyloxyphenylcarbonylamino group and the like. Examples of the substituents include a hydroxyl group, an alkoxy group, a cyano group, a halogen atom and an ionic hydrophilic group.

The aminocarbonylamino group is a substituted or unsubstituted aminocarbonylamino group having preferably 1 to 30 carbon atoms, more preferably 1 to 20 carbon atoms, and still more preferably 1 to 15 carbon atoms, in a state where the substituents are excluded, and examples thereof include a carbamoylamino group, an N,N-dimethylaminocarbonylamino group, an N,N-diethylaminocarbonylamino group, a morpholinocarbonylamino group and the like. Examples of the substituents include an alkyl group, an aryl group and a heterocyclic group.

The alkoxycarbonylamino group is a substituted or unsubstituted alkoxycarbonylamino group having preferably 2 to 30 carbon atoms, more preferably 2 to 20 carbon atoms, and still more preferably 2 to 15 carbon atoms, in a state where the substituents are excluded, and examples thereof include a methoxycarbonylamino group, an ethoxy carbonylamino group, a t-butoxycarbonylamino group, an n-octadecyloxycarbonylamino group, an N-methyl-methoxycarbonylamino group and the like. Examples of the substituents include a hydroxyl group, an alkoxy group, a cyano group, a halogen atom and an ionic hydrophilic group.

The aryloxycarbonylamino group represents a substituted or unsubstituted aryloxycarbonylamino group having preferably 7 to 30 carbon atoms, more preferably 7 to 20 carbon atoms, and still more preferably 7 to 15 carbon atoms, in a state where the substituents are excluded, and examples thereof include a phenoxycarbonylamino group, a p-chlorophenoxycarbonylamino group, an m-n-octyloxyphenoxycarbonylamino group and the like. Examples of the substituents include a hydroxyl group, an alkoxy group, a cyano group, a halogen atom and an ionic hydrophilic group.

The sulfamoylamino group is a substituted or unsubstituted sulfamoylamino group having preferably 0 to 30 carbon atoms, more preferably 0 to 20 carbon atoms, and still more preferably 0 to 15 carbon atoms, in a state where the substituents are excluded, and examples thereof include a sulfamoylamino group, an N,N-dimethylaminosulfonylamino group, an N-n-octylaminosulfonylamino group and the like. Examples of the substituents include an alkyl group, an aryl group and a heterocyclic group.

The alkyl- or aryl sulfonylamino group is a substituted or unsubstituted alkylsulfonylamino group having preferably 1 to 30 carbon atoms, more preferably 1 to 20 carbon atoms, and still more preferably 1 to 15 carbon atoms, in a state where the substituents are excluded, or a substituted or unsaturated arylsulfonylamino group having preferably 6 to 30 carbon atoms, more preferably 6 to 20 carbon atoms, and still more preferably 6 to 15 carbon atoms. Examples thereof include a methylsulfonylamino group, a butylsulfonylamino group, a phenylsulfonylamino group, a 2,3,5-trichlorophenylsulfonylamino group, a p-methylphenylsulfonylamino group and the like. Examples of the substituents include a hydroxyl group, an alkoxy group, a cyano group, a halogen atom and an ionic hydrophilic group.

The alkylthio group is a substituted or unsubstituted alkylthio group having preferably 1 to 30 carbon atoms, preferably 1 to 20 carbon atoms, and still more preferably 1 to 15 carbon atoms, in a state where the substituents are excluded, and examples thereof include a methylthio group, an ethylthio group, an n-hexadecylthio group and the like. Examples of the substituents include an aryl group, a hydroxyl group, an alkoxy group, a cyano group, a halogen atom and an ionic hydrophilic group.

The arylthio group is a substituted or unsubstituted arylthio group having preferably 6 to 30 carbon atoms, more preferably 6 to 20 carbon atoms, and still more preferably 6 to 15 carbon atoms, in a state where the substituents are excluded, and examples thereof include a phenylthio group, a p-chlorophenylthio group, an m-methoxyphenylthio group and the like. Examples of the substituents include an alkyl group, an aryl group, a hydroxyl group, an alkoxy group, a cyano group, a halogen atom and an ionic hydrophilic group.

The heterocyclic thio group is a substituted or unsubstituted heterocyclic thio group having preferably 2 to 30 carbon atoms, more preferably 2 to 20 carbon atoms, and still more preferably 2 to 15 carbon atoms, in a state where the substituents are excluded, and examples thereof include a 2-benzothiazolylthio group, a 1-phenyltetrazol-5-ylthio group and the like. Examples of the substituents include an alkyl group, an aryl group, a hydroxyl group, an alkoxy group, a cyano group, a halogen atom and an ionic hydrophilic group.

The sulfamoyl group is a substituted or unsubstituted sulfamoyl groups group having preferably 0 to 30 carbon atoms, more preferably 0 to 20 carbon atoms, and still more preferably 0 to 15 carbon atoms, in a state where the substituents are excluded, and examples thereof include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, an N—(N'-phenylcarbamoyl) sulfamoyl group and the like. Examples of the substituents include an alkyl group, an aryl group and a heterocyclic group.

The alkyl- or aryl sulfinyl group is a substituted or unsubstituted alkylsulfinyl group having preferably 1 to 30 carbon atoms, more preferably 1 to 20 carbon atoms, and still more preferably 1 to 15 carbon atoms, in a state where the substituents are excluded, or a substituted or unsubstituted arylsulfinyl group having preferably 6 to 30 carbon atoms, more preferably 6 to 20 carbon atoms, and still more preferably 6 to 15 carbon atoms, in a state where the substituents are excluded, and examples thereof include a methylsulfinyl group, an ethylsulfinyl group, a phenylsulfinyl group, a p-methylphenylsulfinyl group and the like. Examples of the substituents include a hydroxyl group, an alkoxy group, a cyano group, a halogen atom and an ionic hydrophilic group.

The alkyl- or aryl sulfonyl group is a substituted or unsubstituted alkylsulfonyl group having preferably 1 to 30 carbon atoms, more preferably 1 to 20 carbon atoms, and still more preferably 1 to 15 carbon atoms, in a state where the substituents are excluded, or a substituted or unsubstituted arylsulfonyl group having preferably 6 to 30 carbon atoms, more preferably 6 to 20 carbon atoms, and still more preferably 6 to 15 carbon atoms, in a state where the substituents are excluded, and examples thereof include a methylsulfonyl group, an ethylsulfonyl group, a phenylsulfonyl group, a p-methylphenylsulfonyl group and the like. Examples of the substituents include a hydroxyl group, an alkoxy group, a cyano group, a halogen atom and an ionic hydrophilic group.

The acyl group is preferably a formyl group, a substituted or unsubstituted alkylcarbonyl group having 2 to 30 carbon atoms, more preferably 2 to 20 carbon atoms, and still more preferably 2 to 15 carbon atoms, in a state where the substituents are excluded, a substituted or unsubstituted arylcarbonyl group having preferably 7 to 30 carbon atoms, more preferably 7 to 20 carbon atoms, and still more preferably 7 to 15 carbon atoms, in a state where the substituents are excluded, and a substituted or unsubstituted heterocyclic carbonyl group having preferably 2 to 30 carbon atoms, more preferably 2 to 20 carbon atoms, and still more preferably 2 to 15 carbon atoms, in a state where the substituents are excluded, and which is bonded with a carbonyl group through a carbon atom, and examples thereof include an acetyl group, a pivaloyl group, a 2-chloroacetyl group, a stearoyl group, a benzoyl group, a p-n-octyloxyphenylcarbonyl group, a 2-pyridylcarbonyl group, a 2-furylcarbonyl group and the like. Examples of the substituents include an alkyl group, an aryl group and a heterocyclic group.

The aryloxycarbonyl group is a substituted or unsubstituted aryloxycarbonyl group having preferably 7 to 30 carbon atoms, more preferably 7 to 20 carbon atoms, and still more preferably 7 to 15 carbon atoms, in a state where the substituents are excluded, and examples thereof include a phenoxycarbonyl group, an o-chlorophenoxycarbonyl group, an m-nitrophenoxycarbonyl group, a p-t-butylphenoxycarbonyl group and the like. Examples of the substituents include a hydroxyl group, an alkoxy group, a cyano group, a halogen atom and an ionic hydrophilic group.

The alkoxycarbonyl group is a substituted or unsubstituted alkoxycarbonyl group having preferably 2 to 30 carbon atoms, more preferably 2 to 20 carbon atoms, and still more preferably 2 to 15 carbon atoms, in a state where the substituents of the alkoxycarbonyl group are excluded, and examples thereof include a methoxycarbonyl group, an ethoxycarbonyl group, a t-butoxycarbonyl group, an n-octadecyloxycarbonyl group and the like. Examples of the substituents include a hydroxyl group, an alkoxy group, a cyano group, a halogen atom and an ionic hydrophilic group.

The carbamoyl group is a substituted or unsubstituted carbamoyl group having preferably 1 to 30 carbon atoms, more preferably 1 to 20 carbon atoms, and still more preferably 1 to 15 carbon atoms, in a state where the substituents of the carbamoyl group are excluded, and examples thereof include a carbamoyl group, an N-methylcarbamoyl group, an N,N-dimethylcarbamoyl group, an N,N-di-n-octylcarbamoyl group, an N-(methylsulfonyl)carbamoyl group and the like. Examples of the substituents include an alkyl group, an aryl group and a heterocyclic group.

The aryl- or heterocyclic azo group is a substituted or unsubstituted arylazo group having preferably 6 to 30 carbon atoms, more preferably 6 to 20 carbon atoms, and still more preferably 6 to 15 carbon atoms, in a state where the substituents are excluded, and a substituted or unsubstituted heterocyclic azo group having preferably 3 to 30 carbon atoms, more preferably 3 to 20 carbon atoms, and still more preferably 3 to 15 carbon atoms, in a state where the substituents are excluded, and examples thereof include phenylazo, p-chlorophenylazo, 5-ethylthio-1,3,4-thiadiazol-2-ylazo and the like. Examples of the substituents include a hydroxyl group, an alkoxy group, a cyano group, a halogen atom and an ionic hydrophilic group.

The imide group is a substituted or unsubstituted imide group having preferably 0 to 30 carbon atoms, more preferably 0 to 20 carbon atoms, and still more preferably 0 to 15 carbon atoms, in a state where the substituents of the imide group are excluded, and examples thereof include an N-succinimide group, an N-phthalimide group and the like. Examples of the substituents include an alkyl group, an aryl group and a heterocyclic group.

The phosphino group is a substituted or unsubstituted phosphino group having preferably 0 to 30 carbon atoms, more preferably 0 to 20 carbon atoms, and still more preferably 0 to 15 carbon atoms, in a state where the substituents are excluded, and examples thereof include a dimethylphosphino group, a diphenylphosphino group, a methylphenoxyphosphino group and the like.

The phosphinyl group is a substituted or unsubstituted phosphinyl group having preferably 0 to 30 carbon atoms, more preferably 0 to 20 carbon atoms, and still more preferably 0 to 15 carbon atoms, in a state where the substituents are excluded, and examples thereof include a phosphinyl group, a dioctylphosphinyl group, a diethoxyphosphinyl group and the like. Examples of the substituents include an alkyl group, an aryl group and a heterocyclic group.

The phosphinyloxy group is a substituted or unsubstituted phosphinyloxy group having preferably 0 to 30 carbon atoms, more preferably 0 to 20 carbon atoms, and still more preferably 0 to 15 carbon atoms, in a state where the substituents are excluded, and examples thereof include a diphenoxyphosphinyloxy group, a dioctyloxyphosphinyloxy group and the like. Examples of the substituents include an alkyl group, an aryl group and a heterocyclic group.

The phosphinylamino group is a substituted or unsubstituted phosphinylamino group having preferably 0 to 30 carbon atoms, more preferably 0 to 20 carbon atoms, and still more preferably 0 to 15 carbon atoms, in a state where the substituents are excluded, and examples thereof include a dimethoxyphosphinylamino group and a dimethylaminophosphinylamino group and the like. Examples of the substituents include an alkyl group, an aryl group and a heterocyclic group.

The silyl group is a substituted or unsubstituted silyl group having preferably 0 to 30 carbon atoms, more preferably 0 to 20 carbon atoms, and still more preferably 0 to 15 carbon atoms, in a state where the substituents are excluded, and examples thereof include a trimethylsilyl group, a t-butyldimethylsilyl group, a phenyldimethylsilyl group and the like. Examples of the substituents include an alkyl group, an aryl group and a heterocyclic group.

The ionic hydrophilic group includes a sulfo group, a carboxyl group, a phosphono group, a quaternary ammonium group and the like. As the ionic hydrophilic group, a carboxyl group and a sulfo group are preferred, and a carboxyl group is particularly preferred. The carboxyl group and the sulfo group may be in the state of a salt, and examples of the salt-forming counter ion include alkali metal ions (for example, a lithium ion, a sodium ion, and a potassium ion) and an organic cation (for example, a tetramethylguanidium ion). Examples of the ionic hydrophilic group in the state of a salt include lithium sulfonate, potassium carboxylate, and tetramethylammonium chloride.

Among the aforementioned substituents, the hydrogen atom in substituents having a hydrogen atom may be substituted with the aforementioned substituents. Examples of such substituents include an alkylcarbonylaminosulfonyl group, an arylcarbonylaminosulfonyl group, an alkylsulfonylaminocarbonyl group and an arylsulfonylaminocarbonyl group. Examples thereof include a methylsulfonylaminocarbonyl group, a p-methylphenylsulfonylaminocarbonyl group, an acetylaminosulfonyl group and a benzoylaminosulfonyl group.

$A_{A1}$ and $A_{A2}$ each independently represent a hydrogen atom or a substituent. As the substituent, the substituents described in the substituents (SUB) may be applied. $A_{A1}$ and $A_{A2}$ represent preferably a hydrogen atom, a halogen atom, an alkyl group, an alkenyl group, an alkynyl group, an aralkyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, a sulfo group, an alkyl- or arylsulfinyl group, an alkyl- or arylsulfonyl group, an acyl group, an aryloxy carbonyl group, an alkoxycarbonyl group, a carbamoyl group, an aryl- or heterocyclic azo group, an imide group, a phosphino group, a phosphinyl group, a phosphinyloxy group, a phosphinylamino group, a silyl group or an ionic hydrophilic group, and more preferably a hydrogen atom, a halogen atom, an alkyl group, an alkenyl group, an alkynyl group, an aryl group, a heterocyclo group, a hydroxyl group, an alkoxy group, an aryloxy group, a heterocyclic oxy group, an amino group, an alkyl group, an amino group substituted with an aryl group or a heterocyclic group, a thio group, an alkyl- or arylthio group, a heterocyclic thio group or an ionic hydrophilic group. Among them, as $A_{A1}$ and $A_{A2}$, a hydrogen atom, an alkyl group having a total carbon number of 1 to 8 or an aryl group having a total carbon number of 6 to 12 are preferred, and a hydrogen atom, an isopropyl group, a sec-butyl group or a tert-butyl group is most preferred. Each group may further have a substituent.

$Y_A$ represents —$OM_A$ or —$NR_{A1}R_{A2}$, $M_A$ represents a hydrogen atom or a metal ion, and $R_{A1}$ and $R_{A2}$ each independently represent a hydrogen atom, or an alkyl group, an alkenyl group, an alkynyl group, an aralkyl group, an aryl group or a heterocyclic group. As $Y_A$, —$OM_A$ is preferred. As $M_A$, a hydrogen atom and an alkali metal ion are preferred, and an alkali metal ion is more preferred. Even among the alkali metal ions, a lithium ion, a sodium ion or a potassium ion is more preferred, and a lithium ion or a potassium ion is still more preferred. When $Y_A$ is —$NR_{A1}R_{A2}$, corresponding groups described in the substituents (SUB) may be applied as substituents to $R_A$ and $R_{A2}$, respectively. As $R_{A1}$ and $R_{A2}$, a hydrogen atom, an alkyl group or an aryl group is more preferred, a hydrogen atom or an alkyl group is still more preferred, and a hydrogen atom is particularly preferred.

In summary, it is preferred that Formula (1-3) of the present invention is composed of a combination of the following (a) to (c).

(a) $Ar_{A1}$ and $Ar_{A2}$ are each independently preferably a pyrazolyl group, a thiazolyl group, an isothiazolyl group or a thiadiazolyl group, and particularly preferably a pyrazolyl group or a thiazolyl group. As the substituent of the pyrazolyl group, an alkyl group, an aryl group, a cyano group, —$SO_2CH_3$ or —$SO_2Ph$ is preferred, the substituent of the pyrazolyl group is most preferably an aryl group and a cyano group, and as the substituent of the thiadiazolyl group, an alkyl group or an aryl group is preferred.

(b) $A_{A1}$ and $A_{A2}$ are each independently preferably a hydrogen atom, an alkyl group having a total carbon number of 1 to 8 or an aryl group having a total carbon number of 6 to 12, more preferably a hydrogen atom, an isopropyl group, a sec-butyl group or a tert-butyl group, and most preferably a tert-butyl group.

(c) $Y_A$ represents —$OM_A$ or —$NR_{A1}R_{A2}$, and is preferably —$OM_A$. As $M_A$, an alkali metal ion is preferred, and among the alkali metal ions, a lithium ion or a potassium ion is more preferred. $R_{A1}$ and $R_{A2}$ are each independently preferably a hydrogen atom or an alkyl group, and particularly preferably a hydrogen atom. Meanwhile, the compound represented by Formula (1) is preferably a compound in which at least one of various substituents is the aforementioned preferred groups, more preferably a compound in which much more substituents are the aforementioned preferred groups, and most preferably a compound in which all the substituents are the aforementioned preferred groups.

It is preferred that the compound represented by Formula (1-3) is the following Formula (1-4) or to Formula (1-7).

Formula (1-4)

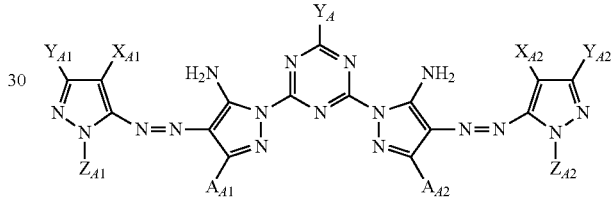

In Formula (1-4), $A_{A1}$, $A_{A2}$, and $Y_A$ have the same meaning as $A_{A1}$, $A_{A2}$, and $Y_A$ in Formula (1-3). $Y_{A1}$ and $Y_{A2}$ each independently represent a hydrogen atom or a substituent, and $X_{A1}$ and $X_{A2}$ each independently represent an electron-withdrawing group having a Hammett's σp value of 0.20 or more. $Z_{A1}$ and $Z_{A2}$ each independently represent a hydrogen atom, an alkyl group, an alkenyl group, an alkynyl group, an aralkyl group, an aryl group or a heterocyclic group.

Hereinafter, the groups of Formula (1-4) will be described in detail.

$A_{A1}$, $A_{A2}$, and $Y_A$ have the same meaning as those described in detail in Formula (1-3).

$Y_{A1}$ and $Y_{A2}$ are preferably a hydrogen atom, a halogen atom, an alkyl group, an alkenyl group, an alkynyl group, an aralkyl group, an aryl group, a heterocyclic group, a cyano group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group, an alkyl group, an amino group substituted with an aryl group or a heterocyclic group, an acylamino group, an aminocarbonylamino group, a sulfamoylamino group, an alkoxycarbonylamino group, an alkyl- or arylsulfonylamino group, an aryloxycarbonylamino group, a nitro group, a thio group, an alkyl- or arylthio group, an acylthio group, a carbamoylthio group, a heterocyclic thio group, an alkoxycarbonyl thio group, an aryloxycarbonyl thio group, an alkyl- or arylsulfonyl group, an alkyl- or arylsulfinyl group, a sulfamoyl group, an ionic hydrophilic group, or an acylamino group. In each group described above, corresponding groups described in the substituents (SUB) may be applied as the substituent.

$Y_{A1}$ and $Y_{A2}$ are more preferably a hydrogen atom, a halogen atom, an alkyl group, an aryl group, a heterocyclic group, a cyano group, an alkoxy group, an acylamino group, an aminocarbonylamino group, an alkylsulfonylamino group, an arylsulfonylamino group, a sulfamoyl group, an alkylsulfonyl group, an arylsulfonyl group, a carbamoyl group or an alkoxycarbonyl group, particularly preferably a hydrogen atom, a halogen atom, an alkyl group, an aryl group, a cyano group, an alkylsulfonyl group, an arylsulfonyl group or a heterocyclic group, and most preferably a hydrogen atom.

Preferred examples of $X_{A1}$ and $X_{A2}$ having a substituent's σp value of 0.20 or more include an acyl group, an acyloxy group, a carboxyl group, a carbamoyl group, an alkoxycarbonyl group, an aryloxycarbonyl group, a cyano group, a nitro group, a dialkylphosphono group, a diarylphosphono group, a diarylphosphinyl group, an alkylthio group, an arylthio group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another substituent having a σp value of 0.20 or more, a heterocyclic group, a halogen atom, an azo group and a selenocyanate group. In each group described above, corresponding groups described in the substituents (SUB) may be applied as the substituent.

$X_{A1}$ and $X_{A2}$ are preferably a cyano group, a carbamoyl group, an alkoxycarbonyl group, an alkylsulfonyl group, an arylsulfonyl group or a halogen atom, more preferably a cyano group, an alkoxycarbonyl group, an alkylsulfonyl group or an arylsulfonyl group, and most preferably a cyano group, an alkylsulfonyl group or an arylsulfonyl group. Among them, a cyano group is most preferred.

Preferred examples of $Z_{A1}$ and $Z_{A2}$ include an alkyl group, a cycloalkyl group, an aralkyl group, an alkenyl group, an alkynyl group, an aryl group, a heterocyclic group, an alkylsulfinyl group, an arylsulfinyl group, an alkylsulfonyl group, an arylsulfonyl group, an arylsulfonyl group, an acyl group, an aryloxy group, an aryloxycarbonyl group, an alkoxycarbonyl group, a carbamoyl group, a phosphino group, a phosphinyl group or a silyl group, and each may further have a substituent.

As those particularly preferred even in $Z_{A1}$ and $Z_{A2}$, an alkyl group, an aryl group, a heterocyclic group, an alkylsulfonyl group, an arylsulfonyl group, an acyl group (preferably anarylarylcarbonyl group) or a carbamoyl group is more preferred, and a substituted aryl group is still more preferred.

In summary, it is preferred that Formula (1-4) of the present invention is composed of a combination of the following (a) to (e).

(a) $Y_{A1}$ and $Y_{A2}$ are each independently particularly preferably a hydrogen atom, a halogen atom, an alkyl group, an aryl group, a cyano group, an alkylsulfinylsulfonyl group, an arylsulfonyl group or a heterocyclic group, and most preferably a hydrogen atom.

(b) $A_{A1}$ and $A_{A2}$ are each independently preferably a hydrogen atom, an alkyl group having a total carbon number of 1 to 8 or an aryl group having a total carbon number of 6 to 12, more preferably an isopropyl group, a sec-butyl group or a tert-butyl group, and most preferably a tert-butyl group.

(c) $X_{A1}$ and $X_{A2}$ are preferably a cyano group, an alkylsulfonyl group or an arylsulfonyl group, and more preferably a cyano group.

(d) $Z_{A1}$ and $Z_{A2}$ are each independently more preferably an alkyl group, an aryl group, a heterocyclic group, an alkylsulfonyl group, an arylsulfonyl group, an acyl group, an arylcarbonyl group or a carbamoyl group, and still more preferably a substituted aryl group. The substituted aryl group is preferably a phenyl group in which at least two (preferably two) have a sulfo group or a carboxyl group as the substituent.

(e) $Y_A$ is preferably —$OM_A$. As $M_A$, an alkali metal ion is preferred, and among the alkali metal ions, a lithium ion or a potassium ion is more preferred. Meanwhile, the compound represented by Formula (11-4) is preferably a compound in which at least one of various substituents is the aforementioned preferred groups, more preferably a compound in which much more substituents are the aforementioned preferred groups, and most preferably a compound in which all the substituents are the aforementioned preferred groups.

Among the compounds represented by Formula (1-4), a compound represented by the following Formula (1-5) is more preferred.

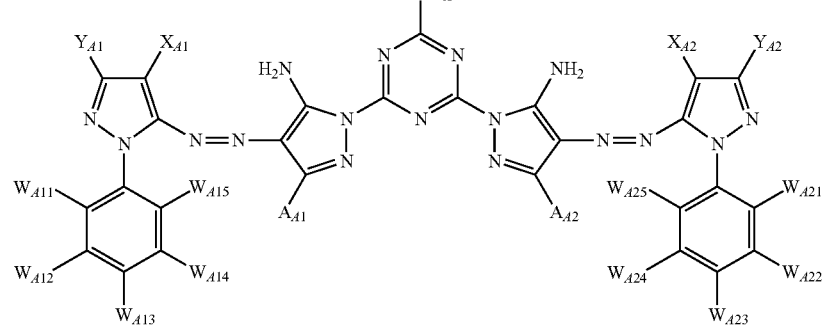

Formula (1-5)

In Formula (1-5), $A_{A1}$, $A_{A2}$, $X_{A1}$, $X_{A2}$, $Y_{A1}$ and $Y_{A2}$ have the same meaning as $A_{A1}$, $A_{A2}$, $X_{A1}$, $X_{A2}$, $Y_{A1}$ and $Y_{A2}$ in Formula (1-4). $W_{A11}$, $W_{A12}$, $W_{A13}$, $W_{A14}$, $W_{A15}$, $W_{A21}$, $W_{A22}$, $W_{A23}$, $W_{A24}$ and $W_{A25}$ each independently represent a hydrogen atom or a substituent, and $M_A$ represents a hydrogen atom or a metal ion.

Hereinafter, the groups of Formula (1-5) will be described in detail.

$A_{A1}$ and $A_{A2}$ have the same meaning as those described in detail in Formula (1-3).

$Y_{A1}$ and $Y_{A2}$ have the same meaning as those described in detail in Formula (1-4).

$X_{A1}$ and $X_{A2}$ have the same meaning as those described in detail in Formula (1-4).

$W_{A11}$, $W_{A12}$, $W_{A13}$, $W_{A14}$, $W_{A15}$, $W_{A21}$, $W_{A22}$, $W_{A23}$, $W_{A24}$ and $W_{A25}$ are preferably a hydrogen atom, a halogen atom, an alkyl group, an aryl group, a heterocyclic group, a cyano group, an alkoxy group, an acylamino group, an aminocarbonylamino group, an alkylsulfonylamino group, an arylsulfonylamino group, a sulfamoyl group, an alkylsulfonyl group, an arylsulfonyl group, a carbamoyl group, an alkoxycarbonyl group, a sulfo group (including salts thereof), a carboxyl group (including salts thereof), a hydroxyl group (may be a salt), a phosphono group (may be a salt) or a quaternary ammonium, and among them, a hydrogen atom, a halogen atom, an alkyl group, a sulfo group (including salts thereof), a carboxyl group (including salts thereof), and a hydroxyl group (may be a salt) (including salts thereof) are preferred and a hydrogen atom, a sulfo group (including salts thereof), and a carboxyl group (including salts thereof) are more preferred, and in particularly, it is preferred that at least one of $W_{A11}$, $W_{A12}$, $W_{A13}$, $W_{A14}$, and $W_{A15}$ are is a sulfo group (including salts thereof) and a carboxyl group (including salts thereof), and also that at least one of $W_{A21}$, $W_{A22}$, $W_{A23}$, $W_{A24}$, and $W_{A25}$ are is a sulfo group (including salts thereof) and a carboxyl group (including salts thereof). It is preferred that two of $W_{A11}$ to $W_{A15}$ and two of $W_{A21}$ to $W_{A25}$ are a carboxyl group (including salts thereof), and the others are a hydrogen atom. In each group of the aforementioned halogen atom, alkyl group, aryl group, heterocyclic group, cyano group, alkoxy group, acylamino group, aminocarbonylamino group, alkylsulfonyl carbonylamino group, arylsulfonylamino group, sulfamoyl group, alkylsulfonyl group, arylsulfonyl group, carbamoyl group and alkoxycarbonyl group, corresponding groups described in the substituents (SUB) may be applied as substituents.

$M_A$ represents a hydrogen atom or a metal ion. More preferably, $M_A$ is a hydrogen atom and an alkali metal ion, and more preferably an alkali metal ion. Even among the alkali metal ions, a lithium ion, a sodium ion or a potassium ion is more preferred, and a lithium ion or a potassium ion is most preferred.

In summary, it is preferred that Formula (1-5) of the present invention is composed of a combination of the following (a) to (e).

(a) $Y_{A1}$ and $Y_{A2}$ are each independently particularly preferably a hydrogen atom, a halogen atom, an alkyl group, an aryl group, a cyano group, an alkylsulfinylsulfonyl group, an arylsulfinyl group or a heterocyclic group, more preferably a hydrogen atom or an alkyl group, and most preferably a hydrogen atom.

(b) $A_{A1}$ and $A_{A2}$ are each independently preferably a hydrogen atom, an alkyl group having a total carbon number of 1 to 8 or an aryl group having a total carbon number of 6 to 12, more preferably an isopropyl group, a sec-butyl group or a tert-butyl group, and most preferably a tert-butyl group.

(c) $X_{A1}$ and $X_{A2}$ are each independently preferably a cyano group, an alkylsulfonyl group or an arylsulfonyl group, and more preferably a cyano group.

(d) $W_{A11}$, $W_{A12}$, $W_{A13}$, $W_{A14}$, $W_{A15}$, $W_{A21}$, $W_{A22}$, $W_{A23}$, $W_{A24}$ and $W_{A25}$ are each independently preferably a hydrogen atom, a sulfo group (including salts thereof) or a carboxyl group (including salts thereof), and in particularly, it is preferred that at least one of $W_{A11}$, $W_{A12}$, $W_{A13}$, $W_{A14}$ and $W_{A15}$ are is a sulfo group (including salts thereof) or a carboxyl group (including salts thereof), and also that at least one of $W_{A21}$, $W_{A22}$, $W_{A23}$, $W_{A24}$ and $W_{A25}$ are is a sulfo group (including salts thereof) and a carboxyl group (including salts thereof). It is preferred that two of $W_{A11}$ to $W_{A15}$ and two of $W_{A21}$ to $W_{A25}$ are a carboxyl group (including salts thereof).

(e) As $M_A$, an alkali metal ion is preferred, and among the alkali metal ions, a lithium ion or a potassium ion is more preferred. Meanwhile, the compound represented by Formula (1-5) is preferably a compound in which at least one of various substituents is the aforementioned preferred groups, more preferably a compound in which much more substituents are the aforementioned preferred groups, and most preferably a compound in which all the substituents are the aforementioned preferred groups.

Among the compounds represented by Formula (1-5), a compound represented by the following Formula (1-6) is more preferred.

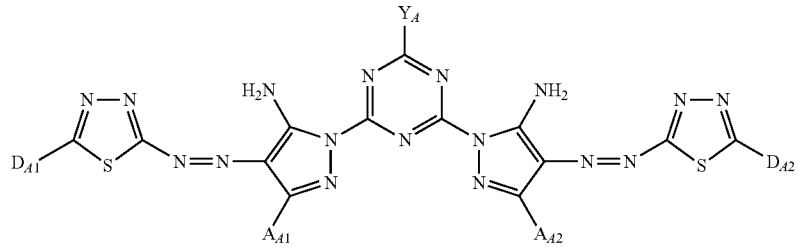

Formula (1-6)

In Formula (1-6), $A_{A1}$, $A_{A2}$, and $Y_A$ have the same meaning as $A_{A1}$, $A_{A2}$, and $Y_A$ in Formula (1-4). $D_{A1}$ and $D_{A2}$ each independently represent a hydrogen atom or a substituent.

Hereinafter, the substituents will be described in detail.

$A_{A1}$ and $A_{A2}$ have the same meaning as those described in detail in Formula (1-3).

$Y_A$ has the same meaning as that described in detail in Formula (1-3).

Preferred examples of $D_{A1}$ and $D_{A2}$ each independently include a hydrogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (an alkylamino group and an arylamino group), an acylamino group (an amide group), an aminocarbonylamino group (an ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkyloxycarbonyl group, a carbamoyl group, a phosphino group, a phosphinyl group, a phosphinyloxy group, a phosphinylamino group, a silyl group, an azo group or an imide group, and in each group described above, corresponding groups described in the substituents (SUB) may be applied as the substituents. Each may further have a substituent.

More preferably, it is preferred that $D_{A1}$ and $D_{A2}$ are each independently a substituted alkyl group, a substituted aryl group, a substituted heterocyclic group, a substituted alkylthio group, a substituted arylthio group, a substituted heterocyclic thio group, a substituted alkylamino group and a substituted arylamino group, and among them, a substituted aryl group and a substituted arylthio group are preferred, and a substituted aryl group is particularly preferred. The substituted aryl group is preferably a phenyl group in which at least two (preferably two) have a sulfo group or a carboxyl group.

In summary, it is preferred that Formula (1-6) of the present invention is composed of a combination of the following (a) to (c).

(b) $A_{A1}$ and $A_{A2}$ are each independently preferably a hydrogen atom, an alkyl group having a total carbon number of 1 to 8 or an aryl group having a total carbon number of 6 to 12, more preferably an isopropyl group, a sec-butyl group or a tert-butyl group, and most preferably a tert-butyl group.

(b) $D_{A1}$ and $D_{A2}$ are each independently preferably a substituted alkyl group, a substituted aryl group, a substituted heterocyclic group, a substituted alkylthio group, a substituted arylthio group or a substituted heterocyclic thio group, and among them, a substituted aryl group or a substituted arylthio group is preferred, and a substituted aryl group is particularly preferred. The substituted aryl group is preferably a phenyl group in which at least two (preferably two) have a sulfo group or a carboxyl group.

(c) $Y_A$ is preferably —$OM_A$. As $M_A$, an alkali metal ion is preferred, and among the alkali metal ions, a lithium ion or a potassium ion is more preferred. Meanwhile, the compound represented by Formula (1-6) is preferably a compound in which at least one of various substituents is the aforementioned preferred groups, more preferably a compound in which much more substituents are the aforementioned preferred groups, and most preferably a compound in which all the substituents are the aforementioned preferred groups.

Among the compounds represented by Formula (1-6), a compound represented by the following Formula (1-7) is more preferred.

In Formula (1-7), $A_{A1}$, $A_{A2}$, $D_{A1}$ and $D_{A2}$ have the same meaning as $A_{A1}$, $A_{A2}$, $D_{A1}$ and $D_{A2}$ in Formula (1-6). $M_A$ represents a hydrogen atom or a metal ion.

Hereinafter, the groups of Formula (1-7) will be described in detail.

$A_{A1}$ and $A_{A2}$ have the same meaning as those described in detail in Formula (1-3).

$D_{A1}$ and $D_{A2}$ have the same meaning as those described in detail in Formula (1-6).

$M_A$ has the same meaning as that described in detail in Formula (1-3).

In summary, it is preferred that Formula (1-7) of the present invention is composed of a combination of the following (a) to (c).

(a) $A_{A1}$ and $A_{A2}$ are each independently preferably a hydrogen atom, an alkyl group having a total carbon number of 1 to 8 or an aryl group having a total carbon number of 6 to 12, more preferably an isopropyl group, a sec-butyl group or a tert-butyl group, and most preferably a tert-butyl group.

(b) $D_{A1}$ and $D_{A2}$ are each independently preferably a substituted alkyl group, a substituted aryl group, a substituted heterocyclic group, a substituted alkylthio group, a substituted arylthio group or a substituted heterocyclic thio group, and among them, a substituted aryl group or a substituted arylthio group is preferred, and a substituted aryl group is particularly preferred. The substituted aryl group is preferably a phenyl group in which at least two (preferably two) have a sulfo group or a carboxyl group.

(c) As $M_A$, an alkali metal ion is preferred, and among the alkali metal ions, a lithium ion or a potassium ion is more preferred. Meanwhile, the compound represented by Formula (1-7) is preferably a compound in which at least one of various substituents is the aforementioned preferred groups, more preferably a compound in which much more substituents are the aforementioned preferred groups, and most preferably a compound in which all the substituents are the aforementioned preferred groups.

Hereinafter, specific examples of the compound represented by Formula (1-3) will be described, but the present invention is not limited thereto.

Formula (1-7)

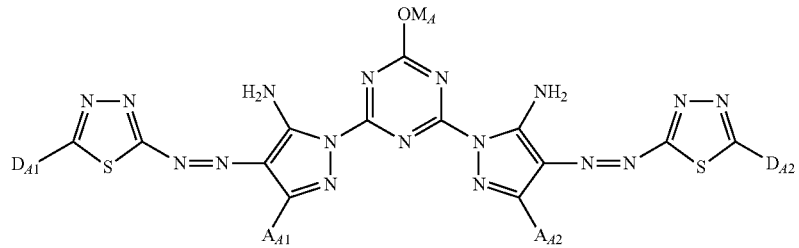

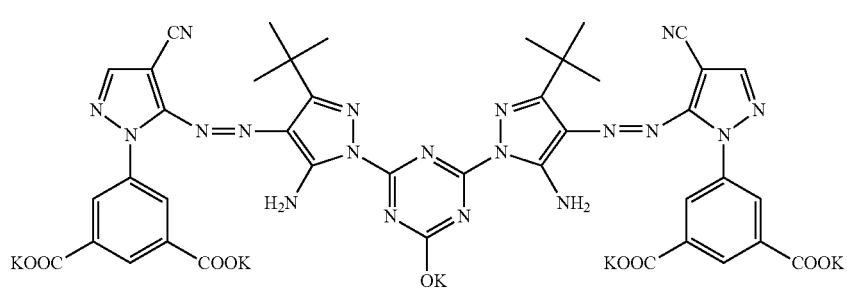
Compound 1
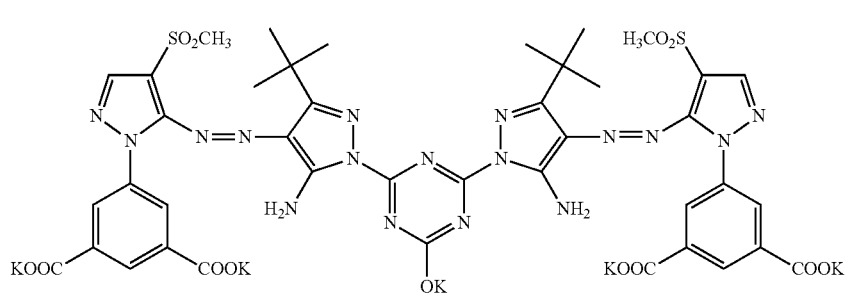
Compound 2
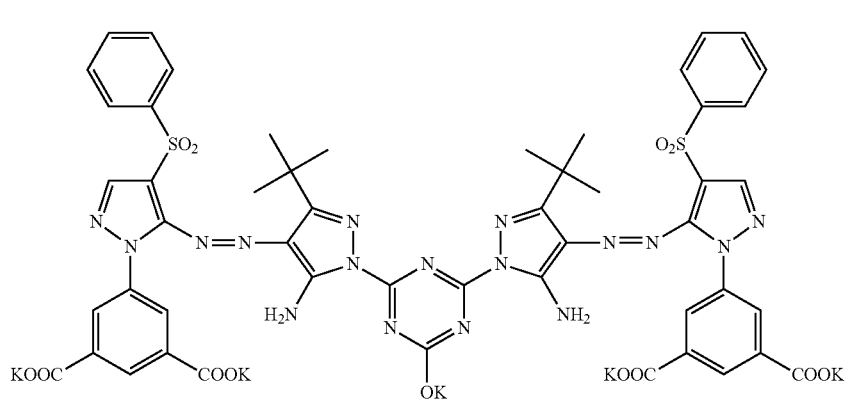
Compound 3
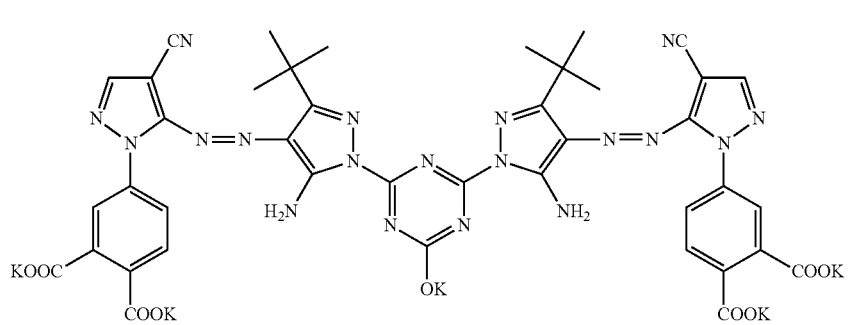
Compound 4
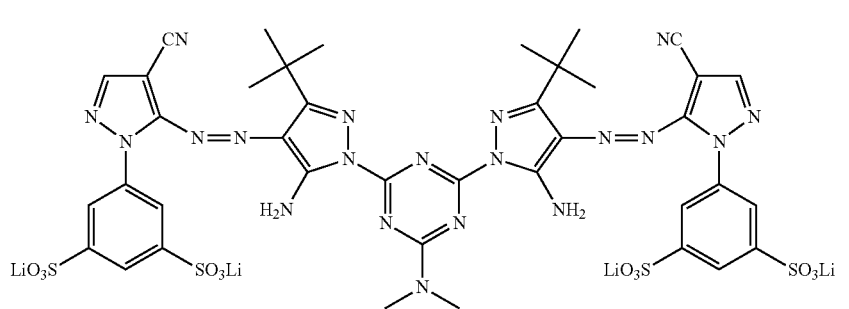
Compound 5

Compound 6
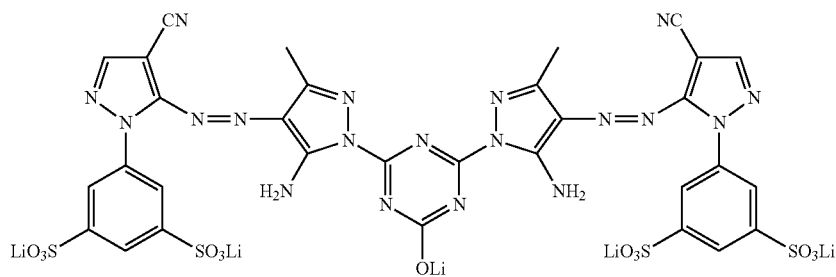
Compound 7
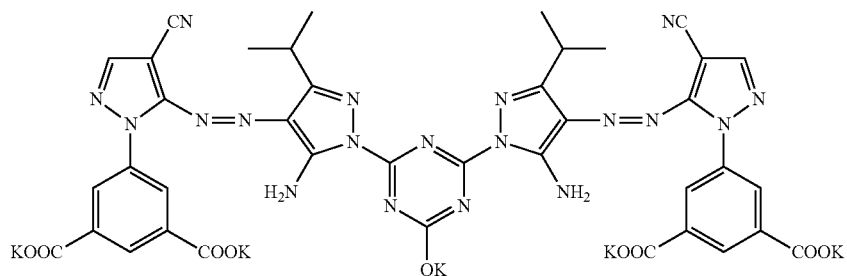
Compound 8
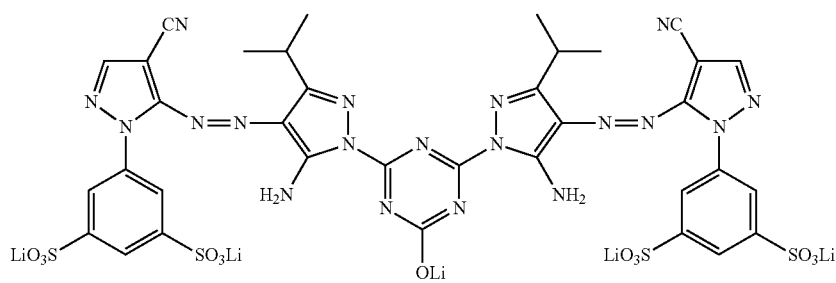
Compound 9
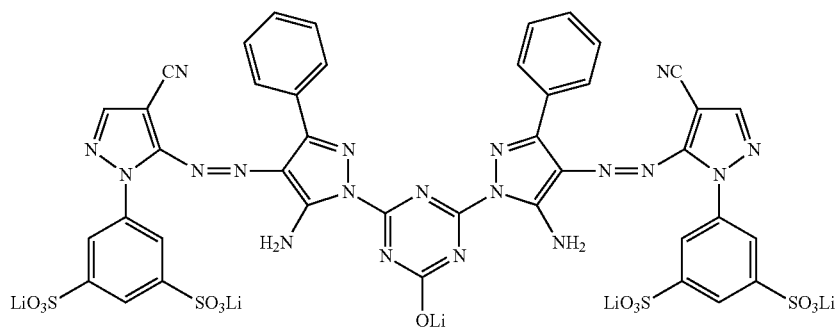
Compound 10
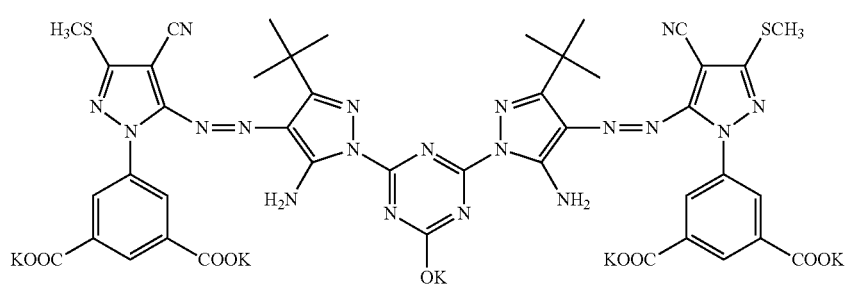

Compound 11
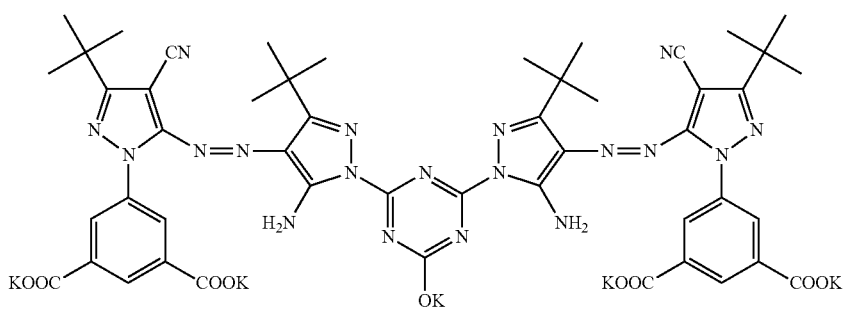
Compound 12
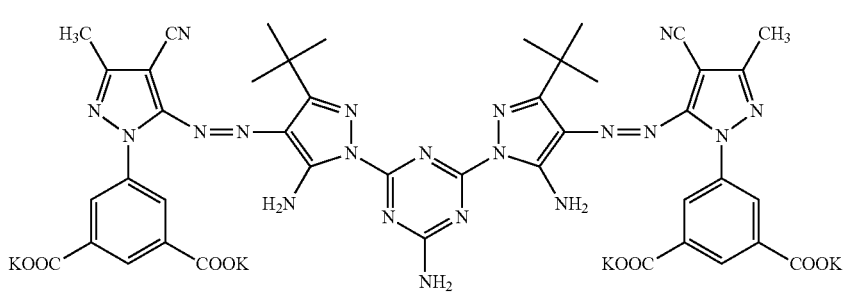
Compound 13
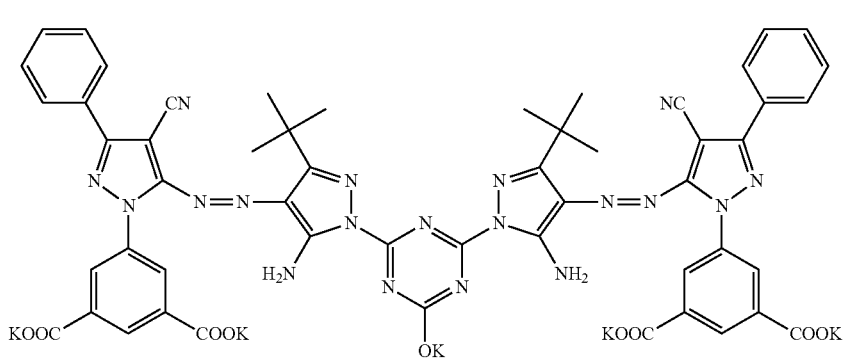
Compound 14
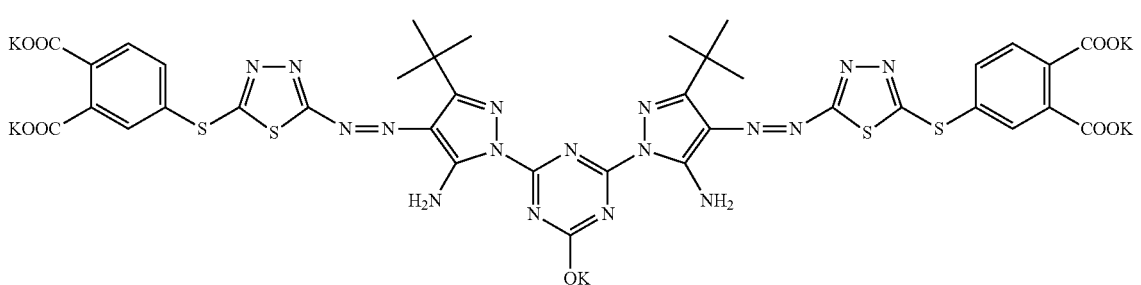
Compound 15
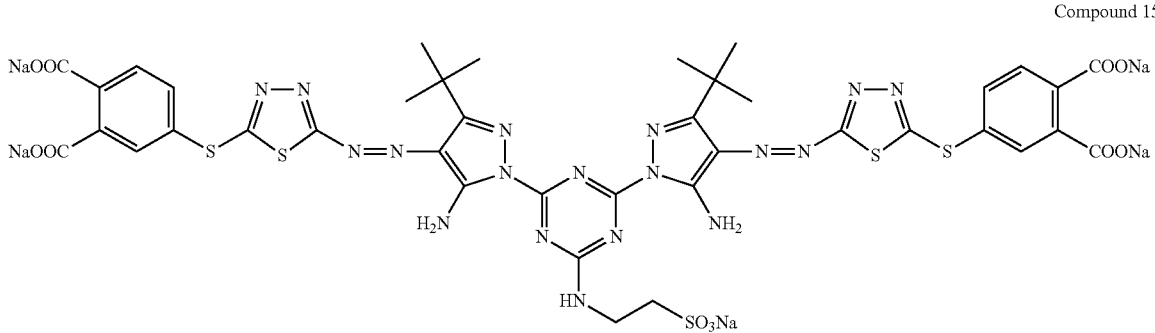

-continued
Compound 16
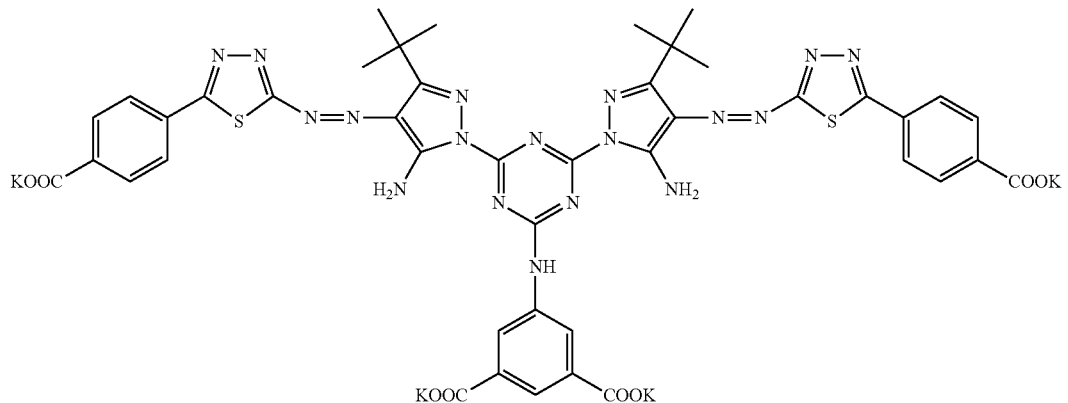
Compound 17
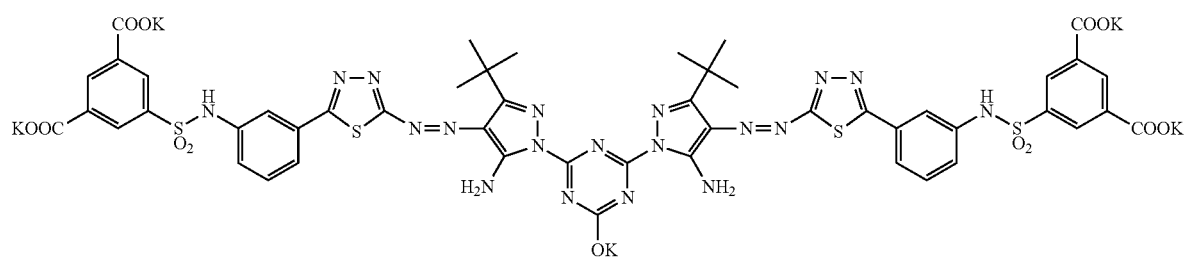
Compound 18
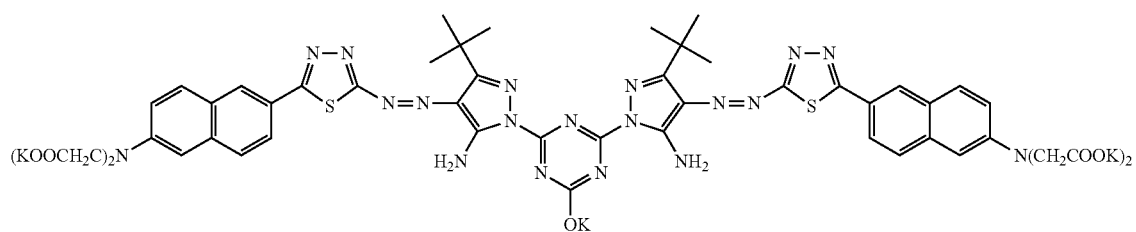
Compound 19
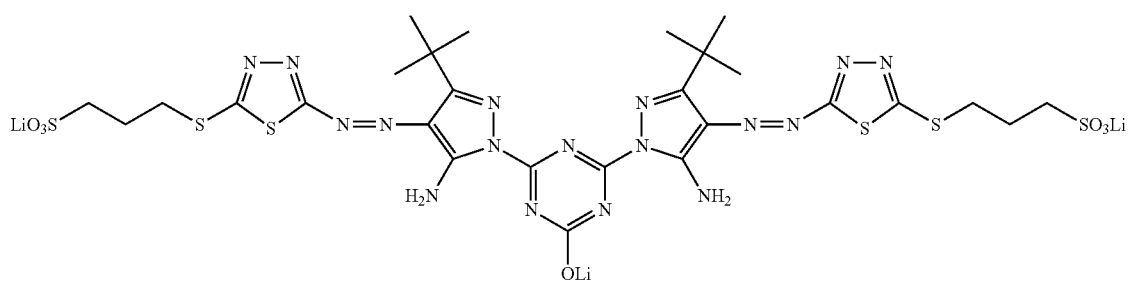
Compound 20
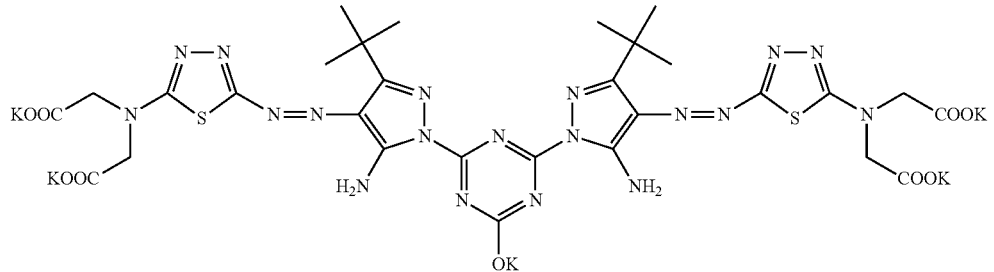

-continued
Compound 21
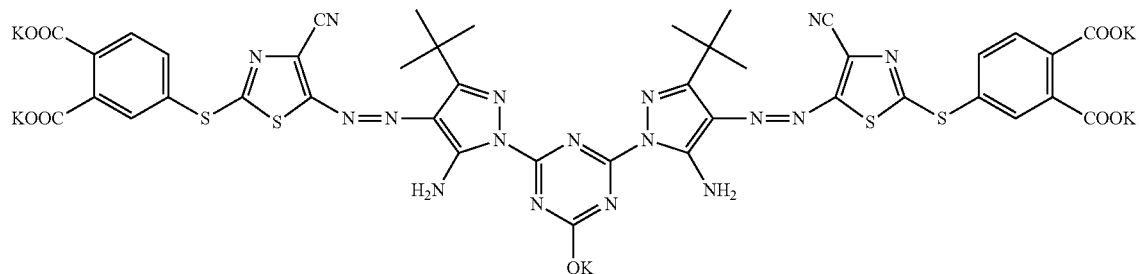
Compound 22
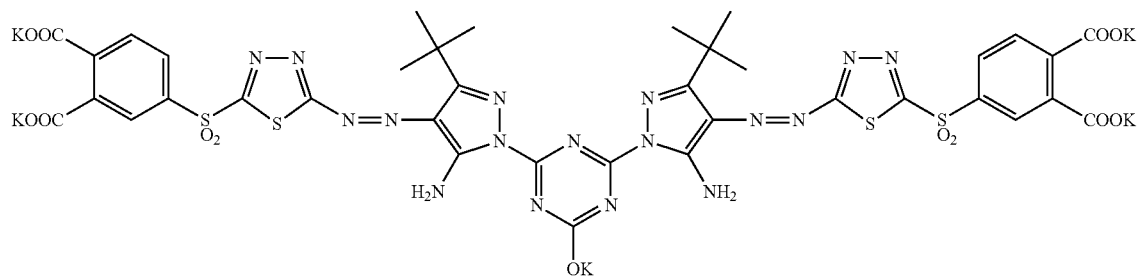
Compound 23
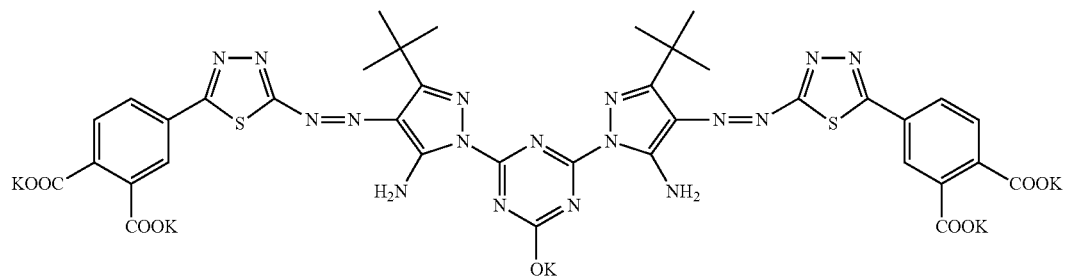
Compound 24
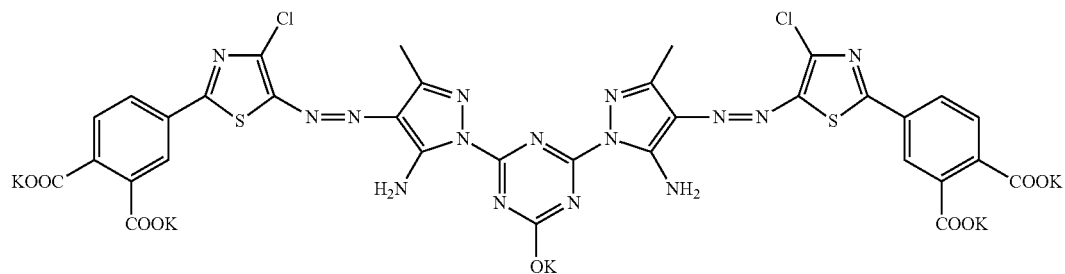
Compound 25
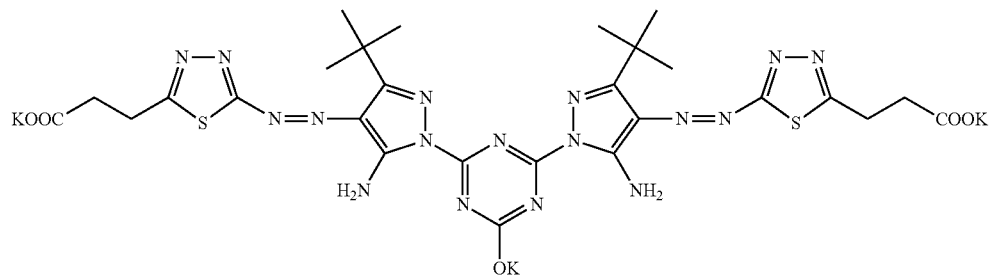

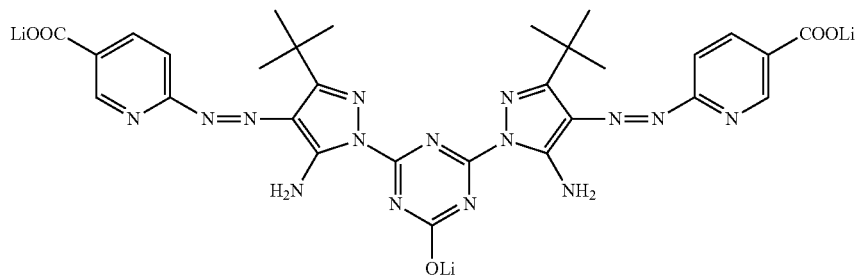
Compound 26
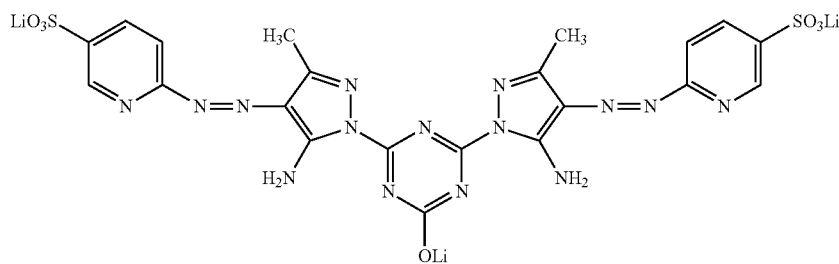
Compound 27
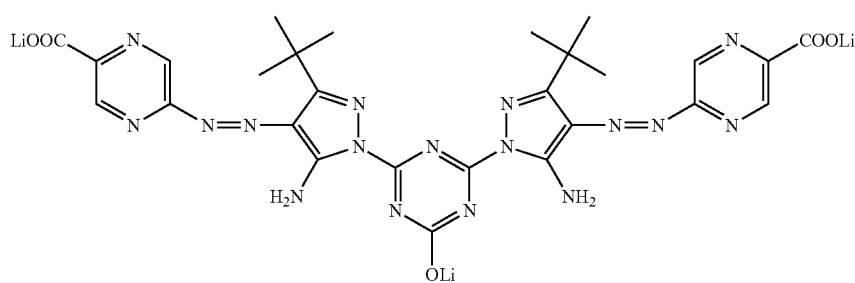
Compound 28
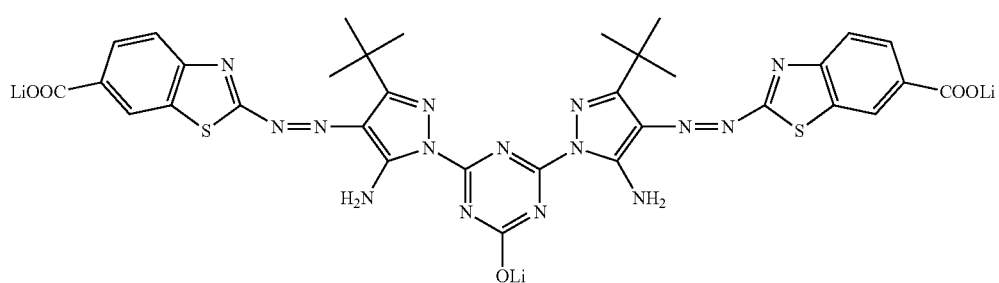
Compound 29
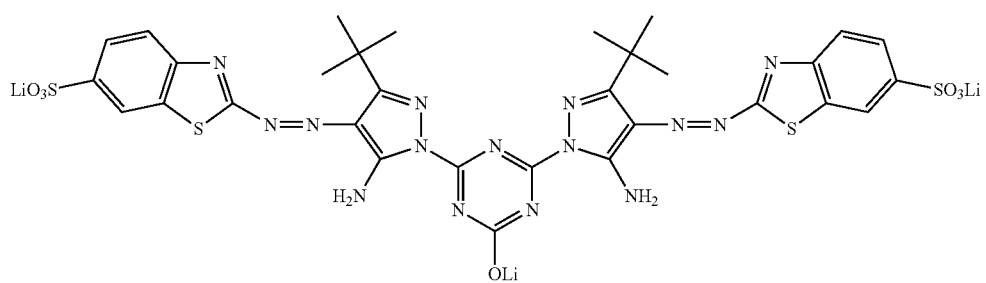
Compound 30

Compound 31

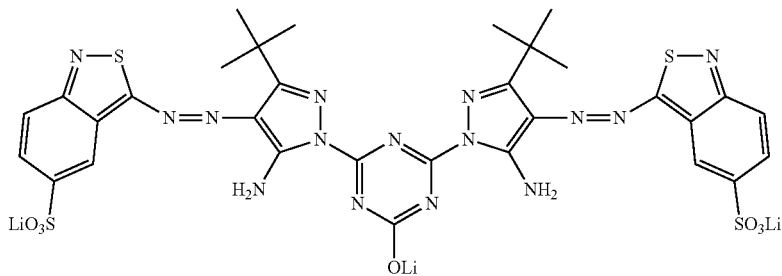

Compound 32

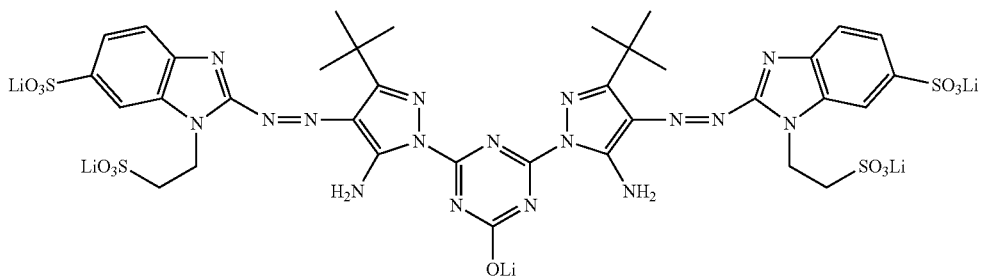

Compound 33

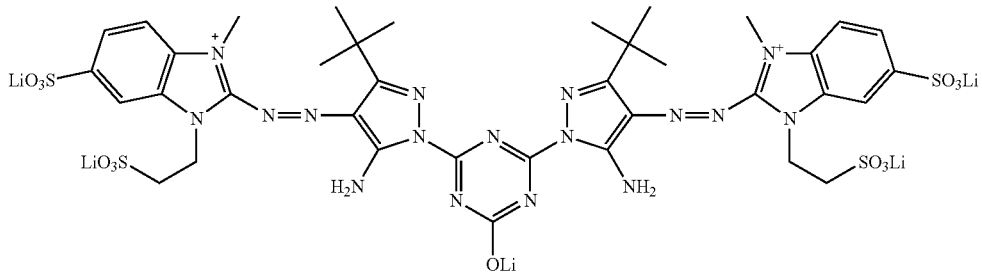

The compound is synthesized by the synthesis methods described in Japanese National Publication of International Patent Application No. 2006-57076 and Japanese Patent Application Laid-Open No. 2007-217681.

When the compound of Formula (1-3) is used, it is preferred that the compound is also used in combination with at least one selected from C.I. Direct Yellow 59, C.I. Direct Yellow 86, C.I. Direct Yellow 132, C.I. Direct Yellow 173, C.I. Acid Yellow 23, and the compounds represented by the following Formulas (1-3-1) to (1-3-5). Hereinafter, these compounds are referred to as Component (C). Meanwhile, $M_A$ in Formulas (1-3-1) to (1-3-5) represents a hydrogen atom or a metal ion. $R_A$ of Formula (1-3-1) represents a hydrogen atom or a methyl group. $M_A^-$ of Formula (1-3-5) represents a halogen ion, an inorganic anion or an organic anion.

Formula (1-11-3-1)

Formula (1-3-2)

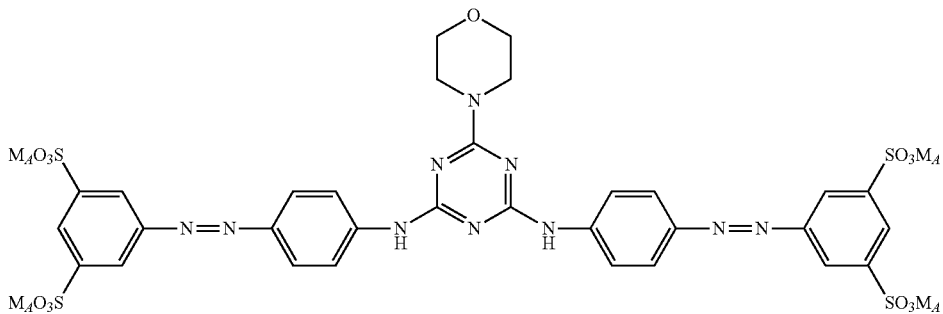

Formula (1-3-3)

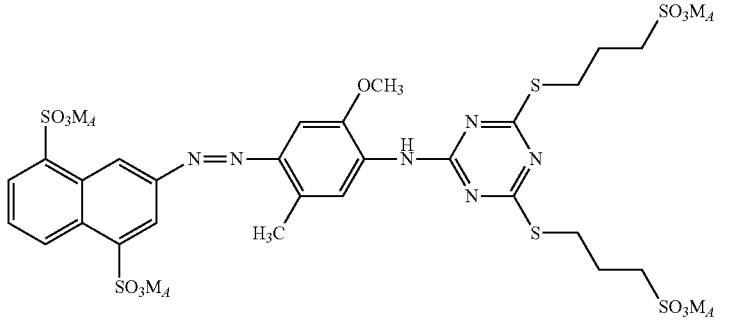

Formula (1-3-4)

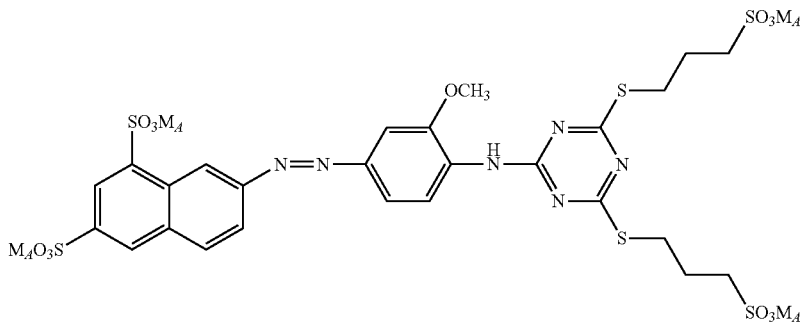

Formula (1-3-5)

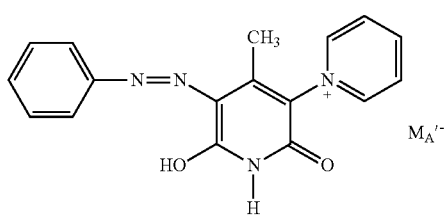

When Component (C) is added, it is presumed that Component (C) forms an associated body with the compound of (1-3), and it can be seen that a color reproduction region of the compound of Formula (1-3) has not been impaired. It is presumed as a factor that because a flatness of Component (C) is higher than that of the other coloring materials. However, the present invention is not limited by such a presumption.

Here, $M_A$ in Formulas (1-3-1) to (1-3-4) will be described. $M_A$ represents a hydrogen atom or a metal ion, and is preferably a metal ion. Among the metal ions represented by $M_A$, an alkali metal ion is preferred. The alkali metal ion represented by $M_A$ includes a lithium ion, a sodium ion, and a potassium ion, and a lithium ion or a potassium ion is preferred.

$M_{A'}^{-}$ in Formula (1-3-5) will be described. $M_{A'}^{-}$ represents a halogen ion, an inorganic anion or an organic anion. Examples of the halogen ion include a fluorine ion, a chlorine ion, and a bromine ion, and nitrate anion, examples of the inorganic anion suitably include nitrate anion, sulfate anion, tetrafluoroborate anion, hexafluorophosphate anion and the like, and examples of the organic anion suitably include methanesulfonate anion, trifluoromethanesulfonate anion, nonafluorobutanesulfonate anion, p-toluenesulfonic acid anion and the like. As $M_{A'}^{-}$, a halogen ion is preferred, and a chlorine ion is more preferred.

The addition amount of Component (C) will be described. The addition amount of Component (C) is preferably 0.01 time to 10 times by mass larger than that of the compound represented by Formula (1-3), more preferably 0.05 time to 5 times by mass, and still more preferably 0.5 time to 4 times, by mass larger than that of the compound represented by Formula (1-3).

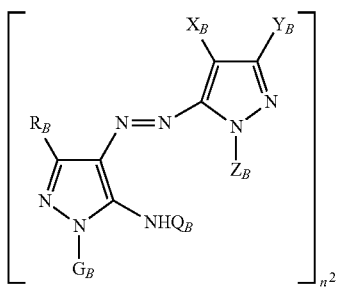

Formula (2)

(In Formula (2), $G_B$ represents a heterocyclic group and $n^2$ represents an integer of 1 to 3. When $n^2$ is 1, $R_B$, $X_B$, $Y_B$, $Z_B$, $Q_B$ and $G_B$ represent a monovalent group. When $n^2$ is 2, $R_B$, $X_B$, $Y_B$, $Z_B$, $Q_B$ and $G_B$ represent a monovalent or divalent substituent, and at least one thereof represents a divalent substituent. When $n^2$ is 3, $R_B$, $X_B$, $Y_B$, $Z_B$, $Q_B$ and $G_B$ represent a monovalent, divalent or trivalent substituent, and at least two thereof represent a divalent substituent, or at least one thereof represents a trivalent substituent.)

Hereinafter, Formula (2) will be described in more detail.

In Formula (2), examples of the preferred substituent of GB are preferably a 5- to 8-membered heterocyclic group, and among them, 5- or 6-membered substituted or unsubstituted aromatic or non-aromatic heterocyclic group is preferred, and these may be further condensed. More preferably, the heterocyclic group is a 5- or 6-membered aromatic heterocyclic group having 3 to 30 carbon atoms.

Examples of the heterocyclic group represented by $G_B$ include pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, sulfolane and the like when the substitution position thereof is exemplified without being limited.

When the heterocyclic group is a group capable of further having a substituent, the group may further have a substituent which is the same as those exemplified below.

A straight or branched alkyl group having 1 to 12 carbon atoms, a straight or branched aralkyl group having 7 to 18 carbon atoms, a straight or branched alkenyl group having 2 to 12 carbon atoms, a straight or branched alkynyl group having 2 to 12 carbon atoms, a straight or branched cycloalkyl group having 3 to 12 carbon atoms, and a straight or branched cycloalkenyl group having 3 to 12 carbon atoms (it is preferred that each group has a branched chain because solubility of the dye and stability of the ink are improved, and it is particularly preferred that each group has an asymmetric carbon. Examples thereof include methyl, ethyl, propyl, isopropyl, sec-butyl, t-butyl, 2-ethylhexyl, 2-methyl sulfonyl ethyl, 3-phenoxypropyl, trifluoromethyl, cyclopentyl), a halogen atom (for example, a chlorine atom and a bromine atom), an aryl group (for example, phenyl, 4-t-butylphenyl, and 2,4-di-t-amyl phenyl), a heterocyclic group (for example, imidazolyl, pyrazolyl, triazolyl, 2-furyl, 2-thienyl, 2-pyrimidinyl, and 2-benzothiazolyl), a cyano group, a hydroxyl group, a nitro group, a carboxyl group, an amino group, an alkyloxy group (for example, methoxy, ethoxy, 2-methoxyethoxy, and 2-methyl sulfonyl ethoxy), an aryloxy group (for example, phenoxy, 2-methylphenoxy, 4-t-butyl phenoxy, 3-nitrophenoxy, 3-t-butyloxycarbonyl phenoxy, 3-methoxycarbonyl phenyloxy, an acylamino group (for example, acetamide, benzamide, 4-(3-t-butyl-4-hydroxyphenoxy)butanamide), an alkylamino group (for example, methylamino, butylamino, diethylamino, and methylbutylamino), an arylamino group (for example, phenylamino, and 2-chloroanilino), an ureido group (for example, phenylureido, methylureido, and N,N-dibutylureido), a sulfamoyl amino group (for example. N,N-dipropylsulfamoylamino), an alkylthio group (for example, methylthio, octylthio, and 2-phenoxyethylthio), an arylthio group (for example, phenylthio, 2-butoxy-5-t-octylphenylthio, and 2-carboxyphenylthio) an alkyloxycarbonylamino group (for example, methoxycarbonylmethylsulfonylamino), an alkylsulfonylamino group and an arylsulfonylamino group (for example, methylsulfonylamino, phenylsulfonylamino, and p-toluenesulfonylamino), a carbamoyl group (for example, N-ethylcarbamoyl and N,N-dibutylcarbamoyl), a sulfamoyl group (for example, N-ethylsulfamoyl, N,N-dipropyl sulfamoyl, and N-phenylsulfamoyl), a sulfonyl group (for example, methylsulfonyl, octylsulfonyl, phenylsulfonyl, and p-toluene sulfonyl), an alkyloxycarbonyl group (for example, methoxycarbonyl and butyloxycarbonyl), a heterocyclic oxy group (for example, 1-phenyltetrazol-5-oxy, and 2-tetrahydropyranyloxy), an azo group (for example, phenylazo, 4-methoxyphenylazo, and 4-pivaloylaminophenylazo, and 2-hydroxy-4-propanoylphenylazo), an acyloxy group (for example, acetoxy), a carbamoyloxy group (for example, N-methylcarbamoyloxy, and N-phenylcarbamoyloxy), a silyloxy group (for example, trimethylsilyloxy, and dibutylmethylsilyloxy), an aryloxycarbonylamino group (for example, phenoxycarbonylamino), an imide group (for example, N-succinimide, and N-phthalimide), a heterocyclic thio group (for example, 2-benzothiazolylthio, 2,4-di-phenoxy-1,3,5-triazol-6-thio, and 2-pyridylthio), a sulfinyl group (for example, 3-phenoxypropylsulfinyl), a phosphonyl group (for example, phenoxyphosphonyl, octyloxyphosphonyl, and phenylphosphonyl), an aryloxycarbonyl group (for example, phenoxycarbonyl), an acyl group (for example, acetyl, 3-phenylpropanoyl, and benzoyl), and an ionic hydrophilic group (for example, a carboxyl group, a sulfo group, a phosphono group and a quaternary ammonium group).

In Formula (2), preferred examples of the substituent of $Q_B$, $R_B$, $X_B$, $Y_B$ and $Z_B$ will be described in detail.

When $Q_B$, $R_B$, $X_B$, $Y_B$ and $Z_B$ represent a monovalent group, the monovalent group represents a hydrogen atom or a monovalent substituent. The monovalent substituent will be described in more detail. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (an alkylamino group and an arylamino group), an acylamino group (an amide group), an aminocarbonylamino group (an ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, a phosphinyloxy group, a phosphinylamino group, a silyl group, an azo group or an imide group, and each group may further have a substituent.

Among them, a hydrogen atom, a halogen atom, an alkyl group, an aryl group, a heterocyclic group, a cyano group, an alkoxy group, an amide group, an ureido group, an alkylsulfonyl amino group, an arylsulfonyl amino group, a sulfamoyl group, an alkylsulfonyl group, an arylsulfonyl group, a carbamoyl group or an alkoxycarbonyl group is particularly preferred, particularly a hydrogen atom, a halogen atom, an alkyl group, an aryl group, a cyano group, an alkylsulfonyl group, an arylsulfonyl group or a heterocyclic group is preferred, and a hydrogen atom, an alkyl group, an aryl group, a cyano group or an alkylsulfonyl group is most preferred.

Hereinafter, $Q_B$, $R_B$, $X_B$, $Y_B$ and $Z_B$ will be described in more detail.

The halogen atom represented by $Q_B$, $R_B$, $X_B$, $Y_B$ and $Z_B$ represents a chlorine atom, a bromine atom or an iodine atom. Among them, a chlorine atom or a bromine atom is preferred, and a chlorine atom is particularly preferred.

The alkyl group represented by $Q_B$, $R_B$, $X_B$, $Y_B$ and $Z_B$ includes a substituted or unsubstituted alkyl group. It is preferred that the substituted or unsubstituted alkyl group is an alkyl group having 1 to 30 carbon atoms. Examples of the substituent include a substituent which is the same as those exemplified when $G_B$ is a group capable of further having a substituent. Among them, a hydroxyl group, an alkoxy group, a cyano group, a halogen atom, a sulfo group (may be in the form of a salt) or a carboxyl group (may be in the form of a salt) are preferred. Examples of the alkyl group include methyl, ethyl, butyl, t-butyl, n-octyl, eicosyl, 2-chloroethyl, hydroxyethyl, cyanoethyl or 4-sulfobutyl.

The cycloalkyl group represented by $Q_B$, $R_B$, $X_B$, $Y_B$ and $Z_B$ includes a substituted or unsubstituted cycloalkyl group. It is preferred that the substituted or unsubstituted cycloalkyl group is a cycloalkyl group having 5 to 30 carbon atoms. Examples of the substituent include a substituent which is the same as those exemplified when $G_B$ is a group capable of further having a substituent. Examples of the cycloalkyl group include cyclohexyl, cyclopentyl or 4-n-dodecyl cyclohexyl.

The aralkyl group represented by $Q_B$, $R_B$, $X_B$, $Y_B$ and $Z_B$ includes a substituted or unsubstituted aralkyl group. It is preferred that the substituted or unsubstituted aralkyl group is an aralkyl group having 7 to 30 carbon atoms. Examples of the substituent include a substituent which is the same as those exemplified when $G_B$ is a group capable of further having a substituent. Examples of the aralkyl group include benzyl and 2-phenethyl.

The alkenyl group represented by $Q_B$, $R_B$, $X_B$, $Y_B$ and $Z_B$ includes a straight, branched or cyclic substituted or unsubstituted alkenyl group. These include preferably a substituted or unsubstituted alkenyl group having 2 to 30 carbon atoms, for example, vinyl, allyl, prenyl, geranyl, oleyl, 2-cyclopenten-1-yl, 2-cyclohexen-1-yl and the like.

The alkynyl group represented by $Q_B$, $R_B$, $X_B$, $Y_B$ and $Z_B$ is a substituted or unsubstituted alkynyl group having 2 to 30 carbon atoms, and examples thereof include ethynyl or propargyl.

The aryl group represented by $Q_B$, $R_B$, $X_B$, $Y_B$ and $Z_B$ is a substituted or unsubstituted aryl group having 6 to 30 carbon atoms, and examples thereof include phenyl, p-tolyl, naphthyl, m-chlorophenyl or o-hexadecanoylaminophenyl. Examples of the substituent include a substituent which is the same as those exemplified when $G_B$ is a group capable of further having a substituent.

The heterocyclic group represented by $Q_B$, $R_B$, $X_B$, $Y_B$ and $Z_B$ is a monovalent group formed by removing in which one hydrogen atom is removed from a 5- or 6-membered, substituted or unsubstituted, aromatic or non-aromatic heterocyclic compound, and these may be further condensed. More preferably, the heterocyclic group is a 5- or 6-membered aromatic heterocyclic group having 3 to 30 carbon atoms. Examples of the substituent include a substituent which is the same as those exemplified when $G_B$ is a group capable of further having a substituent. Examples of the heterocyclic group include pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline and the like, when the substitution position thereof is exemplified without being limited.

The alkoxy group represented by $Q_B$, $R_B$, $X_B$, $Y_B$ and $Z_B$ includes a substituted or unsubstituted alkoxy group. It is preferred that the substituted or unsubstituted alkoxy group is an alkoxy group having 1 to 30 carbon atoms. Examples of the substituent include a substituent which is the same as those exemplified when $G_B$ is a group capable of further having a substituent. Examples of the alkoxy group include methoxy, ethoxy, isopropoxy, n-octyloxy, methoxyethoxy, hydroxyethoxy, 3-carboxypropoxy and the like.

It is preferred that the aryloxy group represented by $Q_B$, $R_B$, $X_B$, $Y_B$ and $Z_B$ is a substituted or unsubstituted aryloxy group having 6 to 30 carbon atoms. Examples of the substituent include a substituent which is the same as those exemplified when $G_B$ is a group capable of further having a substituent. Examples of the aryloxy group include phenoxy, 2-methylphenoxy, 4-t-butylphenoxy, 3-nitrophenoxy, 2-tetradecanoylaminophenoxy and the like.

It is preferred that the silyloxy group represented by $Q_B$, $R_B$, $X_B$, $Y_B$ and $Z_B$ is a silyloxy group having 3 to 20 carbon atoms, and examples thereof include trimethylsilyloxy, t-butyldimethylsilyloxy and the like.

It is preferred that the heterocyclic oxy group represented by $Q_B$, $R_B$, $X_B$, $Y_B$ and $Z_B$ is a substituted or unsubstituted heterocyclic oxy group having 2 to 30 carbon atoms. Examples of the substituent include a substituent which is the same as those exemplified when $G_B$ is a group capable of further having a substituent. Examples of the heterocyclic oxy group include 1-phenyltetrazol-5-oxy, 2-tetrahydropyranyloxy and the like.

It is preferred that the acyloxy group represented by $Q_B$, $R_B$, $X_B$, $Y_B$ and $Z_B$ is a formyloxy group, a substituted or unsubstituted alkylcarbonyloxy group having 2 to 30 carbon atoms, or a substituted or unsubstituted aryloxyarylcarbonyloxy group having 6 to 30 carbon atoms, and examples of the substituent include a substituent which is the same as those exemplified when $G_B$ is a group capable of further having a substituent. Examples of the acyloxy group include formyloxy, acetyloxy, pivaloyloxy, stearoyloxy, benzoyloxy, p-methoxyphenylcarbonyloxy and the like.

It is preferred that the carbamoyloxy group represented by $Q_B$, $R_B$, $X_B$, $Y_B$ and $Z_B$ is a substituted or unsubstituted carbamoyloxy group having 1 to 30 carbon atoms, and examples of the substituent include a substituent which is the same as those exemplified when $G_B$ is a group capable of further having a substituent. Examples of the carbamoyloxy group include N,N-dimethylcarbamoyloxy, N,N-diethylcarbamoyloxy, morpholinocarbonyloxy, N,N-di-n-octylaminocarbonyloxy, N-n-octylcarbamoyloxy and the like.

It is preferred that the alkoxycarbonyloxy group represented by $Q_B$, $R_B$, $X_B$, $Y_B$ and $Z_B$ is a substituted or unsubstituted alkoxycarbonyloxy group having 2 to 30 carbon atoms, and examples of the substituent include a substituent which is the same as those exemplified when $G_B$ is a group capable of further having a substituent. Examples of the alkoxycarbonyloxy group include methoxycarbonyloxy, ethoxycarbonyloxy, t-butoxycarbonyloxy, n-octylcarbonyloxy and the like.

It is preferred that the aryloxycarbonyloxy group represented by $Q_B$, $R_B$, $X_B$, $Y_B$ and $Z_B$ is a substituted or unsubstituted aryloxycarbonyloxy group having 7 to 30 carbon atoms, and examples of the substituent include a substituent which is the same as those exemplified when $G_B$ is a group capable of further having a substituent. Examples of the aryloxycarbonyloxy group include phenoxycarbonyloxy, p-methoxyphenoxycarbonyloxy, p-n-hexadecyloxyphenoxycarbonyloxy and the like.

It is preferred that the amino group represented by $Q_B$, $R_B$, $X_B$, $Y_B$ and $Z_B$ is a substituted or unsubstituted alkylamino group having 1 to 30 carbon atoms, or a substituted or unsubstituted arylamino group having 6 to 30 carbon atoms, and examples of the substituent include a substituent which is the same as those exemplified when $G_B$ is a group capable of further having a substituent. Examples of the amino group include amino, methylamino, dimethylamino, anilino, N-methyl-anilino, diphenylamino, hydroxyethylamino, carboxyethylamino, sulfoethylamino, 3,5-dicarboxyanilino and the like.

It is preferred that the acylamino group represented by $Q_B$, $R_B$, $X_B$, $Y_B$ and $Z_B$ is a formylamino group, a substituted or unsubstituted alkylcarbonylamino group having 1 to 30 carbon atoms, or a substituted or unsubstituted aryloxyarylcarbonylamino group having 6 to 30 carbon atoms, and examples of the substituent include a substituent which is the same as those exemplified when $G_B$ is a group capable of further having a substituent. Examples of the acylamino group include formylamino, acetylamino, pivaloylamino, lauroylamino, benzoylamino, 3,4,5-tri-n-octyloxyphenylcarbonylamino and the like.

It is preferred that the aminocarbonylamino group represented by $Q_B$, $R_B$, $X_B$, $Y_B$ and $Z_B$ is a substituted or unsubstituted aminocarbonylamino group having 1 to 30 carbon atoms, and examples of the substituent include a substituent which is the same as those exemplified when $G_B$ is a group capable of further having a substituent. Examples of the aminocarbonylamino group include carbamoylamino, N,N-dimethylaminocarbonylamino, N,N-diethylaminocarbonylamino, morpholinocarbonylamino and the like.

It is preferred that the alkoxycarbonylamino group represented by $Q_B$, $R_B$, $X_B$, $Y_B$ and $Z_B$ is a substituted or unsubstituted alkoxycarbonylamino group having 2 to 30 carbon atoms, and examples of the substituent include a substituent which is the same as those exemplified when $G_B$ is a group capable of further having a substituent. Examples of the alkoxycarbonylamino group include methoxycarbonylamino, ethoxycarbonylamino, t-butoxycarbonylamino, n-octadecyloxycarbonylamino, N-methyl-methoxycarbonylamino and the like.

It is preferred that the aryloxycarbonylamino group represented by $Q_B$, $R_B$, $X_B$, $Y_B$ and $Z_B$ is a substituted or unsubstituted aryloxycarbonylamino group having 7 to 30 carbon atoms, and examples of the substituent include a substituent which is the same as those exemplified when $G_B$ is a group capable of further having a substituent. Examples of the aryloxycarbonylamino group include phenoxycarbonylamino, p-chlorophenoxycarbonylamino, m-n-octyloxyphenoxycarbonylamino and the like.

It is preferred that the sulfamoylamino group represented by $Q_B$, $R_B$, $X_B$, $Y_B$ and $Z_B$ is a substituted or unsubstituted sulfamoylamino group having 0 to 30 carbon atoms, and examples of the substituent include a substituent which is the same as those exemplified when $G_B$ is a group capable of further having a substituent. Examples of the sulfamoylamino group include sulfamoylamino, N,N-dimethylaminosulfonylamino, N-n-octylaminosulfonylamino and the like.

It is preferred that the alkyl- and arylsulfonylamino group represented by $Q_B$, $R_B$, $X_B$, $Y_B$ and $Z_B$ is a substituted or unsubstituted alkylsulfonylamino group having 1 to 30 carbon atoms, or a substituted or unsubstituted arylsulfonylamino group having 6 to 30 carbon atoms, and examples of the substituent include a substituent which is the same as those exemplified when $G_B$ is a group capable of further having a substituent. Examples of the alkylsulfonylamino group and the arylsulfonylamino group include methylsulfonylamino, butylsulfonylamino, phenylsulfonylamino, 2,3,5-trichlorophenylsulfonylamino, p-methylphenylsulfonylamino and the like.

It is preferred that the alkylthio group represented by $Q_B$, $R_B$, $X_B$, $Y_B$ and $Z_B$ is a substituted or unsubstituted alkylthio group having 1 to 30 carbon atoms, and examples of the substituent include a substituent which is the same as those exemplified when $G_B$ is a group capable of further having a substituent. Examples of the alkylthio group include methylthio, ethylthio, n-hexadecylthio and the like.

It is preferred that the arylthio group represented by $Q_B$, $R_B$, $X_B$, $Y_B$ and $Z_B$ is a substituted or unsubstituted arylthio group having 6 to 30 carbon atoms, and examples of the substituent include a substituent which is the same as those exemplified when $G_B$ is a group capable of further having a substituent. Examples of the arylthio group include phenylthio, p-chlorophenylthio, m-methoxyphenylthio and the like.

It is preferred that the heterocyclic thio group represented by $Q_B$, $R_B$, $X_B$, $Y_B$ and $Z_B$ is a substituted or unsubstituted heterocyclic thio group having 2 to 30 carbon atoms, and examples of the substituent include a substituent which is the same as those exemplified when $G_B$ is a group capable of further having a substituent. Examples of the heterocyclic thio group include 2-benzothiazolylthio, 1-phenyltetrazol-5-ylthio and the like.

It is preferred that the sulfamoylaminosulfamoyl group represented by $Q_B$, $R_B$, $X_B$, $Y_B$ and $Z_B$ is a substituted or unsubstituted sulfamoylamino group having 0 to 30 carbon atoms, and examples of the substituent include a substituent which is the same as those exemplified when $G_B$ is a group capable of further having a substituent. Examples of the sulfamoyl group include N-ethylsulfamoyl, N-(3-dodecyloxypropyl)sulfamoyl, N,N-dimethylsulfamoyl, N-acetylsulfamoyl, N-benzoylsulfamoyl, N—(N'-phenylcarbamoyl)sulfamoyl) and the like.

It is preferred that the alkyl- and arylsulfinyl group represented by $Q_B$, $R_B$, $X_B$, $Y_B$ and $Z_B$ is a substituted or unsubstituted alkylsulfinyl group having 1 to 30 carbon atoms, or a substituted or unsubstituted arylsulfinyl group having 6 to 30 carbon atoms, and examples of the substituent include a substituent which is the same as those exemplified when $G_B$ is a group capable of further having a substituent. Examples of the alkyl- and arylsulfinyl group include methylsulfinyl, ethylsulfinyl, phenylsulfinyl, p-methylphenylsulfinyl and the like.

It is preferred that the alkyl- and arylsulfonyl group represented by $Q_B$, $R_B$, $X_B$, $Y_B$ and $Z_B$ is a substituted or unsubstituted alkylsulfonyl group having 1 to 30 carbon atoms, or a substituted or unsubstituted arylsulfonyl group having 6 to 30 carbon atoms, and examples of the substituent include a substituent which is the same as those exemplified when $G_B$ is a group capable of further having a substituent. Examples of the alkyl- and arylsulfonyl group include methylsulfonyl, ethylsulfonyl, phenylsulfonyl, p-toluenesulfonyl and the like.

It is preferred that the acyl group represented by $Q_B$, $R_B$, $X_B$, $Y_B$ and $Z_B$ is a formyloxyformyl group, a substituted or unsubstituted alkylcarbonyl group having 2 to 30 carbon atoms, a substituted or unsubstituted arylcarbonyl group having 7 to 30 carbon atoms or a substituted or unsubstituted heterocyclic carbonyl group having 4 to 30 carbon atoms, and being which is bonded with a carbonyl group through a carbon atom, and examples of the substituent include a substituent which is the same as those exemplified when $G_B$ is a group capable of further having a substituent. Examples of the acyl group include acetyl, pivaloyl, 2-chloroacetyl, stearoyl, benzoyl, p-n-octyloxyphenylcarbonyl, 2-pyridylcarbonyl, 2-furylcarbonyl and the like.

It is preferred that the aryloxycarbonyl group represented by $Q_B$, $R_B$, $X_B$, $Y_B$ and $Z_B$ is a substituted or unsubstituted aryloxycarbonyl group having 7 to 30 carbon atoms, and examples of the substituent include a substituent which is the same as those exemplified when $G_B$ is a group capable of further having a substituent. Examples of the aryloxycarbonyl group include phenoxycarbonyl, o-chlorophenoxycarbonyl, m-nitrophenoxycarbonyl, p-t-butylphenoxycarbonyl and the like.

It is preferred that the alkoxycarbonyl group represented by $Q_B$, $R_B$, $X_B$, $Y_B$ and $Z_B$ is a substituted or unsubstituted alkoxycarbonyl group having 2 to 30 carbon atoms, and examples of the substituent include a substituent which is the same as those exemplified when $G_B$ is a group capable of further having a substituent. Examples of the alkoxycarbonyl group include methoxycarbonyl, ethoxycarbonyl, t-butoxycarbonyl, n-octadecylcarbonyl and the like.

It is preferred that the carbamoyl group represented by $Q_B$, $R_B$, $X_B$, $Y_B$ and $Z_B$ is a substituted or unsubstituted carbamoyl group having 1 to 30 carbon atoms, and examples of the substituent include a substituent which is the same as those exemplified when $G_B$ is a group capable of further having a substituent. Examples of the carbamoyl group include carbamoyl, N-methylcarbamoyl, N,N-dimethylcarbamoyl, N,N-di-n-octylcarbamoyl, N-(methylsulfonyl)carbamoyl and the like.

It is preferred that the phosphino group represented by $Q_B$, $R_B$, $X_B$, $Y_B$ and $Z_B$ is a substituted or unsubstituted phosphino group having 2 to 30 carbon atoms, and examples of the substituent include a substituent which is the same as those exemplified when $G_B$ is a group capable of further having a substituent. Examples of the phosphino group include dimethylphosphino, diphenylphosphino, methylphenoxyphosphino and the like.

It is preferred that the phosphinyl group represented by $Q_B$, $R_B$, $X_B$, $Y_B$ and $Z_B$ is a substituted or unsubstituted phosphinyl group having 2 to 30 carbon atoms, and examples of the substituent include a substituent which is the same as those exemplified when $G_B$ is a group capable of further having a substituent. Examples of the phosphinyl group include hosphinylphosphinyl, dioctyloxyphosphinyl, diethoxyphosphinyl and the like.

It is preferred that the phosphinyloxy group represented by $Q_B$, $R_B$, $X_B$, $Y_B$ and $Z_B$ is a substituted or unsubstituted phosphinyloxy group having 2 to 30 carbon atoms, and examples of the substituent include a substituent which is the same as those exemplified when $G_B$ is a group capable of further having a substituent Examples of the phosphinyloxy group include diphenoxyphosphinyloxy, dioctyloxyphosphinyloxy and the like.

It is preferred that the phosphinylamino group represented by $Q_B$, $R_B$, $X_B$, $Y_B$ and $Z_B$ is a substituted or unsubstituted phosphinylamino group having 2 to 30 carbon atoms, and examples of the substituent include a substituent which is the same as those exemplified when $G_B$ is a group capable of further having a substituent. Examples of the phosphinylamino group include dimethoxyphosphinylamino, dimethylaminophosphinylamino and the like.

It is preferred that the silyl group represented by $Q_B$, $R_B$, $X_B$, $Y_B$ and $Z_B$ is a substituted or unsubstituted silyl group having 3 to 30 carbon atoms, and examples of the substituent include a substituent which is the same as those exemplified when $G_B$ is a group capable of further having a substituent. Examples of the silyl group include trimethylsilyl, t-butyldimethylsilyl, phenyldimethylsilyl and the like.

Examples of the azo group represented by $Q_B$, $R_B$, $X_B$, $Y_B$ and $Z_B$ include phenylazo, 4-methoxyphenylazo, 4-pivaloylaminophenylazo, 2-hydroxy-4-propanoylphenylazo and the like.

Examples of the imide group represented by $Q_B$, $R_B$, $X_B$, $Y_B$ and $Z_B$ include N-succinimide, N-phthalimide and the like.

When $Q_B$, $R_B$, $X_B$, $Y_B$ and $Z_B$ represent a divalent group, it is preferred that the divalent group is an alkylene group (for example, methylene, ethylene, propylene, butylene, and pentylene), an alkenylene group (for example, ethenylene and propenylene), an alkynylene group (for example, ethynylene and propynylene), an arylene group (for example, phenylene and naphthylene), a divalent heterocyclic group (for example, a 6-chloro-1,3,5-triazin-2,4-diyl group, a pyrimidin-2,4-diyl group, a pyrimidin-4,6-diyl group, a quinoxalin-2,3-diyl group and a pyridazin-3,6-diyl group), —O—, —CO—, —NR$_{B'}$— (in which R$_{B'}$ is a hydrogen atom, an alkyl group, or an aryl group), —S—, —SO$_2$—, —SO—, or a combination thereof (for example, —NHCH$_2$CH$_2$NH—, —NHCONH— and the like).

The alkylene group, the alkenylene group, the alkynylene group, the arylene group, the divalent heterocyclic group, and the alkyl group or the aryl group of R$_{B'}$ may have a substituent.

Examples of the substituent have the same meaning as the substituent described in $G_B$.

The alkyl group and the aryl group of R$_{B'}$ have the same meaning as examples of the substituent of $G_B$.

More preferably, it is more preferred that the divalent group is an alkylene group having 10 or less carbon atoms, an alkenylene group having 10 or less carbon atoms, an alkynylene group having 10 or less carbon atoms, an arylene group having 6 to 10 carbon atoms, a divalent heterocyclic group, —S—, —SO—, —SO$_2$—, or a combination thereof (for example, —SCH$_2$CH$_2$S—, —SCH$_2$CH$_2$CH$_2$S— and the like).

The total number of carbon atoms of the divalent linking group is preferably 0 to 50, more preferably 0 to 30, and most preferably 0 to 10.

When $Q_B$, $R_B$, $X_B$, $Y_B$ and $Z_B$ represents a trivalent group, it is preferred that the trivalent group is a trivalent hydrocarbon group, a trivalent heterocyclic group, >N— or a combination thereof with the divalent group (for example, >NCH$_2$CH$_2$NH—, >NCONH— and the like).

The total number of carbon atoms of the trivalent linking group is preferably 0 to 50, more preferably 0 to 30, and most preferably 0 to 10.

In Formula (2), preferred examples of $n^2$ are 1 or 2, and 2 is particularly preferred.

In Formula (2), preferred examples of the substituent of $X_B$ are an electron-withdrawing group. In particular, it is preferred that the substituent is an electron-withdrawing group having a Hammett's substituent constant σp value of 0.20 or more, and more preferably, an electron-withdrawing group having a σp value of 0.30 or more. The upper limit thereof is an electron-withdrawing group having a σp value of 1.0 or more.

Specific examples of $X_B$ which is an electron-withdrawing having a σp value of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfnyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another electron-withdrawing group having a σp value of 0.20 or more, a heterocyclic group, a halogen atom, an azo group or a selenocyanate group.

Preferred examples of $X_B$ include an acyl group having 2 to 12 carbon atoms, an acyloxy group having 2 to 12 carbon atoms, a carbamoyl group having 1 to 12 carbon atoms, an alkyloxycarbonyl group having 2 to 12 carbon atoms, an aryloxycarbonyl group having 7 to 18 carbon atoms, a cyano group, a nitro group, an alkylsulfinyl group having 1 to 12 carbon atoms, an arylsulfinyl group having 6 to 18 carbon atoms, an alkylsulfonyl group having 1 to 12 carbon atoms, an arylsulfonyl group having 6 to 18 carbon atoms, a sulfamoyl group having 0 to 12 carbon atoms, a halogenated alkyl group having 1 to 12 carbon atoms, a halogenated alkyloxy group having 1 to 12 carbon atoms, a halogenated alkylthio group having 1 to 12 carbon atoms, a halogenated aryloxy group having 7 to 18 carbon atoms, an aryl group having 7 to 18 carbon atoms and substituted with two or more other electron-withdrawing groups having a σp value of 0.20 or more, and a heterocyclic group being a 5- to 8-membered ring having a nitrogen atom, an oxygen atom or a sulfur atom and having 1 to 18 carbon atoms.

A cyano group, an alkylsulfonyl group having 1 to 12 carbon atoms, an arylsulfonyl group having 6 to 18 carbon atoms or a sulfamoyl group having 0 to 12 carbon atoms is more preferred.

As $X_B$, a cyano group, an alkylsulfonyl group having 1 to 12 carbon atoms or a sulfamoyl group having 0 to 12 carbon atoms is particularly preferred, and a cyano group or an alkylsulfonyl group having 1 to 12 carbon atoms is most preferred.

In Formula (2), preferred examples of the substituent of $Z_B$ represent a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group or a substituted or unsubstituted heterocyclic group.

Specific examples of the substituent represented by $Z_B$ have the same meaning as the examples of the corresponding substituent descried in the aforementioned examples of the above-described the heterocyclic group represented by $G_B$, and preferred examples thereof are also the same.

The particularly preferred substituent represented by $Z_B$ is a substituted aryl group or a substituted heterocyclic group, and among them, a substituted aryl group is particularly preferred.

In Formula (2), it is preferred that preferred examples of the substituent of $Q_B$ are a hydrogen atom, a substituted or unsubstituted alkyl group, a substituted or unsubstituted acyl group, a substituted or unsubstituted alkylsulfonyl group, or a substituted or unsubstituted arylsulfonyl group and a hydrogen atom, a substituted or unsubstituted alkyl group or a substituted or unsubstituted acyl group is particularly preferred, and among them, a hydrogen atom is particularly preferred.

In Formula (2), it is preferred that $R_B$ is a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, and among them, a straight alkyl group or branched alkyl group having a total carbon number of 1 to 8 is preferred, or a secondary or tertiary alkyl group is particularly preferred, and a t-butyl group is most preferred.

In Formula (2), it is preferred that $Y_B$ is a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, and among them, a hydrogen atom, or a straight alkyl group or branched alkyl group having a total carbon number of 1 to 8 is preferred, a hydrogen atom or an alkyl group having a total carbon number of 1 to 8 is particularly preferred, and a hydrogen atom is most preferred.

A preferred combination of preferred substituents of the compound represented by Formula (2) is preferably a compound in which at least one of various substituents is the aforementioned preferred groups, more preferably a compound in which much more substituents are the aforementioned preferred groups, and most preferably a compound in which all the substituents are the aforementioned preferred groups.

A particularly preferred combination as the colorant represented by Formula (2) of the present invention includes the following (a) to (g).

(a) $G_B$ is preferably a 5- to 8-membered nitrogen-containing heterocyclic ring, particularly preferably a S-triazine ring, a pyrimidine ring, a pyridazine ring, a pyrazine ring, a pyridine ring, an imidazole ring, a pyrazole ring, or a pyrrole ring, and among them, a S-triazine ring, a pyrimidine ring, a pyridazine ring, or a pyrazine ring is preferred, and a S-triazine ring is most preferred.

(b) $R_B$ is preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, and among them, a straight alkyl group or branched alkyl group having a total carbon number of 1 to 8 is preferred, a secondary or tertiary alkyl group is particularly preferred, and a t-butyl group is most preferred.

(c) $X_B$ is particularly preferably a cyano group, an alkylsulfonyl group having 1 to 12 carbon atoms, an arylsulfonyl group having 6 to 18 carbon atoms, or a sulfamoyl group having 0 to 12 carbon atoms, and among them, a cyano group or an alkylsulfonyl group having 1 to 12 carbon atoms is preferred, and a cyano group is most preferred.

(d) $Y_B$ is preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, and among them, a hydrogen atom, a straight alkyl group or branched alkyl group having a total carbon number of 1 to 8 is preferred, a hydrogen atom or an alkyl group having a total carbon number of 1 to 8 is particularly preferred, and a hydrogen atom is most preferred.

(e) $Z_B$ is preferably a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and a substituted aryl group or a substituted heterocyclic group is a particularly preferred substituent, and among them, a substituted aryl group is particularly preferred.

(f) $Q_B$ is preferably a hydrogen atom, a substituted or unsubstituted alkyl group, a substituted or unsubstituted acyl group, a substituted or unsubstituted alkylsulfonyl group, or a substituted or unsubstituted arylsulfonyl group and a hydrogen atom, a substituted or unsubstituted alkyl group or a substituted or unsubstituted acyl group is particularly preferred, and among them, a hydrogen atom is particularly preferred.

(g) $n^2$ represents an integer of 1 to 3, is preferably 1 or 2, and in particularly, 2 is most preferred.

Among the compounds (azo colorants) represented by Formula (2), colorants represented by the following Formulas (2-1) to (2-5) are preferred.

Hereinafter, Formula (2) will be described in detail.

Formula (2-1)

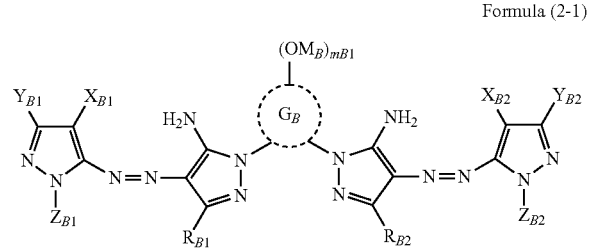

In Formula (2-1), $R_{B1}$, $R_{B2}$, $X_{B1}$, $X_{B2}$, $Y_{B1}$, $Y_{B2}$, $Z_{B1}$ and $Z_{B2}$ represent a monovalent group.

The monovalent group represents a hydrogen atom or a monovalent substituent. Examples of the monovalent substituent have the same meaning as the examples of the monovalent substituent of $R_B$, $X_B$, $Y_B$ and $Z_B$ in Formula (2), and preferred examples thereof are also the same. $m_{B1}$ represents an integer of 0 to 3.

Hereinafter, $R_{B1}$, $R_{B2}$, $X_{B1}$, $X_{B2}$, $Y_{B1}$, $Y_{B2}$, $Z_{B1}$ and $Z_{B2}$ will be described in more detail.

Examples of the substituent of $R_{B1}$ and $R_{B2}$ each independently have the same meaning as the examples of $R_B$ in Formula (2), and preferred examples thereof are also the same.

Examples of the substituent of $Y_{B1}$ and $Y_{B2}$ each independently have the same meaning as the examples of $Y_B$ in Formula (2), and preferred examples thereof are also the same.

Examples of the substituent of $Z_{B1}$ and $Z_{B2}$ each independently have the same meaning as the examples of $Z_B$ in Formula (2), and preferred examples thereof are also the same.

$G_B$ represents an atomic group constituting a 5- to 8-membered nitrogen-containing heterocyclic ring.

Hereinafter, GB and mB1 will be described in more detail.

Preferred examples of the 5- to 8-membered nitrogen-containing heterocyclic ring represented by $G_B$ are a S-triazine ring, a pyrimidine ring, a pyridazine ring, a pyrazine ring, a pyridine ring, an imidazole ring, a pyrazole ring, or a pyrrole ring, and among them, a S-triazine ring, a pyrimidine ring, a pyridazine ring, or a pyrazine ring is more preferred, and a S-triazine ring is most preferred.

$m_{B1}$ represents an integer of 0 to 3, and when a —$OM_B$ group may be substituted as a structure of preferred examples of the 5- to 8-membered nitrogen-containing heterocyclic ring represented by $G_B$, 0 to 2 are preferred, and among them, 0 or 1 is preferred, and in particularly, $m_{B1}=1$ is most preferred.

$M_B$ represents a hydrogen atom or a cation.

Hereinafter, $M_B$ will be described in more detail.

The cation represented by $M_B$ is an alkali metal ion, ammonium or a quaternary ammonium cation, and preferably Li, Na, K, $NH_4$ or $NR_{B4}$. However, $R_B$ are an alkyl group and an aryl group, and the same as the above-described examples of the alkyl group and the aryl group represented by $R_B$ and $Y_B$. Among them, preferred examples of the cation of $M_B$ include Li, Na, K, or $NH_4$, and Li, Na, or K is particularly preferred.

A preferred combination of preferred substituents of the compound (colorant) represented by Formula (2-1) of the present invention is preferably a compound in which at least one of various substituents is the aforementioned preferred groups, more preferably a compound in which much more substituents are the aforementioned preferred groups, and most preferably a compound in which all the substituents are the aforementioned preferred groups.

A particularly preferred combination as the colorant represented by Formula (2-1) of the present invention includes the following (a) to (g).

(a) $R_{B1}$ and $R_{B2}$ may be the same as or different from each other and are preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, and among them, a straight alkyl group or branched alkyl group having a total carbon number of 1 to 8 is preferred, a secondary or tertiary alkyl group is particularly preferred, and a t-butyl group is most preferred.

(b) $X_{B1}$ and $X_{B2}$ may be the same as or different from each other and are preferably an electron-withdrawing group having a Hammett's substituent constant σp value of 0.20 or more, an electron-withdrawing group with 0.30 or more is preferred, and the upper limit thereof is an electron-withdrawing group with 1.0 or less. Among them, a cyano group, an alkylsulfonyl group having 1 to 12 carbon atoms, an arylsulfonyl group having 6 to 18 carbon atoms, or a sulfamoyl group having 0 to 12 carbon atoms is preferred, and a cyano group or an alkylsulfonyl group having 1 to 12 carbon atoms is most preferred.

(c) $Y_{B1}$ and $Y_{B2}$ may be the same as or different from each other and are preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, a hydrogen atom, or a substituted or unsubstituted alkyl group is preferred, and among them, a hydrogen atom is most preferred.

(d) $Z_{B1}$ and $Z_{B2}$ may be the same as or different from each other and are preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, a substituted or unsubstituted aryl group, or a substituted or unsubstituted heterocyclic group is preferred, and in particularly, a substituted aryl group is most preferred.

(e) $G_B$ represents an atomic group constituting a 5- to 8-membered nitrogen-containing heterocyclic ring, preferred examples of the 5- to 8-membered nitrogen-containing heterocyclic ring include a S-triazine ring, a pyrimidine ring, a pyridazine ring, a pyrazine ring, a pyridine ring, an imidazole ring, a pyrazole ring, or a pyrrole ring, and among them, a S-triazine ring, a pyrimidine ring, a pyridazine ring, or a pyrazine ring is more preferred, and a S-triazine ring is most preferred.

(f) $m_{B1}$ represents an integer of 0 to 3, when a —$OM_B$ group may be substituted as a structure of preferred examples of the 5- to 8-membered nitrogen-containing heterocyclic ring represented by $G_B$, 0 to 2 are preferred, and among them, 0 or 1 is preferred, and in particularly, $m_{B1}=1$ is most preferred.

(g) MB is preferably a hydrogen atom or a cation, particularly preferably a hydrogen atom, an alkali metal ion, ammonium, or a quaternary ammonium cation, and further preferably Li, Na, K or $NH_4$.

Hereinafter, Formula (2-2) will be described in detail.

substituted as a structure of preferred examples of the 5- to 8-membered nitrogen-containing heterocyclic ring represented by $G_{B1}$ and $G_{B2}$, 0 to 2 are preferred, and among them, 0 or 1 is preferred, and in particularly, $m_{B21}=1$ and $m_{B22}=1$ are most preferred.

In Formula (2-2), preferred examples of the substituent of $M_B$ have the same meaning as the examples of $M_B$ described in Formula (2-1), and preferred examples thereof are also the same.

In Formula (2-2), preferred examples of the substituent of $R_{B11}$ and $R_{B12}$ have the same meaning as the examples of the substituent of $R_{B1}$, $R_{B2}$, $Y_{B1}$, and $Y_{B2}$ described in Formula (2-1), and preferred examples thereof include a —$OM_B$ group (Ms is a hydrogen atom or a cation), a substituted or unsubstituted amino group; an alkylamino group having 1 to 12 carbon atoms, an arylamino group having 6 to 18 carbon

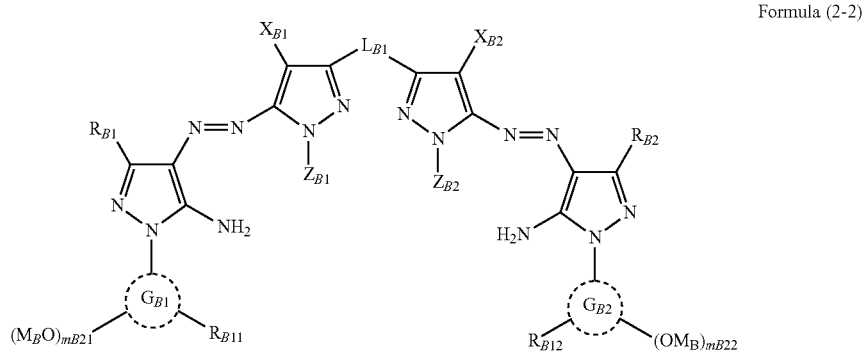

Formula (2-2)

$R_{B1}$, $R_{B2}$, $R_{B11}$, $R_{B12}$, $X_{B1}$, $X_{B2}$, $Z_{B1}$ and $Z_{B2}$ represent a monovalent group.

The monovalent group represents a hydrogen atom or a monovalent substituent.

$L_{B1}$ represents a divalent linking group.

$G_{B1}$ and $G_{B2}$ each independently represent an atomic group constituting a 5- to 8-membered nitrogen-containing heterocyclic ring.

$m_{B21}$ and $m_{B22}$ each independently represent an integer of 0 to 3, when a —$OM_B$ group may be substituted as a structure of preferred examples of the 5- to 8-membered nitrogen-containing heterocyclic ring represented by $G_{B21}$ and $G_{B22}$ to 2 are preferred, and among them, 0 or 1 is preferred, and in particularly, $m_{B21}=1$ and $m_{B22}=1$ are most preferred.

$M_B$ represents a hydrogen atom or a cation.

Hereinafter, Formula (2-2) will be described in more detail.

In Formula (2-2), preferred examples of the substituent of $R_{B1}$ and $R_{B2}$ have the same meaning as the examples of the substituent of $R_{B1}$, $R_{B2}$, $Y_{B1}$, and $Y_{B2}$ described in Formula (2-1), and preferred examples thereof are also the same.

In Formula (2-2), preferred examples of the substituent of $X_{B1}$ and $X_{B2}$ have the same meaning as the examples of the substituent of $X_{B1}$ and $X_{B2}$ described in Formula (2-1), and preferred examples thereof are also the same.

In Formula (2-2), preferred examples of the substituent of $Z_{B1}$ and $Z_{B2}$ have the same meaning as the examples of the substituent of $Z_{B1}$ and $Z_{B2}$ described in Formula (2-1), and preferred examples thereof are also the same.

In Formula (2-2), preferred examples of the substituent of $G_{B1}$ and $G_{B2}$ have the same meaning as the examples of $G_B$ described in Formula (2-1), and preferred examples thereof are also the same.

In Formula (2-2), $m_{B21}$ and $m_{B22}$ each independently represent an integer of 0 to 3, when a —$OM_B$ group may be atoms, a substituted or unsubstituted alkylthio group having 1 to 12 carbon atoms, a substituted or unsubstituted arylthio group having 6 to 18 carbon atoms and the like.

In Formula (2-2), it is preferred that the divalent linking group represented by $L_{B1}$ is an alkylene group (for example, methylene, ethylene, propylene, butylene, and pentylene), an alkenylene group (for example, ethenylene and propenylene), an alkynylene group (for example, ethynylene and propynylene), an arylene group (for example, phenylene and naphthylene), a divalent heterocyclic group (for example, a 6-chloro-1,3,5-triazin-2,4-diyl group, a pyrimidin-2,4-diyl group, a pyrimidin-4,6-diyl group, a quinoxalin-2,3-diyl group and a pyridazin-3,6-diyl group), —O—, —CO—, —$NR_B$— (in which $R_B$ is a hydrogen atom, an alkyl group, or an aryl group), —S—, —$SO_2$—, —SO—, or a combination thereof (for example, —$NHCH_2CH_2NH$—, —NHCONH— and the like).

The alkylene group, the alkenylene group, the alkynylene group, the arylene group, the divalent heterocyclic group, and the alkyl group or the aryl group of $R_B$ may have a substituent.

Examples of the substituent have the same meaning as the substituent of $R_{B1}$, $R_{B2}$, $Y_{B1}$, and $Y_{B2}$ in Formula (2-1).

The alkyl group and the aryl group of $R_B$ have the same meaning as the examples of the substituent of $R_{B1}$, $R_{B2}$, $Y_{B1}$, and $Y_{B2}$ in Formula (2-1).

More preferably, it is more preferred that the divalent group is an alkylene group having 10 or less carbon atoms, an alkenylene group having 10 or less carbon atoms, an alkynylene group having 10 or less carbon atoms, an arylene group having 6 to 10 carbon atoms, —S—, —SO—, —$SO_2$—, or a combination thereof (for example, —$SCH_2CH_2S$—, —$SCH_2CH_2CH_2S$— and the like).

The total carbon number of the divalent linking group is preferably 0 to 50, more preferably 0 to 30, and most preferably 0 to 10.

A preferred combination of preferred substituents of the colorant represented by Formula (2-2) of the present invention is preferably a compound in which at least one of various substituents is the aforementioned preferred groups, more preferably a compound in which much more substituents are the aforementioned preferred groups, and most preferably a compound in which all the substituents are the aforementioned preferred groups.

A particularly preferred combination as the colorant represented by Formula (2-2) of the present invention includes the following (a) to (h).

(a) $R_{B1}$ and $R_{B2}$ may be the same as or different from each other and are preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, and among them, a straight alkyl group or branched alkyl group having a total carbon number of 1 to 8 is preferred, a secondary or tertiary alkyl group is particularly preferred, and a t-butyl group is most preferred.

(b) $X_{B1}$ and $X_{B2}$ may be the same as or different from each other and are preferably an electron-withdrawing group having a Hammett's substituent constant σp value of 0.20 or more, an electron-withdrawing group with 0.30 or more is preferred, and the upper limit thereof is an electron-withdrawing group with 1.0 or less. Among them, a cyano group, an alkylsulfonyl group having 1 to 12 carbon atoms, an arylsulfonyl group having 6 to 18 carbon atoms, or a sulfamoyl group having 0 to 12 carbon atoms is preferred, and a cyano group or an alkylsulfonyl group having 1 to 12 carbon atoms is most preferred.

(c) $Z_{B1}$ and $Z_{B2}$ may be the same as or different from each other and are preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, a substituted or unsubstituted aryl group, or a substituted or unsubstituted heterocyclic group is preferred, and in particularly, a substituted aryl group is most preferred.

(d) $G_{B1}$ and $G_{B2}$ may be the same as or different from each other and represent an atomic group constituting a 5- to 8-membered nitrogen-containing heterocyclic ring, preferred examples of the 5- to 8-membered nitrogen-containing heterocyclic ring include a S-triazine ring, a pyrimidine ring, a pyridazine ring, a pyrazine ring, a pyridine ring, an imidazole ring, a pyrazole ring, or a pyrrole ring, and among them, a S-triazine ring, a pyrimidine ring, a pyridazine ring, or a pyrazine ring is more preferred, and a S-triazine ring is most preferred.

(e) $m_{B21}$ and $m_{B22}$ each independently represent an integer of 0 to 3, when a —$OM_B$ group may be substituted as a structure of preferred examples of the 5- to 8-membered nitrogen-containing heterocyclic ring represented by $G_{B1}$ and $G_{B2}$, 0 to 2 are preferred, and among them, 0 or 1 is preferred, and in particularly, $m_{B21}=1$ and $m_{B22}=1$ are most preferred.

(f) $M_B$ is preferably a hydrogen atom or a cation, particularly preferably a hydrogen atom, an alkali metal ion, ammonium, or a quaternary ammonium cation, and further preferably Li, Na, K or $NH_4$.

(g) $R_{B1}$ and $R_{B12}$ may be the same as or different from each other and are preferably a —$OM_B$ group (in which $M_B$ is a hydrogen atom or a cation), a substituted or unsubstituted amino group (an alkylamino group having 1 to 12 carbon atoms, an arylamino group having 6 to 18 carbon atoms, and the like), a substituted or unsubstituted alkylthio group having 1 to 12 carbon atoms, or a substituted or unsubstituted arylthio group having 6 to 18 carbon atoms, and among them, an unsubstituted amino group, an alkylamino group having 1 to 12 carbon atoms, an arylamino group having 6 to 18 carbon atoms, a substituted or unsubstituted alkylthio group having 1 to 12 carbon atoms, or a substituted or unsubstituted arylthio group having 6 to 18 carbon atoms is preferred, and an unsubstituted amino group, a dialkylamino group having 1 to 12 carbon atoms, an arylamino group having 6 to 18 carbon atoms, or a substituted or unsubstituted alkylthio group having 1 to 12 carbon atoms is particularly preferred.

(h) $L_{B1}$ is preferably an alkylene group having 10 or less carbon atoms, an alkenylene group having 10 or less carbon atoms, an alkynylene group having 10 or less carbon atoms, an arylene group having 6 to 10 carbon atoms, —S—, —SO—, —$SO_2$—, or a combination thereof (for example, —$SCH_2CH_2S$—, —$SCH_2CH_2CH_2S$— and the like), and an alkylene group having 10 or less carbon atoms, an arylene group having 6 to 10 carbon atoms, —S—, —SO—, —$SO_2$—, or a combination thereof (for example, —$SCH_2CH_2S$—, —$SCH_2CH_2CH_2S$— and the like) is preferred, and an alkylene group having 10 or less carbon atoms, —$SCH_2CH_2S$—, or —$SCH_2CH_2CH_2S$— is particularly preferred.

Hereinafter, Formula (2-3) will be described in detail.

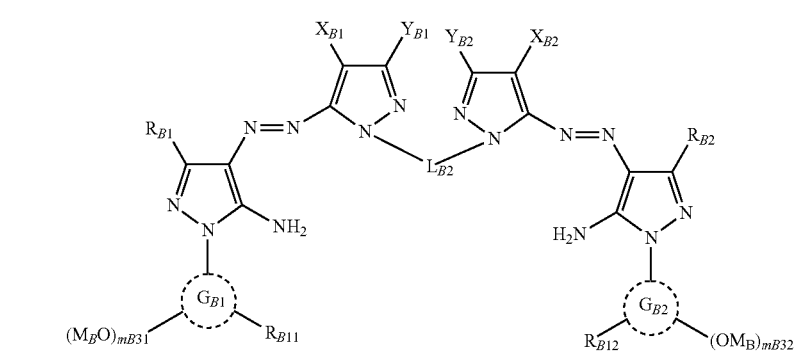

Formula (2-3)

$R_{B1}$, $R_{B2}$, $R_{B11}$, $R_{B12}$, $X_{B1}$, $X_{B2}$, $Y_{B1}$ and $Y_{B2}$ represent a monovalent group.

The monovalent group represents a hydrogen atom or a monovalent substituent.

$L_{B2}$ represents a divalent linking group.

$G_{B1}$ and $G_{B2}$ each independently represent an atomic group constituting a 5- to 8-membered nitrogen-containing heterocyclic ring.

$m_{B31}$ and $m_{B32}$ each independently represent an integer of 0 to 3.

$M_B$ represents a hydrogen atom or a cation.

Hereinafter, Formula (2-3) will be described in more detail.

In Formula (2-3), preferred examples of the substituent of $R_{B1}$, $R_{B2}$, $Y_{B1}$, and $Y_{B2}$ are the same as the examples of the substituent of $R_{B1}$, $R_{B2}$, $Y_{B1}$, and $Y_{B2}$ described in Formula (2-1), and preferred examples thereof are also the same.

In Formula (2-3), preferred examples of the substituent of $X_{B1}$ and $X_{B2}$ are the same as the examples of the substituent of $X_{B1}$ and $X_{B2}$ described in Formula (2-1), and preferred examples thereof are also the same.

In Formula (2-3), preferred examples of $G_{B1}$ and $G_{B2}$ are the same as the examples of $G_B$ described in Formula (2-1), and preferred examples thereof are also the same.

In Formula (2-3), preferred examples of $m_{B31}$ and $m_{B32}$ are the same as the examples of $m_{B21}$ and $m_{B22}$ described in Formula (2-2), and preferred examples thereof are also the same.

In Formula (2-3), preferred examples of $M_B$ are the same as the examples of $M_B$ described in Formula (2-1), and preferred examples thereof are also the same.

In Formula (2-3), preferred examples of the substituent of $R_{B11}$ and $R_{B12}$ are the same as the examples of the substituent of $R_{B11}$ and $R_{B12}$ described in Formula (2-2), and preferred examples thereof are also the same.

In Formula (2-3), the divalent linking group represented by $L_{B2}$ has the same meaning as the examples of $L_{B1}$ described in Formula (2-2), and preferred examples thereof are also the same.

A preferred combination of preferred substituents of the colorant represented by Formula (2-3) of the present invention is preferably a compound in which at least one of various substituents is the aforementioned preferred groups, more preferably a compound in which much more substituents are the aforementioned preferred groups, and most preferably a compound in which all the substituents are the aforementioned preferred groups.

A particularly preferred combination as the colorant represented by Formula (2-3) of the present invention includes the following (a) to (h).

(a) $R_{B1}$ and $R_{B2}$ may be the same as or different from each other and are preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, and among them, a straight alkyl group or branched alkyl group having a total carbon number of 1 to 8 is preferred, a secondary or tertiary alkyl group is particularly preferred, and a t-butyl group is most preferred.

(b) $X_{B1}$ and $X_{B2}$ may be the same as or different from each other and are preferably an electron-withdrawing group having a Hammett's substituent constant $\sigma p$ value of 0.20 or more, and an electron-withdrawing group with 0.30 or more is further preferred, and the upper limit thereof is an electron-withdrawing group with 1.0 or less. Among them, a cyano group, an alkylsulfonyl group having 1 to 12 carbon atoms, an arylsulfonyl group having 6 to 18 carbon atoms, or a sulfamoyl group having 0 to 12 carbon atoms is preferred, and a cyano group or an alkylsulfonyl group having 1 to 12 carbon atoms is most preferred.

(c) $Y_{B1}$ and $Y_{B2}$ may be the same as or different from each other and are preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, a hydrogen atom, or a substituted or unsubstituted alkyl group is preferred, and among them, a hydrogen atom is most preferred.

(d) $G_{B1}$ and $G_{B2}$ may be the same as or different from each other and represent an atomic group constituting a 5- to 8-membered nitrogen-containing heterocyclic ring, preferred examples of the 5- to 8-membered nitrogen-containing heterocyclic ring include a S-triazine ring, a pyrimidine ring, a pyridazine ring, a pyrazine ring, a pyridine ring, an imidazole ring, a pyrazole ring, or a pyrrole ring, and among them, a S-triazine ring, a pyrimidine ring, a pyridazine ring, or a pyrazine ring is more preferred, and a S-triazine ring is most preferred.

(e) $m_{B31}$ and $m_{B32}$ each independently represent an integer of 0 to 3, when a —$OM_B$ group may be substituted as a structure of preferred examples of the 5- to 8-membered nitrogen-containing heterocyclic ring represented by $G_{B1}$ and $G_{B2}$, 0 to 2 are preferred, and among them, 0 or 1 is preferred, and in particularly, $m_{B31}=1$ and $m_{B32}=1$ are most preferred.

(f) $M_B$ is preferably a hydrogen atom or a cation, particularly preferably a hydrogen atom, an alkali metal ion, ammonium, or a quaternary ammonium cation, and further preferably Li, Na, K or $NH_4$.

(g) $R_{B11}$ and $R_{B12}$ may be the same as or different from each other and are preferably a —$OM_B$ group (in which $M_B$ is a hydrogen atom or a cation), a substituted or unsubstituted amino group (an alkylamino group having 1 to 12 carbon atoms, an arylamino group having 6 to 18 carbon atoms, and the like), a substituted or unsubstituted alkylthio group having 1 to 12 carbon atoms, or a substituted or unsubstituted arylthio group having 6 to 18 carbon atoms, and among them, an unsubstituted amino group, an alkylamino group having 1 to 12 carbon atoms, an arylamino group having 6 to 18 carbon atoms, a substituted or unsubstituted alkylthio group having 1 to 12 carbon atoms, or a substituted or unsubstituted arylthio group having 6 to 18 carbon atoms is preferred, and an unsubstituted amino group, a dialkylamino group having 1 to 12 carbon atoms, an arylamino group having 6 to 18 carbon atoms, or a substituted or unsubstituted alkylthio group having 1 to 12 carbon atoms is particularly preferred.

(h) $L_{B2}$ is preferably an alkylene group having 10 or less carbon atoms, an alkenylene group having 10 or less carbon atoms, an alkynylene group having 10 or less carbon atoms, an arylene group having 6 to 10 carbon atoms, —S—, —SO—, —$SO_2$—, or a combination thereof (for example, —$SCH_2CH_2S$—, —$SCH_2CH_2CH_2S$— and the like), and an alkylene group having 10 or less carbon atoms, an arylene group having 6 to 10 carbon atoms, —S—, —SO—, —$SO_2$—, or a combination thereof (for example, —$SCH_2CH_2S$—, —$SCH_2CH_2CH_2S$— and the like) is preferred, and an alkylene group having 10 or less carbon atoms, —$SCH_2CH_2S$—, or —$SCH_2CH_2CH_2S$— is particularly preferred.

Hereinafter, Formula (2-4) will be described in detail.

Formula (2-4)

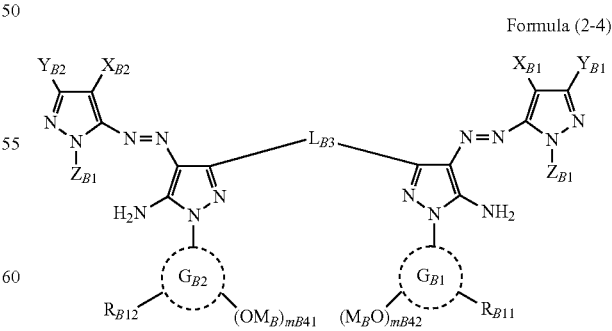

$R_{B11}$, $R_{B12}$, $X_{B1}$, $X_{B2}$, $Y_{B1}$, $Y_{B2}$, $Z_{B1}$ and $Z_{B2}$ represent a monovalent group.

The monovalent group represents a hydrogen atom or a monovalent substituent.

$L_B$ represents a divalent linking group.

$G_{B1}$ and $G_{B2}$ each independently represent an atomic group constituting a 5- to 8-membered nitrogen-containing heterocyclic ring.

$m_{B41}$ and $m_{B42}$ each independently represent an integer of 0 to 3.

$M_B$ represents a hydrogen atom or a cation.

Hereinafter, Formula (2-4) will be described in more detail.

In Formula (2-4), preferred examples of the substituent of $Y_{B1}$ and $Y_{B2}$ are the same as the examples of the substituent of $R_{B1}$, $R_{B2}$, $Y_{B1}$, and $Y_{B2}$ described in Formula (2-1), and preferred examples thereof are also the same.

In Formula (2-4), preferred examples of the substituent of $X_{B1}$ and $X_{B2}$ are the same as the examples of the substituent of $X_{B1}$ and $X_{B2}$ described in Formula (2-1), and preferred examples thereof are also the same.

In Formula (2-4), preferred examples of $G_{B1}$ and $G_{B2}$ are the same as the examples of $G_B$ described in Formula (2-1), and preferred examples thereof are also the same.

In Formula (2-4), preferred examples of $m_{B41}$ and $m_{B42}$ are the same as the examples of $m_{B21}$ and $m_{B22}$ described in Formula (2-2), and preferred examples thereof are also the same.

In Formula (2-4), preferred examples of $M_B$ are the same as the examples of $M_B$ described in Formula (2-1), and preferred examples thereof are also the same.

In Formula (2-4), preferred examples of the substituent of $R_{B11}$ and $R_{B12}$ are the same as the examples of the substituent of $R_{B11}$ and $R_{B12}$ described in Formula (2-2), and preferred examples thereof are also the same.

In Formula (2-4), examples of the divalent linking group represented by $L_{B3}$ are the same as the examples of $L_{B1}$ described in Formula (2-2), and preferred examples thereof are also the same.

A preferred combination of preferred substituents of the colorant represented by Formula (2-4) of the present invention is preferably a compound in which at least one of various substituents is the aforementioned preferred groups, more preferably a compound in which much more substituents are the aforementioned preferred groups, and most preferably a compound in which all the substituents are the aforementioned preferred groups.

A particularly preferred combination as the colorant represented by Formula (2-4) of the present invention includes the following (a) to (h).

(a) $Y_{B1}$ and $Y_{B2}$ may be the same as or different from each other and are preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, a hydrogen atom, or a substituted or unsubstituted alkyl group is preferred, and among them, a hydrogen atom is most preferred.

(b) $X_{B1}$ and $X_{B2}$ may be the same as or different from each other and are preferably an electron-withdrawing group having a Hammett's substituent constant σp value of 0.20 or more, and an electron-withdrawing group with 0.30 or more is further preferred, and the upper limit thereof is an electron-withdrawing group with 1.0 or less. Among them, a cyano group, an alkylsulfonyl group having 1 to 12 carbon atoms, an arylsulfonyl group having 6 to 18 carbon atoms, or a sulfamoyl group having 0 to 12 carbon atoms is preferred, and a cyano group or an alkylsulfonyl group having 1 to 12 carbon atoms is most preferred.

(c) $Z_{B1}$ and $Z_{B2}$ may be the same as or different from each other and are preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, a substituted or unsubstituted aryl group, or a substituted or unsubstituted heterocyclic group is preferred, and in particularly, a substituted aryl group is most preferred.

(d) $G_{B1}$ and $G_{B2}$ may be the same as or different from each other and represent an atomic group constituting a 5- to 8-membered nitrogen-containing heterocyclic ring, preferred examples of the 5- to 8-membered nitrogen-containing heterocyclic ring include a S-triazine ring, a pyrimidine ring, a pyridazine ring, a pyrazine ring, a pyridine ring, an imidazole ring, a pyrazole ring, or a pyrrole ring, and among them, a S-triazine ring, a pyrimidine ring, a pyridazine ring, or a pyrazine ring is more preferred, and a S-triazine ring is most preferred.

(e) $m_{B41}$ and $m_{B42}$ each independently represent an integer of 0 to 3, when a —$OM_B$ group may be substituted as a structure of preferred examples of the 5- to 8-membered nitrogen-containing heterocyclic ring represented by $G_{B1}$ and $G_{B2}$, 0 to 2 are preferred, and among them, 0 or 1 is preferred, and in particularly, $m_{B42}=1$ and $m_{B42}=1$ are most preferred.

(f) $M_B$ is preferably a hydrogen atom or a cation, particularly preferably a hydrogen atom, an alkali metal ion, ammonium, or a quaternary ammonium cation, and further preferably Li, Na, K or $NH_4$.

(g) $R_{B11}$ and $R_{B12}$ may be the same as or different from each other and are preferably a —$OM_B$ group (in which $M_B$ is a hydrogen atom or a cation), a substituted or unsubstituted amino group (an alkylamino group having 1 to 12 carbon atoms, an arylamino group having 6 to 18 carbon atoms, and the like), a substituted or unsubstituted alkylthio group having 1 to 12 carbon atoms, or a substituted or unsubstituted arylthio group having 6 to 18 carbon atoms, and among them, an unsubstituted amino group, an alkylamino group having 1 to 12 carbon atoms, an arylamino group having 6 to 18 carbon atoms, a substituted or unsubstituted alkylthio group having 1 to 12 carbon atoms, or a substituted or unsubstituted arylthio group having 6 to 18 carbon atoms is preferred, and an unsubstituted amino group, a dialkylamino group having 1 to 12 carbon atoms, an arylamino group having 6 to 18 carbon atoms, or a substituted or unsubstituted alkylthio group having 1 to 12 carbon atoms is particularly preferred.

(h) $L_{B3}$ is preferably an alkylene group having 10 or less carbon atoms, an alkenylene group having 10 or less carbon atoms, an alkynylene group having 10 or less carbon atoms, an arylene group having 6 to 10 carbon atoms, —S—, —SO—, —$SO_2$—, or a combination thereof (for example, —$SCH_2CH_2S$—, —$SCH_2CH_2CH_2S$— and the like), and an alkylene group having 10 or less carbon atoms, an arylene group having 6 to 10 carbon atoms, —S—, —SO—, —$SO_2$—, or a combination thereof (for example, —$SCH_2CH_2S$—, —$SCH_2CH_2CH_2S$— and the like) is preferred, and an alkylene group having 10 or less carbon atoms, —$SCH_2CH_2S$—, or —$SCH_2CH_2CH_2S$— is particularly preferred.

Hereinafter, Formula (2-5) will be described in detail.

Formula (2-5)

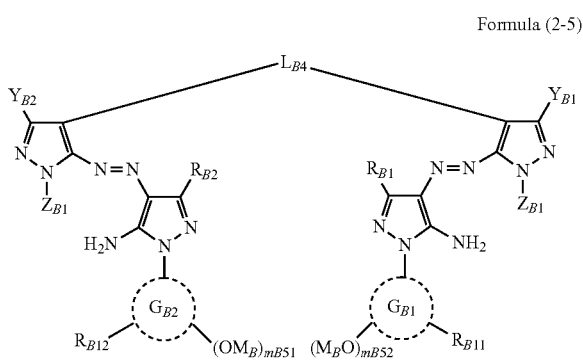

$R_{B1}$, $R_{B2}$, $R_{B11}$, $R_{B12}$, $Y_{B1}$, $Y_{B2}$, $Z_{B1}$ and $Z_{B2}$ represent a monovalent group.

The monovalent group represents a hydrogen atom or a monovalent substituent.

$L_{B4}$ represents a divalent linking group.

$G_{B1}$ and $G_{B2}$ each independently represent an atomic group constituting a 5- to 8-membered nitrogen-containing heterocyclic ring.

$m_{B51}$ and $m_{B52}$ each independently represent an integer of 0 to 3.

$M_B$ represents a hydrogen atom or a cation.

Hereinafter, Formula (2-5) will be described in more detail.

In Formula (2-5), preferred examples of the substituent of $R_{B1}$, $R_{B2}$, $Y_{B1}$ and $Y_{B2}$ are the same as the examples of the substituent of $R_{B1}$, $R_{B2}$, $Y_{B1}$ and $Y_{B2}$ described in Formula (2-1), and preferred examples thereof are also the same.

In Formula (2-5), preferred examples of the substituent of $Z_{B1}$ and $Z_{B2}$ are the same as the examples of the substituent of $Z_{B1}$ and $Z_{B2}$ described in Formula (2-1), and preferred examples thereof are also the same.

In Formula (2-5), preferred examples of $G_{B1}$ and $G_{B2}$ are the same as the examples of $G_B$ described in Formula (2-1), and preferred examples thereof are also the same.

In Formula (2-5), preferred examples of $m_{B51}$ and $m_{B52}$ are the same as the examples of $m_{B21}$ and $m_{B22}$ described in Formula (2-2), and preferred examples thereof are also the same.

In Formula (2-5), preferred examples of $M_B$ are the same as the examples of $M_B$ described in Formula (2-1), and preferred examples thereof are also the same.

In Formula (2-5), preferred examples of the substituent of $R_{B11}$ and $R_{B12}$ are the same as the examples of the substituent of $R_{B11}$ and $R_{B12}$ described in Formula (2-2), and preferred examples thereof are also the same.

In Formula (2-5), examples of the divalent linking group represented by $L_{B4}$ are the same as the examples of $L_{B1}$ described in Formula (2-2), and preferred examples thereof are also the same.

A preferred combination of preferred substituents of the colorant represented by Formula (2-5) of the present invention is preferably a compound in which at least one of various substituents is the aforementioned preferred groups, more preferably a compound in which much more substituents are the aforementioned preferred groups, and most preferably a compound in which all the substituents are the aforementioned preferred groups.

A particularly preferred combination as the colorant represented by Formula (2-5) of the present invention includes the following (a) to (h).

(a) $R_{B1}$ and $R_{B2}$ may be the same as or different from each other and are preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, and among them, a straight alkyl group or branched alkyl group having a total carbon number of 1 to 8 is preferred, a secondary or tertiary alkyl group is particularly preferred, and a t-butyl group is most preferred.

(b) $Y_{B1}$ and $Y_{B2}$ may be the same as or different from each other and are preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, a hydrogen atom, or a substituted or unsubstituted alkyl group is preferred, and among them, a hydrogen atom is most preferred.

(c) $Z_{B1}$ and $Z_{B2}$ may be the same as or different from each other and are preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, a substituted or unsubstituted aryl group, or a substituted or unsubstituted heterocyclic group is preferred, and in particularly, a substituted aryl group is most preferred.

(d) $G_{B1}$ and $G_{B2}$ may be the same as or different from each other and represent an atomic group constituting a 5- to 8-membered nitrogen-containing heterocyclic ring, preferred examples of the 5- to 8-membered nitrogen-containing heterocyclic ring include a S-triazine ring, a pyrimidine ring, a pyridazine ring, a pyrazine ring, a pyridine ring, an imidazole ring, a pyrazole ring, or a pyrrole ring, and among them, a S-triazine ring, a pyrimidine ring, a pyridazine ring, or a pyrazine ring is more preferred, and a S-triazine ring is most preferred.

(e) $m_{B51}$ and $m_{B52}$ each independently represent an integer of 0 to 3, when a —$OM_B$ group may be substituted as a structure of preferred examples of the 5- to 8-membered nitrogen-containing heterocyclic ring represented by $G_{B1}$ and $G_{B2}$, 0 to 2 are preferred, and among them, 0 or 1 is preferred, and in particularly, $m_{B51}=1$ and $m_{B52}=1$ are most preferred.

(f) $M_B$ is preferably a hydrogen atom or a cation, particularly preferably a hydrogen atom, an alkali metal ion, ammonium, or a quaternary ammonium cation, and further preferably Li, Na, K or $NH_4$.

(g) $R_{B11}$ and $R_{B12}$ may be the same as or different from each other and are preferably a —$OM_B$ group (in which $M_B$ is a hydrogen atom or a cation), a substituted or unsubstituted amino group; an alkylamino group having 1 to 12 carbon atoms, an arylamino group having 6 to 18 carbon atoms, a substituted or unsubstituted alkylthio group having 1 to 12 carbon atoms, and a substituted or unsubstituted arylthio group having 6 to 18 carbon atoms, and among them, an unsubstituted amino group, an alkylamino group having 1 to 12 carbon atoms, an arylamino group having 6 to 18 carbon atoms, a substituted or unsubstituted alkylthio group having 1 to 12 carbon atoms, or a substituted or unsubstituted arylthio group having 6 to 18 carbon atoms is preferred, and an unsubstituted amino group, a dialkylamino group having 1 to 12 carbon atoms, an arylamino group having 6 to 18 carbon atoms, or a substituted or unsubstituted alkylthio group having 1 to 12 carbon atoms is particularly preferred.

(h) $L_{B4}$ is a divalent linking group and preferably an electron-withdrawing group having a Hammett's substituent constant σp value of 0.20 or more, an electron-withdrawing group with 0.30 or more is further preferred, and the upper limit thereof is an electron-withdrawing group with 1.0 or less. Among them, an alkylsulfonyl group having 1 to 12 carbon atoms: {—$SO_2$—$(CH_2)n_B$-$O_2S$—; $n_B$=an integer of 1 to 10}, and an arylsulfonyl group having 6 to 18 carbon atoms: {—$SO_2$—$Ar_B$—$O_2S$—; $Ar_B$ is a substituted or unsubstituted aryl group} are preferred, and an alkylsulfonylalkylsulfonyl group having 1 to 12 carbon atoms: {—$SO_2$—$(CH_2)n_B$-$O_2S$—; $n_B$=an integer of 1 to 5} is most preferred.

Among the azo colorants represented by Formula (2-1), the azo colorant is preferably a colorant represented by Formula (2-6).

Formula (2-6)

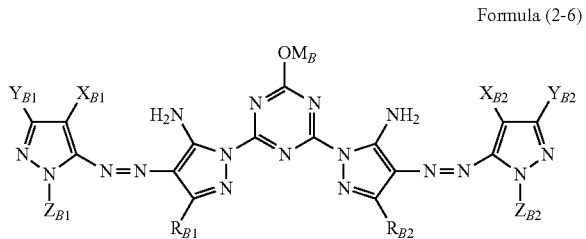

Hereinafter, Formula (2-6) will be described in detail.

$R_{B1}$, $R_{B2}$, $Y_{B1}$ and $Y_{B2}$ represent a monovalent group, and $X_{B1}$ and $X_{B2}$ each independently represent an electron-withdrawing group having a Hammett's σp value of 0.20 or more. $Z_{B1}$ and $Z_{B2}$ each independently represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group. $M_B$ represents a hydrogen atom or a cation.

Hereinafter, $R_{B1}$, $R_{B2}$, $X_{B1}$, $X_{B2}$, $Y_{B1}$, $Y_{B2}$, $Z_{B1}$, $Z_{B2}$ and $M_B$ will be described in detail.

Examples of the substituent of $R_{B1}$, $R_{B2}$, $Y_{B1}$ and $Y_{B2}$ are the same as the examples of the substituent of $R_{B1}$, $R_{B2}$, $Y_{B1}$ and $Y_{B2}$ described in Formula (2-1), and preferred examples thereof are also the same.

Examples of the substituent of $X_{B1}$ and $X_{B2}$ are the same as the examples of the substituent of $X_{B1}$ and $X_{B2}$ described in Formula (2-1), and preferred examples thereof are also the same.

Examples of the substituent of $Z_{B1}$ and $Z_{B2}$ are the same as the examples of the substituent of $Z_{B1}$ and $Z_{B2}$ described in Formula (2-1), and preferred examples thereof are also the same.

Examples of $M_B$ are the same as the examples of $M_B$ described in Formula (2-1), and preferred examples are also the same.

A preferred combination of preferred substituents of the colorant represented by Formula (2-6) of the present invention is preferably a compound in which at least one of various substituents is the aforementioned preferred groups, more preferably a compound in which much more substituents are the aforementioned preferred groups, and most preferably a compound in which all the substituents are the aforementioned preferred groups.

A particularly preferred combination as the colorant represented by Formula (2-6) of the present invention includes the following (a) to (e).

(a) $R_{B1}$ and $R_{B2}$ may be the same as or different from each other and are preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, and among them, a straight alkyl group or branched alkyl group having a total carbon number of 1 to 8 is preferred, a secondary or tertiary alkyl group is particularly preferred, and a t-butyl group is most preferred.

(b) $X_{B1}$ and $X_{B2}$ may be the same as or different from each other and are preferably an electron-withdrawing group having a Hammett's substituent constant σp value of 0.20 or more, and an electron-withdrawing group with 0.30 or more is further preferred, and the upper limit thereof is an electron-withdrawing group with 1.0 or less. Among them, a cyano group, an alkylsulfonyl group having 1 to 12 carbon atoms, an arylsulfonyl group having 6 to 18 carbon atoms, or a sulfamoyl group having 0 to 12 carbon atoms is preferred, and a cyano group or an alkylsulfonyl group having 1 to 12 carbon atoms is most preferred.

(c) $Y_{B1}$ and $Y_{B2}$ may be the same as or different from each other and are preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, a hydrogen atom, or a substituted or unsubstituted alkyl group is preferred, and among them, a hydrogen atom is most preferred.

(d) $Z_{B1}$ and $Z_{B2}$ may be the same as or different from each other and are preferably a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, a substituted or unsubstituted aryl group, or a substituted or unsubstituted heterocyclic group is preferred, and a substituted aryl group is particularly preferred.

(e) $M_B$ is preferably a hydrogen atom or a cation, particularly preferably a hydrogen atom, an alkali metal ion, ammonium, or a quaternary ammonium cation, and further preferably Li, Na, K or $NH_4$.

In the present invention, when the compounds represented by Formulas (2), (2-1), (2-2), (2-3), (2-4), (2-5) and (2-6) need hydrophilicity, it is preferred that the compounds have two or more ionic hydrophilic groups in the molecule, more preferred that the compounds have 2 to 10 ionic hydrophilic groups in the molecule, and particularly preferred that the compounds have 3 to 6 ionic hydrophilic groups in the molecule.

However, when water is not used as a medium, the compounds may not have an ionic hydrophilic group.

Any group may be used as long as the ionic hydrophilic group is an ionic dissociation group.

Specific examples thereof include a sulfo group, a carboxyl group (including salts thereof), a hydroxyl group (may be in the form of a salt), a phosphono group (may be in the form of a salt), or a quaternary ammonium.

A sulfo group, a carboxyl group, or a hydroxyl group (including salts thereof) is preferred. When the ionic hydrophilic group is a salt, preferred examples of counter cations include an alkali metal (for example, lithium, sodium, and potassium), ammonium, and an organic cation (for example, pyridinium, tetramethyl ammonium, and guanidinium), among them, an alkali metal is preferred, and in particularly, in the case of a sulfo group, a lithium salt is preferred, and in the case of a carboxyl group, a sodium salt and/or a potassium salt are/is preferred.

The aqueous colorants represented by Formulas (2), (2-1), (2-2), (2-3), (2-4), (2-5) and (2-6) have preferably a maximum absorption wavelength (λmax) of 380 nm to 490 nm in $H_2O$, more preferably a λmax of 400 nm to 480 nm, and particularly preferably a λmax of 420 nm to 460 nm, from the viewpoint of color reproducibility.

Specific examples (exemplified colorant DYE-1 to DYE-26) of the colorants represented by Formulas (2), (2-1), (2-2), (2-3), (2-4), (2-5), and (2-6) will be shown described as follows, but the colorant used in the present invention is not limited to the following examples.

Further, the structure of the following specific examples will be shown in the form of a free acid, but it is natural obvious that the structure may be used as any salt.

Preferred examples of the coutercation include an alkali metal (for example, lithium, sodium and potassium), ammonium, or an organic cation (for example, pyridinium, tetramethyl ammonium and guanidinium).

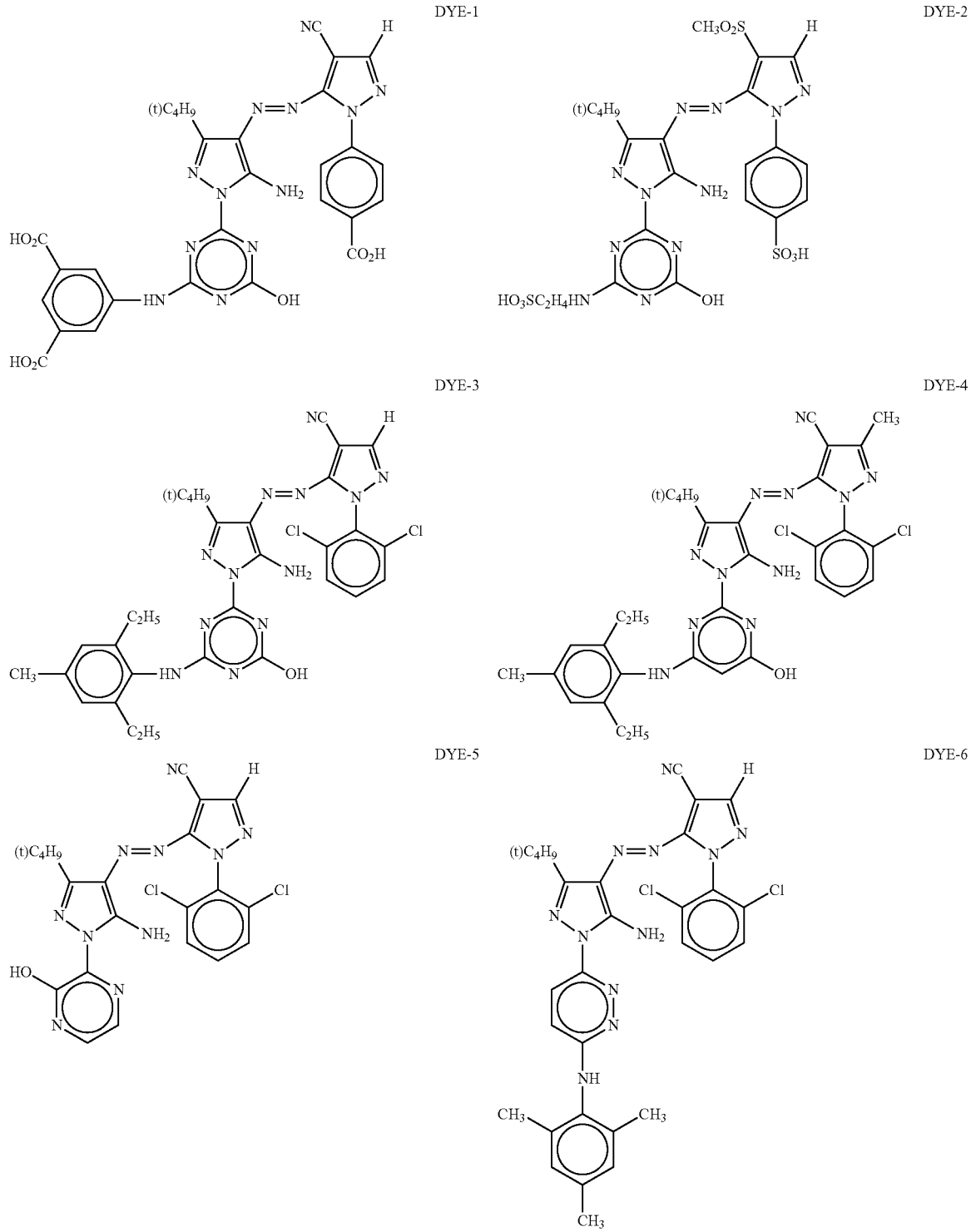

-continued
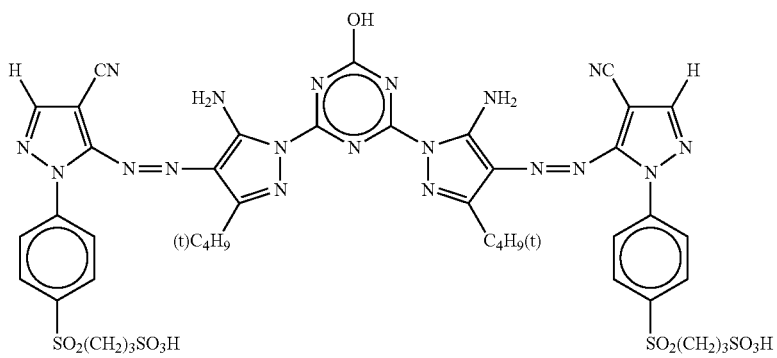
DYE-7
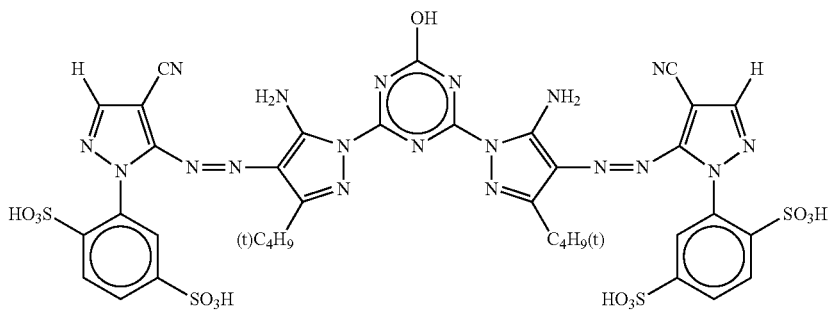
DYE-8
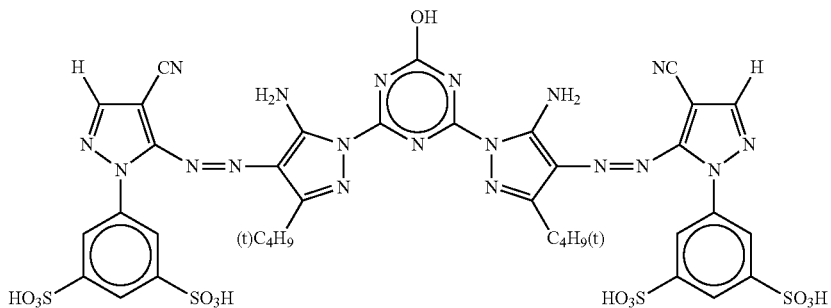
DYE-9
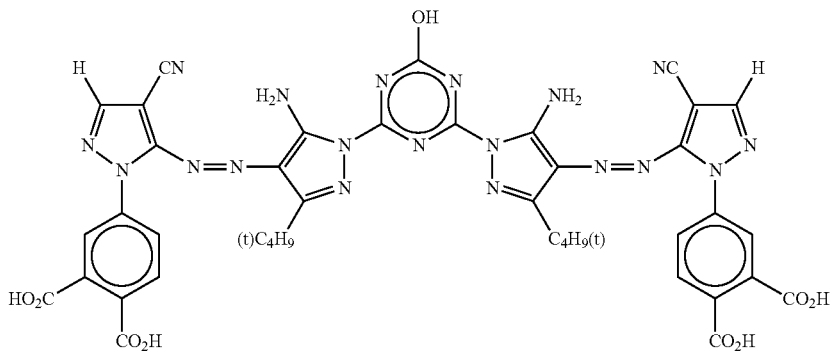
DYE-10
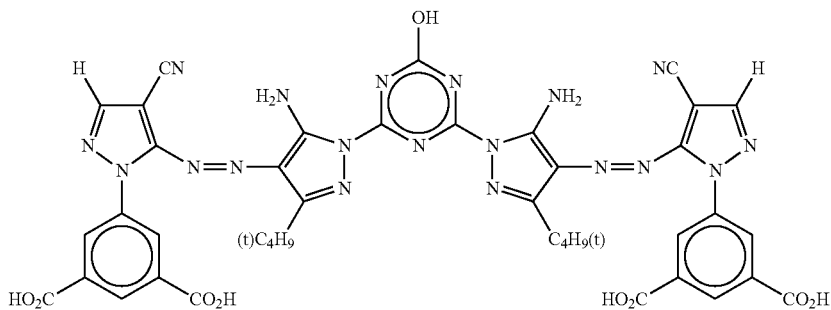
DYE-11

DYE-12
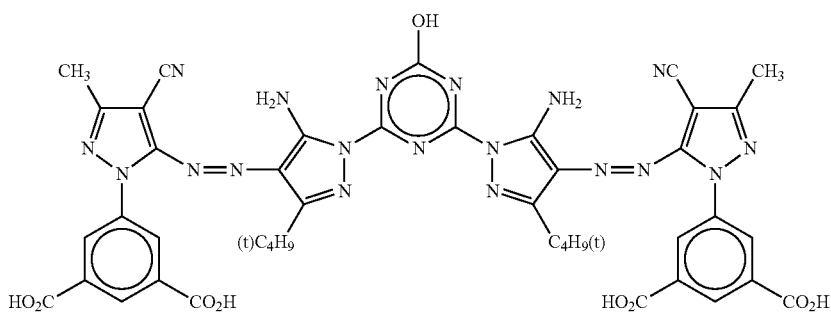
DYE-13
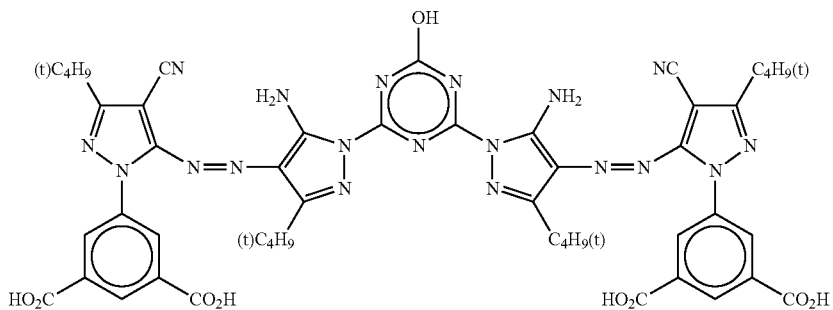
DYE-14
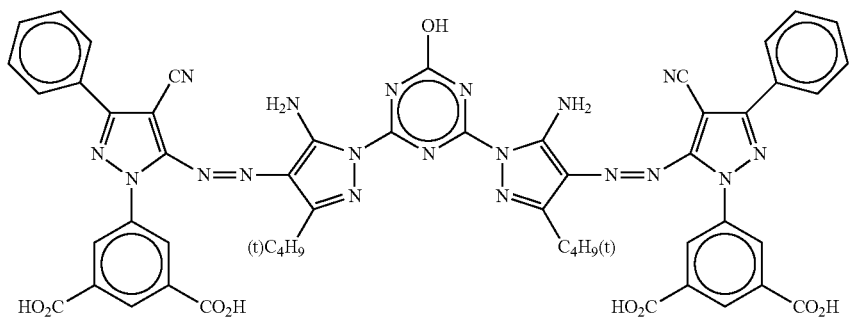
DYE-15
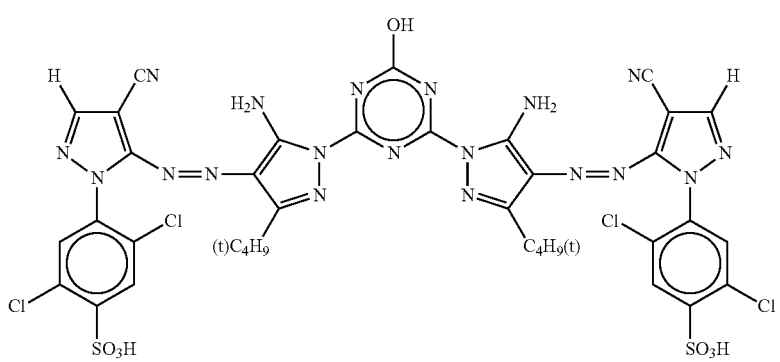
DYE-16
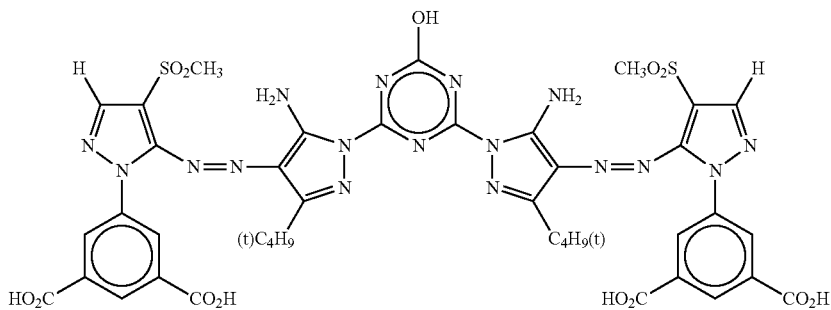

-continued
DYE-17
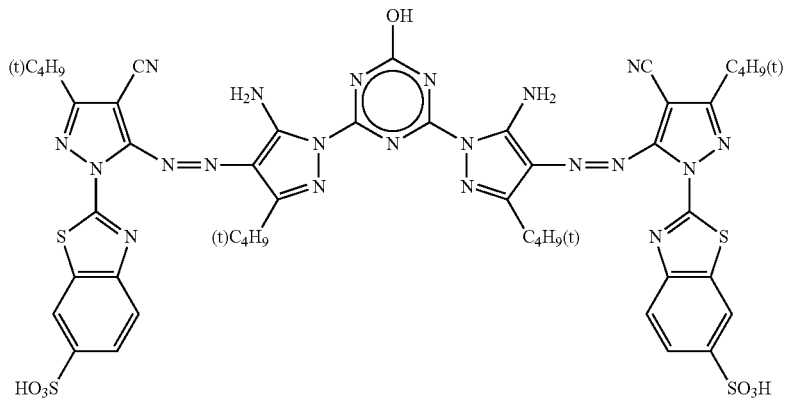
DYE-18
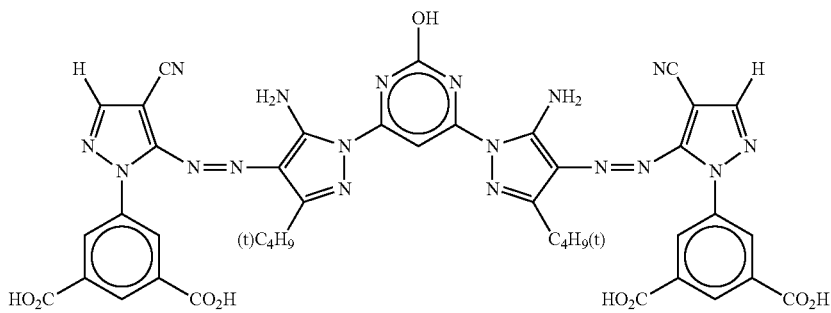
DYE-19
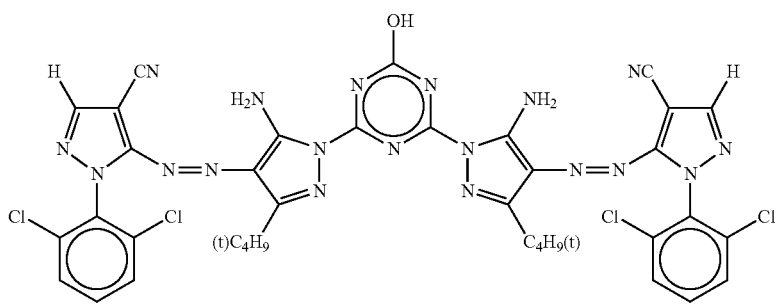
DYE-20
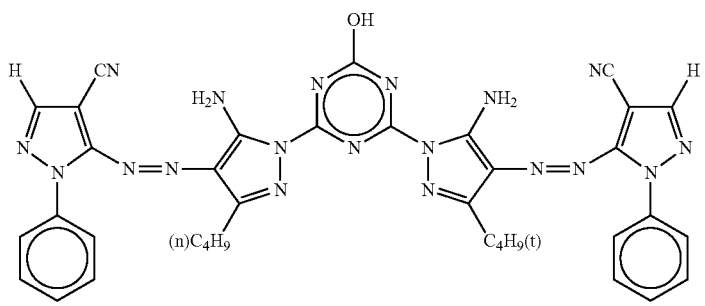
DYE-21
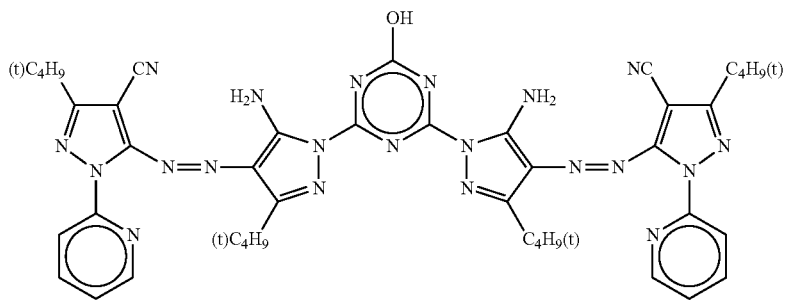

-continued
DYE-22
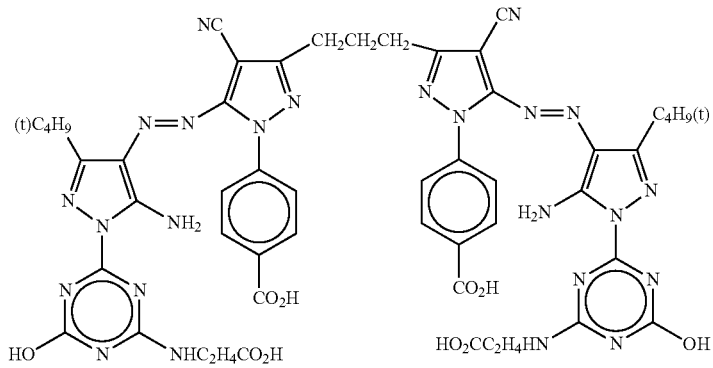
DYE-23
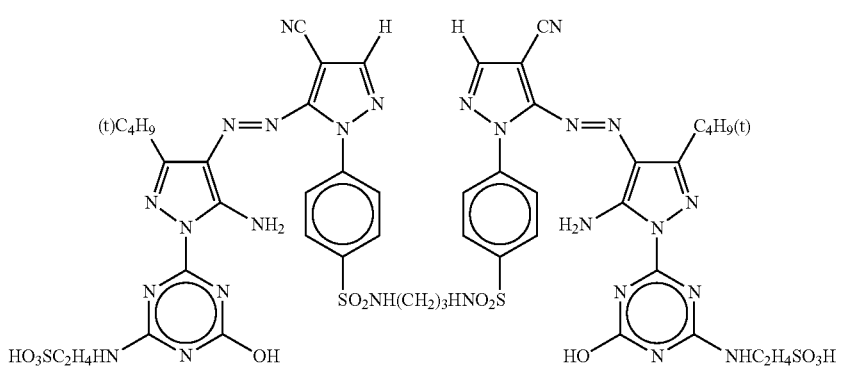
DYE-24
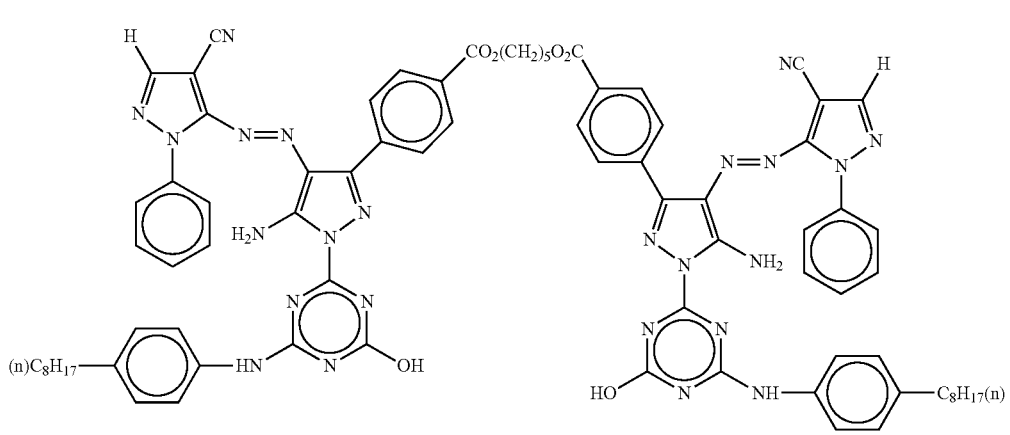
DYE-25
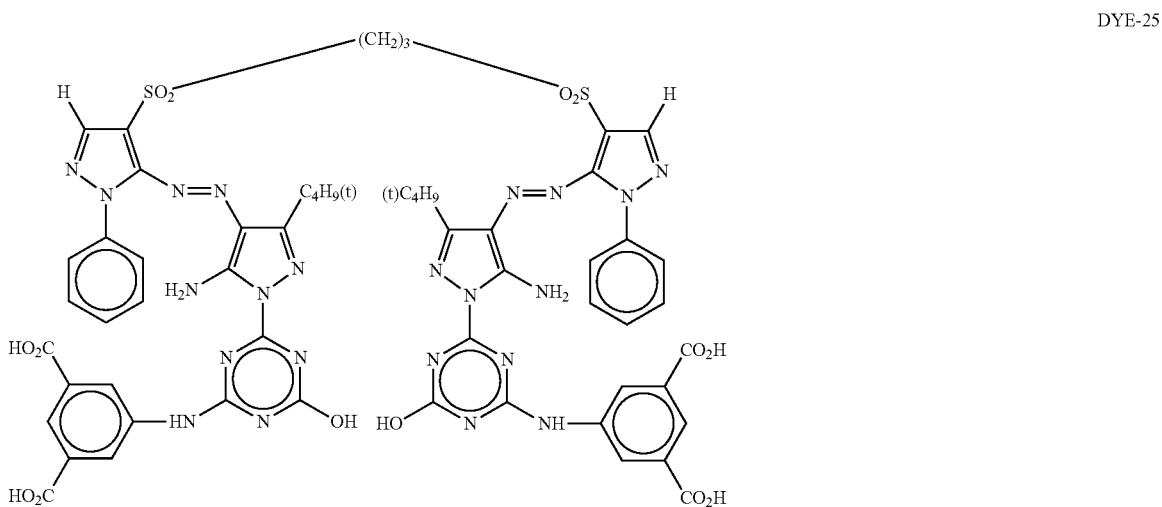

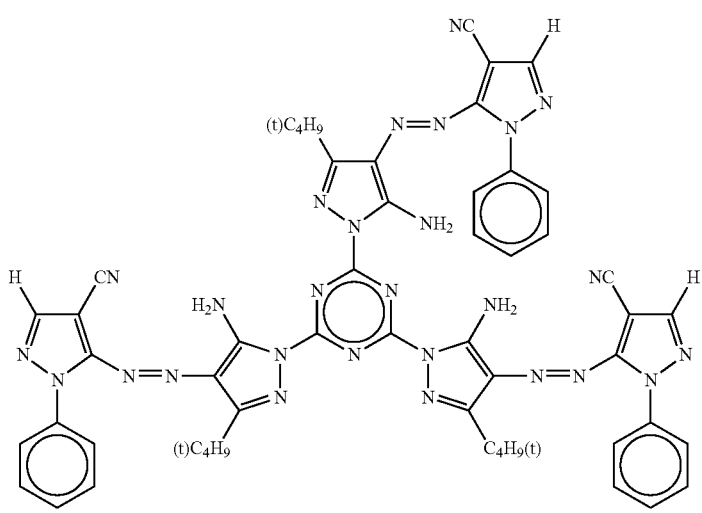

DYE-26

Further, examples of the compound (azo colorant) represented by Formula (2) include a colorant represented by the following Formula (2-7).

Hereinafter, Formula (2-7) will be described in detail.

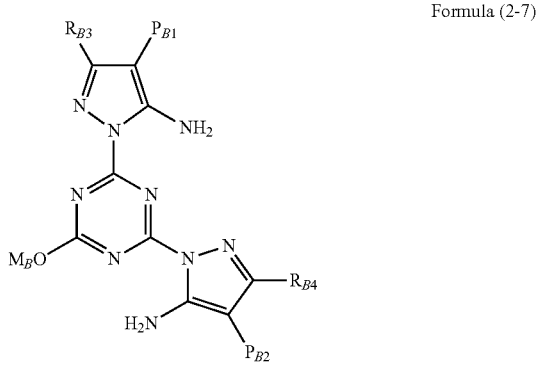

Formula (2-7)

The compound represented by Formula (2-7) includes the compound, salts thereof, and hydrates thereof.

In Formula (2-7), $M_B$, $R_{B3}$, and $R_{B4}$ each independently have the same meaning as $M_B$, $R_{B1}$ and $R_{B2}$ represented by Formula (2-2), and preferred examples thereof are also the same.

In Formula (2-7), $P_{B1}$ and $P_{B2}$ each independently represent a hydrogen atom or a leaving group.

In the present specification, the leaving group means a group capable of leaving by a chemical reaction and refers to, for example, a group capable of being released leaving by a coupling reaction with a diazonium salt, or a group capable of readily causing an addition-elimination reaction with an oxidant of a phenylenediamine derivative. Preferred examples of PB1 and PB2 include a hydrogen atom, a halogen atom, an alkyloxy group, an aryloxy group, an alkylthio group or an arylthio group, and among them, a hydrogen atom or a halogen atom is preferred, and among them, a hydrogen atom is preferred.

The compound represented by Formula (2) may be synthesized by the method described in, for example, the Japanese Patent Application Laid-Open No. 2007-063520.

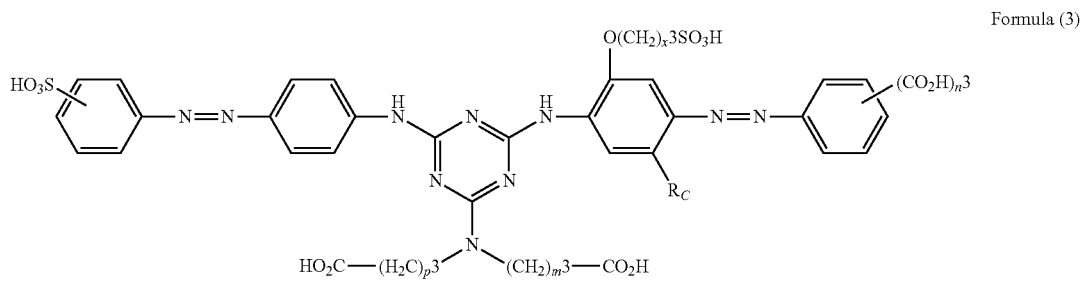

Formula (3)

(In Formula (3), $R_C$ represents an alkyl group having 1 to 4 carbon atoms, $n^3$ represents 1 or 2, $x^3$ represents an integer of 2 to 4, and $m^3$ and $p^3$ each independently represent an integer of 1 to 3.)

The compound represented by Formula (3) will be described in detail.

In Formula (3), examples of the alkyl group having 1 to 4 carbon atoms in RC include a straight, branched or cyclic alkyl group, a straight or branched alkyl group is preferred, and a straight alkyl group is more preferred. Specific examples thereof include a straight alkyl group, such as methyl, ethyl, n-propyl, and n-butyl; a branched alkyl group, such as isopropyl, isobutyl, sec-butyl, and t-butyl; and a cyclic alkyl group, such as cyclopropyl and cyclobutyl. Methyl is particularly preferred.

In Formula (3), $n^3$ represents 1 or 2, and is preferably 1. Meanwhile, the substitution position of the carboxyl group represented by $-(CO_2H)n^3$ is not particularly limited, and may be any of the ortho position, the meta position, or the para position with respect to an azo group, but preferably, substitution may occur at the meta position when $n^3$ is 1 and at two meta positions when $n^3$ is 2.

$x^3$ represents 2 to 4, and is preferably 3.

$m^3$ and $p^3$ in Formula (3) each independently represent an integer of 1 to 3. It is preferred that $m^3$ and $p^3$ are preferably the same number, and more preferably that both are 1.

The substitution position of a sulfo group, in which the substitution position in Formula (3) is not specified, is not particularly limited, and may be any of the ortho position, the meta position, or the para position with respect to an azo group, but is preferably the para position.

In $R_C$, $n^3$, $x^3$, $m^3$ and $p^3$ described above, a compound obtained by combining preferred ones is more preferred, and a compound obtained by combining more preferred ones is still more preferred. The same also applies to the combination of the preferred ones with the more preferred ones, and the like.

It is preferred that the compound represented by Formula (3) is the following Formula (3-1) in which Rc is a methyl group, $n^3$ is 1, $x^3$ is 3, and $m^3$ and $p^3$ are 1.

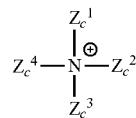

Formula (3-A)

In Formula (3-A), $Z_C^1$ to $Z_C^4$ each independently represent a hydrogen atom, an alkyl group having 1 to 4 carbon atoms, a hydroxyalkyl group (having 1 to 4 carbon atoms), or a hydroxyalkoxy (having 1 to 4 carbon atoms) alkyl group (having 1 to 4 carbon atoms), and at least one of $Z_C^1$ to $Z_C^4$ is a group other than a hydrogen atom.

Here, examples of the alkyl group in $Z_C^1$ to $Z_C^4$ include methyl, ethyl and the like, and similarly, examples of the hydroxyalkyl group include hydroxymethyl, hydroxyethyl, 3-hydroxypropyl, 2-hydroxypropyl, 4-hydroxybutyl, 3-hydroxybutyl, 2-hydroxybutyl and the like, and examples of the hydroxyalkoxyalkyl group include hydroxyethoxymethyl, 2-hydroxyethoxyethyl, 3-(hydroxyethoxy)propyl, 3-(hydroxyethoxy)butyl, 2-(hydroxyethoxy)butyl and the like.

Preferred examples of the salt include an alkali metal salt, such as sodium, potassium, lithium and the like; an organic quaternary ammonium salt, such as salts of monoethanolamine, diethanolamine, triethanolamine, monoisopropanolamine, diisopropanolamine, and triisopropanolamine, and the like; an ammonium salt; and the like. Among them, the salt is more preferably a lithium salt, a sodium salt, and an ammonium salt are more preferred, and an ammonium salt is still more preferred.

As will be apparent to those skilled in the art, a salt or a free acid of the compound of Formula (3) may be easily obtained

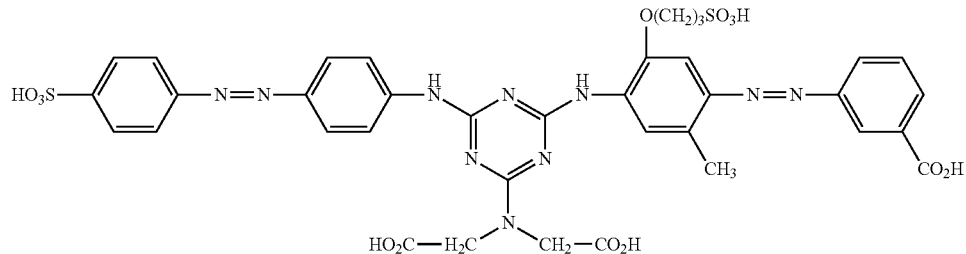

Formula (3-1)

The compound of Formula (3) is also present as a free acid or a salt thereof. Examples of the salt of the compound of Formula (3) include salts with an inorganic or organic cation. Specific examples of the salt of the inorganic cation include an alkali metal salt, for example, a salt such as a lithium salt, a sodium salt, a potassium salt and the like, and an ammonium salt. Further, examples of the organic cation include a quaternary ammonium represented by the following Formula (3-A), but are not limited thereto.

by the method and the like described in, for example, the Japanese Patent Application Laid-Open No. 2010-184985.

Subsequently, specific examples of the compound of Formula (3) of the present invention will be shown in the following Table. In the following Table, an acidic functional group, such as a carboxyl group and a sulfo group and the like, is represented in the form of a free acid. Meanwhile, "Me" in the Table represents a methyl group, and $n^3$, $x^3$, $m^3$, and $p^3$ represent the same meaning as those in Formula (3).

TABLE 3
| Compound No. | $n^3$ | $x^3$ | $m^3$ | $p^3$ | Structure |
|---|---|---|---|---|---|
| 1 | 1 | 2 | 1 | 1 | 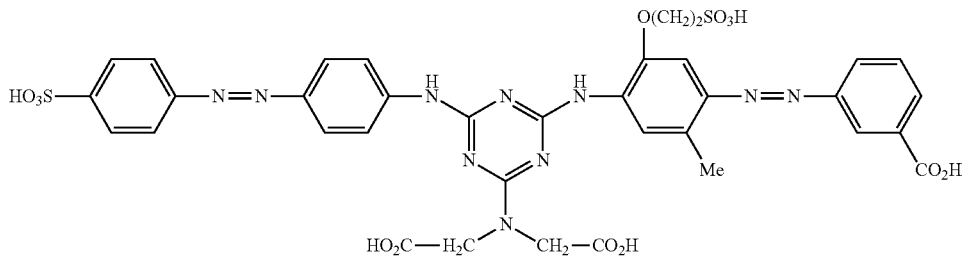 |
| 2 | 1 | 3 | 1 | 1 | 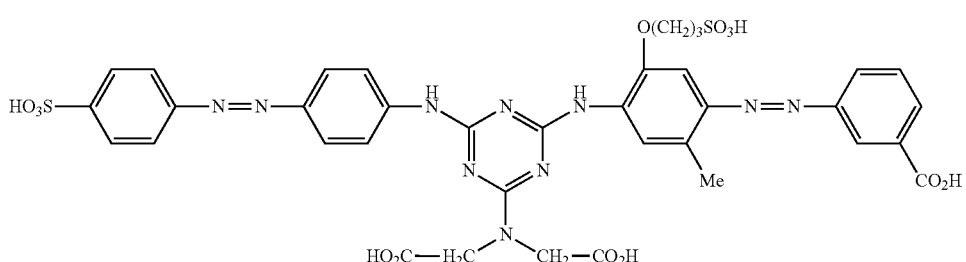 |
| 3 | 1 | 4 | 1 | 1 | 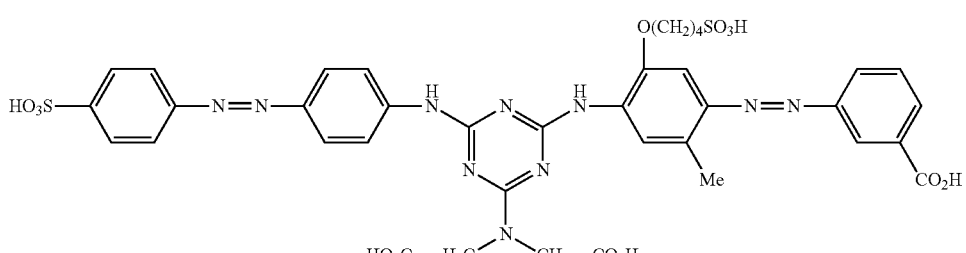 |
| 4 | 1 | 3 | 1 | 1 | 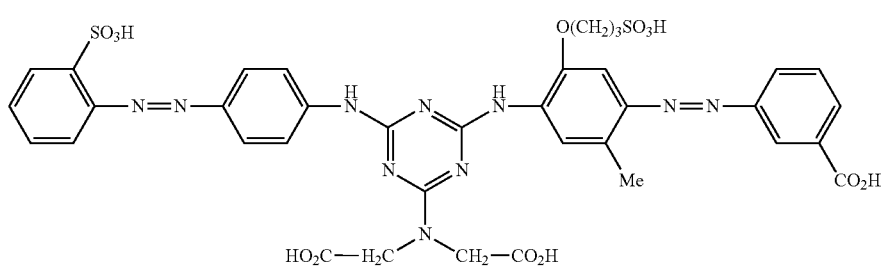 |
| 5 | 1 | 3 | 1 | 1 | 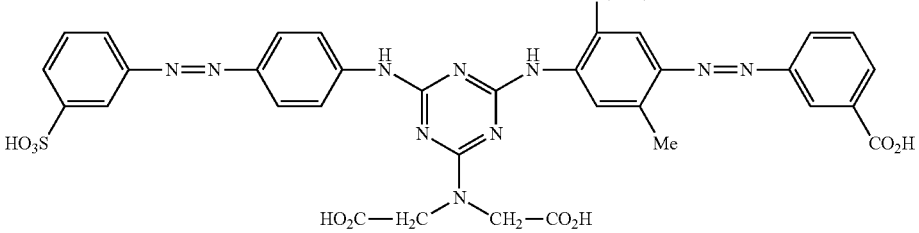 |

TABLE 4
| Compound No. | n³ | x³ | m³ | p³ | Structure |
|---|---|---|---|---|---|
| 6 | 1 | 3 | 1 | 1 | 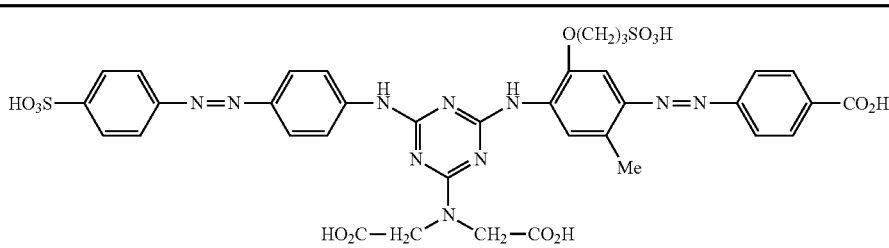 |
| 7 | 1 | 3 | 1 | 1 | 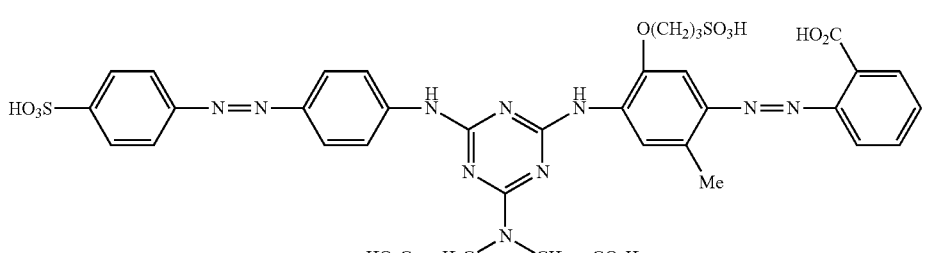 |
| 8 | 2 | 3 | 1 | 1 | 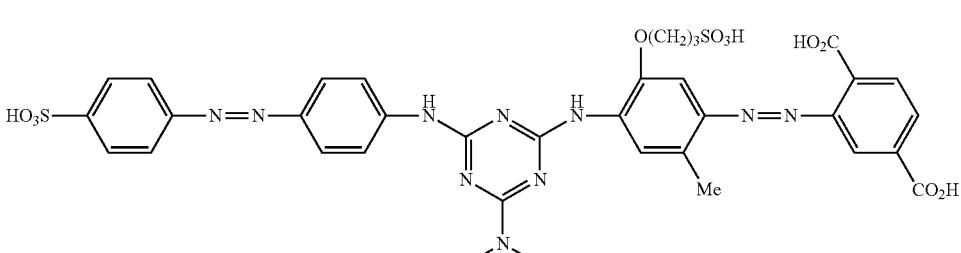 |
| 9 | 2 | 3 | 1 | 1 | 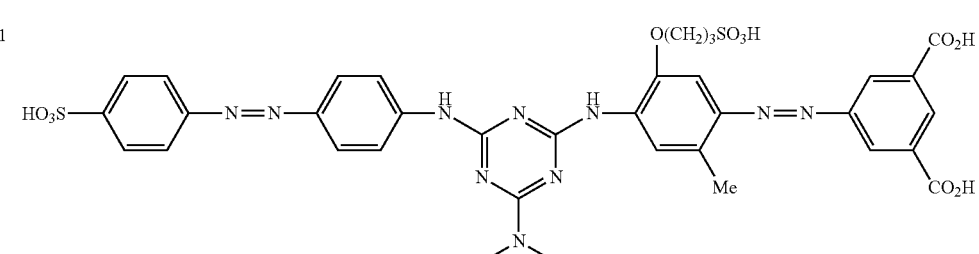 |
| 10 | 1 | 3 | 2 | 1 | 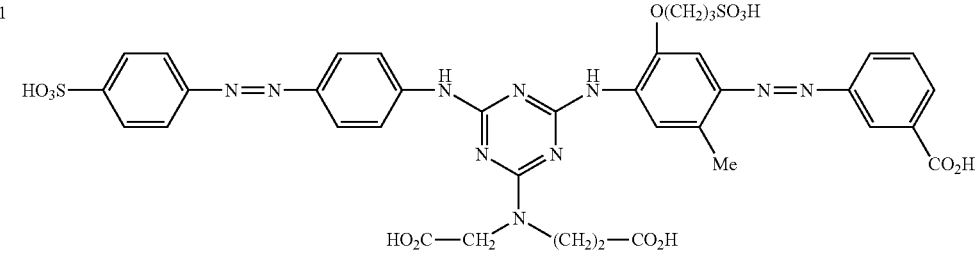 |

TABLE 5

| Compound No. | n³ | x³ | m³ | p³ | Structure |
|---|---|---|---|---|---|
| 11 | 1 | 3 | 3 | 1 | 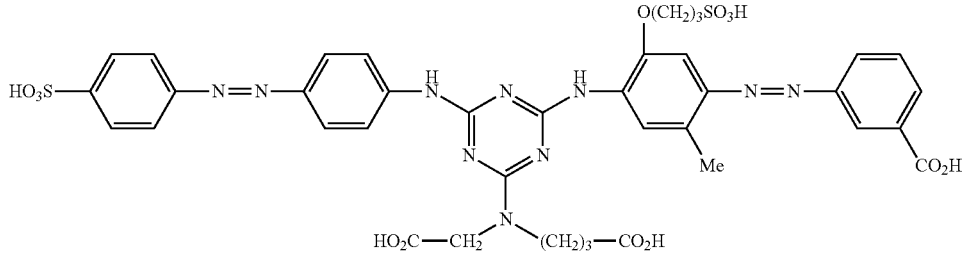 |
| 12 | 1 | 3 | 2 | 2 | 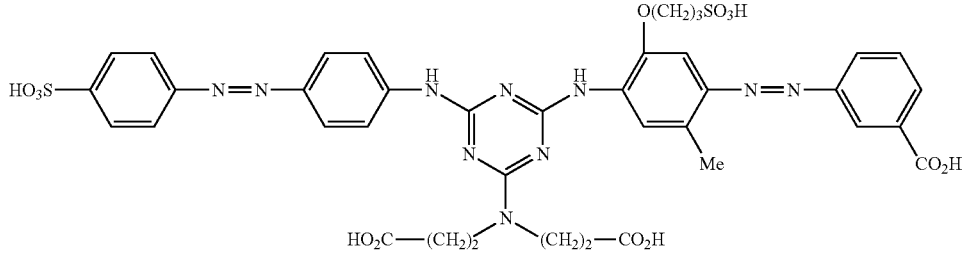 |
| 13 | 1 | 3 | 3 | 2 | 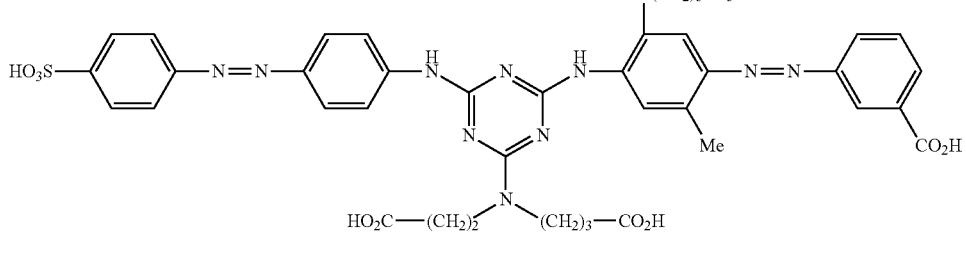 |
| 14 | 1 | 3 | 3 | 3 | 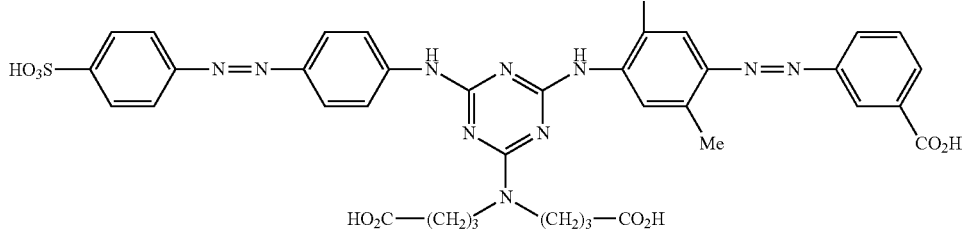 |

The compound of Formula (3) of the present invention may be isolated as a solid free acid by adding an inorganic acid such as hydrochloric acid and the like after the reaction is completed, and it is possible to remove inorganic salts contained as impurities (inorganic impurities), for example, sodium chloride, sodium sulfate and the like by washing the obtained solid of the obtained free acid with water or, for example, acidic water such as hydrochloric acid water, and the like.

For the free acid of the compound of the present invention obtained as described above, it is possible to obtain a solution of the salt of the corresponding compound may be obtained by treating the wet cake obtained in the manner as described above with a desired inorganic or organic base in water, as described above.

Examples of the inorganic base include hydroxide of an alkali metal, such as lithium hydroxide, sodium hydroxide, and potassium hydroxide and the like and the like; carbonate of an alkali metal, such as lithium carbonate, sodium carbonate, potassium carbonate and the like; and ammonium hydroxide (ammonia water) and the like.

Examples of the organic base include an organic amine corresponding to, for example, the quaternary ammonium represented by Formula (3-A), for example, alkanolamine and the like, such as diethanolamine, triethanolamine and the like, but are not limited thereto.

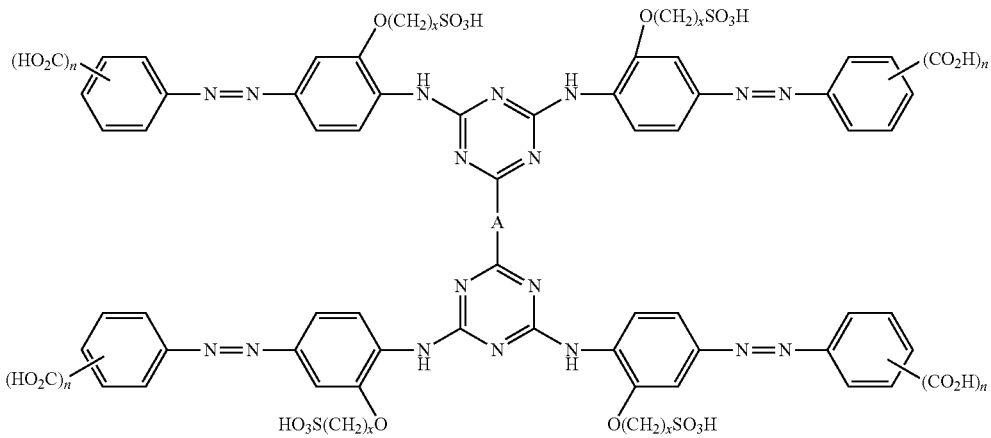

Formula (4)

(In Formula (4), n represents 1 or 2, x represents an integer of 2 to 4, and A represents a divalent bonding group represented by any one of the following Formulas (A-1) to (A-3).)

Formula (A-1)

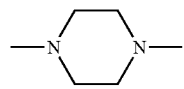

Formula (A-2)

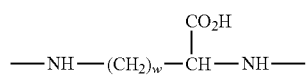

Formula (A-3)

(In Formulas (A-1) and (A-3), y represents an integer of 2 to 6, and w represents an integer of 1 to 4.)

The compound represented by Formula (4) will be described in detail.

In Formula (4), n represents 1 or 2, x represents an integer of 2 to 4, and A represents a divalent bonding group represented by any one of the Formulas (A-1) to (A-3).

In Formula (4), $n^3$ n represents 1 or 2, and is preferably 1. Further, the substitution position of a carboxyl group represented by $-(CO_2H)_n$ may be any one of the ortho position, the meta position, and the para position with respect to an azo group, but the meta position is more preferred.

x represents an integer of 2 to 4, and is preferably 3.

When A in Formula (4) is the Formula (A-1), y in Formula (A-1) represents an integer of 2 to 6. y is preferably 2 to 4, and particularly preferably 2.

When A in Formula (4) is the Formula (A-3), w in Formula (A-3) represents an integer of 1 to 4. w is preferably 3 or 4.

As A in Formula (4), the Formula (A-2) in among Formulas (A-1) to (A-3) is more preferred.

Further, in any one of n, x, and A described above, a combination of preferred one with the other is preferred, a compound obtained by combining two preferred ones is more preferred, and a combination of three preferred ones is most preferred.

It is preferred that the compound represented by Formula (4) is the following Formula (4-1).

Formula (4-1):

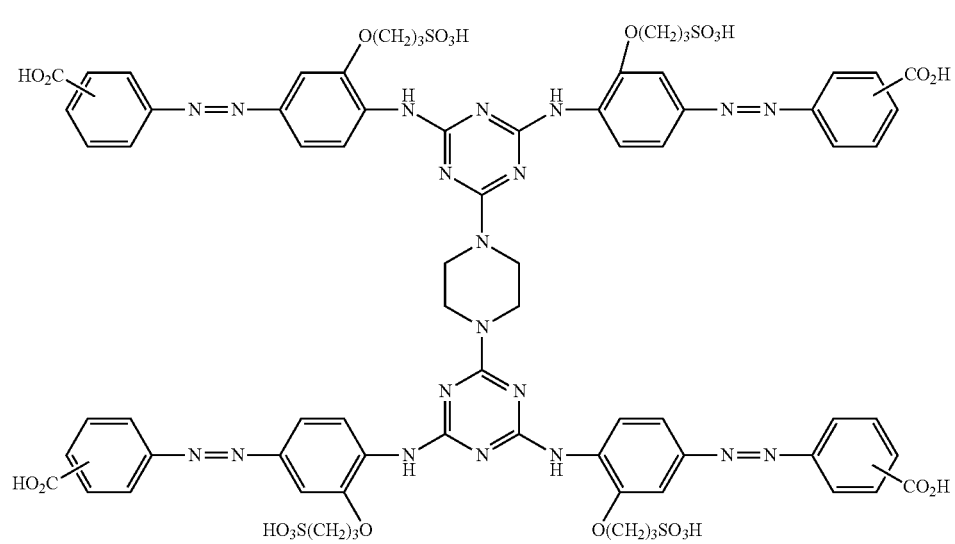

(4-1)

Among the aforementioned combinations, the compound of Formula (4) obtained by particularly preferred combination is the compound of Formula (4-1).

The compound of Formula (4) is also present as a free acid or a salt thereof. Examples of the salt of the compound of Formula (4) include salts with an inorganic or organic cation. Specific examples of the salt of with the inorganic cation include an alkali metal salt, for example, salts such as a lithium salt, a sodium salt, a potassium salt and the like. Further, examples of the organic cation include a salt of the aforementioned compound represented by the above-described Formula (3-A), but are not limited thereto.

As will be apparent to those skilled in the art, a salt of the compound of Formula (4) may be easily obtained by the method and the like described in, for example, International Publication No. 2008/142989.

Subsequently, specific examples of the colorant represented by Formula (4) will be shown in the following Table. In the following Table, acids of carboxyl, sulfo group and the like are represented in the form of a free acid.

TABLE 6

| Compound No. | n | x | A | Structure |
|---|---|---|---|---|
| 1 | 1 | 2 | Formula (A-1) y = 2 | 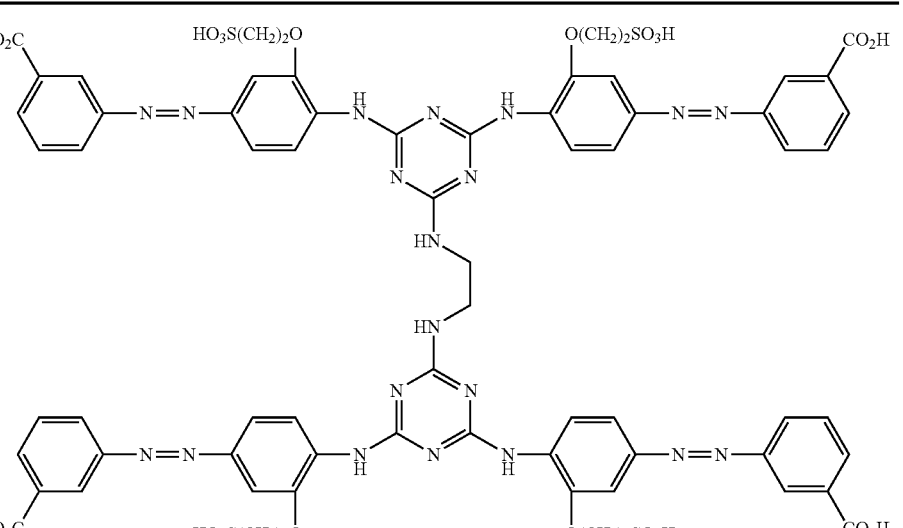 |
| 2 | 1 | 3 | Formula (A-1) y = 2 | 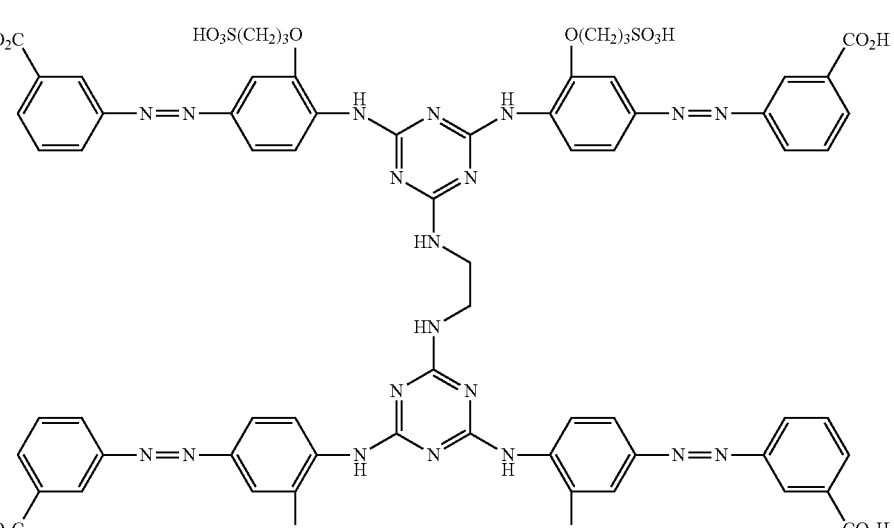 |

TABLE 6-continued
| Compound No. | n | x | A | Structure |
|---|---|---|---|---|
| 3 | 1 | 4 | Formula (A-1) y = 2 | 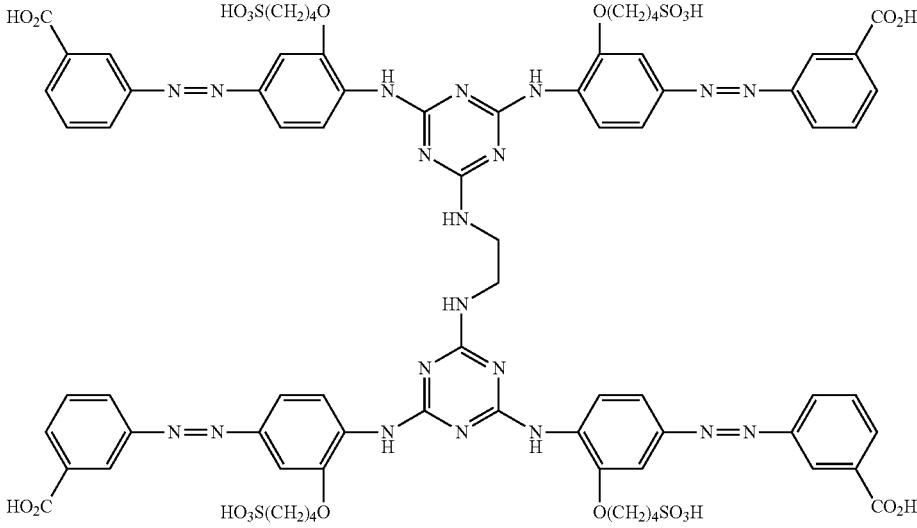 |
| 4 | 1 | 3 | Formula (A-1) y = 2 | 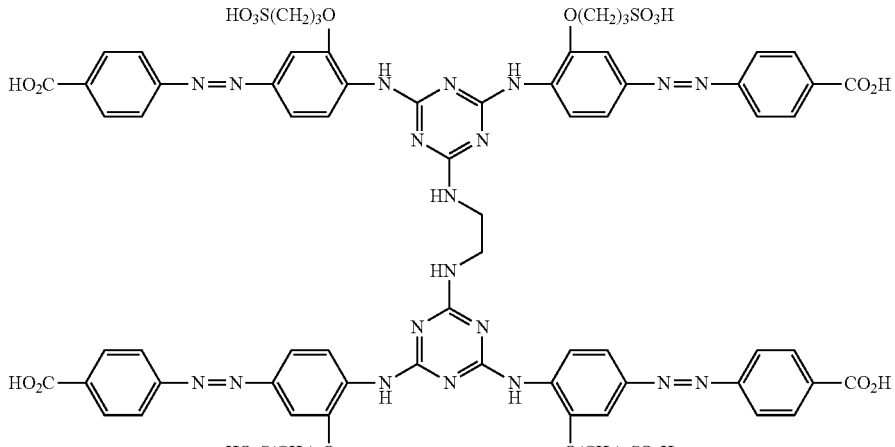 |

TABLE 7
| Compound No. | n | x | A | Structure |
|---|---|---|---|---|
| 5 | 1 | 3 | Formula (A-1) y = 2 | 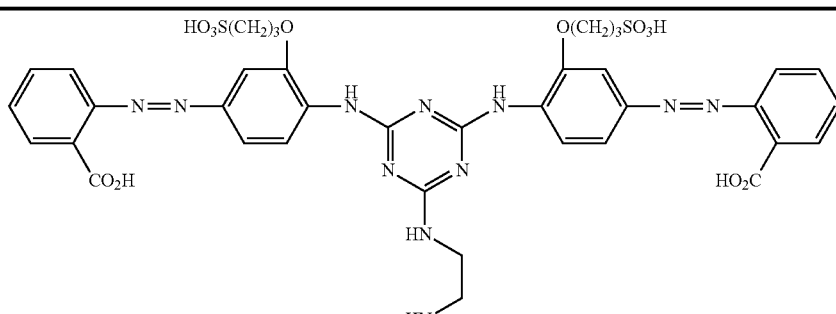 |
| 6 | 2 | 3 | Formula (A-1) y = 2 | |
| 7 | 2 | 3 | Formula (A-1) y = 2 | 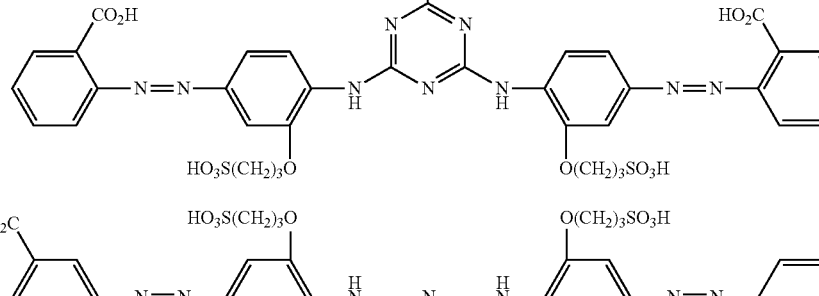 |

TABLE 7-continued
| Compound No. | n | x | A | Structure |
|---|---|---|---|---|
| 8 | 1 | 3 | Formula (A-1) y = 4 | 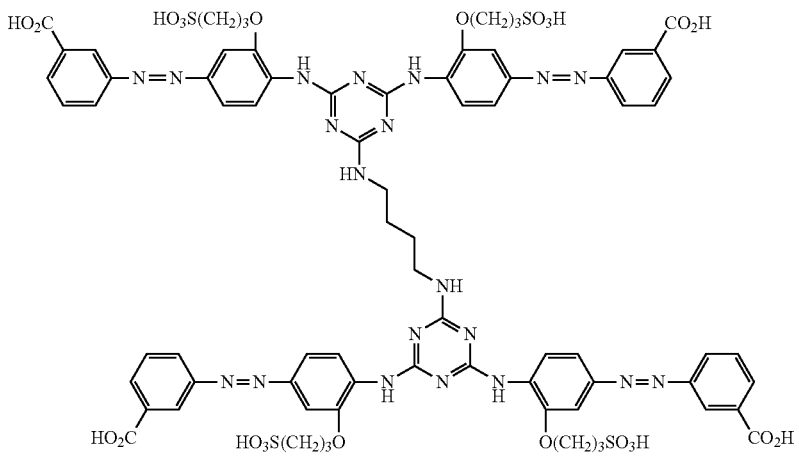 |
TABLE 8
| Compound No. | n | x | A | Structure |
|---|---|---|---|---|
| 9 | 1 | 3 | Formula (A-1) y = 6 | 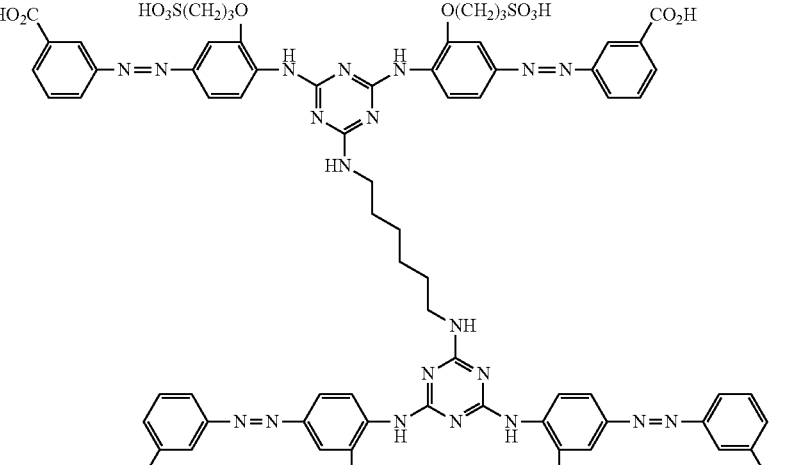 |

TABLE 8-continued
| Compound No. | n | x | A | Structure |
|---|---|---|---|---|
| 10 | 1 | 2 | Formula (A-2) | 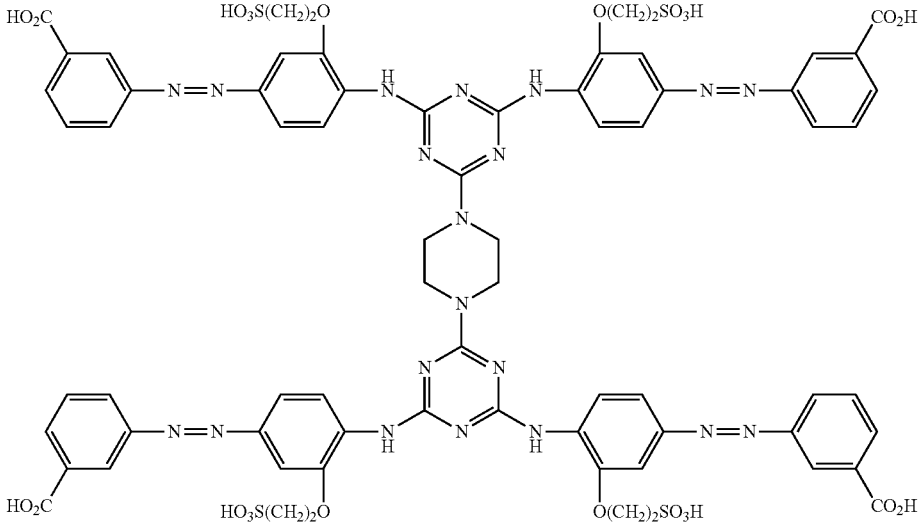 |
| 11 | 1 | 3 | Formula (A-2) | 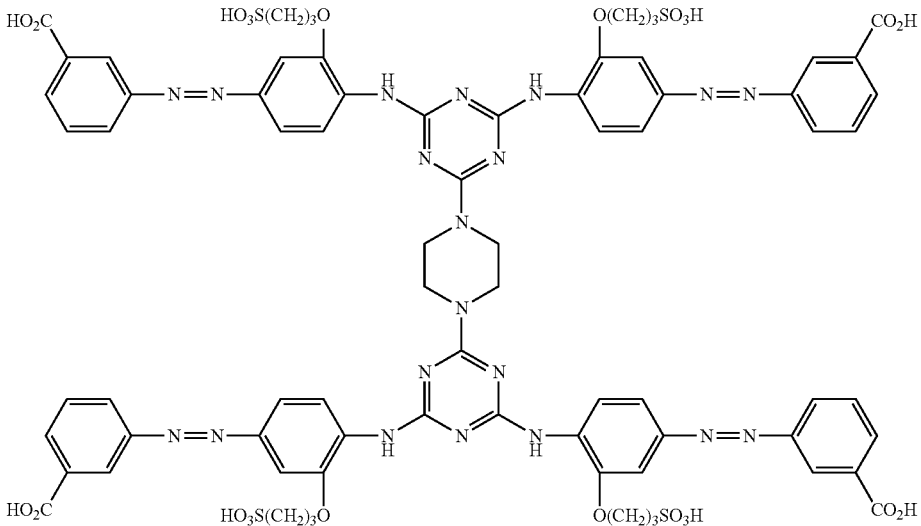 |

TABLE 8-continued

| Compound No. | n | x | A | Structure |
|---|---|---|---|---|
| 12 | 1 | 4 | Formula (A-2) | *(structure shown)* |

TABLE 9

| Compound No. | n | x | A | Structure |
|---|---|---|---|---|
| 13 | 1 | 3 | Formula (A-2) | *(structure shown)* |

TABLE 9-continued
| Compound | | | | Structure |
|---|---|---|---|---|
| No. | n | x | A | |
| 14 | 1 | 3 | Formula (A-2) | 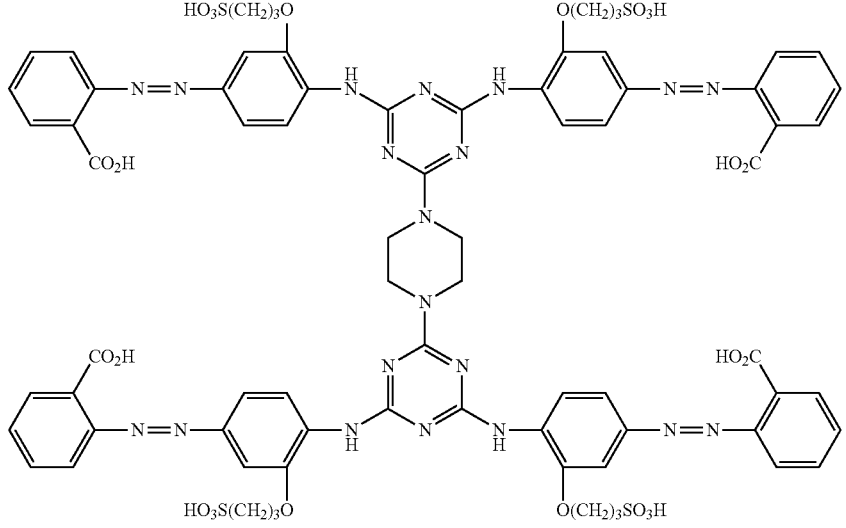 |
| 15 | 2 | 3 | Formula (A-2) | 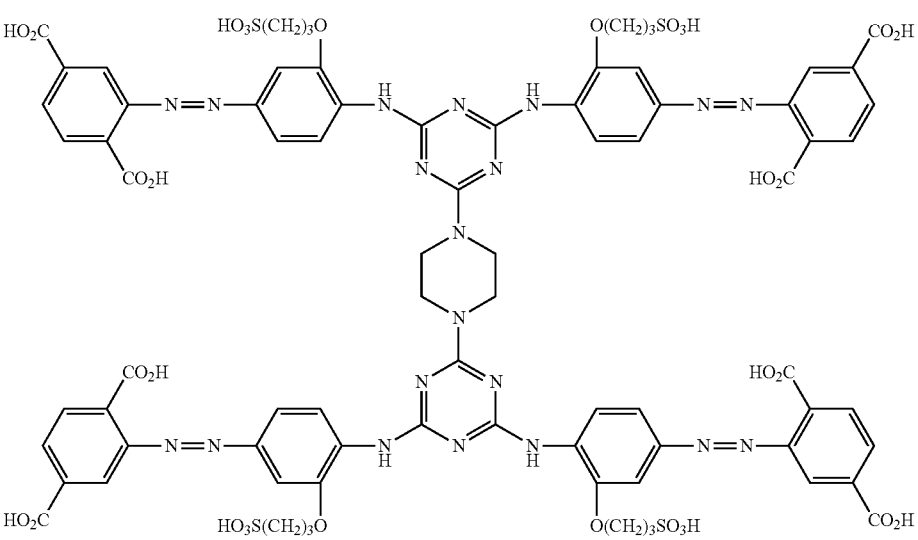 |

TABLE 9-continued
| Compound No. | n | x | A | Structure |
|---|---|---|---|---|
| 16 | 2 | 3 | Formula (A-2) | 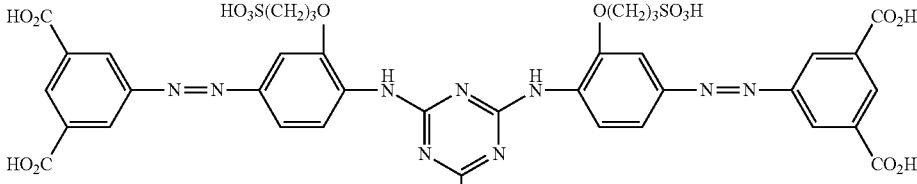 |
TABLE 10
| Compound No. | n | x | A | Structure |
|---|---|---|---|---|
| 17 | 1 | 2 | Formula (A-3) W = 4 | 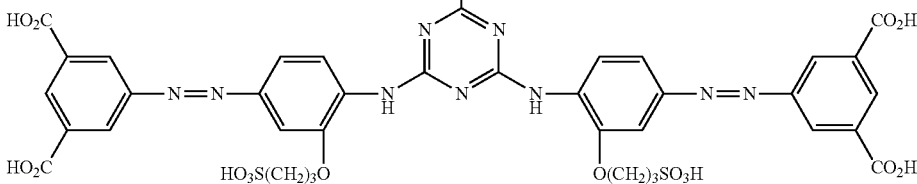 |

TABLE 10-continued
| Compound No. | n | x | A | Structure |
|---|---|---|---|---|
| 18 | 1 | 3 | Formula (A-3) W = 4 | 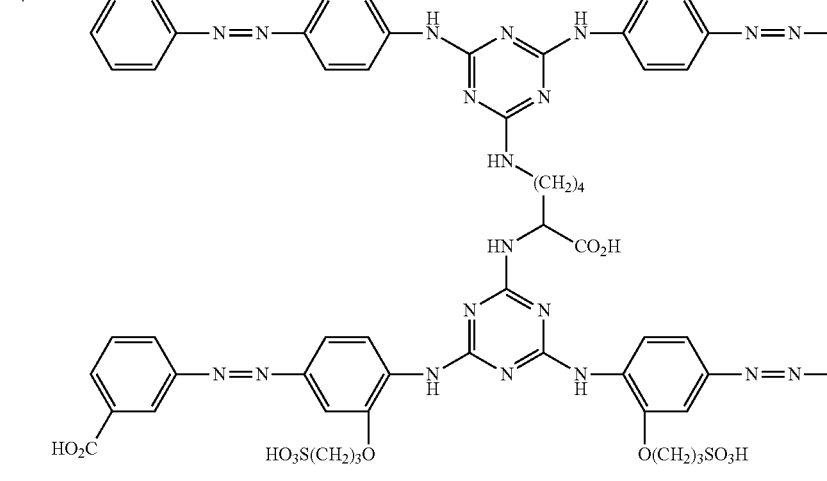 |
| 19 | 1 | 4 | Formula (A-3) W = 4 | 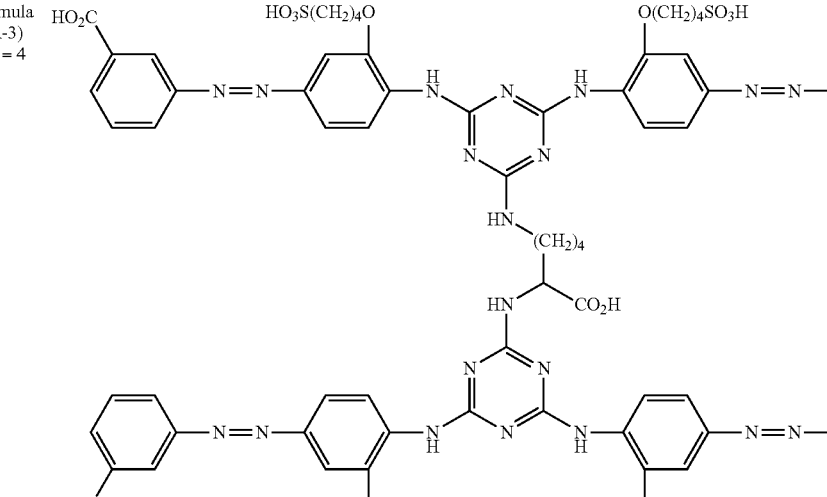 |
| 20 | 1 | 3 | Formula (A-3) W = 4 | 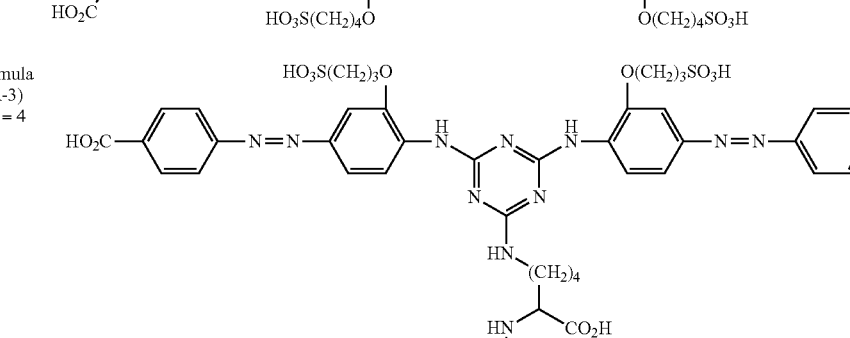 |

TABLE 11

| Compound No. | n | x | A | Structure |
|---|---|---|---|---|
| 21 | 1 | 3 | Formula (A-3) W = 4 | (structure) |
| 22 | 2 | 3 | Formula (A-3) W = 4 | (structure) |
| 23 | 2 | 3 | Formula (A-3) W = 4 | (structure) |

TABLE 11-continued
| Compound No. | n | x | A | Structure |
|---|---|---|---|---|
| 24 | 1 | 3 | Formula (A-3) W = 3 | 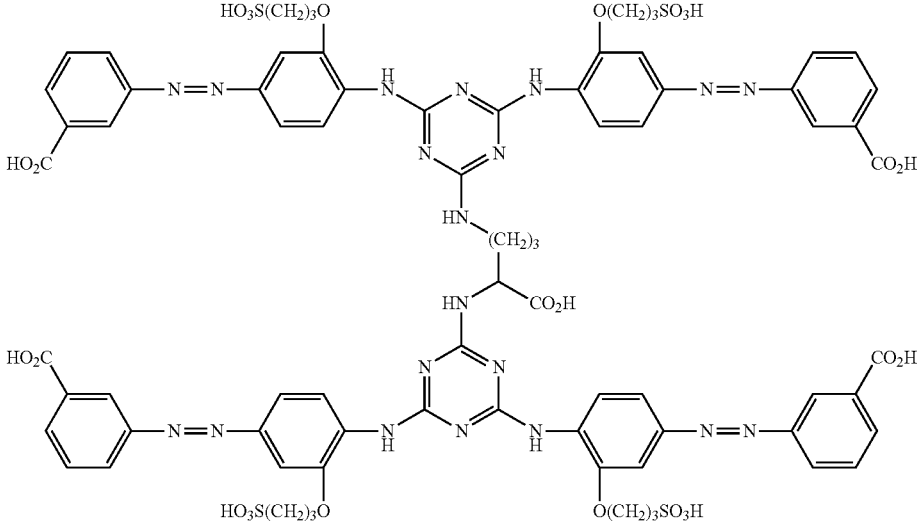 |
TABLE 12
| Compound No. | n | x | A | Structure |
|---|---|---|---|---|
| 25 | 1 | 3 | Formula (A-3) W = 2 | 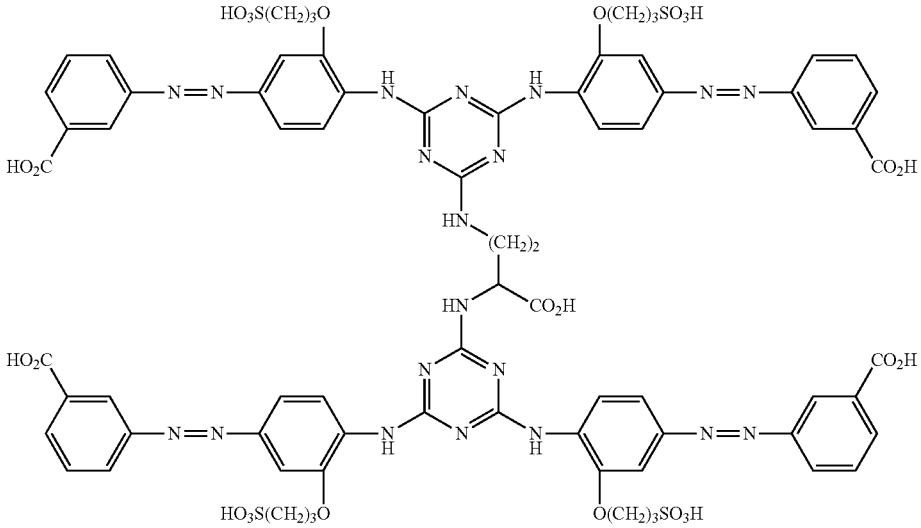 |

TABLE 12-continued

| Compound No. | n | x | A | Structure |
|---|---|---|---|---|
| 26 | 1 | 3 | Formula (A-3) W = 1 | 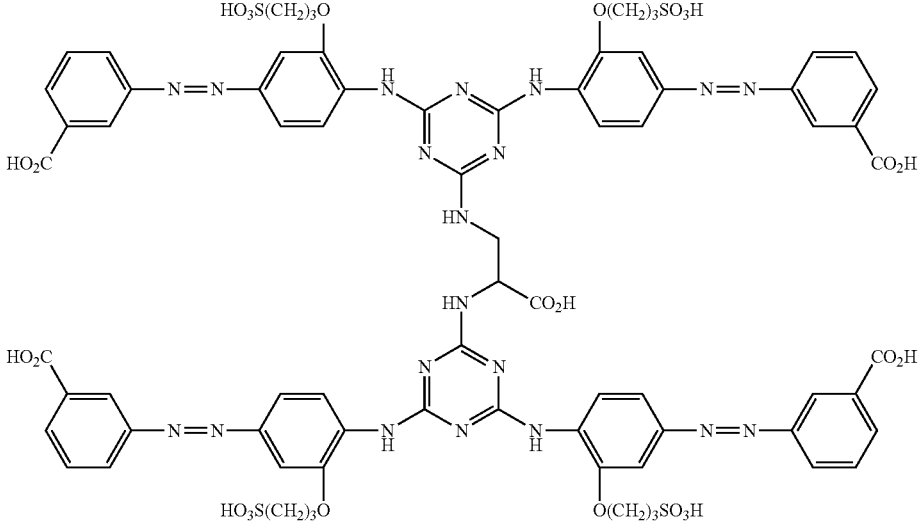 |

The colorant of Formula (4) may be isolated as a solid free acid by adding an inorganic acid such as hydrochloric acid and the like after a coupling reaction is completed, and it is possible to remove inorganic salts contained as impurities (inorganic impurities), for example, sodium chloride, sodium sulfate and the like by washing the obtained solid of the obtained free acid with water or, for example, acidic water such as hydrochloric acid water, and the like.

For the free acid of the colorant of the present invention obtained as described above, it is possible to obtain a solution of the salt of the corresponding colorant may be obtained by treating the wet cake obtained in the manner as described above with a desired inorganic or organic base in water, as described above, and when a colorant solution of an ink, in particularly, an inkjet ink is desired to be prepared, an aqueous medium may also be used instead of water. Meanwhile, the aqueous medium usually means a mixed solution of an aqueous organic solvent and water. However, even though a compound is not usually classified into an organic solvent, the compound may be used as a medium for the aforementioned base treatment, in which when the compound is prepared into an aqueous solution by mixing with water in the same manner as inlike, for example, urea and the like, the aqueous solution to improves the solubility of the dye and does not impair the ink composition of the present invention, even though the compound is not usually classified into an organic solvent. Therefore, the compound including an aqueous solution of the material is denoted as an aqueous medium. Meanwhile, urea is generally classified into a dye dissolving agent in ink compositions.

Examples of the inorganic base include hydroxide of an alkali metal, such as lithium hydroxide, sodium hydroxide, potassium hydroxide and the like; or carbonate of an alkali metal, such as lithium carbonate, sodium carbonate, potassium carbonate and the like, and ammonium hydroxide and the like.

Examples of the organic base include salts of the organic amine represented by Formula (4-A), for example, salts and the like of alkanolamine, such as diethanolamine and triethanolamine, but are not limited thereto.

Formula (5)

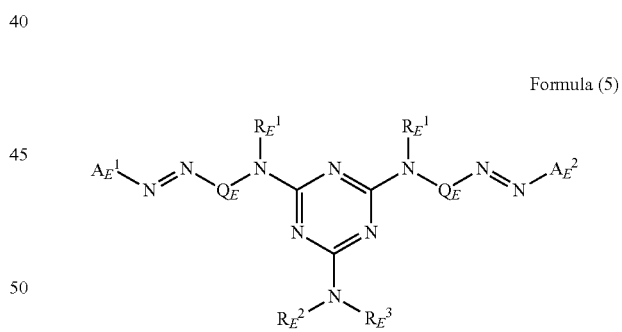

(In Formula (5), $A_E^1$ and $A_E^2$ are each independently a phenyl group or a naphthyl group, which may be substituted, each $Q_E$ is independently a phenylene group which may be substituted, each $R_E^1$ is independently H, or an alkyl group which may be substituted, $R_E^2$ is H, or an alkyl group which may be substituted; and $R_E^3$ is an alkyl group having a sulfo group, provided that the compound of Formula (5) has at least one carboxylic acid group, and the compound of Formula (5) is not Formula (B-1):

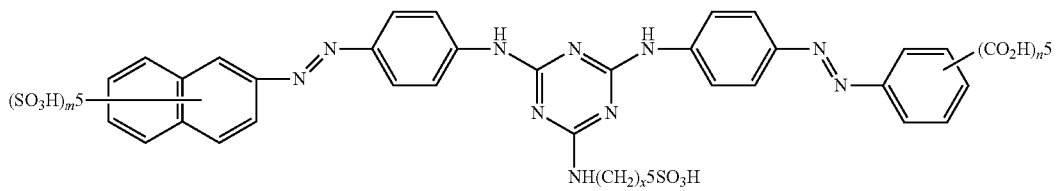

Here, a compound in which $m^5$ is 1 or 2; $n^5$ is 1 or 2; and $x^5$ is 2 to 4.)

In one specific examples of Formula (5), $A_E^1$ and $A_E^2$ are the same as each other.

In further specific examples of Formula (5), $A_E^1$ and $A_E^2$ are different from each other.

In suitable specific examples thereof, one of $A_E^1$ and $A_E^2$ is a naphthyl group which may be substituted, and the other is a phenyl group which may be substituted.

In other specific examples thereof, one of $A_E^1$ and $A_E^2$ has at least one carboxylic acid group, and the other does not include a carboxylic acid group.

In the compound of Formula (B-1), $m^5$, $n^5$, and $x^5$ are preferably 2.

Preferred salts are alkali metal salts (in particularly, lithium, sodium, and potassium salts), ammonium and substituted ammonium salts, and mixtures thereof. Particularly preferred salts are sodium, potassium, and lithium salts, salts having ammonium and volatile amines, and mixtures thereof. Lithium salts have good solubility, low toxicity, and a low tendency to clog inkjet nozzles, and thus form an ink which is particularly stable in storage.

The present compound may be converted into a desired salt using a known technology. For example, an alkali metal salt of the compound may be converted into ammonium or a substituted ammonium salt by dissolving the alkali metal salt of the compound in water, acidifying the resulting solution using an inorganic acid, and adjusting the pH of the solution to pH 9 to 9.5 using ammonia or amine to remove akali metal cations by dialysis or using an ion exchange resin.

Examples of ammines, which may be used in order to form these salts, include methylamine, dimethylamine, trimethylamine, ethylamine, n-propylamine, iso-propylamine, n-butylamine, iso-butylamine, sec-butylamine, tert-butylamine, piperidine, pyridine, morpholine, allylamine, diethylamine, triethylamine, tetramethyl amine, and mixtures thereof. It is not essentially required that the dye is in the form of completely an ammonium salt or a substituted ammonium salt, and it is effective that the dye is a mixed alkali metal and ammonium salt or a substituted ammonium salt, and particularly, at least 50% or the cation is ammonium or a substituted ammonium ion.

The aforementioned compound is preferably a yellow dye.

The compound of Formula (5) may be synthesized by the method described in, for example, Japanese National Publication of International Patent Application No. 2005-533147.

Formula (6)

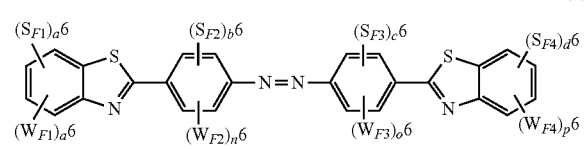

(In Formula (6), each of $S_{F1}$, $S_{F2}$, $S_{F3}$, and $S_{F4}$ is independently a substituent other than a water-dispersible substituent; each of $W_{F1}$, $W_{F2}$, $W_{F3}$, and $W_{F4}$ is independently a water-dispersible substituent; $a^6$, $b^6$, $c^6$, and $d^6$ are each independently 0 to 4; and $m^6$, $n^6$, $o^6$, and $p^6$ are each independently 0 to 4;

($a^6$+$m^6$) has a value of 0 to 4;
($b^6$+$n^6$) has a value of 0 to 4;
($c^6$+$o^6$) has a value of 0 to 4;
($d^6$+$p^6$) has a value of 0 to 4; and
($n^6$+$o^6$) has a value of 1 to 8)

The water-dispersible substituent represented by $W_{F1}$, $W_{F2}$, $W_{F3}$, and $W_{F4}$ may be any substituent which tends to promote the dispersibility of the compound of Formula (6) or a salt thereof in a liquid medium including water. A particularly preferred substituent thereof tends to promote the dispersibility of the compound of Formula (6) in water.

Preferably, the water-dispersible substituent is or includes a non-ionic and/or ionic group, more preferably, the water-dispersible substituent is or includes an ionic group, and further particularly preferably, the water-dispersible substituent is or includes an anionic group. Examples of the nonionic water-dispersible group include hydroxyl, polyethylene oxy, and unsubstituted sulfonamide (—$SO_2NH_2$) groups.

Preferred examples of the anionic water-dispersible group include phosphate, carboxyl, and sulfo groups. When used in the form of a free acid, these groups are carboxyl acid (—$CO_2H$), sulfonic acid (—$SO_3H$), and phosphonic acid (—$PO_3H_2$).

In an aspect, the water-dispersible group substituent may include an alkyl group having 1 to 4 carbon atoms and one or more water-dispersible groups, in and particularly, water-dispersible groups selected from sulfo, phosphate, carboxyl, hydroxyl, and polyethylene oxy groups.

It is preferred that all of the water-dispersible substituents represented by $W_{F1}$, $W_{F2}$, $W_{F3}$ and $W_{F4}$ are each independently selected from phosphate, carboxyl, and sulfo substituents, and it is more preferred that all of the water-dispersible substituents are each independently selected from carboxyl and sulfo substituents. It is particularly preferred that all of the water-dispersible substituents are a sulfo substituent.

Preferably, no group represented by $W_{F1}$, $W_{F2}$, $W_{F3}$ and $W_{F4}$ is a group represented by Formula —$SO_2NH$-$G_F$ ($G_F$ represents a substituted aryl (particularly phenyl) group which imparts water-dispersibility). It is particularly preferred that $G_F$ is not substituted with any thiol group. Those groups are unstable in hydrolysis and oxidation.

Preferably, no group represented by $W_{F1}$, $W_{F2}$, $W_{F3}$ and $W_{F4}$ is a cationic group. Preferably, the compound of Formula (6) does not have a cationic group that is covalently bonded.

The compound of Formula (6) or a salt thereof may have one or more water-dispersible substituents. In this case, the water-dispersible substituent may be another type of water-dispersible substituent of another type. For example, the compound of Formula (6) or a salt thereof may have both sulfo and carboxyl substituents. However, it is preferred that all of the water-dispersible substituents are the same as each other.

$(n^6+o^6)$ is preferably 1 to 4, and more preferably 2, and particularly preferably, $n^6=1$ and $o^6=1$.

Preferably, at least one of the water-dispersible substituents collectively represented by $W_{F2}$ and $W_{F3}$ is at the ortho position with respect to an azo group.

More preferably, at least one of the water-dispersible substituents represented by $W_{F2}$ is at the ortho position with respect to an azo group which is bonded to a phenylene ring, and at least one of the water-dispersible substituents represented by $W_{F3}$ is at the ortho position with respect to an azo group which is bonded to another phenylene ring.

In an aspect, $(m^6+p^6)$ is 1 to 4, and in this aspect, it is preferred that $m^6=1$ and $p^6=1$.

Preferably, $(m^6+n^6+o^6+p^6)$ is 1 to 4, more preferably 2 to 4, and particularly, 2 or 4. The condition imparts particularly good solubility characteristics especially to a water-based ink.

Any substituent represented by $S_{F1}$, $S_{F2}$, $S_{F3}$ and $S_{F4}$ may be any substituent other than the aforementioned water-dispersible substituents.

An arbitrary preferred substituent includes alkyl, alkoxy, amide, ester, ketone and thioether, halogen, nitro, cyano, azo and $CF_3$ groups, which may be substituted.

Preferably, the alkyl group which may be substituted is an alkyl group having 1 to 8 carbon atoms, which may be substituted, more preferably an alkyl group having 1 to 4 carbon atoms, which may be substituted, and particularly, an unsubstituted methyl. Preferably, the alkoxy group which may be substituted is an alkoxy group having 1 to 8 carbon atoms, which may be substituted, and more preferably an alkoxy group having 1 to 4 carbon atoms, which may be substituted.

Preferably, an amide group which may be substituted has a group having Formulas —$NHC(O)NR_F^1R_F^2$, —$C(O)NR_F^1R_F^2$, —$S(O)_2NR_F^1R_F^2$ or —$NHC(O)R_F^3$, here, $R_F^1$, $R_F^2$ and $R_F^3$ are each independently H, or alkyl, aryl or heteroaryl, which may be substituted, or $R_F^1$ and $R_F^2$ form a 5- to 6-membered ring (for example, a piperidine, pyrrolidone, pyridine, piperidine, or morpholine ring) which may be substituted, with nitrogen atoms to which these groups are bonded. In the case of a —$S(O)_2NR_F^1R_F^2$ group, $R_F^1$ and $R_F^2$ are not simultaneously H.

A preferred ester group which may be substituted has Formula —$C(O)OR_F^4$ or —$S(O)_2OR_F^4$, and here, $R_F^4$ is alkyl, aryl, or heteroaryl which may be substituted.

A preferred ketone group which may be substituted has Formula —$C(O)R_F^4$, and here, $R_F^4$ is the same as the definition described above.

A preferred thioether group which may be substituted has Formula —$SR_F^4$, and here, $R_F^4$ is the same as the definition described above.

When one or more of the groups represented by $R_F^1$, $R_F^2$, $R_F^3$ and $R_F^4$ are an alkyl group which may be substituted, each group is independently an alkyl group having 1 to 8 carbon atoms, which may be substituted, and more preferably an alkyl group having 1 to 4 carbon atoms, which may be substituted.

When one or more of the groups represented by $R_F^1$, $R_F^2$, $R_F^3$ and $R_F^4$ are an aryl group which may be substituted, each group is independently a phenyl group or a naphthyl group, which may be substituted, and more preferably a phenyl group, which may be substituted.

The aryl, heteroaryl, alkyl, alkoxy, amide, ester, ketone or thioether substituents, which may be substituted, may be substituted with one or more halogens, and alkoxy having 1 to 4 carbon atoms, cyano, and nitro groups.

A preferred halo group is Cl, F and Br.

Preferably, $(a^6+b^6+c^6+d^6)$ is 0 to 4, and more preferably 0 to 2.

Preferably, $(m^6+n^6+o^6+p^6) \geq (a^6+b^6+c^6+d^6)$, and more preferably, $(m^6+n^6+o^6+p)-(a^6+b^6+c^6+d^6)$ is at least 1, and particularly at least 2. In this manner, the water-dispersible group provides the compound of Formula (6) or a salt thereof with the overall water-dispersibility (particularly water solubility) even when a non-water-dispersible substituent is present.

Preferably, $(m^6+n^6+o^6+p^6)-(a+b^6+c^6+d^6)$ is at most 4, and more preferably at most 2. In this manner, the water resistance fastness of the compound or a salt thereof has been improved. In preferred aspects, the compound of Formula (6) or a salt thereof is the compound of Formula (6-2) or (6-3), or a salt thereof:

Formula (6-2)

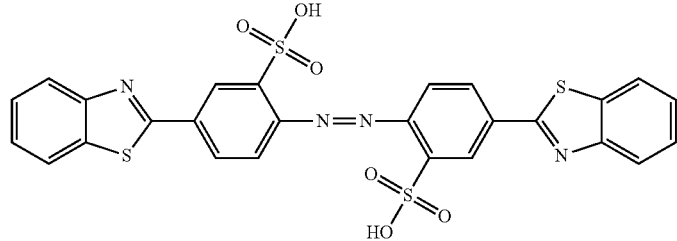

Formula (6-3)

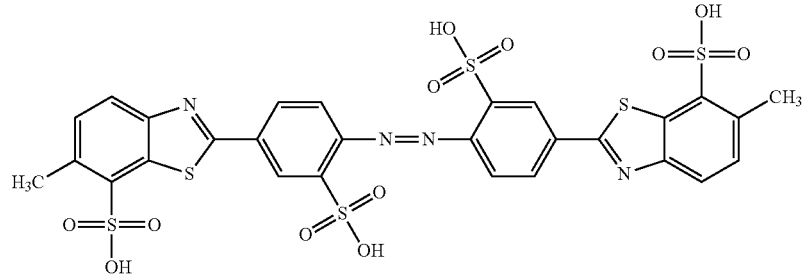

The compound of Formula (6-2) or (6-3) has particularly high solubility, good ozone resistance and light resistance fastness, and is particularly suitable for the requirements of inkjet printing ink.

alkyl having 1 to 6 carbon atoms), which is substituted with one, two or three (more preferably one) groups selected from —$CO_2H$, —$SO_3H$, —$PO_3H_2$ or —$CO_2H$, —$SO_3H$ and —$PO_3H^2$.

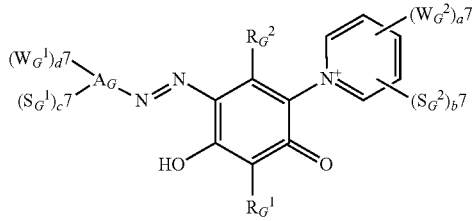

Formula (7)

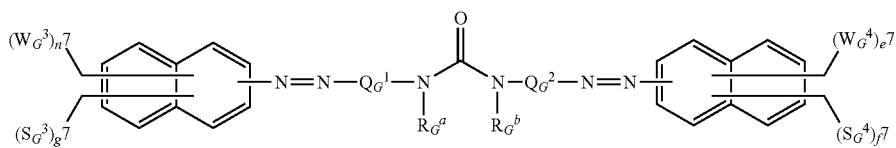

Formula (8)

(In Formulas (7) and (8), $A_G$ is an aryl or heteroaryl group, or a group containing an aryl or heteroaryl group; $Q_G^1$ and $Q_G^2$ are each independently a phenylene group which may be substituted; $R_G^1$, $R_G^2$, $R_G^a$, and $R_G^b$ are each independently H, or an alkyl group which may be substituted, an aryl group which may be substituted, or an aryl alkyl group which may be substituted; each of $W_G^1$, $W_G^2$, $W_G^3$, and $W_G^4$ is independently —$CO_2H$, —$SO_3H$, or —$PO_3H_2$ group, or an alkyl group which is substituted with one or more groups selected from —$CO_2H$, —$SO_3H$, and —$PO_3H_2$; each of $S_G^1$, $S_G^2$, $S_G^3$, and $S_G^4$ is independently a substituent other than a group defined as $W_G^1$, $W_G^2$, $W_G^3$, and $W_G^4$; $a^7$ and $d^7$ are each independently 1 to 45; $a^7$ and $d^7$ are each independently 1 to 5; $b^7$ and $c^7$ are each independently 0 to 4;

($a^7+b^7$) is a value of 1 to 5;

($c^7+d^7$) is a value of 1 to 5; $e^7$ and $h^7$ are each independently 1 to 7; $f^7$ and $g^7$ are each independently 0 to 6;

($e^7+f^7$) has a value of 1 to 7; and ($g^7+h^7$) has a value of 1 to 7.)

In Formula (7), $b^7$ and $c^7$ are each independently preferably 0, 1 or 2, and more preferably 0 or 1.

In Formula (7), $a^7$ and $d^7$ are each independently preferably 1, 2 or 3, and more preferably 1 or 2.

($a^7+b^7$) is preferably 1, 2 or 3, and more preferably 1 or 2. ($c^7+d^7$) is preferably 1, 2 or 3, and more preferably 2 or 3.

It is preferred that the compound of Formula (7) or a salt thereof is a monoazo compound (that is, including only one azo (—N═N—) group).

In an aspect, $A_G$ is an aryl group, more preferably a naphthyl group or a phenyl group, and particularly a phenyl group.

In another aspect, $A_G$ is an indanyl group, and more preferably an indanyl group of Formula (1a):

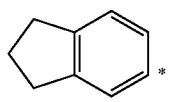

Formula (1a)

(In the formula, the asterisk symbol represents the bonding position of the azo group in the compound of Formula (7)).

Preferably, each $W_G^1$ and each $W_G^2$ are independently an alkyl group having 1 to 10 carbon atoms (more preferably an More preferably, each $W_G^1$ and each $W_G^2$ are independently —$CO_2H$, —$SO_3H$, or an alkyl having 1 to 6 carbon atoms, which is substituted with —$CO_2H$ or —$SO_3H$. It is particularly preferred that each $W_G^1$ is independently —$CO_2H$ or —$SO_3H$.

It is particularly preferred that each $W_{G2}$ is —$CO_2H$.

Preferably, at least one of $W_G^1$ is bonded at the ortho position with respect to an azo group (—N═N—).

Preferably, $S_G^1$ and $S_G^2$ are each independently aryl which may be substituted, aralkyl which may be substituted, and alkyl which may be substituted with a group other than halogen (particularly, F and Cl), nitro, cyano, —$CF_3$, —$OR_G^3$, —$NR_G^4R_G^5$, —$SR_G^6$, —$C(O)R_G^7$, —$C(O)OR_G^8$, —$SO_2R_G^9$, —$SOR_G^{10}$; —$SO_3H$, —$CO_2H$ and —$PO_3H_2$; or a group of Formula (1b), and here, $R_G^3$ and $R_G^6$ are each independently H, an alkyl which may be substituted, or an aryl which may be substituted;

$R_G^4$ and $R_G^5$ are each independently H, an alkyl which may be substituted, an aryl which may be substituted, —CO (an alkyl having 1 to 6 carbon atoms), or —$CONH_2$, or $R_G^4$ and $R_G^5$ form a 5- or 6-membered ring with nitrogen to which these groups are bonded;

$R_G^7$, $R_G^8$, $R_G^9$, and $R_G^{10}$ are each independently an alkyl which may be substituted or an aryl which may be substituted;

the group of Formula (1b) is

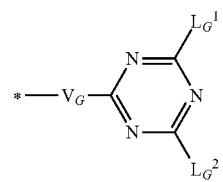

Formula (1b)

(In the formula, $L_G^1$ and $L_G^2$ are each independently —$OR_G^{11}$, —$SR_G^{12}$ or —$NR_G^{13}R_G^{14}$; $R_G^{11}$ and $R_G^{12}$ are each independently H, an aryl group which may be substituted, or an aryl group which may be substituted; $R_G^{13}$ and $R_G^{14}$ are each independently H, an aryl group which may be substituted, an alkyl group which may be substituted, —CO (an alkyl group having 1 to 6 carbon atoms) or —$CONH_2$, or $R_G^{13}$ and $R_G^{14}$ form a morpholine or piperazine ring, which may be substituted, with nitrogen to which these groups are bonded; $V_G$ is —N($R_G^{15}$)— or —S—; $R_G^{15}$ is H, an alkyl group which may be substituted, or an aryl group which may be substituted; and the asterisk symbol (*) represents a bonding position of the group represented by $A_G$.

In preferred aspects, $S_G^1$ and $S_G^2$ are each independently an aryl group which may be substituted, an aralkyl group which may be substituted, and an alkyl group which may be substituted with a group other than halogen (particularly, F and Cl), a nitro group, a cyano group, —$CF_3$, —$OR_G^3$, —$NR_G^4R_G^5$, —$SR_G^6$, —$C(O)R_G^7$, —$C(O)OR_G^8$, —$SO_2R_G^9$, —$SOR_G^{10}$, —$SO_3H$, —$CO_2H$ and —$PO_3H_2$, and here, $R_G^3$, $R_G^4$, $R_G^5$, $R_G^6$, $R_G^7$, $R_G^8$, $R_G^9$ and $R_G^{10}$ are the same as the definition described above.

Preferably, $R_G^7$, $R_G^8$, $R_G^9$ and $R_G^{10}$ are each independently an alkyl group which may be substituted.

When any one of $S_G^1$ and $S_G^2$ is an alkyl group which may be substituted, the group is preferably an alkyl group having 1 to 10 carbon atoms, which may be substituted, and more preferably —OH, a nitro group, a cyano group, halogen (particularly, F and Cl), an amino group, —NH (a hydroxyalkyl group having 1 to 4 carbon atoms), or an alkyl group having 1 to 6 carbon atoms, which may be substituted with —NH (an alkyl group having 1 to 4 carbon atoms).

When any one of $R_G^3$, $R_G^4$, $R_G^5$, $R_G^6$, $R_G^7$, $R_G^8$, $R_G^9$, $R_G^{10}$, $R_G^{11}$, $R_G^{12}$, $R_G^{13}$, $R_G^{14}$ and $R_G^{15}$ is an alkyl group which may be substituted, the group is preferably an alkyl group having 1 to 10 carbon atoms, which may be substituted, and more preferably an alkyl group having 1 to 6 carbon atoms, which may be substituted. A preferred arbitrary substituent is —OH, a nitro group, a cyano group, an amino group and halogen (particularly, F or Cl), and Cl and —OH are more preferred.

When any one of $R_G^3$, $R_G^4$, $R_G^5$, $R_G^6$, $R_G^7$, $R_G^8$, $R_G^9$, $R_G^{10}$, $R_G^{11}$, $R_G^{12}$, $R_G^{13}$, $R_G^{14}$ and $R_G^{15}$ is an aryl group which may be substituted, the group is preferably a phenyl group which may be substituted or a naphthyl group which may be substituted, and particularly a phenyl group which may be substituted. A preferred arbitrary substituent is an alkoxy group having 1 to 4 carbon atoms, (a hydroxyalkoxy group having 1 to 4 carbon atoms) -an alkoxy group having 1 to 4 carbon atoms-, —OH, —$CO_2H$, —$SO_3H$, —$CF_3$, an amino group, —NH (an alkyl group having 1 to 4 carbon atoms), —NH (a hydroxyalkyl group having 1 to 4 carbon atoms), —NH (—CO (an alkyl group having 1 to 4 carbon atoms)), halogen (particularly, F or Cl), nitro, —CO (an alkyl group having 1 to 4 carbon atoms), —$SO_2$ (an alkyl group having 1 to 4 carbon atoms), and an alkyl group having 1 to 4 carbon atoms, which may be substituted with —OH, —$CO_2H$ and —$SO_3H$.

When $R_G^4$ and $R_G^5$ form a 5- or 6-membered ring with nitrogen to which these groups are bonded, it is preferred that the ring is a morpholine which may be substituted or a piperazine which may be substituted.

A preferred arbitrary substituent, which is bonded to a ring which $R_G^4$ and $R_G^5$ may form with nitrogen to which these groups are bonded, is selected from —OH, —$CO_2H$, —$SO_3H$, an alkoxy group having 1 to 4 carbon atoms, and an alkyl group9group having 1 to 4 carbon atoms, which may be substituted with —OH, —$CO_2H$ and —$SO_3H$.

$R_G^7$, $R_G^8$, $R_G^9$ and $R_G^{10}$ are each independently preferably an alkyl group having 1 to 4 carbon atoms, and more preferably a methyl group or an ethyl group.

When any one of $S_G^1$ and $S_G^2$ is an aralkyl group, the aralkyl group is preferably a phenyl group-(an alkylene group)-, which may be substituted, or a naphthyl group-(an alkylene group)-, which may be substituted, and more preferably a phenyl group-(an alkylene group having 1 to 6 carbon atoms)-, which may be substituted, or a naphthyl group-(an alkylene group having 1 to 6 carbon atoms)-, which may be substituted. A preferred arbitrary substituent, which is bonded to an aralkyl group, is those enumerated above with respect to an aryl group, and an alkyl group having 1 to 4 carbon atoms, an alkoxy group having 1 to 4 carbon atoms, —$SO_3H$, —$CO_2H$, an amino group, a nitro group, and F or Cl are more preferred.

Preferably, each $S_G^1$ and each $S_G^2$ do not have —$CO_2H$, —$SO_3H$, and —$PO_3H_2$ groups. Preferably, each of $S_G^1$ and $S_G^2$ is independently an alkyl group having 1 to 4 carbon atoms, or an alkoxy group having 1 to 4 carbon atoms.

Preferably, $c^7$ is 0 to 3, and more preferably, $c^7$ is 0.

Preferably, $b^7$ is 0 to 3, and more preferably, $b^7$ is 0.

Preferably, $R_G^1$ is H, an alkyl group having 1 to 10 carbon atoms, which may be substituted, a phenyl group which may be substituted, or a phenyl group-(an alkylene group having 1 to 6 carbon atoms)-which may be substituted, more preferably H, a phenyl group, or an alkyl group having 1 to 6 carbon atoms, which may be substituted with OH, —$SO_3H$ or —$CO_2H$, and particularly H or an alkyl group having 1 to 4 carbon atoms, and among them, $R_G^1$ is particularly H.

Preferably, $R_G^2$ is an alkyl group having 1 to 10 carbon atoms, which may be substituted, or a phenyl group which may be substituted, more preferably a phenyl group, or an alkyl group having 1 to 6 carbon atoms, which may be substituted with —OH, —$CO_{21}$ or —$SO_3H$, and particularly an alkyl group having 1 to 4 carbon atoms, and among them, $R_G^2$ is particularly a methyl group or an ethyl group.

It is most preferred that $R_G^2$ is a methyl group.

In the preferred compound of Formula (7) or a salt thereof, $A_G$ is the same as the definition described above;

each $W_G^1$ and each $W_G^2$ are independently —$CO_2H$, —$SO_3H$, or an alkyl having 1 to 6 carbon atoms, which is substituted with —$CO_2H$ or —$SO_3H$ group;

each of $S_G^1$ and $S_G^2$ is independently an alkyl group having 1 to 6 carbon atoms, a phenyl group, a nitro group, halo (particularly, F and Cl), a cyano group, —$CF_3$, —$NH_2$, an alkoxy group having 1 to 6 carbon atoms, a —$SC_{1-6}$ alkyl group (an alkylthio group having 1 to 6 carbon atoms), a —$C_{1-6}$ alkyl group substituted with —OH (an alkyl group having 1 to 6 carbon atoms, which is substituted with a hydroxyl group), or a —$NHC(O)C_{1-6}$ alkyl group (an alkylamide group having 1 to 6 carbon atoms at the alkyl moiety);

$R_G^1$ is H, or an alkyl group having 1 to 6 carbon atoms, which may be substituted with —OH, —$SO_3H$, or —$CO_2H$;

$R_G^2$ is an alkyl group having 1 to 4 carbon atoms;

$a^7$ and $d^7$ are each independently 1 or 2; and $b^7$ and $c^7$ are each independently 0, 1, or 2.

Preferably, $W_G^2$ is —$CO_2H$.

Preferably, each $W_G^1$ is independently —$CO_2H$ or —$SO_3H$.

Preferably, $R_G^1$ is H or an alkyl group having 1 to 4 carbon atoms, and more preferably H.

Preferably, $R_G^2$ is a methyl group or an ethyl group, and more preferably a methyl group.

It is particularly preferred that $a^7$ is 1, and $W_G^2$ is —$CO_2H$ which is bonded to a pyridinium ring at the 3rd position.

Preferably, $A_G$ is a phenyl group or an indanyl group.

The compound of Formula (7) or a salt thereof is the compound of Formula (7-3) or a salt thereof.

Formula (7-3)

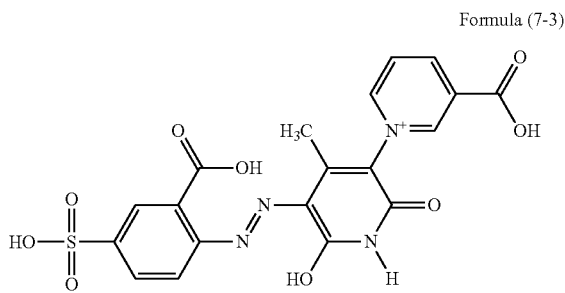 [SMILES: Cc1c(/N=N/c2ccc(S(=O)(=O)O)cc2C(=O)O)c(O)[nH]c(=O)c1-[n+]1cccc(C(=O)O)c1]

The compound of Formula (7-3) has particularly bright yellow and high saturation, and also shows exhibits particularly good light resistance fastness.

In an aspect, the compound of Formula (7) or a salt thereof is the compound of Formula (1c) or a salt thereof:

Formula (1c)

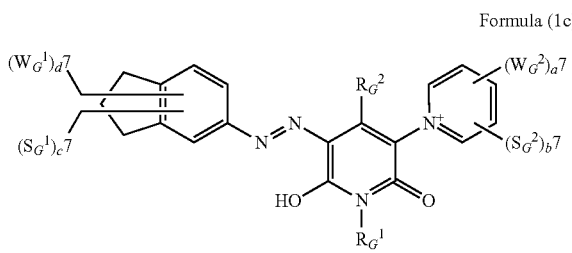

(In the formula, $W_G^1$, $W_G^2$, $S_G^1$, $S_G^2$, $R_G^1$ and $R_G^2$, and $a^7$, $b^7$, $c^7$ and $d^7$ are the same as the definition described above).

Preferably, $d^7$ is 1 to 3, $c^7$ is 0 to 3, and ($c^7+d^7$) is 1 to 3. In this aspect, it is preferred that all the groups represented by each $W_G^1$ and each $S_G^1$ are bonded to a benzyl ring present in the compound of Formula (1c).

Preferably, each $S_G^1$ is independently an alkyl group having 1 to 6 carbon atoms or an alkoxy group having 1 to 6 carbon atoms, which is each arbitrarily substituted with —OH.

In Formula (1c), it is preferred that $c^7$ is 0. Preferably, $d^7$ is 1 or 2.

In Formula (1c), it is particularly preferred that $c^7$ is 0, $a^7$ is 1 or 2, and at least one $W_G^1$ is at the ortho with respect to an azo group in Formula (1c).

The compound of Formula (7) or a salt thereof may be prepared by a synthesis method described in the fifth column of U.S. Pat. No. 6,488,752.

The compound of Formula (7-3) and a salt thereof may be prepared by the same method same as those described in Example 1 starting from the tenth column of U.S. Pat. No. 6,488,752.

It is preferred that the compound of Formula (8) or a salt thereof includes only two azo groups. Preferably, one or both of the naphthyl groups present in the compound of Formula (8) or a salt thereof is or are bonded at the 2-naphthyl position with respect to an azo group present in the compound of Formula (8).

Therefore, the preferred compound of Formula (8) or a salt thereof is the compound of Formula (2a) or a salt thereof.

Formula (2a)

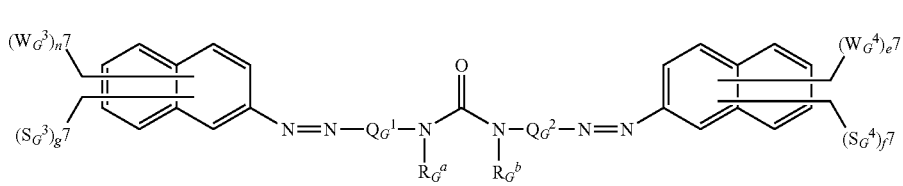

(In the formula, $W_G^1$, $W_G^2$, $S_G^1$, $S_G^2$, $R_G^1$ and $R_G^2$, and $a^7$, $b^7$, $c^7$ and $d^7$ are the same as the definition described above.)

It is preferred that $Q_G^1$ is a phenylene group which is para connected to the —N=N— group and the —$NR_G^a$— group present in the compound of Formula (2a).

Similarly, it is preferred that $Q_G^2$ is a phenylene group which is para connected to the —N=N— group and the —$NR_G^b$— group present in the compound of Formula (2a). $Q_G^1$ and $Q_G^2$ may be substituted with 1 to 4 groups (more preferably 1 or 2 groups) each independently selected from any one group of those as defined above for $W_G^1$ and $S_G^1$.

Preferably, $Q_G^1$ and $Q_G^2$ do not include any of —$CO_2H$, —$SO_3H$ and —$PO_3H_2$ groups.

Preferably, $Q_G^1$ and $Q_G^2$ are each independently substituted with 1 or 2 groups selected from an alkyl group having 1 to 6 carbon atoms, an alkoxy group having 1 to 6 carbon atoms, a —$C(O)OC_{1-6}$ alkyl group (an alkylester group having 1 to 6 carbon atoms at the alkyl moiety), and a —$C(O)NHC_{1-6}$ alkyl group (an alkylamide group having 1 to 6 carbon atoms at the alkyl moiety).

Preferably, $Q_G^1$ and $Q_G^2$ are substituted with at least one alkyl group having 1 to 6 carbon atoms, and more preferably with at least one methyl group. Preferably, an alkyl group having 1 to 6 carbon atoms is present in $Q^1$ and $Q^2$ at the ortho position with respect to an azo (—N=N—) group in the compound of Formula (2a).

Preferably, $Q_G^1$ is the group of Formula (2b).

Formula (2b)

(In the formula, $R_G^{16}$ is H or a methyl group; the asterisk symbol (*) represents the bonding position of the azo group, and the number (#) symbol represents the bonding position of the —$NR_G^a$— group present in the compound of Formula (2a).) Similarly, $Q_G^2$ is preferably the group of Formula (2c):

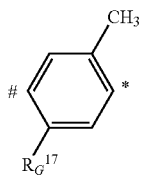

Formula (2c)

(In the formula, $R_G^{17}$ is H or a methyl group; the asterisk symbol (*) represents the bonding position of the azo group, and the number (#) symbol represents the bonding position of —$NR_G^b$— group present in the compound of Formula (2a).) $R_G^a$ and $R_G^b$ may each independently be any of the same groups as the groups those defined above for $R_G^1$.

Preferably, $R_G^a$ and $R_G^b$ are each independently H or an alkyl group having 1 to 6 carbon atoms, which may be substituted with 1 to 3 (particularly 1) —$CO_2H$, —OH or —$SO_3H$.

Preferably, $R_G^a$ and $R_G^b$ are H.

Preferably, $h^7$ is 1, 2 or 3, and more preferably 2.

Preferably, $e^7$ is 1, 2 or 3, and more preferably 2.

When $W_G^3$ or $W_G^4$ is an alkyl group substituted with one or more groups selected from —$CO_2H$, —$SO_3H$, and —$PO_3H_2$, it is preferred that the alkyl group is an alkyl group having 1 to 6 carbon atoms.

Preferably, $W_G^3$ and $W_G^4$ are each independently —$CO_2H$, —$PO_3H_2$ or —$SO_3H$, and more preferably, $W_G^3$ and $W_G^4$ are —$SO_3H$. Preferably, one or both of the naphthyl groups present in the compound of Formula (8) or a salt thereof is or are the group of Formula (2d).

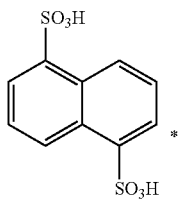

Formula (2d)

(In the formula, the asterisk symbol (*) represents the bonding position of an azo group in the compound of Formula (8).)

Preferably, $f^7$ is 0, 1 or 2, and more preferably 0.

Preferably, $g^7$ is 0, 1 or 2, and more preferably 0.

Preferably, $f^7$ and $g^7$ are simultaneously 0.

$S_G^3$ and $S_G^4$ may each independently be the same groups as those defined above for $S_G^1$.

In the preferred compound of Formula (8) or a salt thereof, each of $W_G^1$ and $W_G^2$ is independently —$CO_2H$, —$PO_3H_2$ or —$SO_3H$;

each of $S_G^3$ and $S_G^4$ is independently an alkyl having 1 to 4 carbon atoms, or an alkoxy having 1 to 4 carbon atoms:

$e^7$ and $h^7$ are each independently 1, 2 or 3; and $f^7$ and $g^7$ are each independently 0, 1, or 2.

It is most preferred that the compound of Formula (8) or a salt thereof is the compound of Formula (8-4) or a salt thereof.

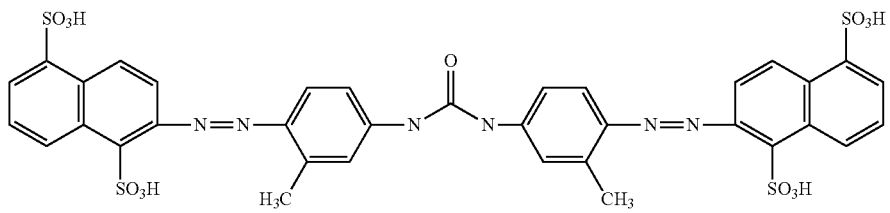

Formula (8-4)

The compounds represented by Formulas (1) to (8) have preferably a maximum absorption wavelength (λmax) of 380 nm to 490 nm in an aqueous solution, more preferably a λmax of 400 nm to 480 nm, and particularly preferably a λmax of 420 nm to 460 nm, in an aqueous solution, from the viewpoint of color reproducibility.

Further, the sum (% by mass) of the contents of the first dye and the third dye in the ink is preferably 1.0% by mass to 20.0% by mass based on the total mass of the ink. In addition, the sum (% by mass) of these contents is particularly preferably 1.5% by mass to 6.0% by mass. By setting the sum thereof within the range, light resistance, ozone resistance, and water resistance of an image to be formed become excellent, and thus there is a tendency that the color tone is also excellent and good inkjet characteristics may be obtained.

By using the aforementioned first dye and third dye at a specific mass ratio, the synergistic effect is exhibited, and thus the reason why it is possible to improve light resistance, ozone resistance, color tone, permeability into an image-receiving paper, and bronzing of printed matters at a level more than expected is not obviously clear, but is presumed as follows by the present inventors.

The compound represented by Formula (Y) contains a lot of heteroatoms, and thus intermolecular interactions easily work and solubility in water is originally low. For that reason, when ink containing these compounds is applied to a recording medium, association or aggregation of the aqueous dye or interaction with an image-receiving layer constituting material easily occurs immediately from that moment. Association or aggregation tends to improve fastness properties of the aqueous dye on the recording medium which forms an image, which is preferred, but excessive association or aggregation reduces the original light resistance ability of a compound, or extremely inhibits permeability into an image-receiving paper in some cases. In contrast, since the compounds represented by Formulas (1) to (8) form an optimal state of association or aggregation with regard to fastness properties or permeability and appropriately inhibit interaction with an image-receiving layer constituting material, it is thought that even permeability or bronze resistance has been accordingly improved.

Meanwhile, the inkjet ink of the present invention is a yellow ink, and the preferred color tone as a yellow ink means the following two cases. That is, it is meant that an image, which is formed using only the yellow ink, does not display red tint or green tint. Further, in addition to this, when an image with a secondary color, which is formed using the yellow ink, that is, an image with a red region or a green region is formed, it is meant that the image has a color tone without greatly losing the color regions of both the red region and the green region. More specifically, it is preferred that a hue angle of the image formed using only the yellow ink is 85 to 92, or 88 to 90°.

In the ink composition of the present invention (preferably the ink for inkjet recording), the azo dye represented by Formula (Y) and the third dye represented by any one of Formulas (1) to (8) may be used in combination with another dye in order to adjust the color tone or maintain the balance of performance. Further, for the purpose of obtaining a full color image, the ink composition of the present invention may be used in combination with an ink including another dye or colorant. Examples of the dye or colorant which may be used in combination therewith include those described as follows.

Examples of the yellow dye include aryl or heteryl azo dyes having, for example, phenols, naphthols, anilines, pyrazolones, pyridones, and open-chain type active methylene compounds as a coupling component; azomethine dyes having, for example, open-chain type active methylene compounds as a coupling component; methine dyes such as, for example, benzylidene dyes, monomethine oxonol dyes, or the like; and quinone-based dyes such as, for example, naphthoquinone dyes, anthraquinone dyes, or the like, and examples of the other dye species include quinophthalone dyes, nitro•nitroso dyes, acridine dyes, acridinone dyes and the like. These dyes may be dyes that exhibit yellow only after a part of the chromophore is dissociated, and in that case, the counter cation may be an inorganic cation such as an alkali metal or ammonium, and an organic cation such pyridinium and a quaternary ammonium salt, and furthermore, may be a polymer cation having these compounds in the partial structure thereof.

Examples of the magenta dyes include aryl or heteryl azo dyes having, for example, phenols, naphthols, and anilines as a coupling component; azomethine dyes having, for example, pyrazolones and pyrazolotriazoles as a coupling component; methine dyes such as, for example, arylidene dyes, styryl dyes, merocyanine dyes, and oxonol dyes; carbonium dyes such as diphenylmethane dyes, triphenylmethane dyes, and xanthene dyes; quinone-based dyes such as, for example, naphthoquinone, anthraquinone, anthrapyridone and the like; condensed polycyclic dyes such as, for example, dioxazine dyes and the like, and the like. These dyes may be dyes that exhibit magenta only after a part of the chromophore is dissociated, and in that case, the counter cation may be an inorganic cation such as an alkali metal or ammonium, and an organic cation such pyridinium and a quaternary ammonium salt, and furthermore, may be a polymer cation having these cations in the partial structure thereof.

Examples of the cyan dyes include azomethine dyes such as, for example, indoaniline dyes and indophenol dyes; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; and aryl or heteryl azo dyes having, for example, phenols, naphthols, and anilines as a coupling component; and indigo-thioindigo dyes. These dyes may be dyes that exhibit cyan only after a part of the chromophore is dissociated, and in that case, the counter cation may be an inorganic cation such as an alkali metal or ammonium, and an organic cation such pyridinium and a quaternary ammonium salt, and furthermore, may be a polymer cation having these cations in the partial structure thereof.

Further, a black dye such as polyazo dyes and the like may also be used.

Examples of the aqueous dyes include direct dyes, acid dyes, edible dyes, basic dyes, reactive dyes and the like. Examples of the preferred aqueous dyes include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, and 247, C.I. Direct Violet 7, 9, 47, 48, 51, 66, 90, 93, 94, 95, 98, 100, and 101, C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163, C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, and 291, C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397, C.I. Acid Violet 5, 34, 43, 47, 48, 90, 103, and 126, C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, and 326, C.I. Acid Black 7, 24, 29, 48, 52:1, and 172, C.I. Reactive Red 3, 13, 17, 19, 21, 22, 23, 24, 29, 35, 37, 40, 41, 43, 45, 49, and 55, C.I. Reactive Violet 1, 3, 4, 5, 6, 7, 8, 9, 16, 17, 22, 23, 24, 26, 27, 33, and 34, C.I. Reactive Yellow 2, 3, 13, 14, 15, 17, 18, 23, 24, 25, 26, 27, 29, 35, 37, 41, and 42, C.I. Reactive Blue 2, 3, 5, 8, 10, 13, 14, 15, 17, 18, 19, 21, 25, 26, 27, 28, 29, and 38, C.I. Reactive Black 4, 5, 8, 14, 21, 23, 26, 31, 32, and 34, C.I. Basic Red 12, 13, 14, 15, 18, 22, 23, 24, 25, 27, 29, 35, 36, 38, 39, 45, and 46, C.I. Basic Violet 1, 2, 3, 7, 10, 15, 16, 20, 21, 25, 27, 28, 35, 37, 39, 40, and 48, C.I. Basic Yellow 1, 2, 4, 11, 13, 14, 15, 19, 21, 23, 24, 25, 28, 29, 32, 36, 39, and 40, C.I. Basic Blue 1, 3, 5, 7, 9, 22, 26, 41, 45, 46, 47, 54, 57, 60, 62, 65, 66, 69, and 71, C.I. Basic Black 8, Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, and 247, C.I. Direct Violet 7, 9, 47, 48, 51, 66, 90, 93, 94, 95, 98, 100, and 101, C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163, C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, and 291, C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397, C.I. Acid Violet 5, 34, 43, 47, 48, 90, 103, and 126, C.I.

Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326, C.I. Acid Black 7, 24, 29, 48, 52:1, 172, C.I. Reactive Red 3, 13, 17, 19, 21, 22, 23, 24, 29, 35, 37, 40, 41, 43, 45, 49, and 55, C.I. Reactive Violet 1, 3, 4, 5, 6, 7, 8, 9, 16, 17, 22, 23, 24, 26, 27, 33, and 34, C.I. Reactive Yellow 2, 3, 13, 14, 15, 17, 18, 23, 24, 25, 26, 27, 29, 35, 37, 41, and 42, C.I. Reactive Blue 2, 3, 5, 8, 10, 13, 14, 15, 17, 18, 19, 21, 25, 26, 27, 28, 29, and 38, C.I. Reactive Black 4, 5, 8, 14, 21, 23, 26, 31, 32, and 34, C.I. Basic Red 12, 13, 14, 15, 18, 22, 23, 24, 25, 27, 29, 35, 36, 38, 39, 45, and 46, C.I. Basic Violet 1, 2, 3, 7, 10, 15, 16, 20, 21, 25, 27, 28, 35, 37, 39, 40, and 48, C.I. Basic Yellow 1, 2, 4, 11, 13, 14, 15, 19, 21, 23, 24, 25, 28, 29, 32, 36, 39, and 40, C.I. Basic Blue 1, 3, 5, 7, 9, 22, 26, 41, 45, 46, 47, 54, 57, 60, 62, 65, 66, 69, and 71, C.I. Basic Black 8 and the like.

Further, in the ink of the present invention, pigment may also be used in combination.

As the pigment used in the present technology, it is possible to use pigments known described in various documents in addition to commercially available pigments. Examples of the documents include Colour Index (edited by The Society of Dyers and Colourists), "New Edition Pigment Handbook," edited by the Japanese Pigment Technology Society (published in 1989), "Latest Pigment Application Technology," CMC Publishing Co., Ltd. (published in 1986), "Printing Ink Technology," CMC Publishing Co., Ltd. (published in 1984), "Industrial Organic Pigments" co-written by W. Herbst & K. Hunger (VCH Verlagsgesellshaft, published in 1993), and the like. Specifically, examples of organic pigments include azo pigments (azo lake pigments, insoluble azo pigments, condensed azo pigments, and chelate azo pigments), polycyclic pigments (phthalocyanine-based pigments, anthraquinone-based pigments, perylene and perynone-based pigments, indigo-based pigments, quinacridone-based pigments, dioxazine-based pigments, isoindolinone-based pigments, quinophthalone-based pigments, diketopyrrolopyrrole-based pigments, and the like), dye lake pigments (lake pigments of acid or basic dyes), azine pigments, and the like, and examples of inorganic pigments include the yellow pigments of C.I. Pigment Yellow 34, 37, 42, 53 and the like, the red-based pigments of C.I. Pigment Red 101, 108 and the like, the blue-based pigments of C.I. Pigment Blue 27, 29, 17:1 and the like, the black-based pigments of C.I. Pigment Black 7, magnetite and the like, and the white-based pigments of C.I. Pigment White 4, 6, 18, 21 and the like.

As pigments color tones preferred for image formation, blue to cyan pigments are preferably phthalocyanine pigments, anthraquinone-based indanthrone pigments (for example, C.I. Pigment Blue 60 and the like), and dye lake pigment-based triarylcarbonium pigments, and particularly, most preferably phthalocyanine pigments (preferred examples thereof include copper phthalocyanines such as C.I. Pigment Blue 15:1, 15:2, 15:3, 15:4, 15:6 and the like, monochloro to low-chlorinated copper phthalocyanines, pigments described in European Patent No. 860475 as aluminum phthalocyanines, the metal-free phthalocyanine that is C.I. Pigment Blue 16, phthalocyanines containing Zn, Ni, and Ti as the respective central metals and the like, and among them, C.I. Pigment Blue 15:3 and 15:4 and the aluminum phthalocyanines are most preferred).

In red to violet pigments, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146, and 184) and the like, and among them, preferred examples thereof include C.I. Pigment Red 57:1, 146, and 184), quinacridone-based pigments (preferred examples thereof include C.I. Pigment Red 122, 192, 202, 207, and 209 and C.I. Pigment Violet 19 and 42, and among them, C.I. Pigment Red 122 is particularly preferred), dye lake pigment-based triarylcarbonium pigments (preferred examples include the xanthene-based pigments of C.I. Pigment Red 81:1 and C.I. Pigment Violet 1, 2, 3, 27, and 39), dioxazine-based pigments (for example, C.I. Pigment Violet 23 and 37), diketopyrrolopyrrole-based pigments (for example, C.I. Pigment Red 254), perylene pigments (for example, C.I. Pigment Violet 29), anthraquinone-based pigments (examples thereof include C.I. Pigment Violet 5:1, 31, and 33), and thioindigo-based pigments (examples thereof include C.I. Pigment Red 38 and 88) are preferably used.

As yellow pigments, azo pigments (preferred examples thereof include the monoazo-based pigments of C.I. Pigment Yellow 1, 3, 74 and 98, the disazo-based pigments of C.I. Pigment Yellow 12, 13, 14, 16, 17 and 83, general azo-based pigments of C.I. Pigment Yellow 93, 94, 95, 128 and 155, the benzimidazolone-based pigments of C.I. Pigment Yellow 120, 151, 154, 156 and 180, and the like, and among them, it is preferred that benzidine-based compounds are not used as a raw material), isoindoline-isoindolinone-based pigments (preferred examples thereof include C.I. Pigment Yellow 109, 110, 137 and 139, and the like), quinophthalone pigments (preferred examples thereof include C.I. Pigment Yellow 138 and the like), and flavanthrone pigments (for example, C.I. Pigment Yellow 24 and the like) are preferably used.

Preferred examples of black pigments include inorganic pigments (preferred examples thereof include carbon black and magnetite) or aniline black.

Further, orange pigments (C.I. Pigment Orange 13 and 16, and the like) or green pigments (C.I. Pigment 7, and the like) may be used.

The pigments which may be used in the present technology may be the above-described bare pigments or surface-treated pigments. As a surface-treatment method, a method of coating a surface with resin or wax, a method of attaching a surfactant, a method of binding a reactive material (for example, a silane coupling agent, radicals produced from epoxy compounds, polyisocyanates, and diazonium salts, and the like) to a pigment surface, and the like may be contemplated, and these methods are described in the following documents or patents.

(1) Properties and Application of Metal Soap (Saiwaishobo)

(2) Printing of Printing Ink (CMC Publishing Co., Ltd. 1984)

(3) Latest Pigment Application Technology (CMC Publishing Co., Ltd. 1986)

(4) U.S. Pat. Nos. 5,554,739 and 5,571,311

(5) Japanese Patent Application Laid-Open Nos. H9-151342, 10-140065, 10-292143, and 11-166145

In particular, self-dispersible pigments prepared by reacting diazonium salts with carbon black, which are disclosed in the above U.S. patents of (4), or the encapsulated pigments prepared by the methods disclosed in the above Japanese Patents of (5) are particularly effective because dispersion stability may be obtained without excessively using any dispersant in ink.

In the present invention, pigments may be dispersed by further using dispersants. It is possible to use various known dispersants to suit the pigments used, for example, low molecular dispersants of surfactant type or polymer type dispersants as dispersants. Examples of the dispersants include dispersants described in Japanese Patent Application Laid-Open No. H3-69949, European Patent No. 549486, and the like. Further, when a dispersant is used, pigment derivatives called as synergists may be added in order to promote adsorption of the dispersant to the pigment.

The particle diameter of pigments, which may be used in the present technology, preferably ranges from 0.01μ to 10μ, and more preferably 0.05μ to 1μ after the dispersion.

As a method of dispersing pigments, a known dispersing technology used for preparation of ink or toner may be used. Examples of a dispersing machine include a vertical or horizontal agitator mill, an Attritor, a colloid mill, a ball mill, a three-roll mill, a pearl mill, a super mill, an impeller, a disperser, a KD mill, a dynatron, a pressure kneader, and the like. The details thereof are described in "Latest Pigment Application Technology" (CMC Publishing Co., Ltd., 1986).

[pH of Ink]

It is preferred that the ink of the present invention has a pH of 7.0 to 10.0 from the viewpoint of storage stability and discharge properties of the ink.

[Aqueous Medium]

In the ink of the present invention, it is possible to use water or an aqueous medium which is a mixed solvent of water and an aqueous organic solvent. It is preferred that deionized water (ion-exchanged water) is used as water. It is preferred that the content (% by mass) of water in the ink is 10% by mass to 90.0% by mass based on the total mass of the ink.

The aqueous organic solvent is not particularly limited as long as the organic solvent is water-soluble, and it is possible to use alcohols, polyhydric alcohosl, polyglycols, glycol ethers, nitrogen-containing polar solvents, sulfur-containing polar solvents and the like. From the viewpoint of discharge stability of the ink and the like, it is preferred that the content (% by mass) of the aqueous organic solvent in the ink is 5.0% by mass to 90.0% by mass, and further, 10.0% by mass to 50.0% by mass, based on the total mass of the ink.

As the aqueous organic solvent, specifically those described below may be used. Alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol and the like. Amides such as dimethylformamide and dimethylacetamide. Ketones or keto alcohols such as acetone and diacetone alcohol. Ethers such as tetrahydrofuran and dioxane. Polyalkylene glycols such as polyethylene glycol and polypropylene glycol. Glycols such as ethylene glycol, propylene glycol, butylene glycol, diethylene glycol, triethylene glycol, hexylene glycol and thiodiglycol. Alkylene glycols in which the alkylene group such as 1,5-pentanediol, 1,6-hexanediol, 2-methyl-1,3-propanediol, 3-methyl-1,5-pentanediol and 1,2,6-hexanetriol has 2 to 6 carbon atoms. Bis(2-hydroxyethyl)sulfone. Lower alkyl ether acetates such as polyethylene glycol monomethyl ether acetate. Alkyl ethers of polyhydric alcohols such as ethylene glycol monomethyl (or ethyl)ether, diethylene glycol methyl (or ethyl)ether and triethylene glycol monomethyl (or ethyl) ether. N-methyl-2-pyrrolidone, 2-pyrrolidone, 1,3-dimethyl-2-imidazolidinone and the like. Of course, the present invention is not limited thereto. One or two or more of these aqueous organic solvents may be used if necessary.

[Other Additives]

The ink of the present invention may contain, if necessary, solid aqueous organic compounds at normal temperature such as polyhydric alcohols such as trimethylol propane, trimethylol ethane and the like, urea derivatives such as ethylene urea, and the like, in addition to the aforementioned components. Further, the ink of the present invention may contain, if necessary, various additives such as a surfactant, a pH adjusting agent, a rust inhibitor, a preservative, a fungicide, an antioxidant, an anti-reducing agent, an evaporation accelerator, a chelating agent, an aqueous polymer and the like.

<Other Inks>

In order to form a full-color image and the like, it is possible to use the ink of the present invention in combination with an ink having a color tone separate from the ink of the present invention. It is preferred that the ink of the present invention is used along with at least one ink selected from, for example, black ink, cyan ink, magenta ink, yellow ink, red ink, green ink, blue ink and the like. Further, it is also possible to use the ink of the present invention further in combination with a light shade ink having substantially the same color tone as these inks. A known dye, or an aqueous dye newly synthesized may also be used as an aqueous dye of these inks or light shade ink.

<Recording Medium>

As a recording medium used in forming an image using the ink of the present invention, any recording medium may be used as long as the recording medium is a recording medium that performs recording by imparting ink. In the present invention, it is preferred to use an inkjet recording medium, which adsorbs a coloring material such as a dye, pigment or the like to particles which form a porous structure of an ink-receiving layer. In particular, it is preferred to use a recording medium having an ink-receiving layer of a so-called pore-absorption type, in which ink is absorbed by pores formed in the ink-receiving layer on a support. The ink-receiving layer of a pore-absorption type essentially consists of particles, and may further contain a binder or other additives, if necessary.

The following may be specifically used as particles. Inorganic pigments such as zinc oxide such as silica, clay, talc, calcium carbonate, kaolin, aluminum oxide such as alumina, hydrated alumina or the like, diatomaceous earth, titanium oxide, hydrotalcite, zinc oxide, or the like. Organic pigments such as urea formalin resin, ethylene resin, styrene resin and the like. These particles may be used either alone or in combination of two or more thereof, if necessary.

Examples of the binder include aqueous polymer, latex or the like, and specifically, the followings may be used as the binder. Polyvinyl alcohol, starch, gelatin, or modified products thereof. Gum arabic. Cellulose derivatives such as carboxymethyl cellulose, hydroxyethyl cellulose, hydroxypropylmethyl cellulose, or the like. Vinyl-based copolymer latex such as SBR latex, NBR latex, methyl methacrylate-butadiene copolymer latex, functional group-modified polymer latex, an ethylene-vinyl acetate copolymer, or the like. Polyvinyl pyrrolidone. Maleic anhydride or a copolymer thereof, an acrylic acid ester copolymer and the like. These binders may be used either alone or in combination of two or more thereof, if necessary.

Further, additives may be used, if necessary. For example, it is possible to use a dispersant, a thickener, a pH adjusting agent, a lubricant, a fluidity modifier, a surfactant, a defoaming agent, a release agent, a fluorescent brightener, an ultraviolet absorber, an antioxidant, a dye fixing agent and the like.

When an image is formed by using the ink of the present invention, it is preferred to use a recording medium in which an ink-receiving layer is formed by essentially including particles having an average particle diameter of 1 μm or less. Specific examples of the particles include silica particles, aluminum oxide particles and the like. Preferred silica particles are silica particles typified by colloidal silica. Commercially available colloidal silica products may also be used, but it is particularly preferred to use colloidal silica described in, for example, the Japanese Patent Nos. 2803134 and 2881847. Further, preferred examples of aluminum oxide particles include hydrated alumina particles (alumina-based pigments).

It is preferred that the recording medium has a support for supporting the aforementioned ink-receiving layer. Any material of the support may be used without any particular limitation as long as the material thereof allows the ink-receiving layer to be formed of porous particles and imparts strength enough to be conveyed by a conveying mechanism of an inkjet recording device and the like. For example, it is possible to use a paper support consisting of a pulp raw material which essentially includes natural cellulose fibers. Further, it is possible to use a plastic support consisting of a material such as polyester (for example, polyethylene terephthalate), cellulose triacetate, polycarbonate, polyvinyl chloride, polypropylene, polyimide and the like. In addition, it is possible to use an already known resin-coated paper (example: RC paper) having a polyolefin resin coating layer to which a white pigment and the like are added on at least one side thereof.

<Inkjet Recording Method>

The present invention also relates to an inkjet recording method using the ink for inkjet recording according to the present invention.

The ink of the present invention has no limitation on the recording method of the inkjet, and is used in a known method, for example, a charge control method of discharging an ink using an electrostatic attraction force, a drop-on-demand method (pressure pulse method) using oscillating pressure of a piezoelectric element, an acoustic inkjet method of discharging ink using radiation pressure by converting electrical signals into acoustic beams to irradiate the acoustic beams on the ink, a thermal inkjet method of using pressure produced by heating ink to form bubbles, and the like.

Examples of the inkjet recording method include a method of injecting ink with low concentration, which is called photo ink, in a number of small volumes, a method of improving image quality using a plurality of inks having substantially the same color and different concentrations, or a method of using colorless and transparent ink.

A preferred combination of a material to be recorded and a recording method is an inkjet recording method of recording an image on an image-receiving material by discharging ink droplets on the image-receiving material having an image-receiving layer containing white inorganic pigment particles on a support according to a recording signal.

The ink for inkjet recording of the present invention may also be used for use other than inkjet recording. For example, it is possible to use the ink for inkjet recording in a material for a display image, a material for forming an image on interior decoration materials, a material for forming an image on exterior decoration materials, and the like.

Examples of the material for a display image include various materials such as posters, wallpaper, decorative articles (ornaments, dolls or the like), advertising fliers, wrapping paper, wrapping materials, paper bags, plastic bags, package materials, billboards, images painted on or attached to sides of transport facilities (cars, buses, trains and the like), clothes with logo types, and the like. When the dye of the present invention is used as a material for forming a display image, the term "image" includes all of patterns formed by the dye, which are recognizable by humans, from images in a narrow sense to abstract designs, characters, geometrical patterns and the like.

Examples of interior decoration materials include various materials such as wallpaper, decorative articles (ornaments, dolls or the like), members of lighting fixtures, members of furniture, design members of a floor or a ceiling, and the like. When the dye of the present invention is used as a material for forming an image, the term "image" includes all of patterns formed by the dye, which are recognizable by humans, from images in a narrow sense to abstract designs, characters, geometrical patterns and the like.

Examples of exterior decoration materials include various materials such as wall materials, roofing materials, signboards, gardening materials, outdoor decorative articles (ornaments, dolls or the like), members of outdoor lighting fixtures, and the like. When the dye of the present invention is used as a material for forming an image, the term "image" includes all of patterns formed by the dye, which are recognizable by human, from images in a narrow sense to abstract designs, characters, geometrical patterns and the like.

In the uses described above, examples of media on which patterns are formed include various articles such as paper, texture, cloth (including nonwoven fabric), plastics, metals, ceramics and the like. As the dyeing form, colorants may be fixed in the form of mordanting, textile printing or a reactive dye into which a reactive group is introduced. Among them, the dyeing in the form of mordanting is preferred.

EXAMPLE

Hereinafter, the present invention will be described in more detail with reference to Examples and Comparative Examples, but the present invention is not limited to the following Examples as long as the present invention does not deviate from the gist thereof.

Synthesis Example

Hereinafter, synthesis methods of dye mixtures of the present invention will be described in Examples, but the present invention is not limited to these Examples.

Dyes represented by Formula (Y-1) of the present invention may be derived from, for example, the following synthesis route.

In the following Examples $\lambda_{max}$ is an absorption maximum wavelength, and $\epsilon_{max}$ means a molar extinction coefficient at the absorption maximum wavelength. Further, those simply described as % represent % by mass.

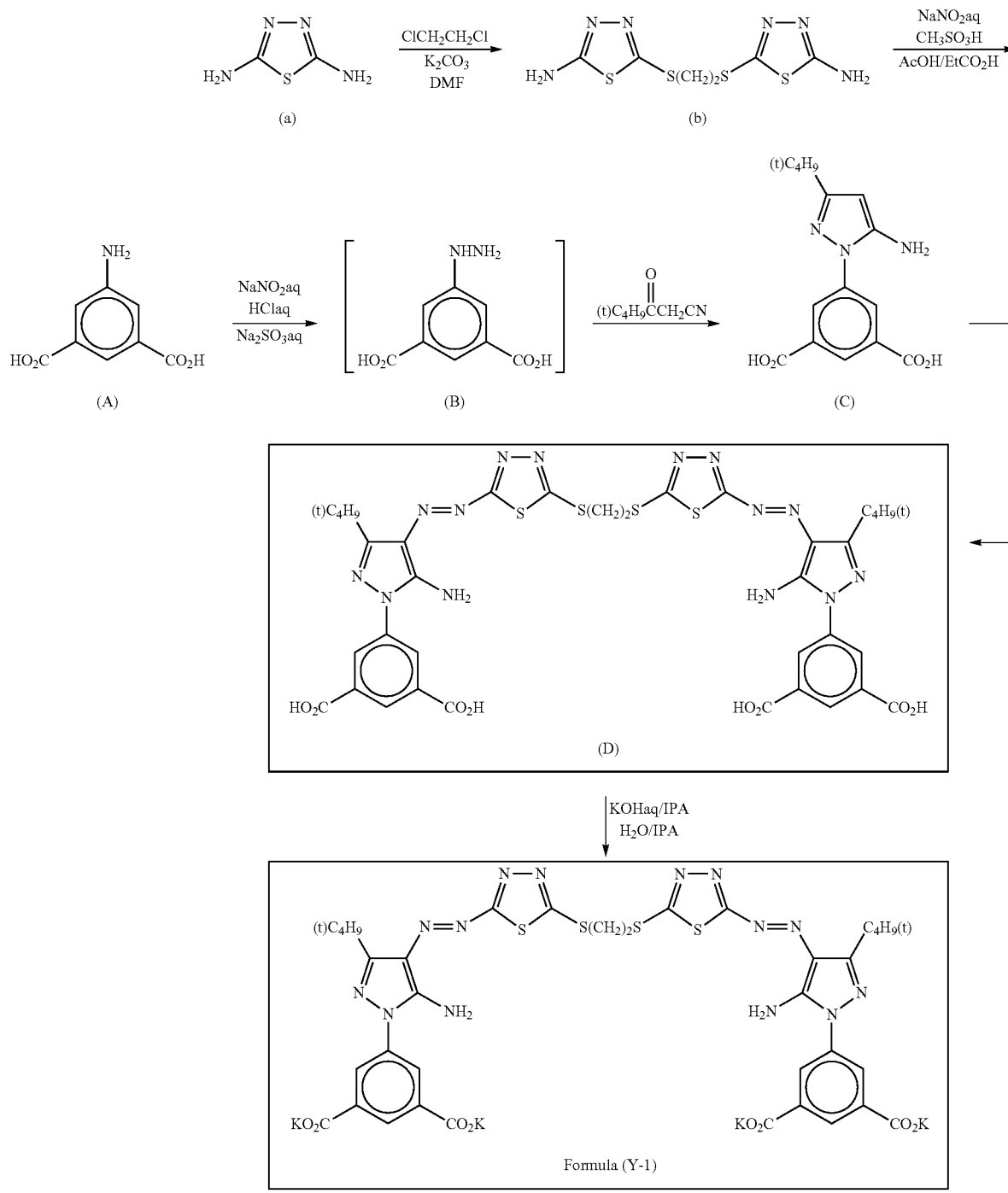

Synthesis Example 1

76.5 g of a compound (a) (2-amino-5-mercapto-1,3,4-thiadiazole (manufactured by Wako Pure Chemical Industries, Ltd./Catalog no. 019-11125)) was added to 450 mL of DMF (N,N-dimethylformaide) and 24.75 g of 1,2-dichloroethane at room temperature, and 79.5 g of potassium carbonate was added. Thereafter, the temperature was increased up to 70° C., and followed by stirring at the same temperature for 30 minutes. Subsequently, 375 mL of warm water (80° C.) was added dropwise to the reaction solution for 10 minutes, and the internal temperature was cooled to 25° C. The precipitated crystal was separated by filtration, washed with 250 mL of ion-exchanged water, and subsequently with 150 mL of methanol, and dried overnight at 70° C. to obtain 65.1 g of a compound (b).

Synthesis Example 2

181.2 g of amino isophthalic acid (A) (manufactured by Wako Pure Chemical Industries, Ltd./Catalog no. 322-26175)) was suspended in 1000 ml of ion-exchanged water, added with 257 mL of concentrated hydrochloric acid, and maintained in ice bath at 5° C. 116 ml of an aqueous solution of 69.7 g of sodium nitrite was added dropwise thereto (reaction solution A). 1300 ml of an aqueous solution of 378.1 g of sodium sulfite was stirred at the internal temperature of 25° C., and the reaction solution A was poured therein. After stirring for 30 minutes under this state, the internal temperature was heated up to 30° C. Then, after stirring for 60 minutes, 500 mL of hydrochloric acid was added to the reaction solution, and the internal temperature was increased up to 50° C. (reaction solution B). After stirring for 90 minutes under this state, 125.2 g of pivaloylacetonitrile (manufactured by Tokyo Chemical Industry Co., Ltd/Catalog No. P 1112) and 100 mL of isopropanol were added to the reaction solution B, and then, the internal temperature was increased up to 93° C. After stirring for 240 minutes, the resultant product was cooled to room temperature, and a precipitated crystal (C) was filtered by suction, washed with 1500 mL of ion-exchanged water, and subsequently with 1000 mL of isopropanol, and dried. Isolation yield 223.5 g. Yield 73.7%.

Synthesis Example 3

29.2 g of the compound (b) was added to 100 mL of methanesulfonic acid, 120 mL of acetic acid and 180 mL of propionic acid at room temperature, and the internal temperature was increased up to 45° C. to form a homogeneous solution. Then, the internal temperature was cooled to 0° C. Subsequently, a solution of 14.7 g of NaNO and 27 mL of ion-exchanged water was added dropwise to the homogeneous solution while maintaining at the internal temperature of 0° C. to 10° C. After stirring at the internal temperature of 5° C. for 15 minutes, a diazonium salt was prepared. The diazonium salt solution was added dropwise to a previously prepared solution of 60.6 g of the coupler component (C) prepared in Synthesis Example 2, 600 mL of methanol and 600 mL of ethylene glycol at a rate maintaining the internal temperature at 0 to 10° C. Subsequently, after stirring at the internal temperature of 25° C. for 30 minutes, a precipitated crystal was filtered and washed with 250 mL of methanol. Then, the crude crystal was dispersed in 650 mL of water, stirred at the internal temperature of 80° C. for 30 minutes, and cooled to room temperature. The resultant product was filtered, washed with 300 mL of water, and dried at 60° C. overnight to obtain 64.47 g of a colorant (D).

Synthesis Example 4

46.1 g of the colorant (D) prepared in Synthesis Example 3 was added and dissolved in a previously prepared solution of 16.5 g of KOH (tablet) and 414.9 mL of ion-exchanged water at the internal temperature of 20° C. to 30° C.

Subsequently, a solution of 40.0 g of potassium acetate and 200 mL of methanol was added dropwise to the colorant aqueous solution at the internal temperature of 25° C., and followed by stirring at the same temperature for 10 minutes. Next, 2488 mL of IPA (isopropanol) was added dropwise to form a salt. After stirring at the same temperature for 30 minutes, the resultant product was filtered, washed with 500 mL of IPA, and dried at 70° C. overnight to obtain 44 g of a crude crystal of a water soluble dye represented by Formula (Y-1).

Synthesis Example 5

In 78.3 mL of ion-exchanged water, 8.7 g of the crude crystal of the aqueous dye represented by Formula (Y-1) was dissolved at room temperature. Then, the pH value of the aqueous solution was adjusted to 8.5 by using 0.1N hydrochloric acid. After filtration using a membrane filter of 0.2 μm, 391.5 mL of IPA was added dropwise to a filtrate at the internal temperature of 25° C. The precipitated crystal was filtered, washed with 100 mL of IPA, and dried at 80° C. overnight to obtain 7.8 g of a purified crystal of the aqueous dye represented by Formula (Y-1). {λmax: 428 nm ($H_2O$), εmax: $4.20 \times 10^4$}

Synthesis Example 6

7.7 g of a purified crystal of the aqueous dye (Y-2: $M=Na^+$ in Formula (Y)) was obtained in the same manner as in Synthesis Example 4 and Synthesis Example 5 except that NaOH and sodium acetate were used instead of KOH and potassium acetate in Synthesis Example 4.

Synthesis Example 7

7.4 g of a purified crystal of the aqueous dye (Y-3: $M=Li^+$ in Formula (Y)) was obtained in the same manner as in Synthesis Example 4 and Synthesis Example 5 except that LiOH and lithium acetate were used instead of KOH and potassium acetate in Synthesis Example 4.

Synthesis Example 8

7.3 g of a purified crystal of the aqueous dye (Y-4: $M=NH_4^+$ in Formula (Y)) was obtained in the same manner as in Synthesis Example 4 and Synthesis Example 5 except that $NH_4OH$ and ammonium acetate were used instead of KOH and potassium acetate in Synthesis Example 4.

Examples 1 to 22 and Comparative Examples 1 to 7

Preparation of Ink

Each ink composition of Examples 1 to 22 and Comparative Examples 1 to 7 was obtained by using an aqueous dye (a first coloring material) represented by the above-described Formula (Y-1), a second coloring material, and a third aqueous dye (a third coloring material) and stirring each component at normal temperature for 30 minutes based on the following composition, and then filtering the obtained solution using a 1.0 μm-membrane filter. Meanwhile, the numerical value of each component represents the mass of each component when the mass of the ink composition is set as 100 g, and "remnant" representing the amount of water represents an amount which would produce 100 g when combined with the amount of components other than water.

(Ink Composition)

Aqueous dye (first coloring material) represented by Formula (Y-1)(content thereof is described in Table 13)

1 of Group A ($M=K^+$)/2 of Group A ($M=K^+$)/3 of Group A ($M=K^+$)/8 of Group A ($M=K^+$)=1/3/1/2 (mass ratio) (second coloring material, content thereof is described in Table 13)

Third coloring material (Type and content thereof are described in Table 13)

Glycerin: 10 g

Diethylene glycol: 12 g

Triethylene glycol monobutyl ether: 5 g 2-pyrrolidone: 2 g

SURFYNOL 104 PG60 (trade name: acetylene glycol-based surfactant, manufactured by Air Products and Chemicals Inc.): 1 g PROXEL XL2 (1,2-benzisothiazolin-3-one, manufactured by AVECIA): 0.5 g Ultrapure water: Remnant Meanwhile, in the ink compositions of Examples 1 to 22 and Comparative Example 1 described in Table 13, the mass ratio of the content (% by mass) of the second coloring material to content (% by mass) of the first coloring material ([Content of at least one compound selected from Group A]/[Content of compound of Formula (Y-1)]) is 0.100.

The color tone of a yellow monochromatic image and the image fastness properties (light resistance and ozone resistance) of a three-color gray image are evaluated as follows by printing the yellow monochromatic image and the three-color gray image onto an inkjet-dedicated recording medium {Photographic paper <gloss> (trade name, manufactured by Seiko Epson Corporation)} by an inkjet printer Stylus Color 880 (trademark) (trade name, manufactured by Seiko Epson Corporation) using the obtained ink.

<Evaluation>

(1) Color Tone

For color tone, evaluation was performed in three stages A (best), B (good) and C (bad) by visual inspection.

<Image Fastness Properties>

A gray image, in which three colors constituted by yellow, magenta, and cyan were mixed with each other, was prepared by refilling the yellow ink of the printer with the aforementioned ink and using the other color inks as they are. The gray image was subjected to light resistance and ozone resistance tests.

(2) Light Resistance

The gray image after 14 days was evaluated by irradiating Xenon light (100,000 lux) on gloss paper on which an image was formed, for 14 days. The gray image after 14 days was evaluated in three stages A (gray tone is maintained), B (gray tone is almost maintained), and C (gray tone is greatly collapsed) by visual inspection.

(3) Ozone Resistance

The photographic gloss paper on which an image was formed was left to stand under the condition set at an ozone gas concentration of 5 ppm (25° C., 60% RH) for 7 days, and the gray image after being left to stand for 7 days was evaluated under the conditions. The gray image after being left to stand under the conditions for 7 days was evaluated in three stages A (gray tone is maintained), B (gray tone is almost maintained), and C (gray tone is greatly collapsed) by visual inspection.

(4) Evaluation of Permeability into Image-Receiving Paper

An amount of one liquid droplet was set in a range of 22 pL to 28 pL using PIXUS iP8600 manufactured by Canon Inc., and a one-dot line with a resolution of 600 dpi was printed on a plain paper (GASAI SHASHIN SHIAGE Pro manufactured by Fujifilm Corporation using the inks in the Examples and the Comparative Examples. Permeability was evaluated in accordance with the following evaluation criteria by measuring the line width of the one-dot line with Personal IAS manufactured by QEA Inc.

Evaluation Criteria of Permeability Evaluation

A: The line width is 115 μm to 135 μm.

B: The line width is less than 115 μm.

C: The line width exceeds 135 μm.

(5) Bronze Evaluation

An inkjet recording was made on a dedicated film A (photographic gloss film HG201 manufactured by Canon Inc.) using an inkjet printer (trade name, PIXUS iP4100 manufactured by Canon Inc.). Meanwhile, the dedicated film A used in the test was a recording medium having an ink-receiving layer containing white inorganic pigment particles on a substrate.

A yellow beta image (solid image) was printed on the film under an environment of 10° C. 80% RH, left to stand under the same condition overnight, and then bronze (metal gloss on print surface) was evaluated in accordance with the following criteria by visual inspection.

A: Bronzing is not observed at all.

B: Bronzing is slightly observed.

C: Bronzing is clearly recognized.

The evaluation results are shown in Table 13.

TABLE 13

| | First coloring material (Formula (Y-1)) Content (g) | Second coloring material Content (g) | Third coloring material Kind | Third coloring material Content (g) | Color tone | Light resistance | Ozone resistance | Permeability to image receiving paper | Bronze evaluation |
|---|---|---|---|---|---|---|---|---|---|
| Ex. 1 | 4.0 | 0.4 | (A) | 1.0 | A | A | A | A | A |
| Ex. 2 | 4.0 | 0.4 | (B) | 1.0 | A | A | A | A | A |
| Ex. 3 | 4.0 | 0.4 | (C) | 1.0 | A | A | A | A | A |
| Ex. 4 | 4.0 | 0.4 | (D) | 1.0 | A | A | A | A | A |
| Ex. 5 | 4.0 | 0.4 | (E) | 1.0 | A | A | A | A | A |
| Ex. 6 | 4.0 | 0.4 | (F) | 1.0 | A | A | B | A | A |
| Ex. 7 | 4.0 | 0.4 | (G) | 1.0 | A | A | A | A | A |
| Ex. 8 | 4.0 | 0.4 | (H) | 1.0 | A | A | A | A | A |
| Ex. 9 | 4.0 | 0.4 | (I) | 1.0 | A | A | A | A | A |
| Ex. 10 | 4.0 | 0.4 | (J) | 1.0 | A | A | B | A | A |
| Ex. 11 | 4.0 | 0.4 | (K) | 1.0 | A | A | B | A | A |
| Ex. 12 | 4.0 | 0.4 | (L) | 1.0 | A | A | B | A | A |
| Ex. 13 | 4.0 | 0.4 | (M) | 1.0 | A | A | A | A | A |
| Ex. 14 | 5.4 | 0.54 | (E) | 0.6 | A | A | A | A | A |
| Ex. 15 | 4.0 | 0.4 | (E) | 2.0 | A | A | A | A | A |

TABLE 13-continued

| | First coloring material (Formula (Y-1)) Content (g) | Second coloring material Content (g) | Third coloring material Kind | Third coloring material Content (g) | Color tone | Light resistance | Ozone resistance | Permeability to image receiving paper | Bronze evaluation |
|---|---|---|---|---|---|---|---|---|---|
| Ex. 16 | 3.0 | 0.3 | (E) | 3.0 | A | A | A | A | A |
| Ex. 17 | 5.4 | 0.54 | (F) | 0.6 | A | A | A | A | A |
| Ex. 18 | 4.0 | 0.4 | (F) | 2.0 | A | A | A | A | A |
| Ex. 19 | 3.0 | 0.3 | (F) | 3.0 | A | A | B | A | A |
| Ex. 20 | 5.4 | 0.54 | (M) | 0.6 | A | A | A | A | A |
| Ex. 21 | 4.0 | 0.4 | (M) | 2.0 | A | A | B | A | A |
| Ex. 22 | 3.0 | 0.3 | (M) | 3.0 | A | B | B | A | A |
| Comp. Ex. 1 | 5.0 | 0.5 | None | — | A | A | A | B | B |
| Comp. Ex. 2 | None | None | (B) | 5.0 | A | A | A | B | C |
| Comp. Ex. 3 | None | None | (E) | 5.0 | B | A | A | B | C |
| Comp. Ex. 4 | None | None | (F) | 5.0 | B | B | B | B | C |
| Comp. Ex. 5 | None | None | (M) | 5.0 | B | B | B | C | B |
| Comp. Ex. 6 | 4.4 | None | (F) | 1.0 | B | B | B | B | B |
| Comp. Ex. 7 | 5.4 | None | None | — | A | B | B | B | B |

Hereinafter, the structure of the third coloring material described in Table 13 will be shown.

Dye (A)

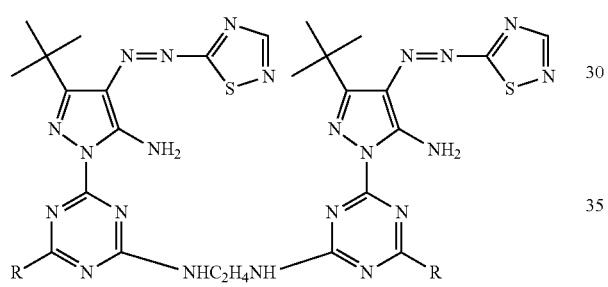

R

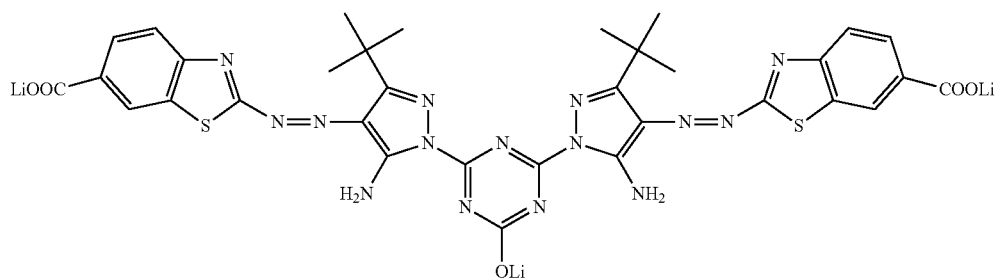

Dye (B)

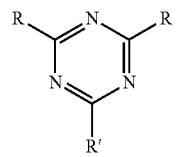

R <span></span> R'

—NHC$_2$H$_4$SO$_3$Na

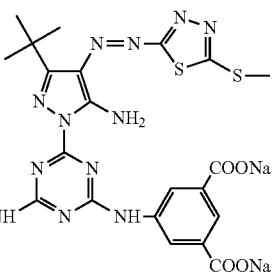

Dye (C)

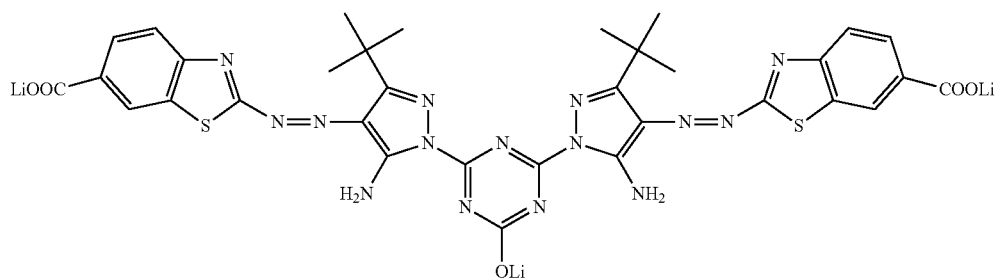

-continued
Dye (D)
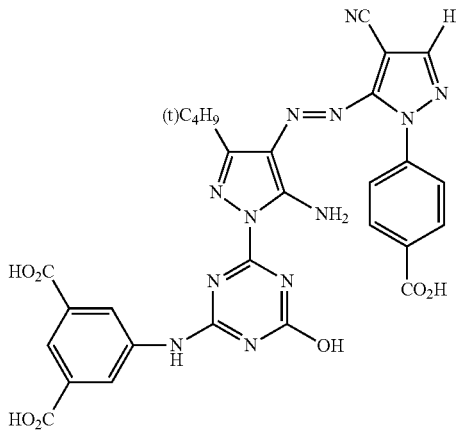
Dye (E)
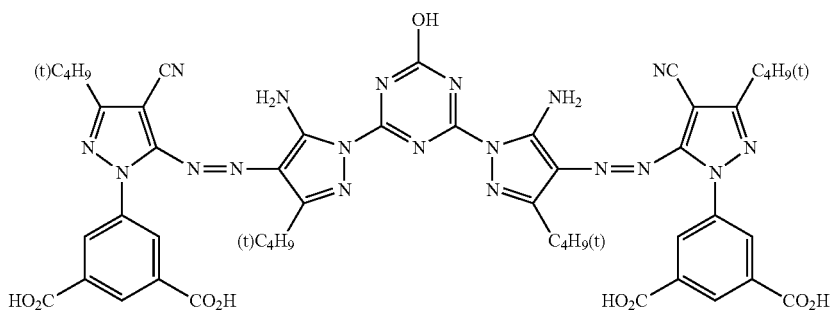
Dye (F)
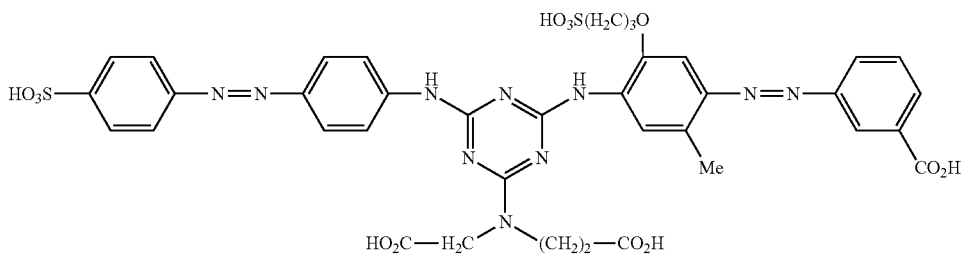
Dye (G)
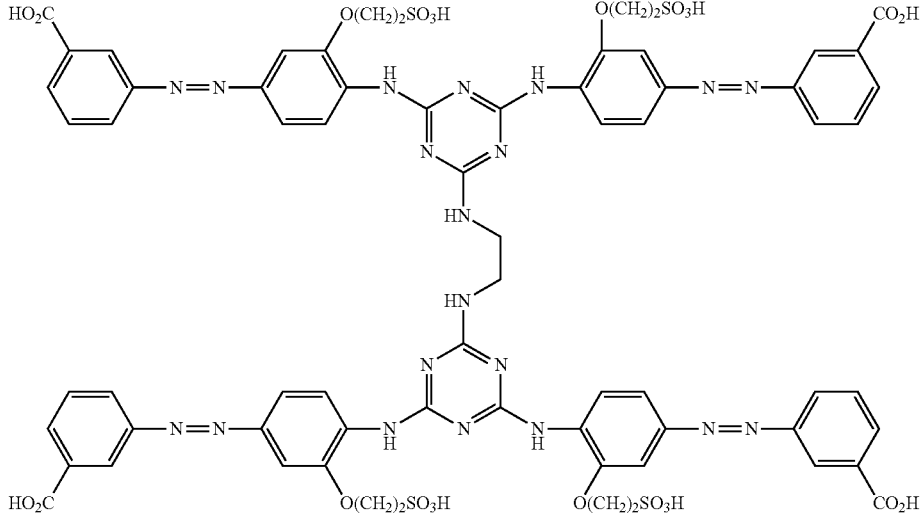

Dye (H)
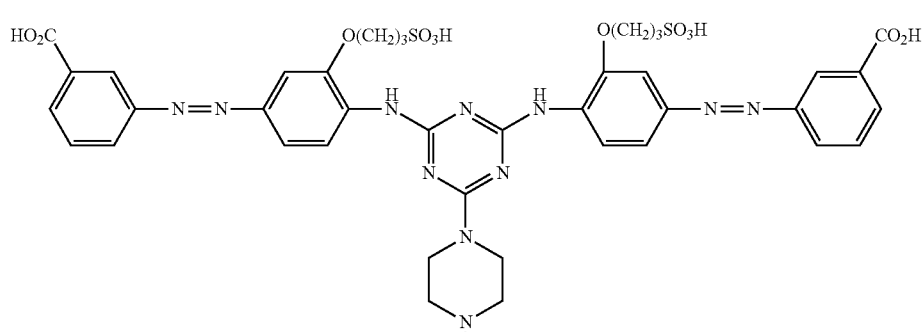
Dye (I)
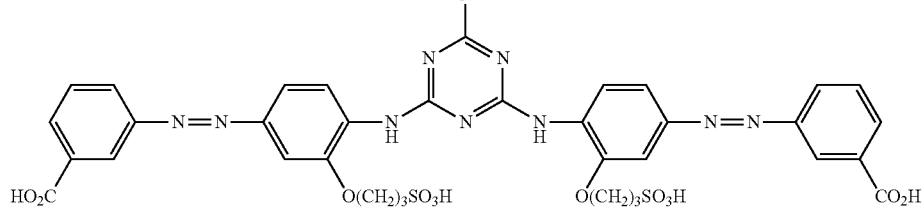
Dye (J)
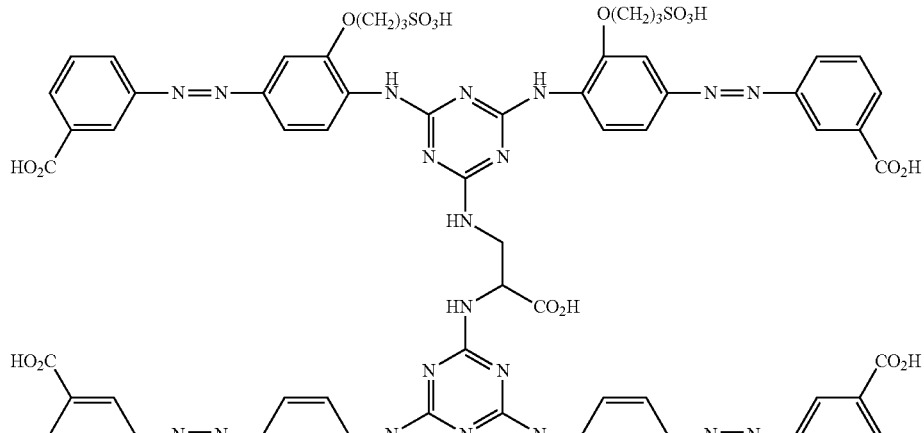
Dye (K)
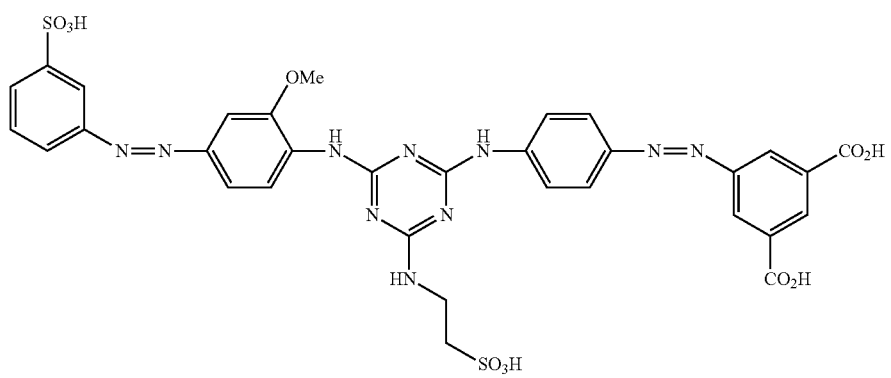
Dye (L)
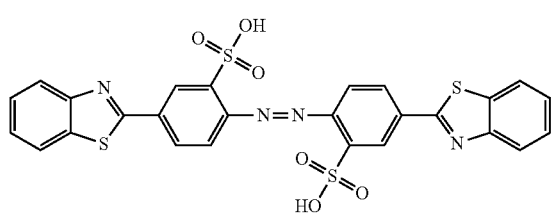
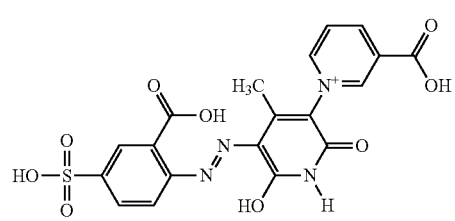

-continued

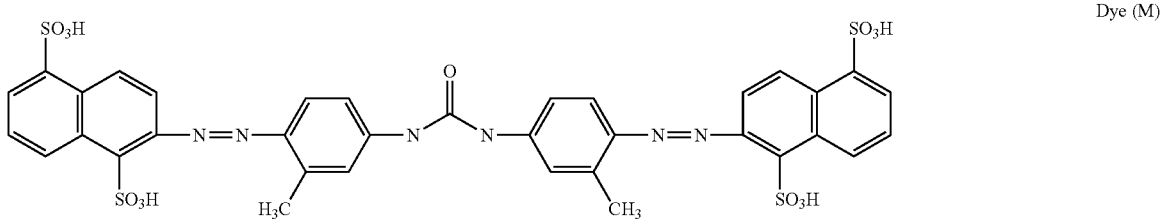 [SMILES: Cc1cc(NC(=O)Nc2ccc(N=Nc3ccc4c(S(=O)(=O)O)cccc4c3S(=O)(=O)O)c(C)c2)ccc1N=Nc1ccc2c(S(=O)(=O)O)cccc2c1S(=O)(=O)O]

Dye (M)

From the result of Table 13, Examples 1 to 22 use a first coloring material represented by Formula (Y), a second coloring material, and a third coloring material in combination and thus have better light resistance and ozone resistance than the case of using not all of these three coloring materials, and also have excellent color tone, permeability into an image-receiving paper, and bronzing inhibitory properties of printed matters.

Examples 23 to 43 and Comparative Examples 8 and 9

An ink composition was prepared in the same manner as in Example 1, except that Coloring material 1 and Coloring material 2 are changed as shown in the following Tables 14 to 16. Meanwhile, Examples 38 to 40 are examples in which Coloring material 2 used in Example 1 is changed into a cationic species described in Table 15, and the total content thereof is described in Table 15.

Further, in the ink composition, the mass ratio of the content (% by mass) of the second coloring material to the content (% by mass) of the first coloring material (Content of at least one compound selected from Group A]/[Content of compound of Formula (Y) or Formula (Y-1)] is defined as "Coloring material 2/Coloring material 1", and shown in the following Tables 14 to 16.

The results of evaluating these ink compositions in the same manner as in Example 1 are shown in Table 17.

TABLE 4

Ink composition

| | Example | | | | | | | | | Unit (g) |
|---|---|---|---|---|---|---|---|---|---|---|
| | 23 | 24 | 25 | 26 | 27 | 28 | 29 | 30 | 31 | |
| Coloring material 1 (Y-1) | — | — | — | 4.0 | 4.0 | 4.0 | 4.0 | 4.0 | 4.0 | |
| Coloring material 1 (Y-2) | 4.0 | — | — | — | — | — | — | — | — | |
| Coloring material 1 (Y-3) | — | 4.0 | — | — | — | — | — | — | — | |
| Coloring material 1 (Y-4) | — | — | 4.0 | — | — | — | — | — | — | |
| Coloring material 2 (1 in Group A: M=$K^+$ ion) | 0.057 | 0.057 | 0.057 | 0.057 | 0.057 | 0.057 | 0.057 | 0.057 | 0.057 | |
| Coloring material 2 (2 in Group A: M=$K^+$ ion) | 0.172 | 0.172 | 0.172 | 0.172 | 0.172 | 0.172 | 0.172 | 0.172 | 0.172 | |
| Coloring material 2 (3 in Group A: M=$K^+$ ion) | 0.057 | 0.057 | 0.057 | 0.057 | 0.057 | 0.057 | 0.057 | 0.057 | 0.057 | |
| Coloring material 2 (4 in Group A: M=$K^+$ ion) | — | — | — | — | 0.011 | — | — | 0.011 | 0.011 | |
| Coloring material 2 (5 in Group A: M=$K^+$ ion) | — | — | — | — | — | 0.011 | — | 0.011 | 0.011 | |
| Coloring material 2 (6 in Group A: M=$K^+$ ion) | — | — | — | 0.011 | 0.011 | 0.011 | 0.011 | 0.011 | 0.011 | |
| Coloring material 2 (7 in Group A: M=$K^+$ ion) | — | — | — | — | — | — | 0.011 | — | 0.011 | |
| Coloring material 2 (8 in Group A: M=$K^+$ ion) | 0.114 | 0.114 | 0.114 | 0.114 | 0.114 | 0.114 | 0.114 | 0.114 | 0.114 | |
| Coloring material 2/Coloring material 1 | 0.100 | 0.100 | 0.100 | 0.103 | 0.106 | 0.106 | 0.106 | 0.108 | 0.111 | |

TABLE 15

Ink composition

| | Example | | | | | | | | | Unit (g) |
|---|---|---|---|---|---|---|---|---|---|---|
| | 32 | 33 | 34 | 35 | 36 | 37 | 38 | 39 | 40 | |
| Coloring material 1 (Y-1) | 4.0 | 4.0 | 4.0 | 4.0 | 4.0 | 4.0 | 4.0 | 4.0 | 4.0 | |
| Coloring material 1 (Y-2) | — | — | — | — | — | — | — | — | — | |
| Coloring material 1 (Y-3) | — | — | — | — | — | — | — | — | — | |
| Coloring material 1 (Y-4) | — | — | — | — | — | — | — | — | — | |
| Coloring material 2 (1 in Group A: M=$K^+$ ion) | — | — | — | — | — | — | — | — | — | |
| Coloring material 2 (2 in Group A: M=$K^+$ ion) | 0.172 | 0.172 | 0.172 | 0.172 | 0.172 | 0.172 | — | — | — | |
| Coloring material 2 (3 in Group A: M=$K^+$ ion) | — | 0.057 | 0.057 | — | 0.057 | — | — | — | — | |
| Coloring material 2 (4 in Group A: M=$K^+$ ion) | — | — | — | 0.057 | 0.057 | 0.057 | — | — | — | |
| Coloring material 2 (5 in Group A: M=$K^+$ ion) | — | 0.057 | — | — | — | — | — | — | — | |
| Coloring material 2 (6 in Group A: M=$K^+$ ion) | 0.057 | — | 0.057 | — | — | 0.057 | — | — | — | |
| Coloring material 2 (7 in Group A: M=$K^+$ ion) | 0.057 | — | — | 0.057 | — | — | — | — | — | |
| Coloring material 2 (8 in Group A: M=$K^+$ ion) | 0.114 | 0.114 | 0.114 | 0.114 | 0.114 | 0.114 | — | — | — | |

TABLE 15-continued

Ink composition

| | Example | | | | | | | | | Unit (g) |
|---|---|---|---|---|---|---|---|---|---|---|
| | 32 | 33 | 34 | 35 | 36 | 37 | 38 | 39 | 40 | |
| Coloring material 2 (Coloring material 2 of Example 1; M=Na+ ion with respect to total 4 kinds of compounds) | — | — | — | — | — | — | 0.4 | — | — | |
| Coloring material 2 (Coloring material 2 of Example 1; M=Li+ ion with respect to total 4 kinds of compounds) | — | — | — | — | — | — | — | 0.4 | — | |
| Coloring material 2 (Coloring material 2 of Example 1; M=NH4+ ion with respect to total 4 kinds of compounds) | — | — | — | — | — | — | — | — | 0.4 | |
| Coloring material 2/Coloring material 1 | 0.100 | 0.100 | 0.100 | 0.100 | 0.100 | 0.100 | 0.100 | 0.100 | 0.100 | |

TABLE 16

Ink composition

| | Example | | | Comparative Example | | Unit (g) |
|---|---|---|---|---|---|---|
| | 41 | 42 | 43 | 8 | 9 | |
| Coloring material 1 (Y-1) | 4.0 | 4.0 | 4.0 | 4.0 | 4.0 | |
| Coloring material 1 (Y-2) | — | — | — | — | — | |
| Coloring material 1 (Y-3) | — | — | — | — | — | |
| Coloring material 1 (Y-4) | — | — | — | — | — | |
| Coloring material 2 (1 in Group A: M = K+ ion) | 0.00057 | 0.114 | 0.571 | 0.00028 | 0.628 | |
| Coloring material 2 (2 in Group A: M = K+ ion) | 0.00172 | 0.344 | 1.714 | 0.00086 | 1.885 | |
| Coloring material 2 (3 in Group A: M = K+ ion) | 0.00057 | 0.114 | 0.571 | 0.00028 | 0.628 | |
| Coloring material 2 (4 in Group A: M = K+ ion) | — | — | — | — | — | |
| Coloring material 2 (5 in Group A: M = K+ ion) | — | — | — | — | — | |
| Coloring material 2 (6 in Group A: M = K+ ion) | — | — | — | — | — | |
| Coloring material 2 (7 in Group A: M = K+ ion) | — | — | — | — | — | |
| Coloring material 2 (8 in Group A: M = K+ ion) | 0.00114 | 0.228 | 1.144 | 0.00058 | 1.259 | |
| Coloring material 2/ Coloring material 1 | 0.001 | 0.200 | 1.000 | 0.0005 | 1.100 | |

TABLE 17

Evaluation result

| | Color tone | Light resistance | Ozone resistance | Permeability to image receiving paper | Bronze evaluation |
|---|---|---|---|---|---|
| Example 23 | A | A | B | A | A |
| Example 24 | A | B | B | A | A |
| Example 25 | A | B | B | A | A |
| Example 26 | A | A | A | A | A |
| Example 27 | A | A | A | A | A |
| Example 28 | A | A | A | A | A |
| Example 29 | A | A | A | A | A |
| Example 30 | A | A | A | A | A |
| Example 31 | A | A | A | A | A |
| Example 32 | A | B | B | A | A |
| Example 33 | A | A | B | A | A |
| Example 34 | A | A | B | A | A |
| Example 35 | B | B | B | A | A |
| Example 36 | A | B | A | A | A |
| Example 37 | A | B | B | A | A |
| Example 38 | A | A | B | A | A |
| Example 39 | A | B | B | A | A |
| Example 40 | A | B | B | A | A |
| Example 41 | A | A | A | A | A |
| Example 42 | A | A | A | A | A |
| Example 43 | A | A | A | A | A |
| Comp. Example 8 | B | B | B | B | B |
| Comp. Example 9 | B | A | A | B | B |

From the results of Examples 1 and 23 to 25, it can be confirmed that K+ ion is excellent as a counter cation in Coloring material 1.

From the results of Examples 26 to 31, it can be confirmed that a good result may be obtained even when a plurality of compounds are used as Coloring material 2 in various combinations.

From the results of Examples 1 and 32 to 37, it can be confirmed that it is excellent to include combinations of 1 and 2 and 3 and 8 from Group A as Coloring material 2.

From the results of Examples 1 and 38 to 40, it can be confirmed that $K^+$ ion is excellent as a counter cation in Coloring material 2.

From the results of Examples 41 to 43 and Comparative Examples 8 and 9, it can be confirmed that a good result may be obtained when the ratio of Coloring material 2/Coloring material 1 is in a range of 0.001 to 1.0.

INDUSTRIAL APPLICABILITY

According to the present invention, it is possible to provide an ink composition which may form an image which is robust to light and ozone, and have excellent color tone, permeability into an image-receiving paper, and suppression of bronze generation of printed matters, an ink for inkjet recording using the ink composition, and an inkjet recording method.

Although the present invention has been described with reference to detailed and specific embodiments thereof, it is obvious to those skilled in the art that various changes or modifications may be made without departing from the spirit and scope of the present invention. The present application is based on Japanese Patent Application (Patent Application 2011-043406) filed on Feb. 28, 2011 and Japanese Patent Application (Patent Application 2011-142326) filed on Jun. 27, 2011, and the content of which is incorporated herein by reference.

What is claimed is:

1. An ink composition comprising:
at least three coloring materials of a first coloring material, a second coloring material, and a third coloring material,
wherein the first coloring material is a compound represented by Formula (Y),
the second coloring material is at least one compound selected from the group consisting of compounds designated as Group A,
a mass ratio of a content (% by mass) of the second coloring material in the ink composition to a content (% by mass) of the first coloring material in the ink composition is 0.001 to 1.0, and
the third coloring material is a compound different from the first coloring material and is represented by any one of Formulas (1) to (8):

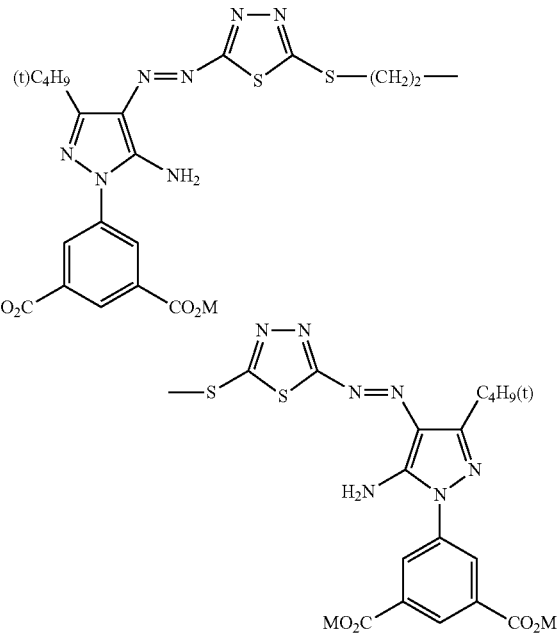

wherein in Formula (Y), M's each independently represent a hydrogen atom or a cation, and when M represents a cation, M represents $Li^+$ ion, $Na^+$ ion, $K^+$ ion, or $NH_4^+$ ion;

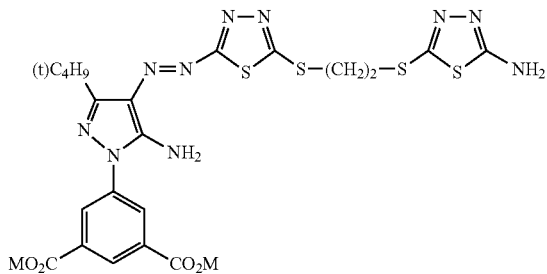

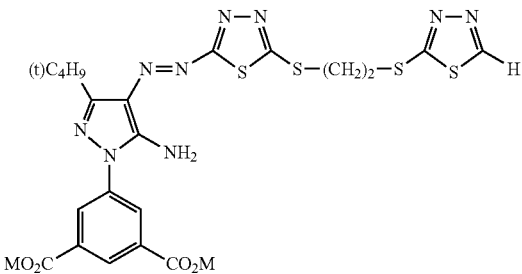

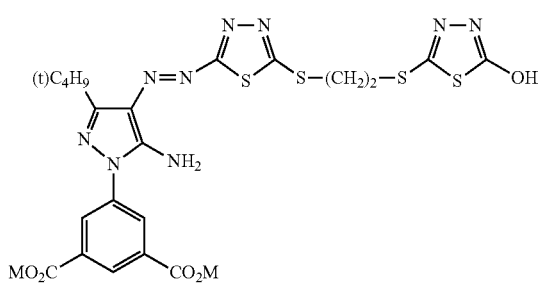

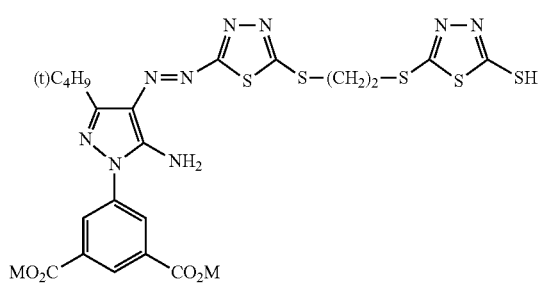

-continued

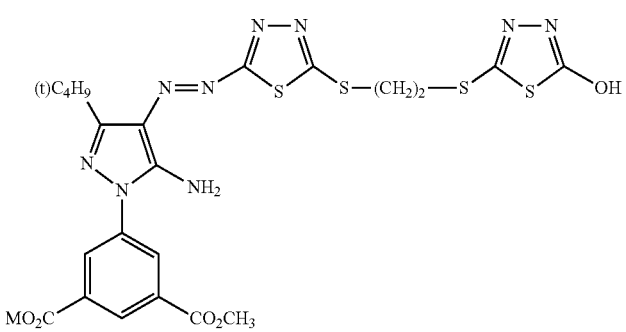

5

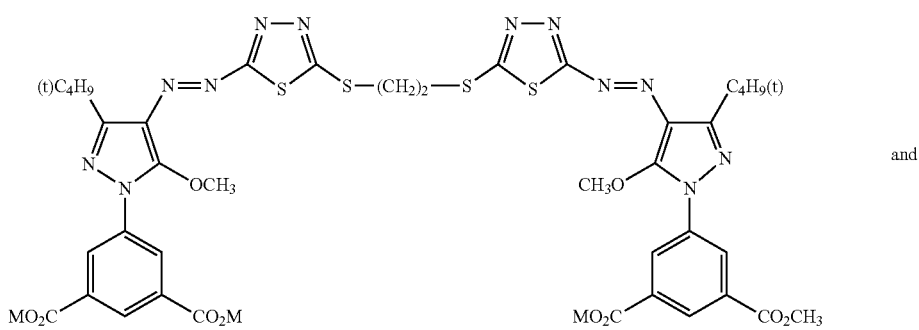

7 and

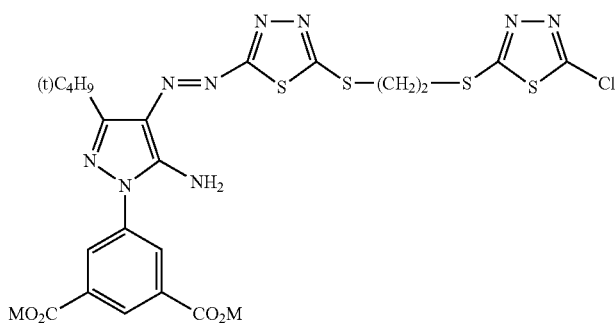

8 wherein in Group A, M's each independently represent a hydrogen atom or a cation, and when M represents a cation, M represents $Li^+$ ion, $Na^+$ ion, $K^+$ ion, or $NH_4^+$ ion;

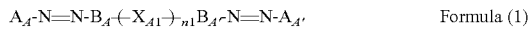  Formula (1)

wherein in Formula (1), $A_A$ and $A_{A'}$ each independently represent an aryl group or a monovalent heterocyclic group, $B_A$ and $B_{A'}$ each independently represent an arylene group or a divalent heterocyclic group, $X_{A1}$ represents a divalent linking group, and n1 represents 0 or 1, provided that at least one of $A_A$, $B_A$, $A_{A'}$, and $B_{A'}$ are a heterocyclic group;

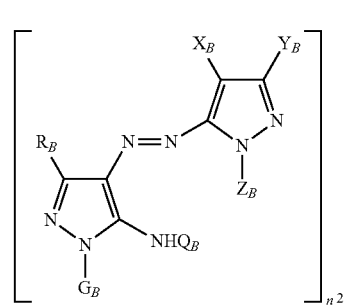  Formula (2)

wherein in Formula (2), $G_B$ represents a heterocyclic group, $n^2$ represents an integer of 1 to 3, when $n^2$ is 1, $R_B$, $X_B$, $Y_B$, $Z_B$ and $Q_B$ represent a monovalent group, when $n^2$ is 2, $R_B$, $X_B$, $Y_B$, $Z_B$ and $Q_B$ represent a monovalent or divalent substituent, and at least one of $R_B$, $X_B$, $Y_B$, $Z_B$ and $Q_B$ represents a divalent substituent, when $n^2$ is 3, $R_B$, $X_B$, $Y_B$, $Z_B$ and $Q_B$ represent a monovalent, divalent or trivalent substituent, and at least two $R_B$, $X_B$, $Y_B$, $Z_B$ and $Q_B$ represent a divalent substituent or at least one thereof represents a trivalent substituent;

Formula (3):

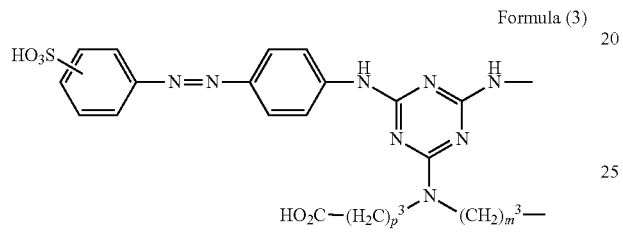

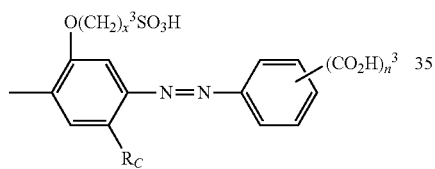

wherein in Formula (3), $R_C$ represents an alkyl group having 1 to 4 carbon atoms, $n^3$ n represents 1 or 2, $x^3$ represents an integer of 2 to 4, and $m^3$ and $p^3$ each independently represent an integer of 1 to 3;

Formula (4)

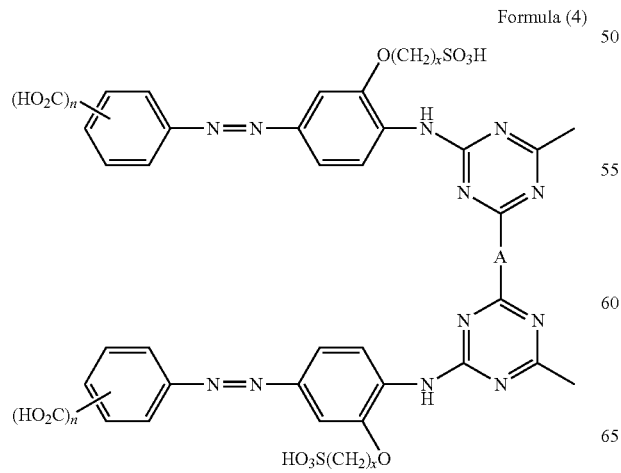

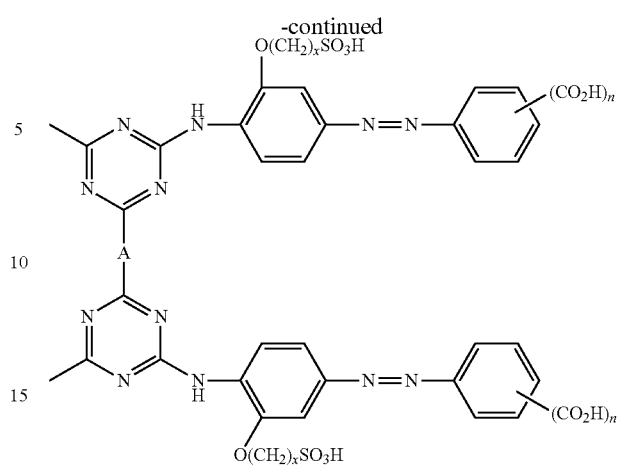

wherein in Formula (4), n represents 1 or 2, x represents an integer of 2 to 4, and A represents a divalent bonding group represented by any one of Formulas (A-1) to (A-3):

 Formula (A-1)

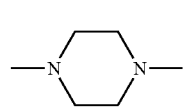 Formula (A-2)

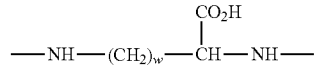 Formula (A-3)

wherein in Formulas (A-1) and (A-3), y represents an integer of 2 to 6, and w represents an integer of 1 to 4;

Formula (5)

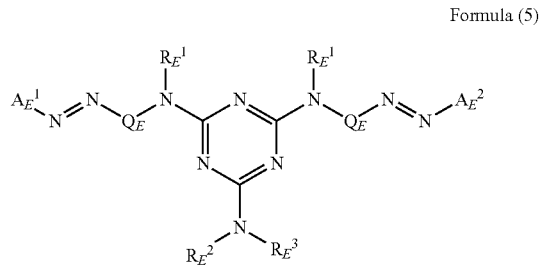

wherein in Formula (5), $A_E^1$ and $A_E^2$ are each independently a phenyl group or a naphthyl group which is optionally substituted, each of $Q_E$'s is independently a phenylene group which is optionally substituted, each of $R_E^1$'s is independently H, or an alkyl group which is optionally substituted, $R_E^2$ is H, or an alkyl group which is optionally substituted, $R_E^3$ is an alkyl group having a sulfo group, provided that the compound of Formula (5) has at least one carboxylic acid group and the compound of Formula (5) is not a compound represented by Formula (B-1):

Formula (B-1)

[Structure: naphthalene-(SO$_3$H)$_{m^5}$ with N=N linked to phenyl-NH-methyl; and triazine structure with NH(CH$_2$)$_{x^5}$SO$_3$H and methyl groups, connected via NH to phenyl-N=N-phenyl-(CO$_2$H)$_{n^5}$]

wherein m$^5$ is 1 or 2,
n$^5$ is 1 or 2, and
x$^5$ is 2 to 4;

Formula (6)

[Structure: benzothiazole with (S$_{F1}$)$_{a^6}$, (W$_{F1}$)$_{m^6}$ substituents, connected to phenyl with (S$_{F2}$)$_{b^6}$, (W$_{F2}$)$_{n^6}$, then N=N; and methylphenyl with (S$_{F3}$)$_{c^6}$, (W$_{F3}$)$_{o^6}$ connected to benzothiazole with (S$_{F4}$)$_{d^6}$, (W$_{F4}$)$_{p^6}$]

wherein in Formula (6), each of S$_{F1}$, S$_{F2}$, S$_{F3}$ and S$_{F4}$ is independently a substituent other than a water-dispersible substituent, each of W$_{F1}$, W$_{F2}$, W$_{F3}$, and W$_{F4}$ is independently a water-dispersible substituent, a$^6$, b$^6$, c$^6$, and d$^6$ are each independently 0 to 4,
m$^6$, n$^6$, o$^6$, and p$^6$ are each independently 0 to 4,
(a$^6$+m$^6$) has a value of 0 to 4,
(b$^6$+n$^6$) has a value of 0 to 4,
(c$^6$+o$^6$) has a value of 0 to 4,
(d$^6$+p$^6$) has a value of 0 to 4, and
(n$^6$+o$^6$) has a value of 1 to 8;

Formula (7):

[Structure: (W$_G^1$)$_{d^7}$ and (S$_G^1$)$_{c^7}$ on A$_G$, connected via N=N to pyridinium ring with R$_G^2$, (W$_G^2$)$_{a^7}$, (S$_G^2$)$_{b^7}$, HO, R$_G^1$, and =O]

Formula (8)

[Structure: naphthalene with (W$_G^3$)$_{n^7}$ and (S$_G^3$)$_{g^7}$, connected via N=N-Q$_G^1$-N(R$_G^a$)-C(=O)-N(R$_G^b$)-]

—Q$_G^2$—N=N—[naphthalene with (W$_G^4$)$_{e^7}$ and (S$_G^4$)$_{f^7}$]

wherein in Formulas (7) and (8), A$_G$ is an aryl or heteroaryl group, or a group containing an aryl or heteroaryl group, Q$_G^1$ and Q$_G^2$ are each independently a phenylene group which is optionally substituted, R$_G^1$, R$_G^2$, R$_G^a$ and R$_G^b$ are each independently H, an alkyl group which is optionally substituted, an aryl group which is optionally substituted, or an aryl alkyl group which is optionally substituted, each of W$_G^1$, W$_G^2$, W$_G^3$ and W$_G^4$ is independently a —CO$_2$H, —SO$_3$H or —PO$_3$H$_2$ group, or an alkyl group which is substituted with one or more groups selected from the group consisting of —CO$_2$H, —SO$_3$H and —PO$_3$H$_2$, each of S$_G^1$, S$_G^2$, S$_G^3$ and S$_G^4$ is independently a substituent other than a group defined as W$_G^1$, W$_G^2$, W$_G^3$ and W$_G^4$, a$^7$ and d$^7$ are each independently 1 to 5,
b$^7$ and c$^7$ are each independently 0 to 4,
(a$^7$+b$^7$) is a value of 1 to 5,
(c$^7$+d$^7$) is a value of 1 to 5,
e$^7$ and h$^7$ are each independently 1 to 7,
f$^7$ and g$^7$ are each independently 0 to 6,
(e$^7$+f$^7$) has a value of 1 to 7; and
(g$^7$+h$^7$) has a value of 1 to 7.

2. The ink composition according to claim 1, wherein the second coloring material is at least one compound selected from the group consisting of Compounds 1, 2, 3 and 8.

3. The ink composition according to claim 1, wherein all of M in both of the compound represented by Formula (Y) and the compound selected from the group consisting of compounds designated as Group A are a K$^+$ ion.

4. The ink composition according to claim 1, wherein the mass ratio of the content (% by mass) of the second coloring material in the ink composition to the content (% by mass) of the first coloring material in the ink composition is 0.001 to 0.2.

5. The ink composition according to claim 1, wherein a content of the second coloring material in the ink composition is 0.01% by mass to 1.1% by mass based on a total mass of the ink composition.

6. The ink composition according to claim 1, wherein a content of the first coloring material represented by Formula (Y) is 0.1% by mass to 10% by mass based on a total mass of the ink composition.

7. The ink composition according to claim 1, wherein a content of the third coloring material is 0.1% by mass to 10% by mass based on the total mass of the ink composition.

8. The ink composition according to claim 1, wherein a content (% by mass) of the first coloring material in the ink composition is 1.0 time to 5.0 times by mass ratio than a content (% by mass) of the third coloring material.

9. The ink composition according to claim 8, wherein the content (% by mass) of the first coloring material in the ink composition is 2.0 times to 4.0 times by mass ratio than the content (% by mass) of the third coloring material.

10. An ink for inkjet recording comprising the ink composition according to claim 1.

11. An inkjet recording method utilizing the ink for inkjet recording according to claim 10.

12. An inkjet recording method comprising:
discharging ink droplets to an image-receiving material having an image-receiving layer containing white inorganic pigment particles on a substrate in accordance with a recording signal to record an image on the image-receiving material,
wherein the ink droplets are made of the ink for inkjet recording according to claim 10.

* * * * *